(12) United States Patent
Kanno et al.

(10) Patent No.: US 9,768,643 B2
(45) Date of Patent: Sep. 19, 2017

(54) WIRELESS POWER TRANSMISSION SYSTEM CAPABLE OF CONTINUING POWER TRANSMISSION WHILE SUPPRESSING HEATUP OF FOREIGN OBJECTS

(71) Applicant: PANASONIC INTELLECTUAL PROPERTY MANAGEMENT CO., LTD., Osaka (JP)

(72) Inventors: Hiroshi Kanno, Osaka (JP); Kenichi Asanuma, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 814 days.

(21) Appl. No.: 14/068,453

(22) Filed: Oct. 31, 2013

(65) Prior Publication Data

US 2014/0159501 A1 Jun. 12, 2014

Related U.S. Application Data

(60) Provisional application No. 61/721,698, filed on Nov. 2, 2012, provisional application No. 61/721,729, filed on Nov. 2, 2012.

(30) Foreign Application Priority Data

Jul. 8, 2013 (JP) .................................. 2013-142483

(51) Int. Cl.
*H01F 38/14* (2006.01)
*H02J 17/00* (2006.01)
(Continued)

(52) U.S. Cl.
CPC ............. *H02J 17/00* (2013.01); *B60L 11/007* (2013.01); *B60L 11/182* (2013.01);
(Continued)

(58) Field of Classification Search
CPC .................................. H02J 17/00; H02J 50/00
See application file for complete search history.

(56) References Cited

U.S. PATENT DOCUMENTS

| 8,026,694 B2 | 9/2011 | Kamijo et al. |
| 2008/0278264 A1 | 11/2008 | Karalis et al. |

(Continued)

FOREIGN PATENT DOCUMENTS

| CN | 101179207 | 5/2008 |
| CN | 101197507 | 6/2008 |

(Continued)

OTHER PUBLICATIONS

Extended European Search Report issued Mar. 30, 2015 in corresponding European Patent Application No. 13851383.3.

(Continued)

*Primary Examiner* — Jared Fureman
*Assistant Examiner* — Joel Barnett
(74) *Attorney, Agent, or Firm* — Wenderoth, Lind & Ponack, L.L.P.

(57) ABSTRACT

A power transmitting antenna includes a first resonant circuit including a power transmitting coil, a power receiving antenna includes a second resonant circuit including a power receiving coil. When the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency. A wireless power transmitting apparatus is provided with a power transmitting circuit configured to generate high-frequency power at a variable frequency, and supply the (Continued)

high-frequency power to the power transmitting antenna. A control circuit sets the frequency of the high-frequency power generated by the power transmitting circuit to one of the odd-mode resonance frequency and the even-mode resonance frequency.

16 Claims, 66 Drawing Sheets

(51) Int. Cl.
  *B60L 11/00* (2006.01)
  *B60L 11/18* (2006.01)
  *H02J 50/00* (2016.01)
  *H02J 7/02* (2016.01)

(52) U.S. Cl.
  CPC ....... *B60L 11/1824* (2013.01); *B60L 11/1833* (2013.01); *H01F 38/14* (2013.01); *H02J 50/00* (2016.02); *B60L 2200/12* (2013.01); *B60L 2210/10* (2013.01); *B60L 2210/30* (2013.01); *B60L 2210/40* (2013.01); *B60L 2230/22* (2013.01); *B60L 2240/36* (2013.01); *H02J 7/025* (2013.01); *Y02T 10/7005* (2013.01); *Y02T 10/7088* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | |
|---|---|---|
| 2009/0001932 A1* | 1/2009 | Kamijo ................ H02J 5/005 320/108 |
| 2009/0284082 A1 | 11/2009 | Mohammadian |
| 2010/0033021 A1 | 2/2010 | Bennett |
| 2011/0089769 A1 | 4/2011 | Kwon et al. |
| 2012/0001493 A1* | 1/2012 | Kudo ................ H02J 5/005 307/104 |
| 2012/0049647 A1 | 3/2012 | Kim et al. |
| 2012/0161536 A1 | 6/2012 | Kamata et al. |
| 2012/0169137 A1 | 7/2012 | Lisi et al. |
| 2012/0274149 A1 | 11/2012 | Kanno et al. |
| 2012/0280575 A1 | 11/2012 | Kim et al. |
| 2012/0326499 A1 | 12/2012 | Ichikawa et al. |
| 2012/0326662 A1 | 12/2012 | Matsumoto et al. |
| 2013/0127257 A1* | 5/2013 | Yamamoto ............ H01F 38/14 307/104 |
| 2013/0134796 A1 | 5/2013 | Kanno |
| 2013/0163635 A1 | 6/2013 | Karanth et al. |
| 2015/0162785 A1 | 6/2015 | Lee et al. |
| 2015/0270716 A1 | 9/2015 | Waffenschmidt |

FOREIGN PATENT DOCUMENTS

| | | |
|---|---|---|
| JP | 2008-206327 | 9/2008 |
| JP | 2009-011129 | 1/2009 |
| JP | 4743173 | 8/2011 |
| JP | 2012-016171 | 1/2012 |
| WO | 2011/086445 | 7/2011 |
| WO | 2011/132471 | 10/2011 |
| WO | 2012/147339 | 11/2012 |

OTHER PUBLICATIONS

Hiroshi Hirayama et al., "A Consideration of Electro-Magnetic-Resonant Coupling Mode in Wireless Power Transmission", IEICE Electronics Express, vol. 6, No. 19, Oct. 10, 2009, pp. 1421-1425.
Chinese Office Action issued Dec. 4, 2015 in related Chinese Patent Application No. 201380004567.X with English translation of Search Report.
Written Opinion of the International Searching Authority issued Jan. 14, 2014 in International (PCT) Application No. PCT/JP2013/006492.
Ikuo Awai et al., "EM Field Made by Dual Spiral Resonator and Its Application to the WPT System," Technical Report of IEICE, WPT2012-20, Aug. 2012, pp. 29-34, with abstract.
Tatsuya Hosotani, "A Novel Design Theory for Wireless Power Transfer System with Electromagnetic Field Resonant Coupling Using Soft-Switching Technique", Technical Report of IEICE, WPT2011-22, Dec. 2011, with abstract.
Hirayama, "Equivalent Circuit and Calculation of Its Parameters of Magnetic-Coupled Resonant Wireless Power Transfer," pp. 117-132, Jan. 25, 2012.

\* cited by examiner

Fig.7
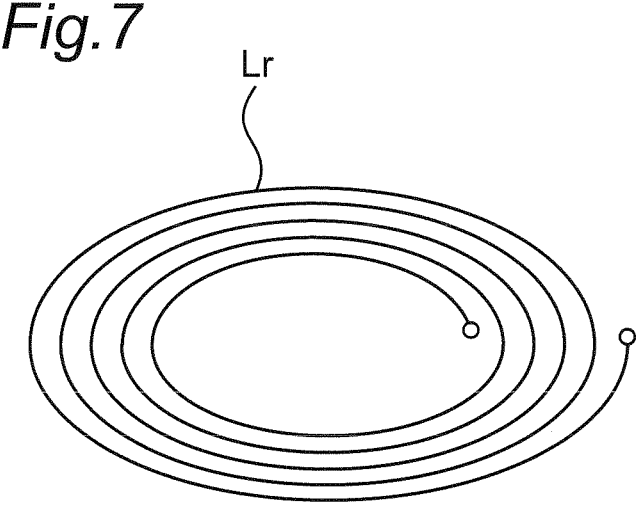
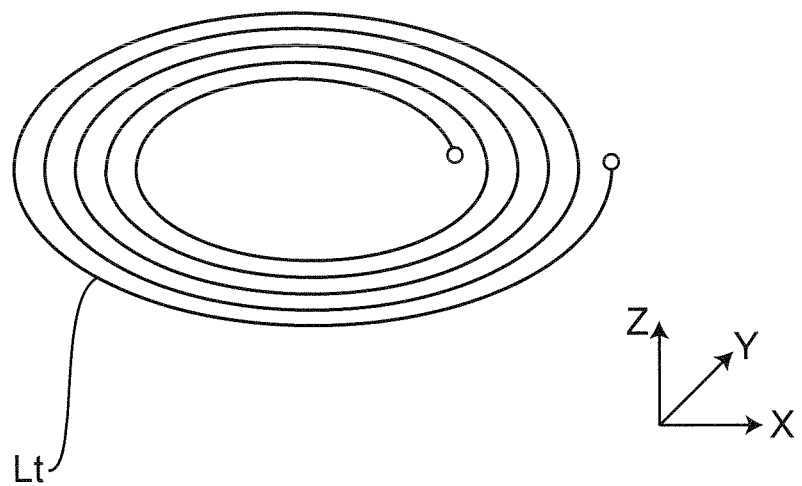

WIRELESS POWER TRANSMISSION SYSTEM CAPABLE OF CONTINUING POWER TRANSMISSION WHILE SUPPRESSING HEATUP OF FOREIGN OBJECTS

BACKGROUND OF THE INVENTION

1. Field of the Invention

The present disclosure relates to a wireless power transmission system for wirelessly and contactlessly transmitting power using resonant magnetic coupling. The present disclosure also relates to a wireless power transmitting apparatus and a wireless power receiving apparatus which are used in the wireless power transmission system, and relates to control circuits of the wireless power transmitting apparatus and the wireless power receiving apparatus.

2. Description of Related Art

U.S. Patent Application Publication No. 2008/0278264 (FIGS. 12 and 14) discloses a wireless power transmission apparatus for transmitting energy through space between two resonant circuits. The wireless power transmission apparatus wirelessly (contactlessly) transmits oscillating energy by coupling two resonant circuits through leakage of oscillating energy at a resonance frequency (evanescent tail) generated in space around the resonant circuits.

If a metal foreign object is present near a coil of a power transmitting resonant circuit or a coil of a power receiving resonant circuit during power transmission of a wireless power transmission system, an eddy current may be generated on the metal foreign object, resulting in heating of the metal foreign object. In order to safely use the wireless power transmission system, it is necessary to suppress heating of the metal foreign object.

For example, a noncontact power transmission system disclosed in Japanese Patent No. 4743173 stops power transmission upon detecting a metal foreign object, thus suppressing heating of the metal foreign object.

However, in a wireless power transmission system that stops power transmission whenever detecting a metal foreign object, the wireless power transmission system cannot resume power transmission unless a user removes the metal foreign object. In order to improve the usability of the wireless power transmission system, it is desirable that, when a metal foreign object is detected, the wireless power transmission system be able to continue power transmission while suppressing heating of the metal foreign object.

SUMMARY OF THE INVENTION

According to non-restrictive and exemplary embodiments of the present disclosure, there is provided a wireless power transmission system in which, even if a metal foreign object is present near a coil of a power transmitting resonant circuit or a coil of a power receiving resonant circuit, it is possible to continue power transmission without immediately stopping the power transmission, while suppressing heating of the metal foreign object. In addition, according to non-restrictive and exemplary embodiments of the present disclosure, there are provided a wireless power transmitting apparatus and a wireless power receiving apparatus which are used in the wireless power transmission system, and control circuits of the wireless power transmitting apparatus and the wireless power receiving apparatus.

According to a control circuit of a wireless power transmitting apparatus of an aspect of the present disclosure, there is provided a control circuit of a wireless power transmitting apparatus in a wireless power transmission system for transmitting high-frequency power from the wireless power transmitting apparatus having a power transmitting antenna to a power receiving antenna. The power transmitting antenna includes a first resonant circuit including a power transmitting coil, the power receiving antenna includes a second resonant circuit including a power receiving coil. When the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency. The wireless power transmitting apparatus is further provided with a power transmitting circuit configured to generate, from input power, high-frequency power at a variable frequency, and supply the high-frequency power to the power transmitting antenna, under control of the control circuit of the wireless power transmitting apparatus. The control circuit of the wireless power transmitting apparatus sets the frequency of the high-frequency power generated by the power transmitting circuit to one of the odd-mode resonance frequency and the even-mode resonance frequency.

These general and specific aspects may be implemented using a system, a method, a computer program, and any combination of systems, methods, and computer programs.

Additional benefits and advantages of the disclosed embodiments will be apparent from the specification and drawings. The benefits and/or advantages may be individually provided by the various embodiments and features of the specification and drawings disclosure, and need not all be provided in order to obtain one or more of the same.

According to the control circuit of the wireless power transmitting apparatus of the present disclosure, even when a metal foreign object is present near the power transmitting coil or the power receiving coil, it is possible to continue power transmission without immediately stopping the power transmission, while suppressing heating of the metal foreign object.

BRIEF DESCRIPTION OF THE DRAWINGS

FIG. 7 is a perspective view showing a configuration of a modified embodiment of a power transmitting coil Lt and a power receiving coil Lr of FIG. 6.

DETAILED DESCRIPTION OF THE INVENTION

Embodiments of wireless power transmission systems will be described below with reference to the drawings. In the following embodiments, like components are denoted by the same reference signs. Embodiments of the wireless power transmission systems are not limited to those disclosed below.

First Embodiment

Figure 1:
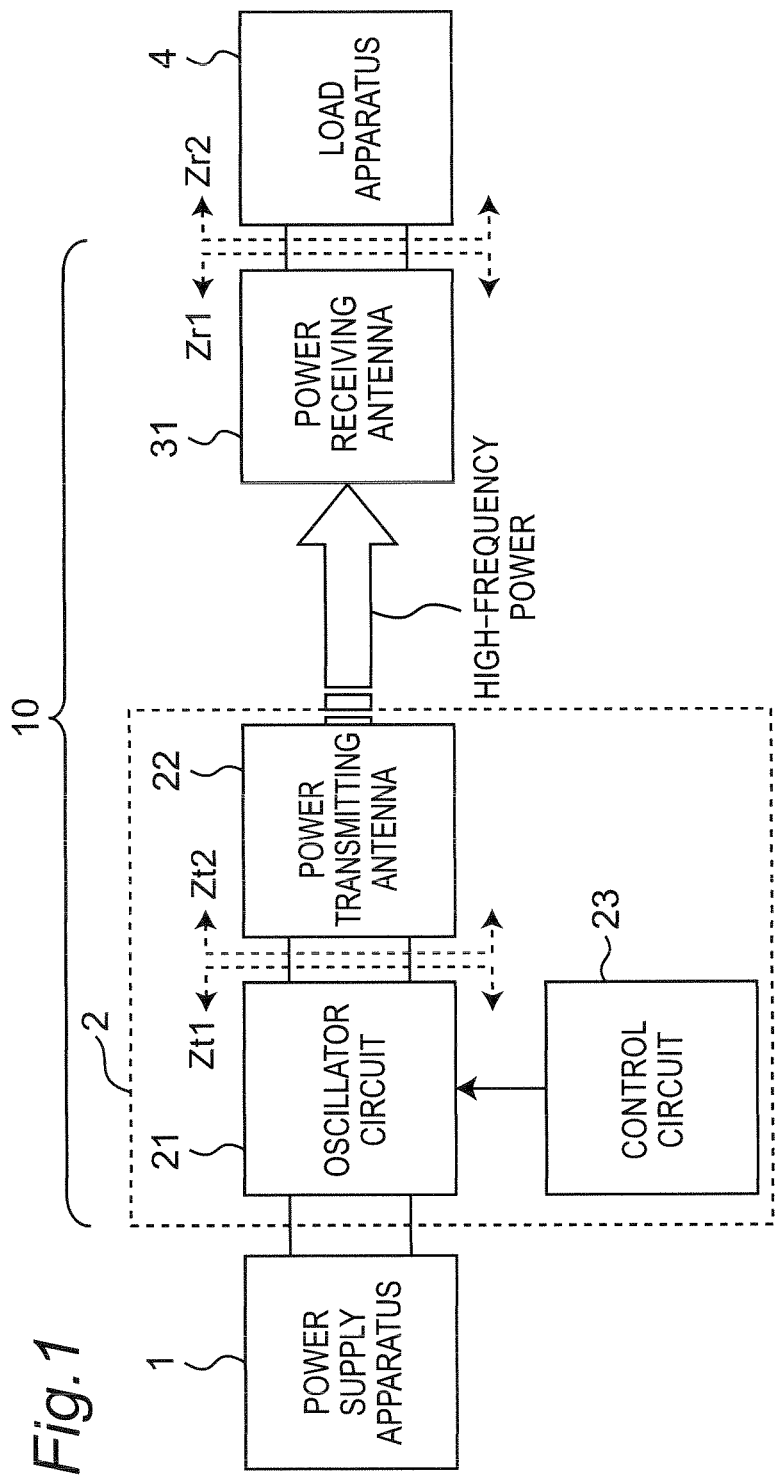
FIG. 1 is a block diagram showing a configuration of a wireless power transmission system 10 according to a first embodiment.

FIG. 1 is a block diagram showing a configuration of a wireless power transmission system 10 according to a first embodiment. The wireless power transmission system 10 includes: a wireless power transmitting apparatus 2 connected to a power supply apparatus 1; and a power receiving antenna 31 connected to a load apparatus 4. The wireless power transmission system 10 wirelessly transmits high-frequency power from a power transmitting antenna 22 of the wireless power transmitting apparatus 2 to the power receiving antenna.

The power supply apparatus 1 converts alternating-current power from a commercial alternating-current power supply, into direct-current power, and outputs the direct-current power to the wireless power transmission system 10. Alternatively, the power supply apparatus 1 converts the voltage of direct-current power from a direct-current power supply such as a battery, and outputs the power to the wireless power transmitting apparatus 2. The wireless power transmission system 10 converts the direct-current power from the power supply apparatus 1 into high-frequency power and wirelessly transmits the high-frequency power, and then, outputs the high-frequency power to the load apparatus 4. From now on, the configuration and operation of the wireless power transmission system 10 will be described with reference to an exemplary case where the load apparatus 4 is a battery charger for a mobile phone.

The wireless power transmitting apparatus 2 is provided with an oscillator circuit 21, the power transmitting antenna 22, and a control circuit 23. The oscillator circuit 21 operates as a power transmitting circuit configured to generate, from inputted direct-current power, high-frequency power at a variable frequency, and supply the high-frequency power to the power transmitting antenna 22, under the control of the control circuit 23. The oscillator circuit 21 is provided with: a pulse generator for generating a pulse sequence with a variable transmission frequency ftr; and a class-D amplifier including a switching element operable according to the pulse sequence. The oscillator circuit 21 generates high-frequency power with the transmission frequency ftr. The power transmitting antenna 22 includes an LC resonant circuit, and the power receiving antenna 31 also includes an LC resonant circuit.

The power receiving antenna 31 is electromagnetically coupled to the power transmitting antenna 22.

Figure 2:
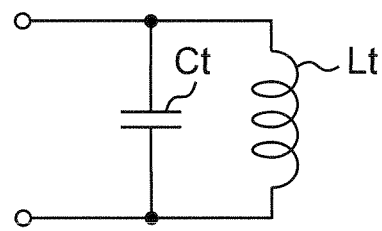
FIG. 2 is a circuit diagram showing a configuration of a power transmitting antenna 22 of FIG. 1.
Figure 3:
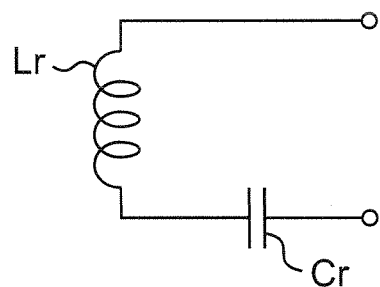
FIG. 3 is a circuit diagram showing a configuration of a power receiving antenna 31 of FIG. 1.
Figure 6:
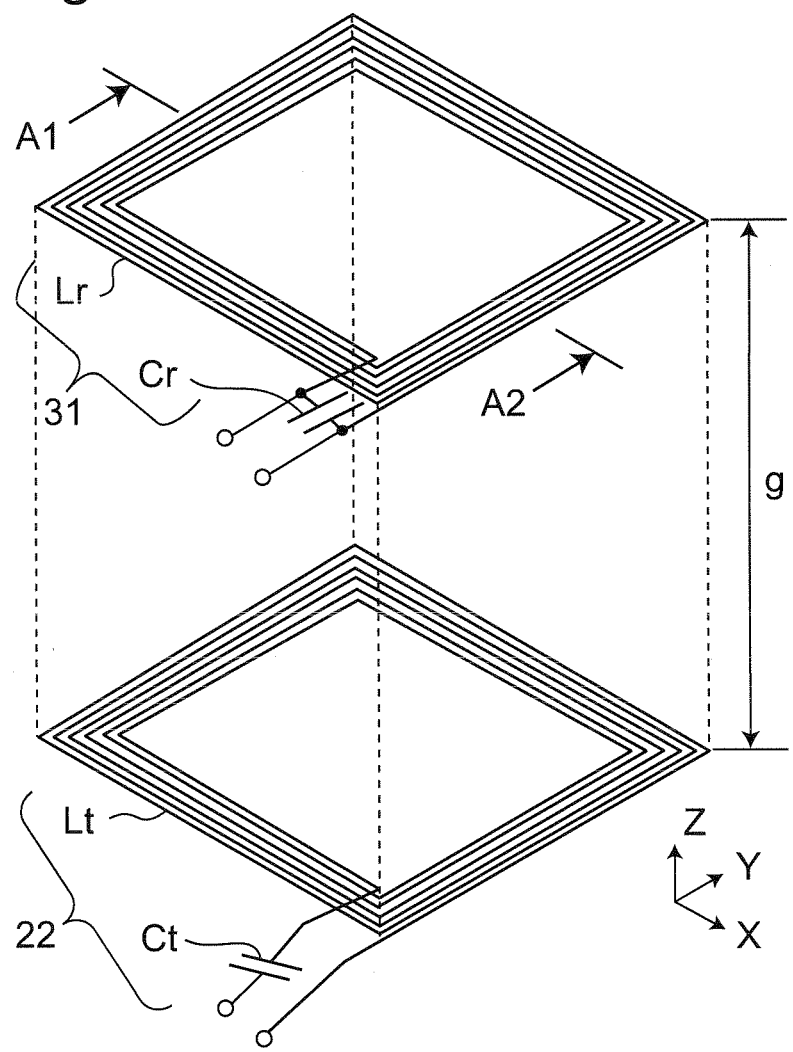
FIG. 6 is a perspective view showing an implementation example of the power transmitting antenna 22 and the power receiving antenna 31 of FIG. 1.

FIG. 2 is a circuit diagram showing a configuration of the power transmitting antenna 22 of FIG. 1. FIG. 3 is a circuit diagram showing a configuration of the power receiving antenna 31 of FIG. 1. As shown in FIG. 2, the power transmitting antenna 22 is configured to include an LC parallel resonant circuit including a resonant capacitor Ct and a power transmitting coil Lt connected in parallel, and the LC parallel resonant circuit having a resonance frequency fT. On the other hand, as shown in FIG. 3, the power receiving antenna 31 is configured to include an LC series resonant circuit including a resonant capacitor Cr and a power receiving coil Lr connected in series, and the LC series resonant circuit having a resonance frequency fR. FIG. 6 is a perspective view showing an implementation example of the power transmitting antenna 22 and the power receiving antenna 31 of FIG. 1. As shown in FIG. 6, the power transmitting coil Lt and the power receiving coil Lr are, for example, square spiral coils. The power transmitting coil Lt and the power receiving coil Lr have substantially planar configurations, so as to be opposed to each other with a certain gap "g" therebetween. In this case, the gap g is set to, for example, several millimeters to several tens of centimeters, so that the power transmitting coil Lt and the power receiving coil Lr are electromagnetically coupled to each other. In addition, FIG. 7 is a perspective view showing a configuration of a modified embodiment of the power transmitting coil Lt and the power receiving coil Lr of FIG. 6. As shown in FIG. 7, the power transmitting coil Lt and the power receiving coil Lr may be, for example, circular spiral coils.

As shown in FIGS. 6 and 7, each of the power transmitting coil Lt and the power receiving coil Lr is, for example, a spiral coil including a winding wound substantially on a plane, and having a square or other shape. Each of the power transmitting coil Lt and the power receiving coil Lr has a central portion and a peripheral portion. The power transmitting coil Lt is provided close to the power receiving coil Lr such that, when the power transmitting antenna 22 and the power receiving antenna 31 are electromagnetically coupled to each other, the central portion of the power transmitting coil Lt is opposed to the central portion of the power receiving coil Lr, and the peripheral portion of the power transmitting coil Lt is opposed to the peripheral portion of the power receiving coil Lr. In this case, each winding of the power transmitting coil Lt and the power receiving coil Lr is not limited to being wound on a plane, and may be wound on a curved surface or in any other shape, as long as the central portion of the power transmitting coil Lt is opposed to the central portion of the power receiving coil Lr, and the peripheral portion of the power transmitting coil Lt is opposed to the peripheral portion of the power receiving coil Lr. In addition, at least a part of the windings of the power transmitting coil Lt and the power receiving coil Lr may be wound such that the central portion of the power transmitting coil Lt is opposed to the central portion of the power receiving coil Lr, and the peripheral portion of the power transmitting coil Lt is opposed to the peripheral portion of the power receiving coil Lr.

Figure 4:
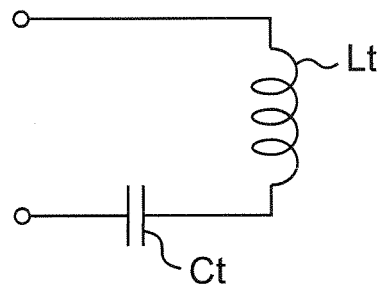
FIG. 4 is a circuit diagram showing a configuration of a power transmitting antenna 22a according to a modified embodiment of the power transmitting antenna 22 of FIG. 2.
Figure 5:
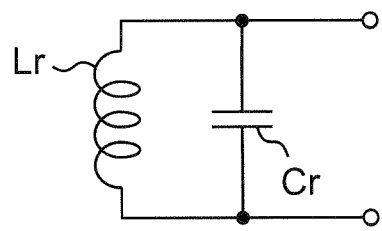
FIG. 5 is a circuit diagram showing a configuration of a power receiving antenna 31a according to a modified embodiment of the power receiving antenna 31 of FIG. 3.

Although the power transmitting antenna 22 of FIG. 2 is a parallel resonant circuit and the power receiving antenna 31 of FIG. 3 is a series resonant circuit, the power transmitting antenna and the power receiving antenna are not limited thereto. FIG. 4 is a circuit diagram showing a configuration of a power transmitting antenna 22a according to a modified embodiment of the power transmitting antenna 22 of FIG. 2. The power transmitting antenna 22a of FIG. 4 may be used instead of the power transmitting antenna 22 of FIG. 2. The power transmitting antenna 22a is a series resonant circuit including a resonant capacitor Ct and a power transmitting coil Lt. In addition, FIG. 5 is a circuit diagram showing a configuration of a power receiving antenna 31a according to a modified embodiment of the power receiving antenna 31 of FIG. 3. The power receiving antenna 31a of FIG. 5 may be used instead of the power receiving antenna 31 of FIG. 3. The power receiving antenna 31a is a parallel resonant circuit including a resonant capacitor Cr and a power receiving coil Lr. In addition, each of the power transmitting antenna and the power receiving antenna may be a self-resonant circuit using its wire's parasitic capacitance.

One of the power transmitting antenna 22 and the power receiving antenna 31 may include a coil and a capacitor connected in series, and the other may include a coil and a capacitor connected in parallel. Alternatively, both the power transmitting antenna 22 and the power receiving antenna 31 may include a coil and a capacitor connected in series, and both the power transmitting antenna 22 and the power receiving antenna 31 may include a coil and a capacitor connected in parallel.

In addition, in FIG. 1, when the load apparatus 4 is connected to the power receiving antenna 31, and the power transmitting antenna 22 and the power receiving antenna 31 are electromagnetically coupled to each other, an output impedance Zt1 for the case where an input terminal of the power transmitting antenna 22 is seen from an output terminal of the oscillator circuit 21 is set to be substantially equal to an input impedance Zt2 for the case where the output terminal of the oscillator circuit 21 is seen from the input terminal of the power transmitting antenna 22. Further, when the oscillator circuit 21 is connected to the power transmitting antenna 22, and the power transmitting antenna 22 and the power receiving antenna 31 are electromagnetically coupled to each other, an output impedance Zr1 for the case where the load apparatus 4 is seen from an output terminal of the power receiving antenna 31 is set to be substantially equal to an input impedance Zr2 for the case where the output terminal of the power receiving antenna 31 is seen from the load apparatus 4. It is noted that "substantially equal" in impedance means that the difference between the absolute values of the impedances is 25% or less than the absolute value of the higher one of the impedances. By setting the impedances in this manner, it is possible to suppress multiple reflections of high-frequency energy between circuit blocks, thus substantially maximizing total transmission efficiency.

Referring to FIG. 1, the oscillator circuit 21 drives the switching element of the above-described class-D amplifier according to the pulse sequence with the transmission frequency ftr, and thus, converts a direct-current voltage from the power supply apparatus 1, into a high-frequency voltage, and outputs the high-frequency voltage to the power transmitting antenna 22. When the power transmitting antenna 22 is provided close to the power receiving antenna 31 such that they are electromagnetically coupled to each other, the high-frequency voltage from the oscillator circuit 21 is transmitted to the power receiving antenna 31 through the power transmitting antenna 22 at the transmission frequency ftr, and is supplied to the load apparatus 4. That is, the power from the power supply apparatus 1 is transmitted contactlessly by resonant magnetic coupling between the power transmitting antenna 22 and the power receiving antenna 31.

It is noted that the power transmitting antenna 22 and the power receiving antenna 31 are not normal antennas for transmission and reception of radiated electromagnetic field, but elements for energy transmission between two objects using the coupling of near-field components (evanescent tails) of the electromagnetic field of the resonant circuits, as described above. According to wireless power transmission using a resonant magnetic field, no energy loss during a long distance propagation of an electromagnetic wave (radiation loss) occurs, and therefore, it is possible to transmit power with very high efficiency. Such energy transmission using the coupling of resonant electromagnetic-fields (near fields) can not only provide a smaller loss than that of the well-known wireless power transmission using Faraday's law of electromagnetic induction, but also transmit energy with high efficiency between two resonant circuits (antennas) separated by, for example, several meters. It is noted that the resonance frequency fT of the power transmitting antenna 22 and/or the resonance frequency fR of the power receiving antenna 31 do not need to be completely identical to the transmission frequency ftr.

Figure 8:
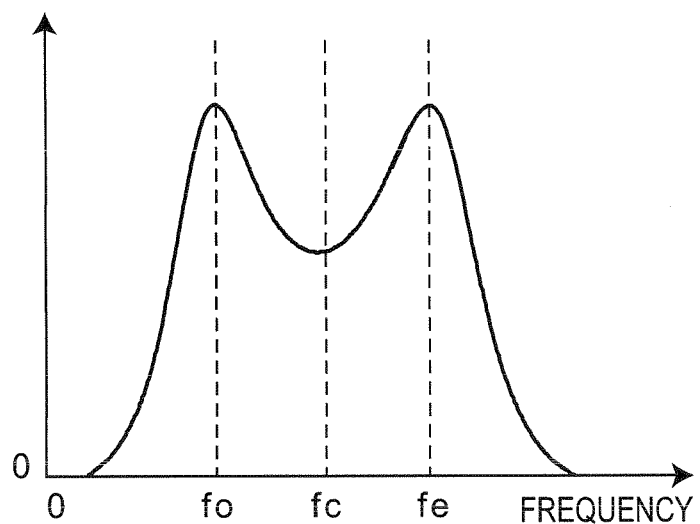
FIG. 8 is a graph showing the characteristics of transmission efficiency versus frequency of the wireless power transmission system 10 of FIG. 1.

FIG. 8 is a graph showing the characteristics of transmission efficiency versus frequency of the wireless power transmission system 10 of FIG. 1. In general, the resonance frequency f of an LC resonant circuit having an inductance L and a capacitance C is obtained by: $f=1/(2\pi\sqrt{(LC)})$. Meanwhile, it is known that when a plurality of resonators are electromagnetically coupled to each other, their resonance frequency is split into the same number of frequencies as the number of the resonators. In a system of two resonators electromagnetically coupled to each other, the resonance frequency of the system is split into two frequencies, so-called even mode and odd mode (see: Ikuo AWAU, et al., "EM Field Made by a Dual Spiral Resonator and Its Application to the WPT system", Institute of Electronics, Information and Communication Engineers (IEICE) technical report, WPT2012-20, pp. 29-34, August 2012; and Tatsuya HOSOTANI, "A Novel Design Theory for Wireless Power Transfer System with Electromagnetic Field Resonant Coupling Using Soft-Switching Technique", IEICE technical report, WPT2011-22, December 2011). Normally, an even-mode resonance frequency and an odd-mode resonance frequency have different values from each other. It can be considered that the resonant condition (resonant mode) of a lower resonance frequency fo is the odd mode, and the resonant condition (resonant mode) of a higher resonance frequency fe is the even mode. In an electromagnetic space including a pair of the power transmitting antenna 22 and the power receiving antenna 31 of the present specification, the power transmitting coil Lt is close to the power receiving coil Lr such that they are electromagnetically coupled to each other, and two separate resonance frequencies, i.e., the odd-mode resonance frequency fo, and the even-mode resonance frequency fe higher than the odd-mode resonance frequency fo, occur.

It is noted that although the two resonance frequencies fo and fe vary depending on the connection impedances to the preceding and subsequent circuits connected to the input and output portions of the power transmitting antenna 22 and the power receiving antenna 31, it does not change the fact that the resonance frequency is split into two values due to two resonators coupled to each other. In the present specification, the resonant mode of a lower resonance frequency fo of two separate resonance frequencies occurring when the power transmitting antenna 22 and the power receiving antenna 31 are coupled to each other is defined as odd mode, and the resonant mode of a higher resonance frequency fe is defined as even mode.

As shown in FIG. 8, in general, it is possible to maximize the transmission efficiency by setting the transmission frequency ftr to the resonance frequency fo or fe. The control circuit 23 of the wireless power transmitting apparatus 2 sets the frequency of high-frequency power generated by the oscillator circuit 21, i.e., transmission frequency ftr, to one of the odd-mode resonance frequency fo and the even-mode resonance frequency fe.

Figure 9:
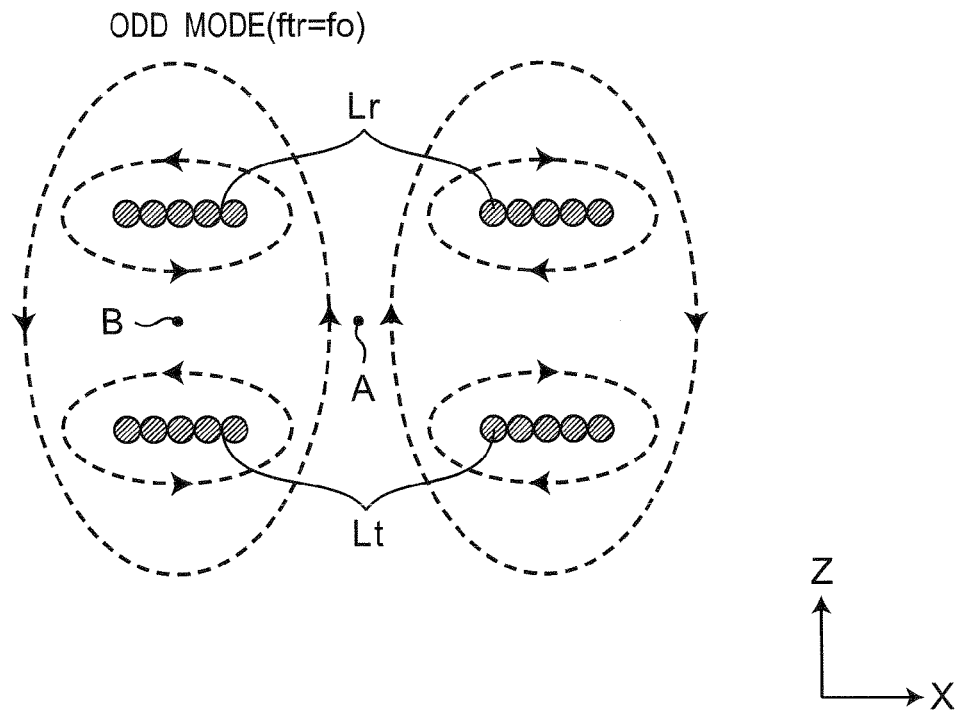
FIG. 9 is a cross-sectional view showing a magnetic flux distribution in the wireless power transmission system 10 of FIG. 1, for the case where the power transmitting antenna 22 and the power receiving antenna 31 are in an odd-mode resonant condition.
Figure 10:
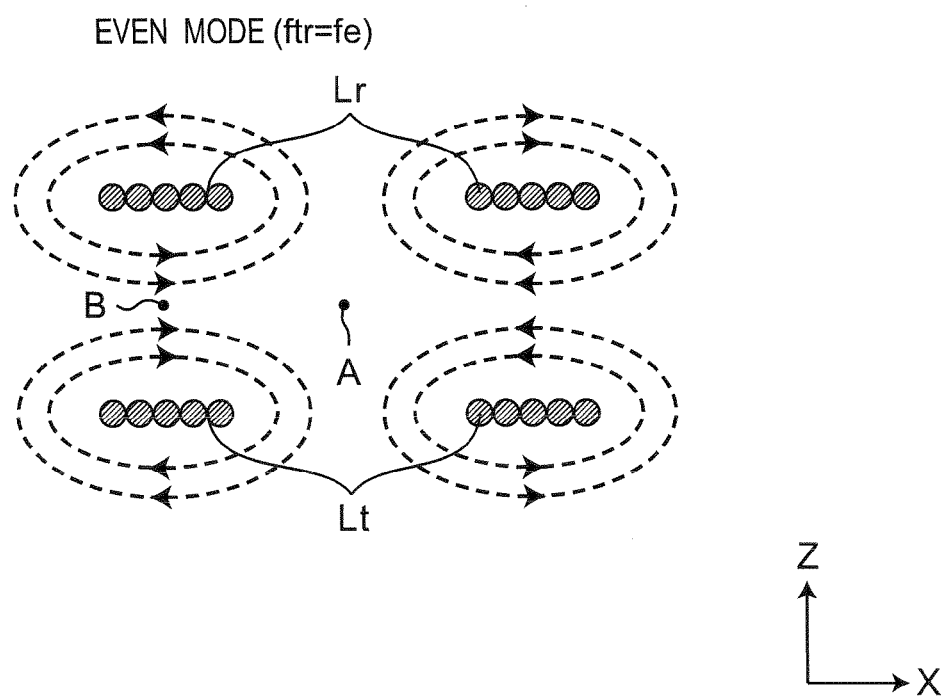
FIG. 10 is a cross-sectional view showing a magnetic flux distribution in the wireless power transmission system 10 of FIG. 1, for the case where the power transmitting antenna 22 and the power receiving antenna 31 are in an even-mode resonant condition.

FIG. 9 is a cross-sectional view showing a magnetic flux distribution for the case where the power transmitting antenna 22 and the power receiving antenna 31 are in the odd-mode resonant condition in the wireless power transmission system 10 of FIG. 1. FIG. 10 is a cross-sectional view showing a magnetic flux distribution for the case where the power transmitting antenna 22 and the power receiving antenna 31 are in the even-mode resonant condition in the wireless power transmission system 10 of FIG. 1. FIGS. 9 and 10 schematically show a cross-section along line A1-A2 of FIG. 6. In addition, in FIGS. 9 and 10, arrows indicate the main directions of a magnetic flux. In the case of FIG. 9, the transmission frequency ftr is set to the odd-mode resonance frequency fo. In the case of FIG. 10, the transmission frequency ftr is set to the even-mode resonance frequency fe. In the wireless power transmission system 10 of FIG. 1, the power transmitting antenna and the power receiving antenna are coupled to each other based on a magnetic field distribution variable according to the frequency selected as the transmission frequency ftr.

When the power transmitting antenna 22 and the power receiving antenna 31 are in the odd-mode resonant condition, a magnetic field inside the power transmitting coil Lt and a magnetic field inside the power receiving coil Lr occur in the same direction (in FIG. 9, +Z direction). When the power transmitting antenna 22 and the power receiving antenna 31 are in the even-mode resonant condition, a magnetic field inside the power transmitting coil Lt and a magnetic field inside the power receiving coil Lr occur in opposite directions (in FIG. 10, +Z direction for the power transmitting coil Lt, and −Z direction for the power receiving coil Lr). Referring to FIGS. 9 and 10, the magnetic flux density at the central portion of the power transmitting coil Lt and the power receiving coil Lr (point A) is lower in the even-mode resonant condition (ftr=fe) than in the odd-mode resonant condition (ftr=fo). On the other hand, The magnetic flux density at the peripheral portion of the power transmitting coil Lt and the power receiving coil Lr (point B) is lower in the odd-mode resonant condition than in the even-mode resonant condition.

When a foreign object made of metal, magnetic, etc., (hereinafter, referred to as a metal foreign object) enters near the power transmitting coil Lt or the power receiving coil Lr during power transmission of the wireless power transmission system 10, the stronger the magnetic flux density distributed in space increases, the more eddy current flows on the surface of the metal foreign object. Therefore, the stronger the magnetic flux density increases, the higher the amount of heating on the surface of the metal foreign object increases. As is apparent from FIGS. 9 and 10, the amount of heating of the metal foreign object varies depending on the relative positional relationship among the power transmitting coil Lt, the power receiving coil Lr, and the metal foreign object, and also depending on the transmission mode of the wireless power transmission system 10 (even mode and odd mode). Hence, when the metal foreign object is located at the central portion of the power transmitting coil Lt or the power receiving coil Lr, it is possible to suppress heating of the metal foreign object, by setting the transmission frequency ftr to the resonance frequency fe for the even-mode power transmission. On the other hand, when the metal foreign object is located at the peripheral portion of the power transmitting coil Lt or the power receiving coil Lr, it is possible to suppress heating of the metal foreign object, by setting the transmission frequency ftr to the resonance frequency fo for the odd-mode power transmission.

As described above, resonant wireless power transmission by the wireless power transmission system 10 of FIG. 1 has two transmission modes (even mode and odd mode), by which the wireless power transmission system 10 can substantially maximize transmission efficiency and ensure good transmission characteristics. In addition, even when the position of a metal foreign object is unknown, there is a possibility to reduce heating of the metal foreign object by using one transmission mode of the even mode or the odd mode, as compared to the transmission using the other transmission mode.

Further, in the wireless power transmission system 10 of FIG. 1, we analyzed temperature variations of a metal foreign object, obtained when the metal foreign object was disposed between the power transmitting coil Lt and the power receiving coil Lr at the coils' central portion, and the transmission frequency ftr was set to the resonance frequency fo for the odd-mode power transmission. As described above, when a metal foreign object is present between the power transmitting coil Lt and the power receiving coil Lr at the coils' central portion, the amount of heating of the metal foreign object when transmitting power in the odd mode is larger than when transmitting power in the even mode. However, even when transmitting power in the odd mode, it takes several tens of minutes for the temperature of the metal foreign object or a housing of the wireless power transmission system 10 to reach a predetermined threshold temperature (e.g., a temperature set for safety reasons, such as 45° C.). That is, this time is sufficiently longer than a cycle corresponding to the transmission frequency ftr (e.g., several 100 kHz). Therefore, even when a metal foreign object is present, and an inappropriate transmission mode not capable of suppressing heating at the position of the metal foreign object is selected, it is possible to avoid the risk of heating of the metal foreign object by changing the transmission mode to the other transmission mode before the saturation of the temperature of the metal foreign object.

Figure 11:
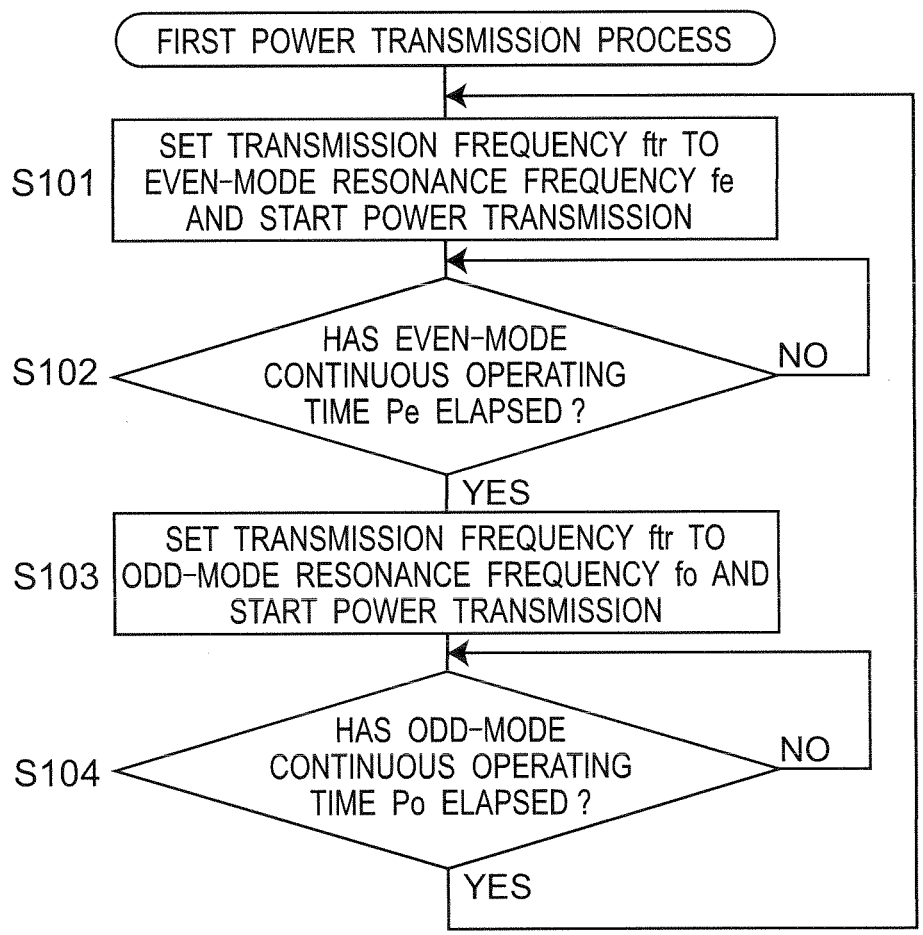
FIG. 11 is a flowchart showing a first power transmission process performed by a control circuit 23 of a wireless power transmitting apparatus 2 of FIG. 1.

FIG. 11 is a flowchart showing a first power transmission process performed by the control circuit 23 of the wireless power transmitting apparatus 2 of FIG. 1. At first, at step S101, the control circuit 23 sets the transmission frequency ftr to the even-mode resonance frequency fe, and starts power transmission. Then, at step S102, the control circuit 23 determines whether or not an even-mode continuous operating time Pe has elapsed; and if YES, the process proceeds to step S103; if NO, the process repeats step S102. At step S103, the control circuit 23 sets the transmission frequency ftr to the odd-mode resonance frequency fo, and starts power transmission. Then, at step S104, the control circuit 23 determines whether or not an odd-mode continuous operating time Po has elapsed; if YES, the process returns to step S101; if NO, the process repeats step S104.

That is, according to the power transmission process of FIG. 11, the control circuit 23 of the wireless power transmitting apparatus 2 repeatedly alternates a time interval having the continuous operating time Pe during which sets the transmission frequency ftr is set to the even-mode resonance frequency fe (a time interval for an even-mode transmission mode), and a time interval having the continuous operating time Po during which the transmission frequency fir is set to the odd-mode resonance frequency fo (a time interval for an odd-mode transmission mode).

In this case, with reference to FIG. 11, the even-mode continuous operating time Pe may be set to be, for example, shorter than the time during which the temperature of a metal foreign object reaches a predetermined threshold temperature Tth, in the case in which the metal foreign object is present at a position where a maximum amount of heating of the metal foreign object is obtained when continuing power transmission under the condition that the power transmitting coil Lt and the power receiving coil Lr are coupled in the even mode. That is, the even-mode continuous operating time Pe may be set to be, for example, shorter than the shortest time during which the temperature of a foreign object reaches the threshold temperature Tth, when high-frequency power is transmitted at the even-mode resonance frequency and the foreign object is present near the power transmitting coil Lt or the power receiving coil Lr. In addition, the odd-mode continuous operating time Po may be set to be, for example, shorter than the time during which the temperature of a metal foreign object reaches the threshold temperature Tth, in the case in which the metal foreign object is present at a position where a maximum amount of heating of the metal foreign object is obtained when continuing power transmission under the condition that the power transmitting coil Lt and the power receiving coil Lr are coupled in the odd mode. That is, the odd-mode continuous operating time Po may be set to be, for example, shorter than the shortest time during which the temperature of a foreign object reaches the threshold temperature Tth, when high-frequency power is transmitted at the odd-mode resonance frequency and the foreign object is present near the power transmitting coil Lt or the power receiving coil Lr. In this case, the continuous operating time Pe and Po are set in advance based on, for example, an experimental result or a numerical simulation result of heating a foreign object during maximum power transmission.

Figure 12:
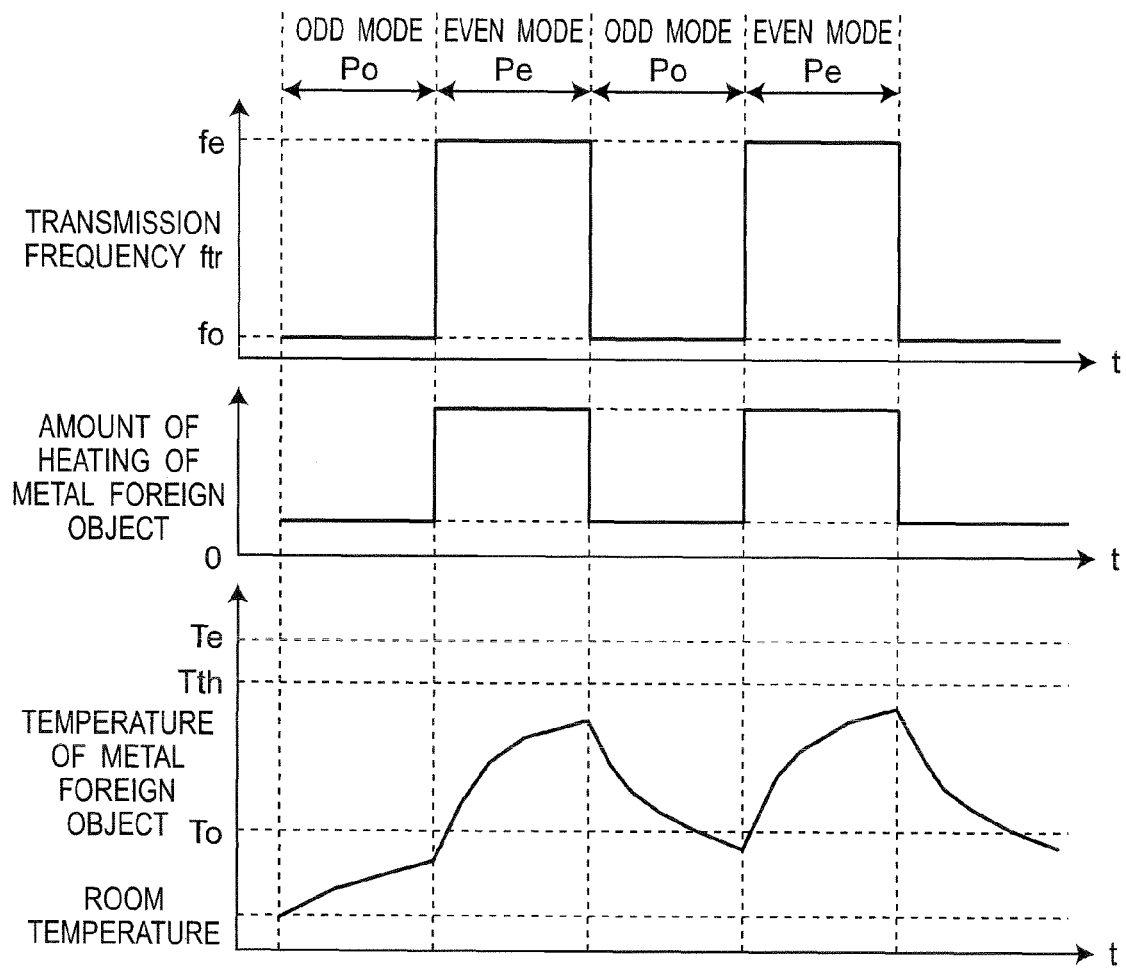
FIG. 12 is a timing chart showing the operation of the wireless power transmission system 10 for the case where a metal foreign object is present between a power transmitting coil Lt of the power transmitting antenna 22 and a power receiving coil Lr of the power receiving antenna 31 of FIG. 1, and the metal foreign object is present at the coils' peripheral portion.

FIG. 12 is a timing chart showing the operation of the wireless power transmission system 10 for the case where a metal foreign object is present between the power transmitting coil Lt of the power transmitting antenna 22 and the power receiving coil Lr of the power receiving antenna 31 of FIG. 1, and the metal foreign object is present at the coils' peripheral portion. When a metal foreign object is present between the power transmitting coil Lt and the power receiving coil Lr at the coils' peripheral portion, it is possible to suppress heating of the metal foreign object by setting the transmission frequency ftr to the resonance frequency fo, as described above (see FIG. 9). Referring to FIG. 12, a temperature Te is the saturation temperature of the metal foreign object for the case where power is transmitted continuously in the even mode, and a temperature To is the saturation temperature of the metal foreign object for the case where power is transmitted continuously in the odd mode. In addition, a threshold temperature Tth is the upper limit of the temperature of the foreign object, which is set in advance for safety reasons, etc. According to conventional wireless power transmission systems, when Te>Tth, the temperature of the metal foreign object is measured, and power transmission is stopped before the temperature reaches the threshold temperature Tth, thus ensuring safety.

Referring to FIG. 12, when the odd-mode power transmission with a smaller amount of heating of the metal foreign object is changed to the even-mode power transmission with a larger amount of heating of the metal foreign object, the temperature of the metal foreign object increases higher than room temperature, and further increases higher than the temperature To. However, since the even-mode continuous operating time Pe is set to be shorter than the time during which the temperature of the metal foreign object is saturated in the even mode, the temperature of the metal foreign object does not increase to the temperature Te. As a result, it is possible to continue the power transmission such that the temperature of the metal foreign object does not reach Te. Further, for example, by setting the even-mode continuous operating time Pe to be shorter than the time during which the temperature of the metal foreign object reaches the threshold temperature Tth, it is possible to continue the power transmission without increasing the temperature of the metal foreign object to the threshold temperature Tth.

In a wireless power transmission system using resonant magnetic coupling, since the position of a metal foreign object entering near the wireless power transmission system is unknown, both the transmission modes in the even mode and in the odd mode may result in a small amount of heating, or otherwise, may result in a large amount of heating. According to the conventional wireless power transmission systems, there is a risk of continuing power transmission in a transmission mode with a larger amount of heating, without performing power transmission in a transmission mode with a smaller amount of heating. As a result, there is a case in which the temperature of a metal foreign object increases to the threshold temperature Tth or higher, thus stopping the operation of the wireless power transmission system. However, the wireless power transmission system 10 of FIG. 1 does not perform power transmission in the same transmission mode over a long period of time until the temperature of a metal foreign object is saturated, but performs power transmission while continuously alternating the transmission mode between the time interval having the odd-mode continuous operating time Po and the time interval having the even-mode continuous operating time Pe. Therefore, the transmission mode is changed to one with a smaller amount of heating before the temperature of the metal foreign object is saturated to a significantly high temperature. Thus, a risk of heating brought about by a transmission mode with a larger amount of heating is reduced, and further, the risk can be avoided. That is, even if a metal foreign object is present near the power transmitting coil Lt or the power receiving coil Lr, it is possible to continue power transmission without immediately stopping the power transmission, while suppressing heating of the metal foreign object. In addition, theoretically, the wireless power transmission system 10 of FIG. 1 can increase the amount of power supplied to the load apparatus 4, as compared to a conventional wireless power transmission system operating intermittently in only one transmission mode of the even mode and the odd mode, the one transmission mode resulting in a potentially larger amount of heating.

In the power transmission process of FIG. 11, a time shorter than the continuous operating times Po and Pe may be added to stop the wireless power transmission when changing the transmission mode.

In addition, although the power transmitting coil Lt and the power receiving coil Lr of FIGS. 6 and 7 are single-layer square or circular spiral coils, the shapes of the power transmitting coil Lt and the power receiving coil Lr are not limited thereto. The power transmitting coil Lt and the power receiving coil Lr may have other shapes, such as a rectangle or an ellipse. In addition, the power transmitting coil Lt and the power receiving coil Lr may be wound in other manners, such as helical or solenoid. In addition, at least one of the power transmitting coil Lt and the power receiving coil Lr may be wound in multiple layers. Further, each of the power transmitting coil Lt and the power receiving coil Lr may be wound with at least one turn. When the number of turns is one, the coil has a loop structure. In addition, when the number of turns is two or more, each coil does not need to be formed as a single-layer conductive pattern, and may be configured such that a plurality of conductive patterns are stacked and connected in series with each other.

Further, the power transmitting coil Lt and the power receiving coil Lr of the wireless power transmission system 10 of FIG. 1 are made of, for example, a conductor having good conductivity, such as copper or silver. Since a high-frequency current mainly flows on the surface of a conductor, the surface of the conductor may be covered by a high conductivity material in order to increase transmission efficiency. In addition, in order to avoid unnecessary coupling between a plurality of wirings of the power transmitting coil Lt and the power receiving coil Lr, the surfaces of conductors of the wirings may be covered by magnetic material. In addition, the power transmitting coil Lt and the power receiving coil Lr may be configured using a conductor with a cross section including a central hollow portion, to reduce the weight of the power transmitting antenna 22 and the power receiving antenna 31. Further, by forming the power transmitting coil Lt and the power receiving coil Lr using a conductor with a parallel wiring structure, such as Litz wire, it is possible to reduce the conductor loss per unit length, and therefore, improve the Q factor of the resonant circuits, and achieve power transmission with higher transmission efficiency.

Furthermore, wirings may be formed at once using ink printing techniques in order to reduce manufacturing costs. In addition, magnetic material may be disposed around the power transmitting coil Lt and/or the power receiving coil Lr. Furthermore, it is possible to set a desired coupling coefficient between the power transmitting coil Lt and the power receiving coil Lr by using an inductor with an air-core spiral structure.

Although FIGS. 6 and 7 show that both the power transmitting coil Lt and the power receiving coil Lr are wound in the same direction (clockwise), the power transmitting coil Lt and the power receiving coil Lr may be wound in opposite directions (clockwise and counterclockwise). In addition, both the power transmitting coil Lt and the power receiving coil Lr may be wound counterclockwise.

In addition, although it is desirable that the power transmitting coil Lt and the power receiving coil Lr have the same size and the same shape, the power transmitting coil Lt and the power receiving coil Lr may have different sizes or different shapes. Even when the power transmitting coil Lt and the power receiving coil Lr have the same size and the same shape, the power transmitting coil Lt and the power receiving coil Lr may have different electrical characteristics.

In addition, in general, the power transmitting coil Lt and the power receiving coil Lr may be provided with shields in order to prevent unnecessary radiation. However, even under the environment with such shields, the operation of the wireless power transmission system 10 of FIG. 1 is not impaired.

In addition, as the resonant capacitors Ct and Cr, it is possible to use various types of capacitors, for example, a chip capacitor or a capacitor with leads. For example, a capacitance between two wirings through air may serve as each of the resonant capacitors Ct and Cr. In addition, when each of the resonant capacitors Ct and Cr is configured as an MIM capacitor, it is possible to form a capacitance circuit with relatively low loss using a well-known semiconductor process or multilayer board process.

Furthermore, in the wireless power transmission system 10 of FIG. 1, the transmission frequency ftr is set to, for example, 50 Hz to 300 GHz, 20 kHz to 10 GHz, 20 kHz to 20 MHz, or 20 kHz to 1 MHz. In addition, the transmission frequency ftr may be set to ISM band, such as 6.78 MHz and 13.56 MHz. In addition, the transmission frequency ftr may be set within a range up to 263 kHz so that its second harmonic does not interfere with AM radio broadcast waves, or a range up to 175 kHz so that its third harmonic does not interfere with AM radio broadcast waves, or a range up to 105 kHz so that its fifth harmonic does not interfere with AM radio broadcast waves.

In addition, although the oscillator circuit 21 of the wireless power transmission system 10 of FIG. 1 is configured using a class-D amplifier, the configuration of the oscillator circuit 21 is not limited thereto. The oscillator circuit 21 may be configured using an amplifier capable of achieving high efficiency and low distortion characteristics, such as a class-E amplifier or a class-F amplifier, or may be configured using a Doherty amplifier. In addition, after a switching element which generates an output signal including distortion components, a low-pass filter or a band-pass filter may be provided to generate a sine wave with high efficiency. In this case, the low-pass filter or the band-pass filter may serve as a matching circuit. Further, the oscillator circuit 21 may be a frequency converter circuit for converting a direct-current voltage from the power supply apparatus 1, into a high-frequency voltage. In any case, it is only necessary for the oscillator circuit 21 to convert inputted direct-current power into high-frequency energy and output the high-frequency energy to the power transmitting antenna 22.

It is noted that the transmission efficiency of the wireless power transmission system 10 depends on the gap g between the power transmitting antenna 22 and the power receiving antenna 31 (antenna gap), and also depends on the amount of losses in circuit elements forming the power transmitting antenna 22 and the power receiving antenna 31. It is noted that the "antenna gap" is substantially the gap g between the power transmitting antenna 22 and the power receiving antenna 31. The antenna gap can be evaluated based on the size of an areas in which the power transmitting antenna 22 and the power receiving antenna 31 are disposed. In this case, the size of the areas in which the power transmitting antenna 22 and the power receiving antenna 31 are disposed corresponds to the size of an area in which a relatively smaller antenna is disclosed. When a coil of the antenna has a circular outline, the size is defined as the diameter of the coil. When a coil of the antenna has a square outline, the size is defined as the length of one side of the coil. When a coil of the antenna has a rectangular outline, the size is defined as the length of a short side of the coil.

In addition, the Q factors of the resonant circuits of the power transmitting antenna 22 and the power receiving antenna 31 depend on required transmission efficiency, and also depend on a coupling coefficient between the power transmitting coil Lt and the power receiving coil Lr. In this case, the Q factor is set to, for example, 100 or more, 200 or more, 500 or more, or 1000 or more. It is effective to user a Litz wire in order to achieve a high Q value, as described above.

Further, although the power supply apparatus 1 of the wireless power transmission system 10 of FIG. 1 converts alternating-current power from a commercial alternating-current power supply, into direct-current power, and outputs the direct-current power to the wireless power transmission system 10, the configuration of the power supply apparatus 1 is not limited thereto. The power supply apparatus 1 may obtain power from an alternating-current power supply outputting an alternating-current voltage with a certain frequency, or from a direct-current power supply, such as a solar cell, and convert the power into direct-current power, and supply the direct-current power to the wireless power transmitting apparatus 2.

In addition, a matching circuit may be connected between the oscillator circuit 21 and the power transmitting antenna 22, and a matching circuit may be connected between the power receiving antenna 31 and the load apparatus 4.

It is noted that the control circuit 23 of the wireless power transmitting apparatus 2 may be integrated with the oscillator circuit 21, and configured as an integrated circuit.

Figure 13:
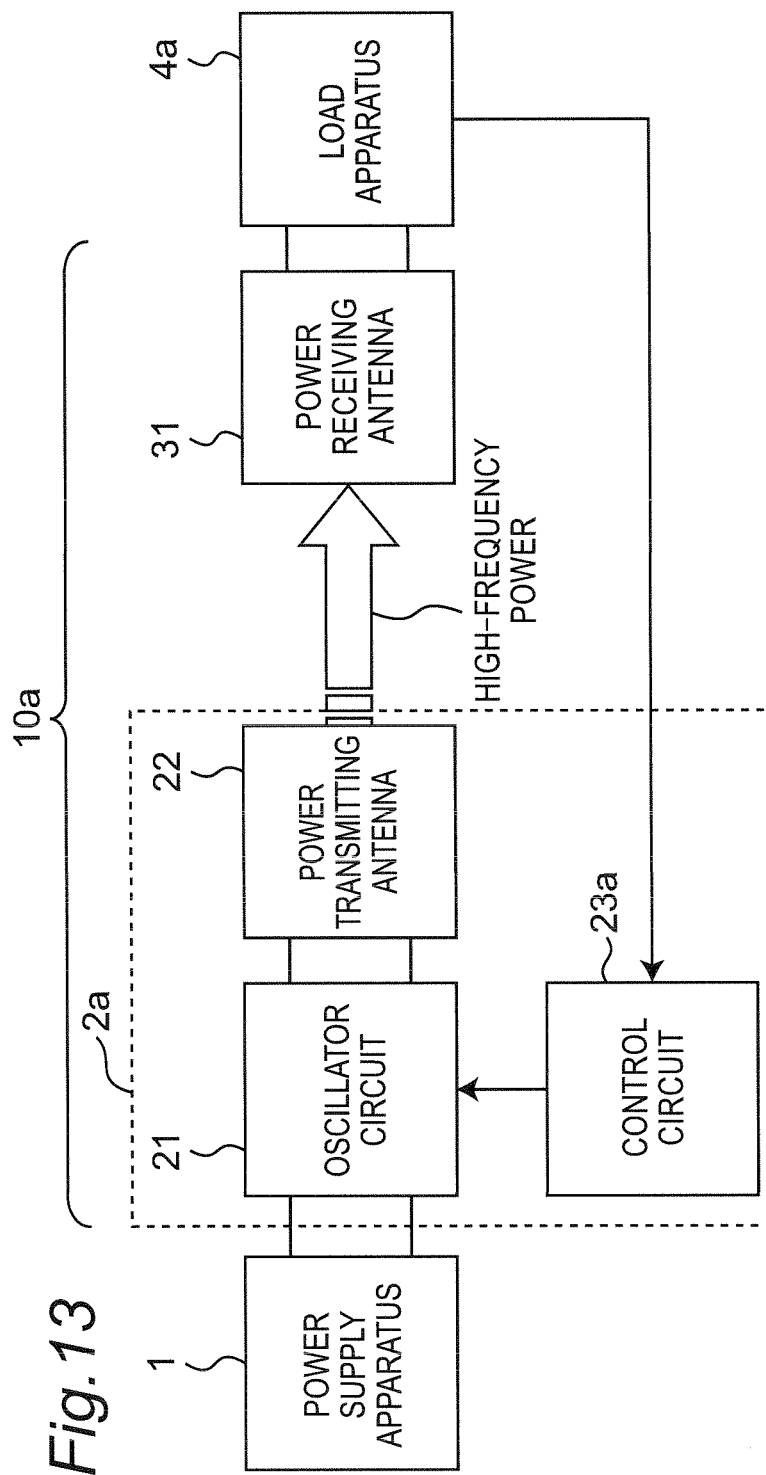
FIG. 13 is a block diagram showing a configuration of a wireless power transmission system 10a according to a first modified embodiment of the first embodiment.

FIG. 13 is a block diagram showing a configuration of a wireless power transmission system 10a according to a first modified embodiment of the first embodiment. The wireless power transmission system 10a includes: a wireless power transmitting apparatus 2a connected to the power supply apparatus 1; and the power receiving antenna 31 connected to the load apparatus 4a. The wireless power transmitting apparatus 2a is provided with a control circuit 23a, instead of the control circuit 23 of FIG. 1. The load apparatus 4a transmits a request signal notifying of its required voltage and current, to the control circuit 23a of the wireless power transmitting apparatus 2a.

The amount of power to be transmitted from a power transmitting antenna 22 of the wireless power transmitting apparatus 2a to the power receiving antenna 31 varies depending on a change in power consumed by the load apparatus 4a. In the present modified embodiment, the control circuit 23a of the wireless power transmitting apparatus 2a adjusts the transmission frequency ftr near the even-mode resonance frequency fe or near the odd-mode resonance frequency fo, based on the voltage and current to be outputted to the load apparatus 4a, such that a desired voltage and a desired current are outputted to the load apparatus 4a. In this case, the frequency near the even-mode resonance frequency fe ranges from a frequency (fe−Δfe) to a frequency (fe+Δfe), and Δfe is set to, for example, 5% of the even-mode resonance frequency fe. In addition, the frequency near the odd-mode resonance frequency fo ranges from a frequency (fo−Δfo) to a frequency (fo+Δfo), and Δfo is set to, for example, 5% of the odd-mode resonance frequency fo.

It is noted that in the present modified embodiment the control circuit 23a of the wireless power transmitting apparatus 2a may adjust the transmission frequency ftr near the even-mode resonance frequency fe or near the odd-mode resonance frequency fo, based on a voltage and a current to be inputted to the power transmitting antenna 22, such that a desired voltage and a desired current are outputted to the load apparatus 4a.

Figure 14:
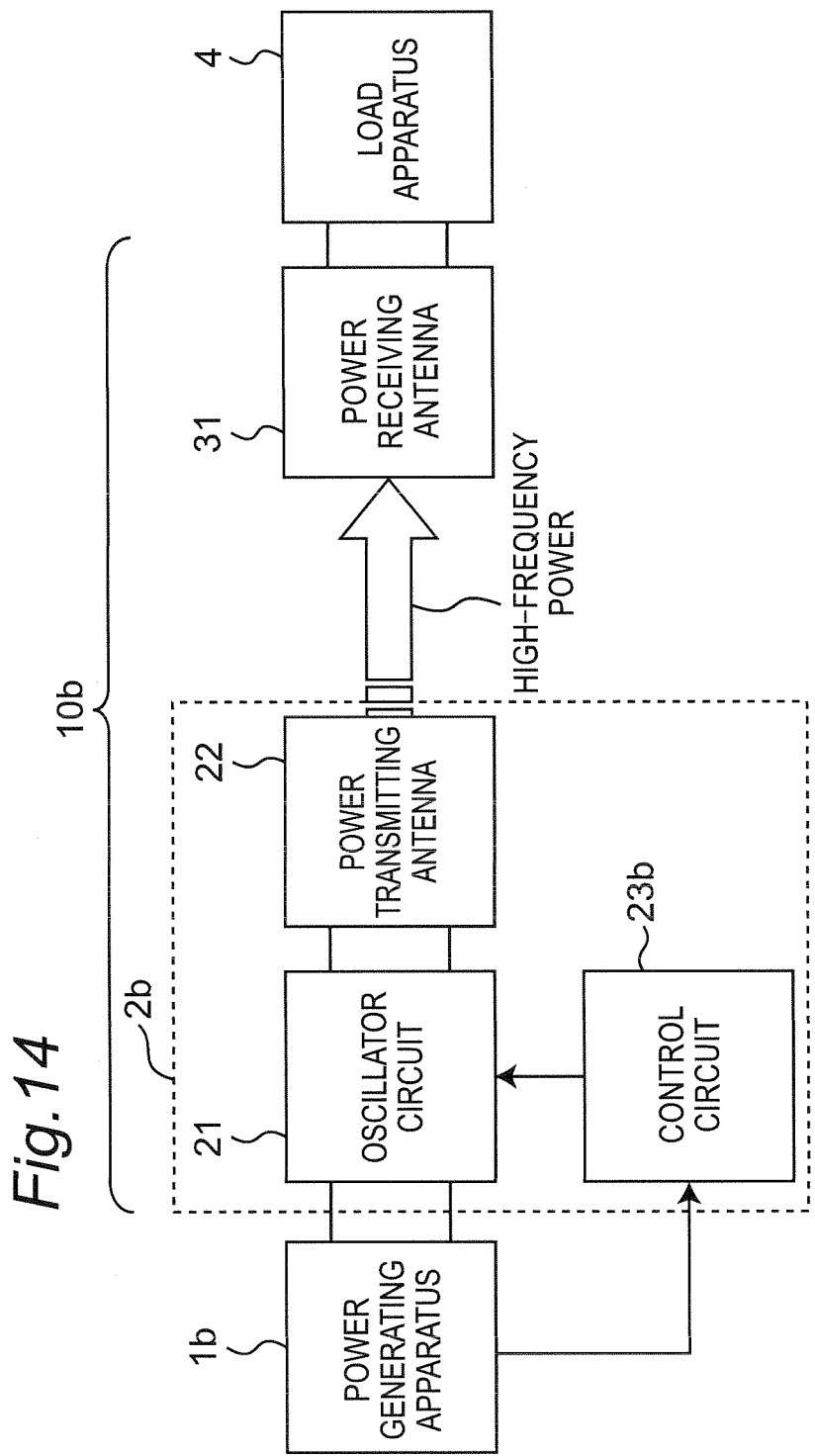
FIG. 14 is a block diagram showing a configuration of a wireless power transmission system 10b according to a second modified embodiment of the first embodiment.

FIG. 14 is a block diagram showing a configuration of a wireless power transmission system 10b according to a second modified embodiment of the first embodiment. The wireless power transmission system 10b includes: a wireless power transmitting apparatus 2b connected to a power generating apparatus 1b; and the power receiving antenna 31 connected to the load apparatus 4. The power generating apparatus 1b is, for example, a power supply apparatus, such as a solar cell. In this case, power outputted from the power generating apparatus 1b varies depending on the amount of sunlight received by the solar cell. The wireless power transmitting apparatus 2b is provided with a control circuit 23b, instead of the control circuit 23 of FIG. 1. The control circuit 23b of the wireless power transmitting apparatus 2b adjusts the transmission frequency ftr near the odd-mode resonance frequency fo or near the even-mode resonance frequency fe, based on a voltage and a current outputted from the power generating apparatus 1b, so that maximum power can be obtained from the power generating apparatus 1b.

It is noted that also in other embodiments and other modified embodiments, the control circuit of the wireless power transmitting apparatus may adjust the transmission frequency ftr near the even-mode resonance frequency fe or near the odd-mode resonance frequency fo, based on transmission efficiency, an output voltage, or an output current, during power transmission, so that maximum power can be obtained from the power supply apparatus.

Figure 15:
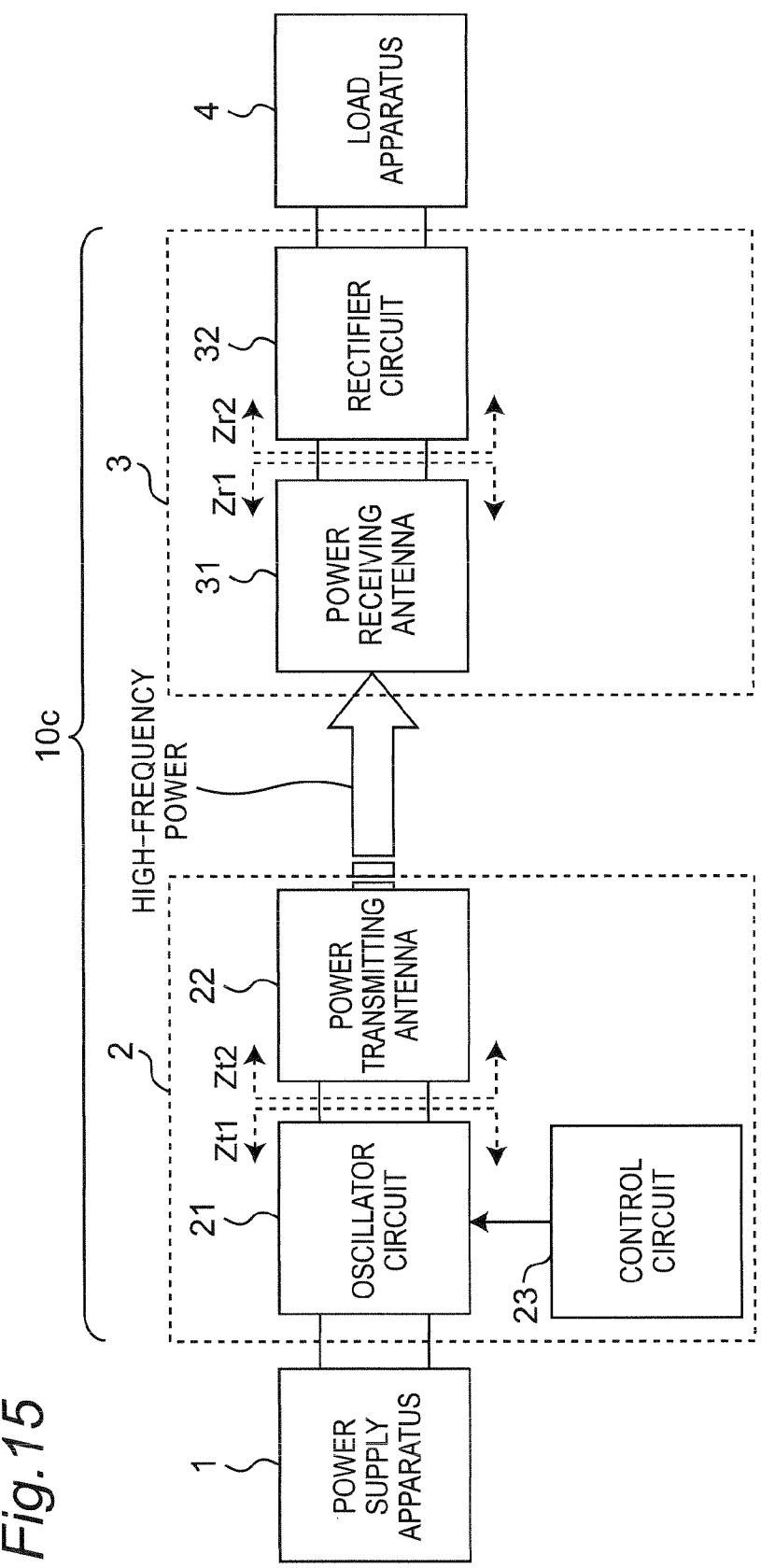
FIG. 15 is a block diagram showing a configuration of a wireless power transmission system 10c according to a third modified embodiment of the first embodiment.

FIG. 15 is a block diagram showing a configuration of a wireless power transmission system 10c according to a third modified embodiment of the first embodiment. Although the power receiving antenna 31 is directly connected to the load apparatus 4 in the wireless power transmission system 10 of FIG. 1, the configuration of the wireless power transmission system is not limited thereto. The wireless power transmission system 10c of FIG. 15 includes: the wireless power transmitting apparatus 2 connected to the power supply apparatus 1; and a wireless power receiving apparatus 3 connected to the load apparatus 4. The wireless power transmission system 10c wirelessly transmits high-frequency power from the wireless power transmitting apparatus 2 to the wireless power receiving apparatus 3. Referring to FIG. 15, the wireless power receiving apparatus 3 is provided with a power receiving antenna 31 and a rectifier circuit 32. The power receiving antenna 31 of FIG. 15 is configured in a manner similar to that of the power receiving antenna 31 of the wireless power transmission system 10 of FIG. 1. The rectifier circuit 32 operates as a power receiving circuit for converting high-frequency power transmitted from the wireless power transmitting apparatus 2 through the power transmitting antenna 22 and the power receiving antenna 31, into direct-current output power, and supplying the direct-current output power to the load apparatus 4. When the oscillator circuit 21 is connected to the power transmitting antenna 22, and the power transmitting antenna 22 and the power receiving antenna 31 are electromagnetically coupled to each other, an output impedance Zr1 for the case where the rectifier circuit 32 is seen from the output terminal of the power receiving antenna 31 is set to be substantially equal to an input impedance Zr2 for the case where the output terminal of the power receiving antenna 31 is seen from the rectifier circuit 32. Also in the wireless power transmission system 10c of FIG. 15, even if a metal foreign object is present near the power transmitting coil Lt or the power receiving coil Lr, it is possible to continue power transmission without immediately stopping the power transmission, while suppressing heating of the metal foreign object.

Figure 16:
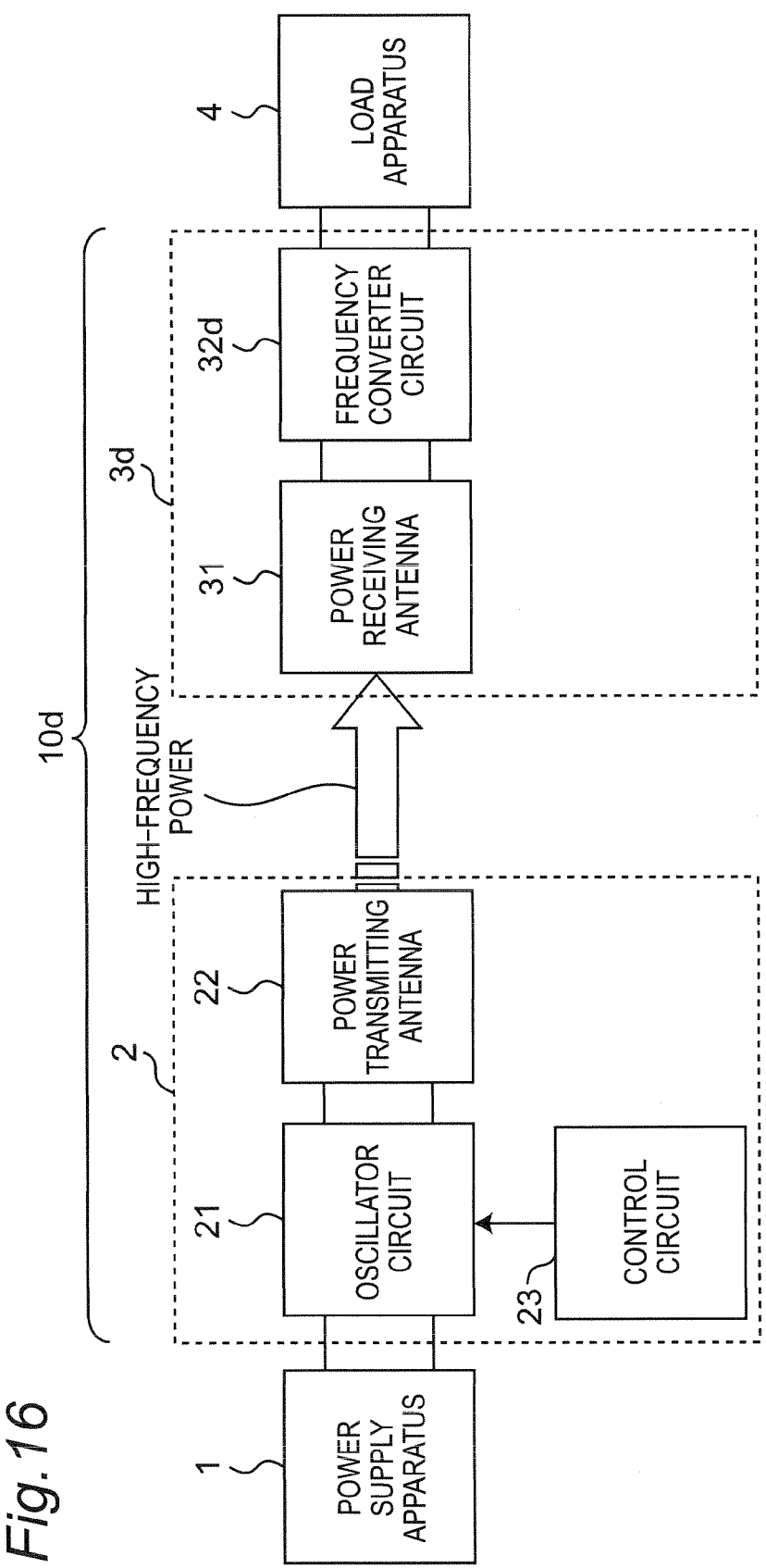
FIG. 16 is a block diagram showing a configuration of a wireless power transmission system 10d according to a fourth modified embodiment of the first embodiment.

FIG. 16 is a block diagram showing a configuration of a wireless power transmission system 10d according to a fourth modified embodiment of the first embodiment. The wireless power transmission system 10d includes: the wireless power transmitting apparatus 2 connected to the power supply apparatus 1; and a wireless power receiving apparatus 3d connected to the load apparatus 4. The wireless power receiving apparatus 3d of FIG. 16 is provided with a frequency converter circuit 32d, instead of the rectifier circuit 32 of the wireless power receiving apparatus 3 of FIG. 15. The frequency converter circuit 32d converts high-frequency power transmitted from the wireless power transmitting apparatus 2 through the power transmitting antenna 22 and the power receiving antenna 31, into alternating-current power with a frequency required by the load apparatus 4, and supplies the alternating-current power to the load apparatus 4.

Figure 17:
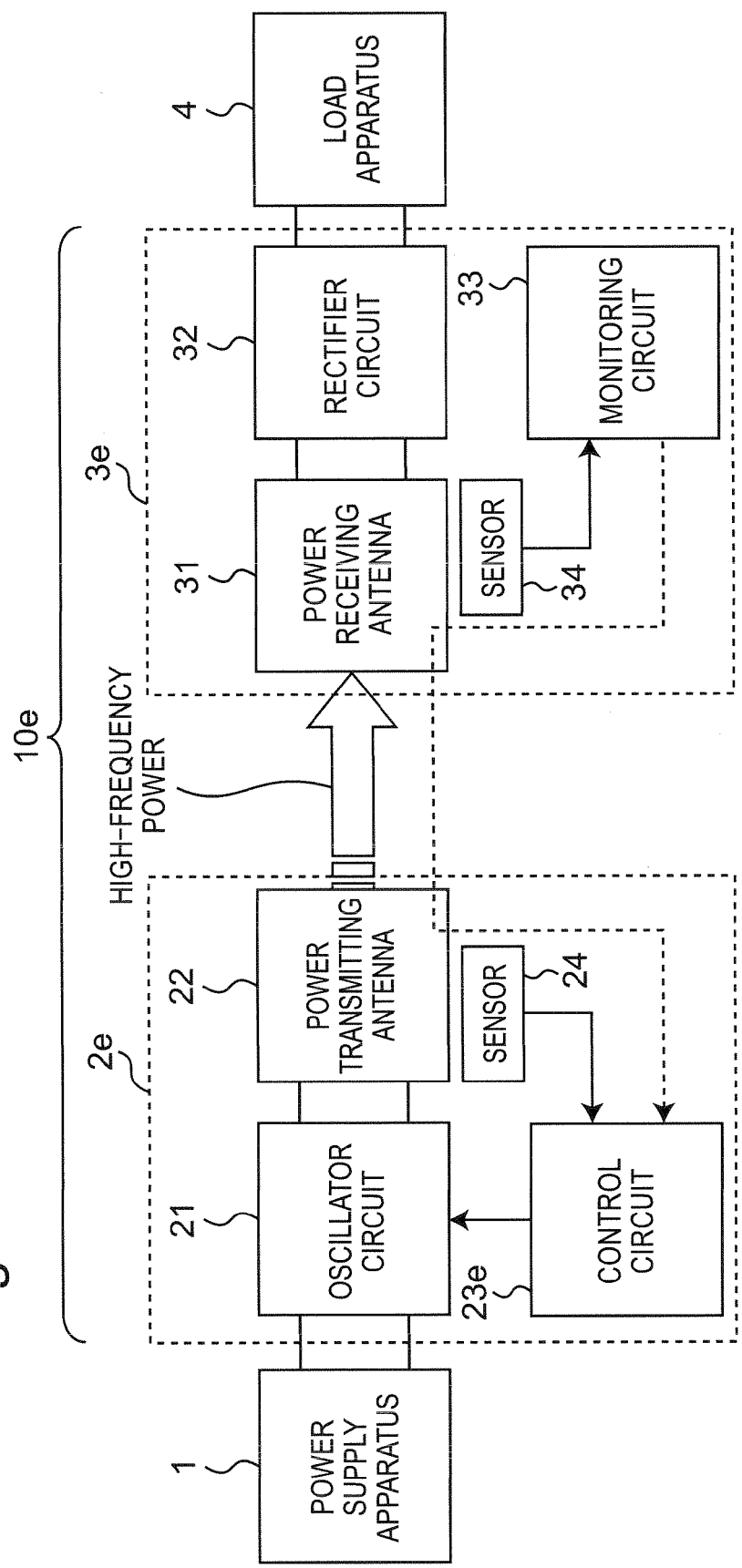
FIG. 17 is a block diagram showing a configuration of a wireless power transmission system 10e according to a fifth modified embodiment of the first embodiment.

FIG. 17 is a block diagram showing a configuration of a wireless power transmission system 10e according to a fifth modified embodiment of the first embodiment. The wireless power transmission system 10e includes: a wireless power transmitting apparatus 2e connected to the power supply apparatus 1; and a wireless power receiving apparatus 3e connected to the load apparatus 4. The wireless power transmitting apparatus 2e is provided with a control circuit 23e, instead of the control circuit 23 of FIG. 1. The wireless power transmitting apparatus 2e is further provided with a sensor 24 configured to detect an abnormal condition due to a foreign object near the power transmitting coil Lt (e.g., an abnormal temperature increase resulting from heating of a metal foreign object caused by an eddy current occurring on the metal foreign object), and notify the control circuit 23e of the abnormal condition. The wireless power receiving apparatus 3e has the configuration of the wireless power receiving apparatus 3 of FIG. 15, and is further provided with a monitoring circuit 33 and a sensor 34. The sensor 34 detects an abnormal condition due to a foreign object near the power receiving coil Lr (e.g., an abnormal temperature increase resulting from heating of a metal foreign object caused by an eddy current occurring on the metal foreign object), and notifies the monitoring circuit 33 of the abnormal condition. The monitoring circuit 33 notifies the control circuit23e of the wireless power transmitting apparatus 2e, of the detection result. The sensors 24 and 34 include, for example, detection means, such as a temperature sensor for measuring a temperature near the power transmitting coil Lt or the power receiving coil Lr, an infrared camera, or an imaging device.

Figure 18:
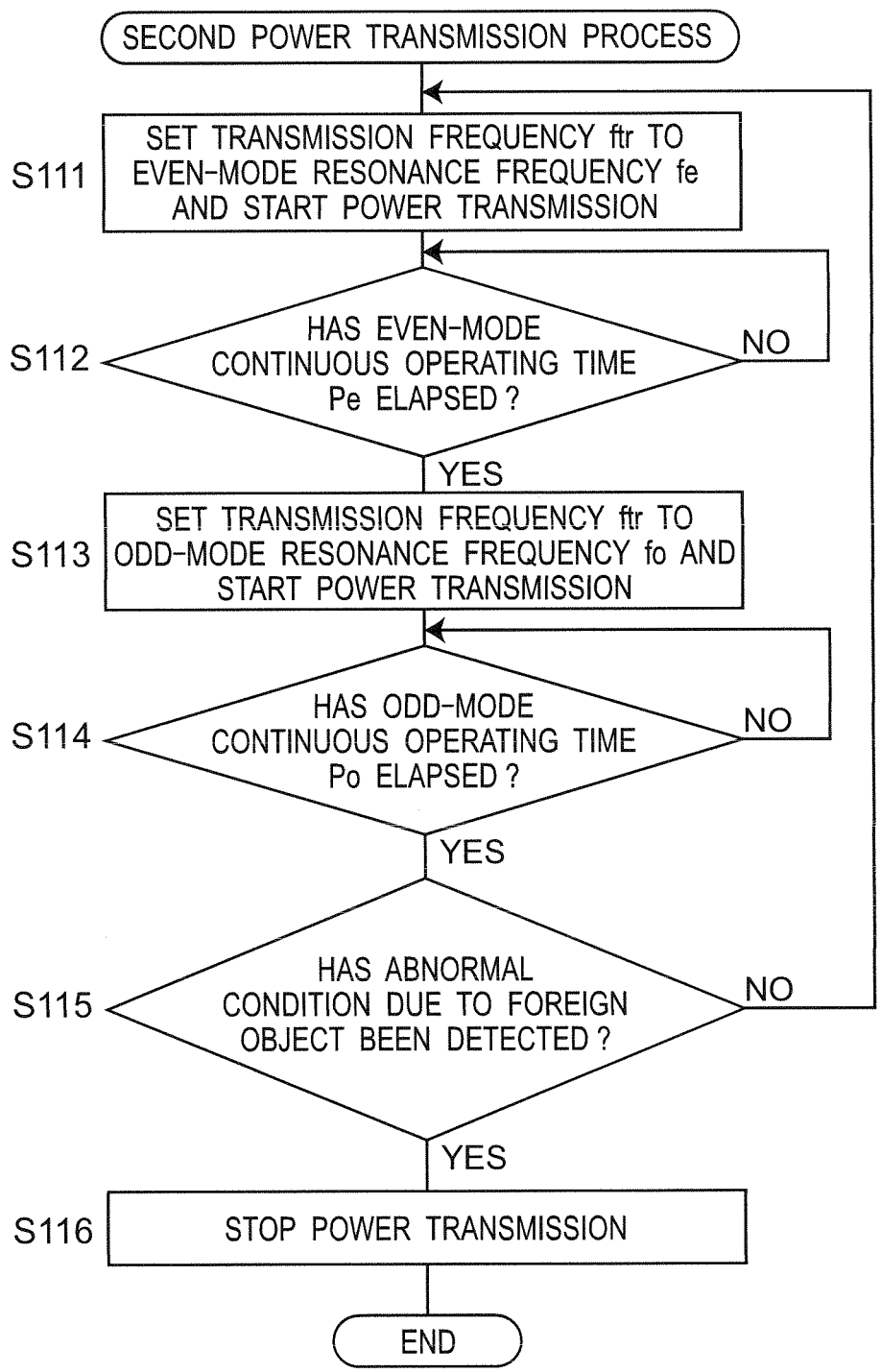
FIG. 18 is a flowchart showing a second power transmission process performed by a control circuit 23e of a wireless power transmitting apparatus 2e of FIG. 17.

FIG. 18 is a flowchart showing a second power transmission process performed by the control circuit 23e of the wireless power transmitting apparatus 2e of FIG. 17. Steps S111 to S114 of FIG. 18 are the same as steps S101 to S104 of FIG. 11. If YES at step S114, the process proceeds to step S115. At step S115, the control circuit 23e determines whether or not the sensor 24 or 34 has detected an abnormal condition due to a foreign object; and if YES, then at step S116, the control circuit 23e stops power transmission to end the power transmission process; if NO, the process returns to step S111. Specifically, for example, when the control circuit 23e detects that the temperature near the power transmitting coil Lt or the power receiving coil Lr is equal to a predetermined threshold temperature (e.g., threshold Tc=90° C.) or higher, or when the control circuit 23e detects that the temperature increase rate is equal to a predetermined threshold or higher, the control circuit 23e determines that an abnormal condition due to a foreign object has been detected.

According to the second power transmission process, even if a metal foreign object is present near the power transmitting coil Lt or the power receiving coil Lr, it is possible to continue power transmission without immediately stopping the power transmission, while suppressing heating of the metal foreign object, until an abnormal condition due to the foreign object is detected.

It is noted that although steps S115 and S116 are performed subsequent to step S114 in FIG. 18, the order of the steps is not limited thereto. Steps S115 and S116 may be performed at any time between steps S111 and S114.

Figure 19:
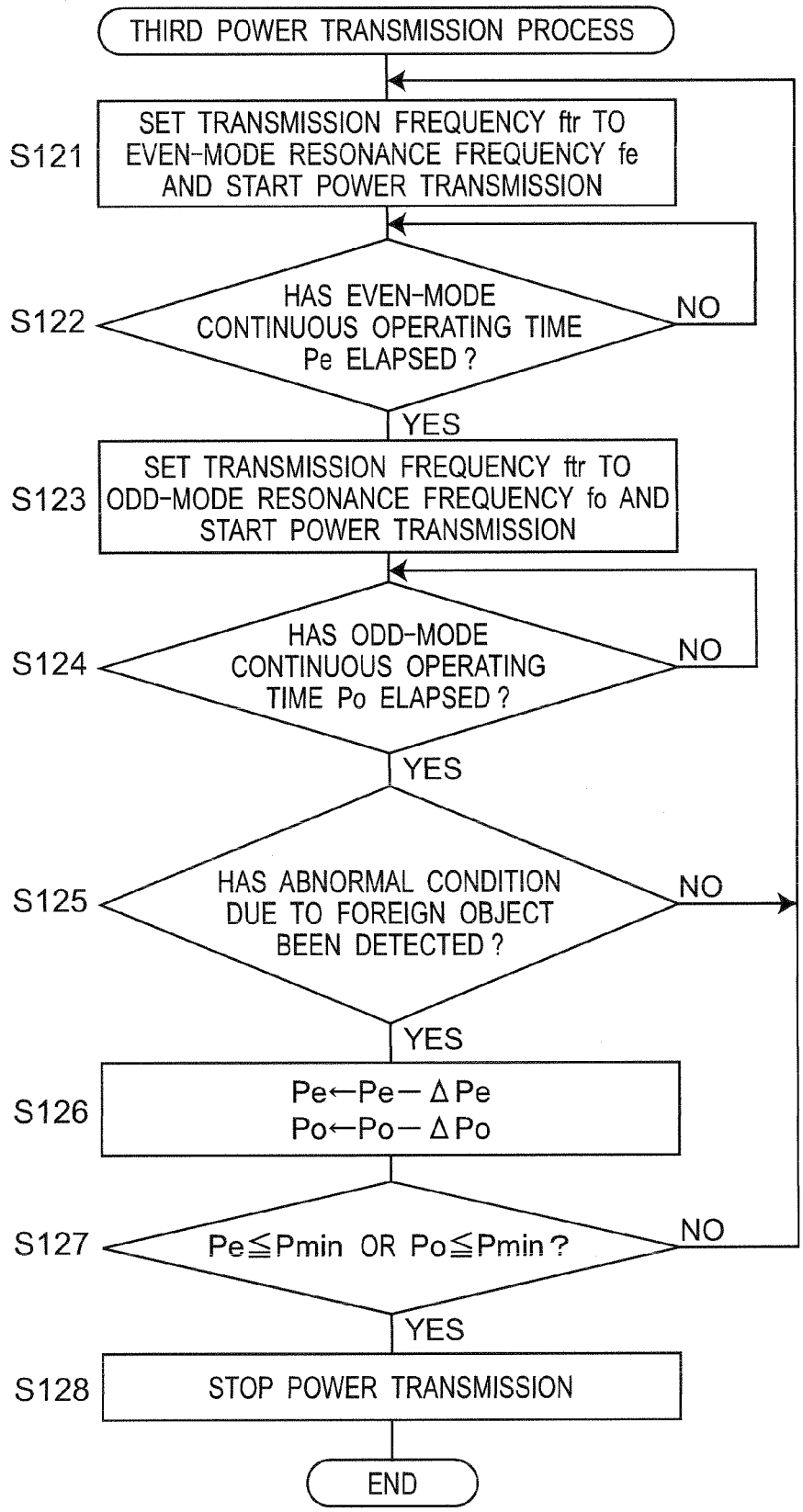
FIG. 19 is a flowchart showing a third power transmission process performed by the control circuit 23e of the wireless power transmitting apparatus 2e of FIG. 17.

FIG. 19 is a flowchart showing a third power transmission process performed by the control circuit 23e of the wireless power transmitting apparatus 2e of FIG. 17. Steps S121 to S125 and S128 of FIG. 19 are the same as steps S111 to S115 and S116 of FIG. 18. If YES at step S125, the process proceeds to step S126. At step S126, the control circuit 23e sets the odd-mode continuous operating time Po to be reduced by an odd-mode reduction time ΔPo, and sets the even-mode continuous operating time Pe to be reduced by an even-mode reduction time ΔPe. Then, at step S127, the control circuit 23e determines whether or not the continuous operating time Po or Pe is equal to a minimum operating time Pmin or less; and if YES, then at step S128, the control circuit 23e stops power transmission to end the power transmission process; if NO, the process returns to step S121. In this case, the odd-mode reduction time ΔPo is set to, for example, 5% of the odd-mode continuous operating time Po, and the even-mode reduction time ΔPe is set to, for example, 5% of the even-mode continuous operating time Pe.

Heating during power transmission at one transmission mode of the even mode and the odd mode, which results in a larger amount of heating, is dominant in heating of a metal foreign object. Therefore, by reducing the continuous operating time for the transmission mode with a larger amount of heating, there is a possibility to suppress the temperature of the metal foreign object under the threshold temperature Tth. According to the third power transmission process of FIG. 19, even if a metal foreign object is detected, since the continuous operating time Pe and Po are reduced, it is possible to continue power transmission longer than that of the second power transmission process of FIG. 18, without immediately stopping power transmission, while suppressing heating of the metal foreign object.

It is noted that when it is known in advance which transmission mode of the even mode and the odd mode results in a larger amount of heating, it is possible to further suppress heating by reducing only the continuous operating time for the transmission mode with the larger amount of heating.

Next, with reference to FIGS. 20 to 23, simulation results for the wireless power transmission system 10 of FIG. 1 will be described.

Figure 20:
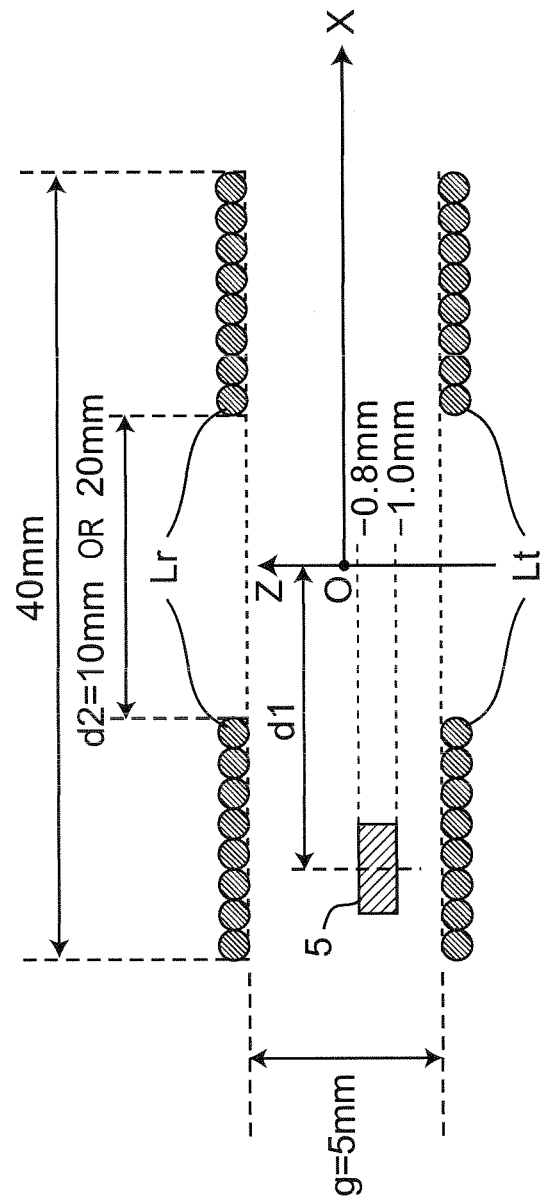
FIG. 20 is a cross-sectional view showing configurations of a power transmitting coil Lt and a power receiving coil Lr according to an implementation example of the first embodiment.

FIG. 20 is a cross-sectional view showing configurations of a power transmitting coil Lt and a power receiving coil Lr according to an implementation example of the first embodiment. A simulation was done using the finite element method. As shown in FIG. 20, planar circular spiral coils of a single-layer configuration were used as the power transmitting coil Lt and the power receiving coil Lr. The number of turns of each of the power transmitting coil Lt and the power receiving coil Lr was set to 8, the outer diameter was set to 40 mm, and the inner diameter d2 was set to 10 mm or 20 mm. The power transmitting coil Lt and the power receiving coil Lr were disposed to be parallel to the XY-plane, with a gap g=5 mm in the Z-direction. In addition, the resonance frequency fo was set to 106 kHz, and the resonance frequency fe was set to 162.6 kHz. Further, as a metal foreign object 5, a piece of aluminum of 2 mm×2 mm×0.2 mm was disposed between the power transmitting coil Lt and the power receiving coil Lr.

In addition, when the load apparatus 4 was connected to the power receiving antenna 31, and the power transmitting antenna 22 and the power receiving antenna 31 were electromagnetically coupled to each other, the output impedance Zt1 for the case where the input terminal of the power transmitting antenna 22 was seen from the output terminal of the oscillator circuit 21 was set to be substantially equal to the input impedance Zt2 for the case where the output terminal of the oscillator circuit 21 was seen from the input terminal of the power transmitting antenna 22. Further, when the oscillator circuit 21 was connected to the power transmitting antenna 22, and the power transmitting antenna 22 and the power receiving antenna 31 were electromagnetically coupled to each other, the output impedance Zr1 for the case where the load apparatus 4 was seen from the output terminal of the power receiving antenna 31 is set to be substantially equal to the input impedance Zr2 for the case where the output terminal of the power receiving antenna 31 was seen from the load apparatus 4. As a result, a good transmission efficiency of 90% or more was achieved whether the transmission frequency ftr was set to either the resonance frequency fo or fe. That is, it was possible to perform power transmission equivalent in terms of input and output voltages, a current, and efficiency, whether the transmission frequency ftr was set to either the resonance frequency fo or fe.

An eddy current generated on the surface of the metal foreign object 5 is proportional to the area of the metal foreign object 5. In addition, the amount of heating of the metal foreign object 5 is theoretically proportional to the square of the eddy current generated on the surface of the metal foreign object 5. Therefore, the square of a maximum value of the surface current density was evaluated as an indicator of the amount of heating.

Figure 21:
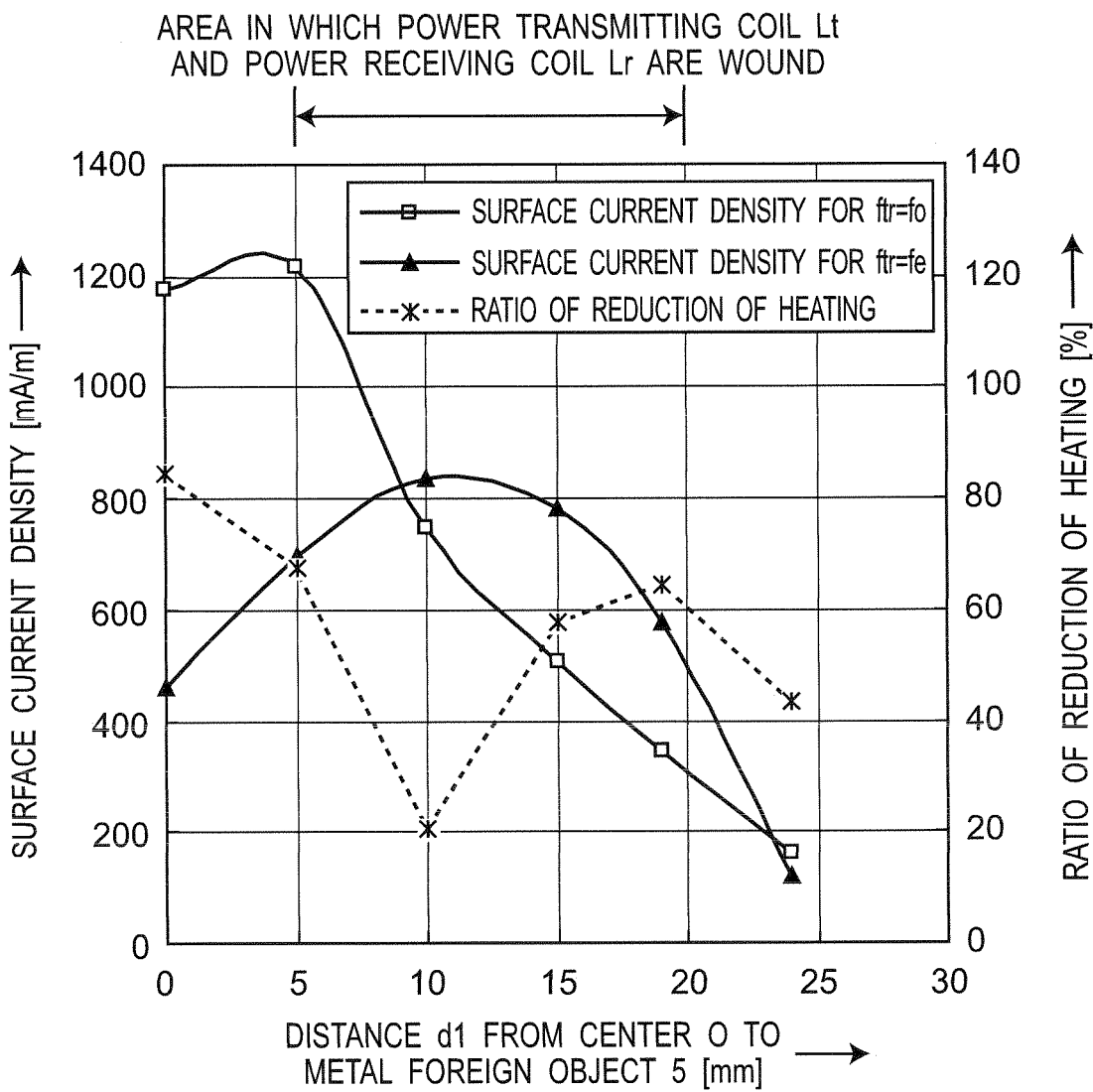
FIG. 21 is a graph showing the direct-current density with respect to the position of a metal foreign object 5, for the case where the inner diameter d2 of the power transmitting coil Lt and the power receiving coil Lr of FIG. 20 is 10 mm.

FIG. 21 is a graph showing the direct-current density with respect to the position of the metal foreign object 5 for the case where the inner diameter d2 of the power transmitting coil Lt and the power receiving coil Lr of FIG. 20 is 10 mm. The input power to the power transmitting coil Lt was set to 1 W. FIG. 21 shows a relationship between the position of the metal foreign object 5 and a maximum value of the surface current density on the metal foreign object 5, for the case where the transmission frequency ftr is set to the resonance frequency fo or fe. In addition, FIG. 21 also shows a relationship between the position of the metal foreign object 5 and the ratio of reduction of heating at the respective positions, the reduction being achieved when selecting one transmission mode capable of suppressing a larger amount of heating as compared to when selecting the other transmission mode. As shown in FIG. 21, it can be seen that when the metal foreign object 5 is present within the opening (central portion) of the power transmitting coil Lt and the power receiving coil Lr, the amount of heating can be reduced by setting the transmission frequency ftr to the even-mode resonance frequency fe. On the other hand, it can be seen that when the metal foreign object 5 is remote from the opening of the power transmitting coil Lt and the power receiving coil Lr and is present between the winding of the power transmitting coil Lt and the winding of the power receiving coil Lr (peripheral portion), the amount of heating can be reduced by setting the transmission frequency ftr to the odd-mode resonance frequency fo.

Figure 22:
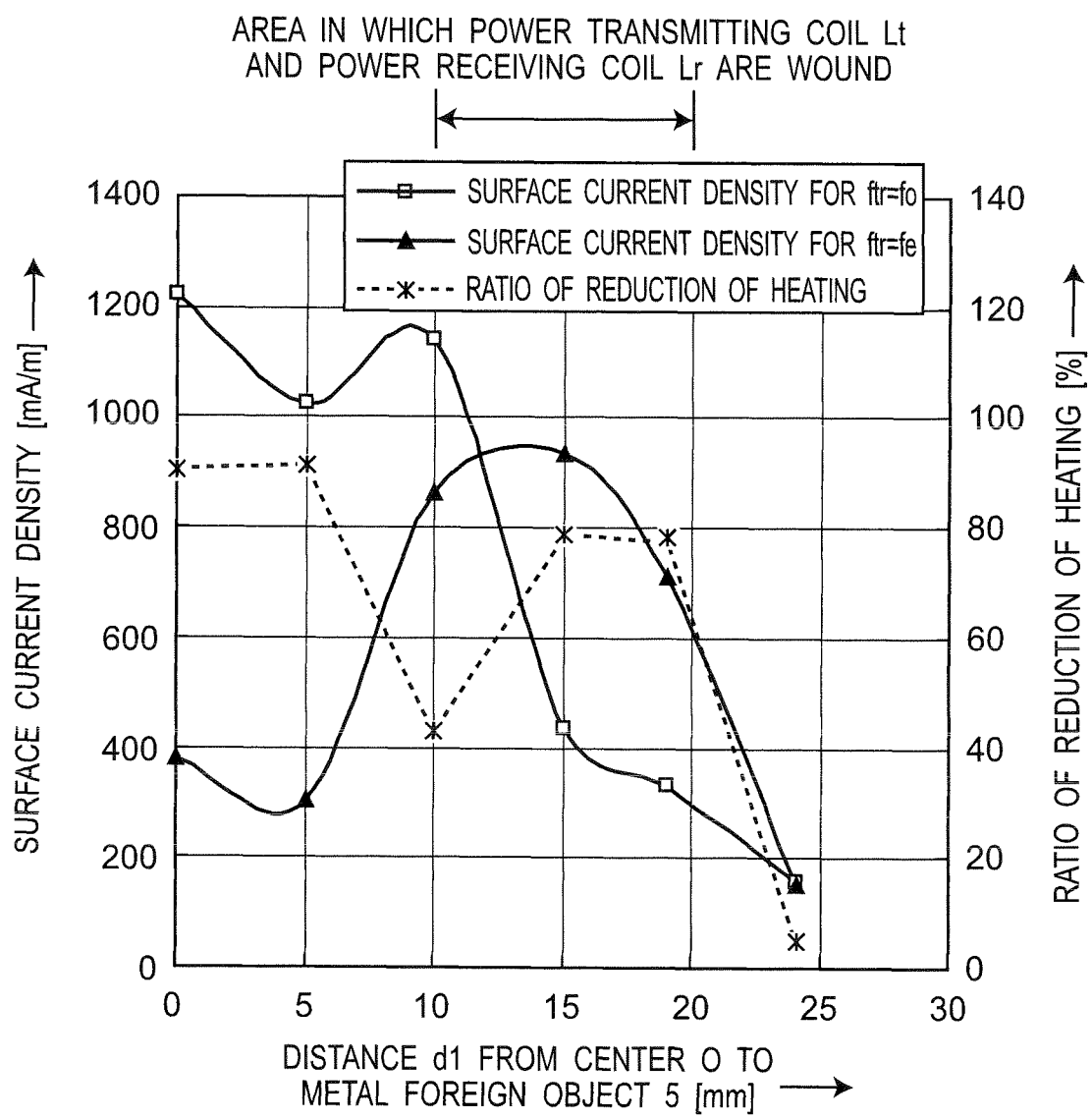
FIG. 22 is a graph showing direct-current density with respect to the position of a metal foreign object 5, for the case where the inner diameter d2 of the power transmitting coil Lt and the power receiving coil Lr of FIG. 20 is 20 mm.

FIG. 22 is a graph showing direct-current density with respect to the position of the metal foreign object 5 for the case where the inner diameter d2 of the power transmitting coil Lt and the power receiving coil Lr of FIG. 20 is 20 mm. Referring to FIG. 22, it can be seen that when the metal foreign object 5 is present within the opening (central portion) of the power transmitting coil Lt and the power receiving coil Lr, the amount of heating can be reduced by setting the transmission frequency ftr to the even-mode resonance frequency fe, as in the case of FIG. 21. On the other hand, it can be seen that when the metal foreign object 5 is remote from the opening of the power transmitting coil Lt and the power receiving coil Lr and is present between the winding of the power transmitting coil Lt and the winding of the power receiving coil Lr (peripheral portion), the amount of heating can be reduced by setting the transmission frequency ftr to the odd-mode resonance frequency fo.

Therefore, according to FIGS. 21 and 22, it can be seen that, not depending on the structures of the power transmitting coil Lt and the power receiving coil Lr, (1) when the metal foreign object 5 is present at the central portion of the power transmitting coil Lt and the power receiving coil Lr, the amount of heating is smaller when the transmission frequency ftr is the resonance frequency fe, than when the transmission frequency ftr is the resonance frequency fo, and (2) when the metal foreign object 5 is present at the peripheral portion of the power transmitting coil Lt and the power receiving coil Lr, the amount of heating is smaller when the transmission frequency ftr is the resonance frequency fo, than when the transmission frequency ftr is the resonance frequency fe. It is noted that substantially equal impedance and substantially equal transmission efficiency are achieved at the two frequencies fo and fe, the frequency does not affect transmission characteristics. From the above results, it can be seen that the wireless power transmission system 10 has two transmission modes (even mode and odd mode) capable of ensuring good transmission characteristics, and can suppress heating regardless of the position of the metal foreign object 5, by selecting one of the transmission modes.

Figure 23:
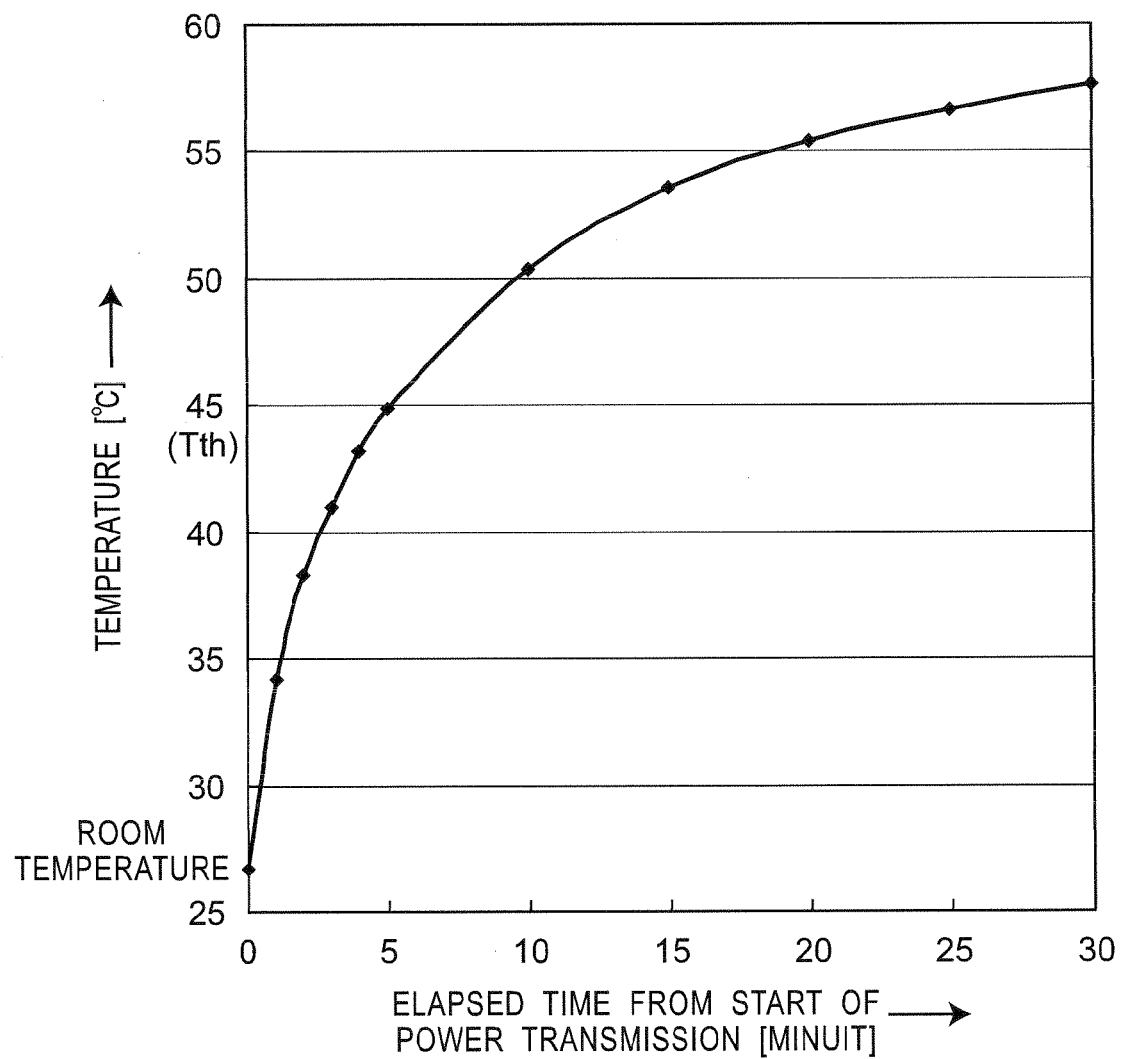
FIG. 23 is a graph showing changes in the temperature of a metal foreign object 5 of aluminum with a size of 1 cm×1 cm×1 mm, for the case where the metal foreign object 5 is present between the power transmitting coil Lt and the power receiving coil Lr of FIG. 20 at the coils' central portion, while continuing power transmission at an odd-mode resonance frequency fo.

FIG. 23 is a graph showing changes in the temperature of the metal foreign object 5 of aluminum with a size of 1 cm×1 cm×1 mm, for the case where the metal foreign object 5 is present between the power transmitting coil Lt and the power receiving coil Lr of FIG. 20 at the coils' central portion, while continuing power transmission at the odd-mode resonance frequency fo. The input power to the power transmitting coil Lt was set to 3 W. As shown in FIG. 23, it has been found that the temperature of the metal foreign object 5 is not saturated immediately after starting the transmission, and it takes several tens of minutes or more for the temperature of the metal foreign object 5 to be saturated. Specifically, although the temperature of the metal foreign object 5 increased by 35 degrees from room temperature in 30 minutes after starting the transmission, it increased by only 30 degrees in 20 minutes, 28 degrees in 15 minutes, 25 degrees in 10 minutes, 20 degrees in 5 minutes, 15 degrees in 3 minutes, 10 degrees in 90 seconds, and 5 degrees in 45 seconds. In this case, an elapsed time of, for example, 60 seconds corresponds to 6360000 times of the transmission cycle for the case in which the transmission frequency ftr is set to the resonance frequency fo. Therefore, it can be said that the time required for the temperature of the metal foreign object 5 or the housing close to the metal foreign object 5 to reach the predetermined threshold temperature Tth (e.g., 45° C.) is a very long as compared to the cycle of transmission energy, even if a "wrong transmission mode" resulting in a serious amount of heating of the metal foreign object 5 is selected. Hence, for example, in the case of FIG. 23, when the threshold temperature Tth is 45° C., the odd-mode continuous operating time Po may be set to less than 5 minutes.

In addition, when it is known in advance that the two transmission modes have different maximum increase rates of the temperature of the metal foreign object 5 for the case where the metal foreign object 5 is present, it is possible to increase the possibility of avoiding the risk of heating, by setting the continuous operating time Po for the resonance frequency fo and the continuous operating time Pe for the resonance frequency fe, to different values. For example, with reference to FIG. 21 as an example, the surface current density for the case where the transmission frequency ftr is set to the resonance frequency fo (odd mode) can be 1220 mA/m, and on the other hand, the surface current density for the case where the transmission frequency ftr is set to the resonance frequency fe (even mode) can be, at most, 840 mA/m. Hence, the amount of heating for the case where the transmission frequency ftr is set to the resonance frequency fe is only 47% of the amount of heating for the case where the transmission frequency ftr is set to the resonance frequency fo. Therefore, even if the even-mode continuous operating time Pe is set to 1 to 2.1 times of the odd-mode continuous operating time Po, an integrated amount of heating during the even-mode operation does not exceed a maximum integrated amount of heating during the odd-mode operation. Further, taking the natural dissipation of heat from the metal foreign object 5 into consideration, there may be a case in which the even-mode continuous operating time Pe can be set to 2.1 times or more of the odd-mode continuous operating time Po.

Second Embodiment

Figure 24:
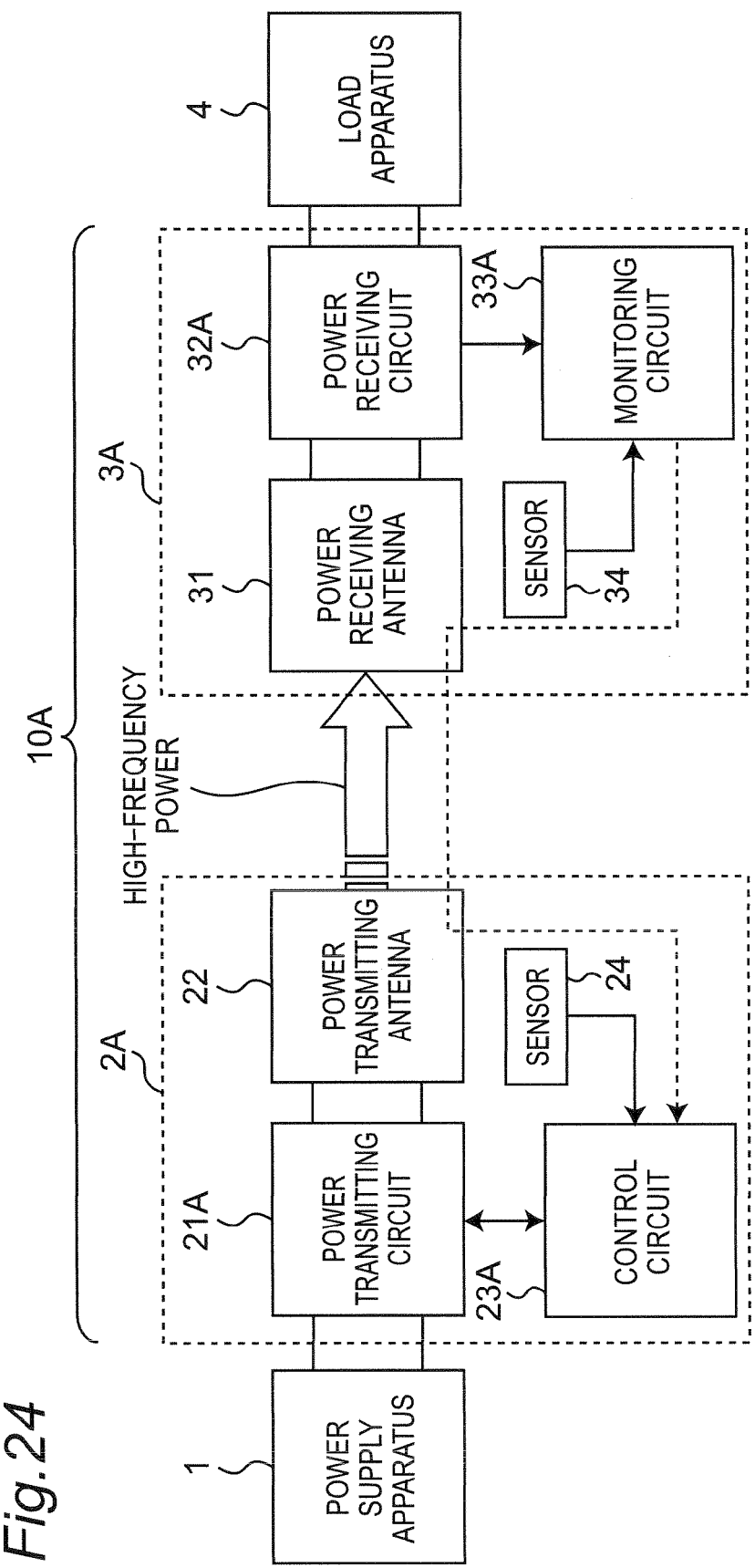
FIG. 24 is a block diagram showing a schematic configuration of a wireless power transmission system 10A according to a second embodiment.

FIG. 24 is a block diagram showing a schematic configuration of a wireless power transmission system 10A according to a second embodiment. The wireless power transmission system 10A includes: a wireless power transmitting apparatus 2A connected to the power supply apparatus 1; and a wireless power receiving apparatus 3A connected to the load apparatus 4. The wireless power transmission system 10A wirelessly transmits high-frequency power from the wireless power transmitting apparatus 2A to the wireless power receiving apparatus 3A.

The wireless power transmitting apparatus 2A is provided with a power transmitting circuit 21A, the power transmitting antenna 22, a control circuit 23A, and the sensor 24. The power transmitting antenna 22 of the wireless power transmitting apparatus 2A is configured in a manner similar to that of the power transmitting antenna 22 of FIG. 2 or the power transmitting antenna 22a of FIG. 4. The power transmitting circuit 21A is connected to the power supply apparatus 1, and generates, from input power, an output voltage (high-frequency power) with a variable frequency (e.g., 100 to 200 kHz, etc.) using pulse width modulation, and supplies the output voltage to the power transmitting antenna 22, under the control of the control circuit 23A. When the power transmitting antenna 22 is provided close to the power receiving antenna 31 of the wireless power receiving apparatus 3A such that they are electromagnetically coupled to each other, the power transmitting circuit 21A transmits power at a certain frequency to the wireless power receiving apparatus 3A through the power transmitting antenna 22. The control circuit 23A controls the start and stop of power transmission performed by the power transmitting circuit 21A, and also controls the frequency of an output voltage from the power transmitting circuit 21A. The sensor 24 detects an abnormal condition due to a foreign object near the power transmitting coil Lt of the power transmitting antenna 22 (e.g., an abnormal temperature increase resulting from heating of a metal foreign object caused by an eddy current occurring on the metal foreign object), and notifies the control circuit 23A of the abnormal condition. The sensor 24 includes, for example, a temperature sensor.

The wireless power receiving apparatus 3A includes the power receiving antenna 31, a power receiving circuit 32A, a monitoring circuit 33A, and the sensor 34. The power receiving antenna 31 of the wireless power receiving apparatus 3A is configured in a manner similar to that of the power receiving antenna 31 of FIG. 3 or the power receiving antenna 31a of FIG. 5. The power receiving circuit 32A receives power transmitted from the wireless power transmitting apparatus 2A through the power receiving antenna 31, and supplies the power to the load apparatus 4. When power supply to the load apparatus 4 becomes unnecessary (e.g., when the power of the load apparatus 4 is turned off, or when charging of a rechargeable battery as the load apparatus 4 has been completed), the power receiving circuit 32A transmits a signal requesting to stop power transmission, to the control circuit 23A of the wireless power transmitting apparatus 2A through the power receiving antenna 31 and the power transmitting antenna 22. The sensor 34 detects an abnormal condition due to a foreign object near the power receiving coil Lr of the power receiving antenna 31, and notifies the monitoring circuit 33A of the abnormal condition. The sensor 34 includes, for example, a temperature sensor. When the sensor 34 has detected an abnormal condition, the monitoring circuit 33A transmits a signal indicating the occurrence of the abnormal condition, to the control circuit 23A of the wireless power transmitting apparatus 2A through the power receiving antenna 31 and the power transmitting antenna 22.

Now, the case in which the sensors 24 and 34 are temperature sensors will be described. At least one temperature estimation means is required to estimate the temperature of a foreign object near the power transmitting coil or the power receiving coil, in which heating of the metal foreign object being problematic. Various temperature estimation means can be used to estimate the temperature. For example, it is possible to use a method of directly measuring a temperature using a temperature sensor, such as a thermistor, and a method of measuring transmission efficiency between the wireless power transmitting apparatus 2A and the wireless power receiving apparatus 3A, calculating loss power, and estimating the temperature of a heated foreign object from the loss power. In those cases, since a curve of the temperature increase of a heated foreign object can be obtained, it is possible to predict a temperature after continuing power transmission for a predetermined period of time. In addition, it is also possible to use a method of measuring the impedance of the power transmitting antenna 22 or the power receiving antenna 31 before the start of power transmission, estimating the position of a foreign object, or the like, from the measurement result, and estimating the amount of heating of the foreign object based on data indicating a relationship between the position of the foreign object and transmitting power, the date being obtained in advance by simulations, experiments, or the like. In this case, there is an effect of measuring a temperature more quickly than in the case of using a temperature sensor. In addition, in the case of communication between the power transmitting antenna 22 and the power receiving antenna 31, it is possible to use an error rate during the communication as an indicator. This is because received power decreases when there is a foreign object between the power transmitting coil and the power receiving coil, and therefore, a ratio of received power to noise power (Signal to Noise Ratio: SNR) decreases, resulting in an increase in the error rate. Inversely, it is also possible to calculate SNR from error rate, calculate loss power from the SNR, and estimate the amount of heating from the loss power. As described above, there are various methods for estimating the temperature of a metal foreign object. As a basic idea, it is possible to obtain the temperature of a foreign object by directly measuring the temperature of the foreign object with a temperature sensor, or by calculating loss power from the measurement results of electrical characteristics or communication characteristics and estimating the temperature from the loss power. By those methods, it is possible to obtain a reference for selecting an optimal frequency of high-frequency power.

NFC (Near Field Communication) or other modulated (amplitude-modulated or phase-modulated) radio signals may be used in order to transmit signals from the power receiving circuit 32A or the monitoring circuit 33A of the wireless power receiving apparatus 3A to the control circuit 23A of the wireless power transmitting apparatus 2A through the power receiving antenna 31 and the power transmitting antenna 22. In addition, additional antennas provided to the wireless power receiving apparatus 3A and the wireless power transmitting apparatus 2A, other than the power receiving antenna 31 and the power transmitting antenna 22, may be used in order to transmit signals from the power receiving circuit 32A or the monitoring circuit 33A of the wireless power receiving apparatus 3A to the control circuit 23A of the wireless power transmitting apparatus 2A.

When power is transmitted from the wireless power transmitting apparatus 2A to the wireless power receiving apparatus 3A, the power transmitting antenna 22 and the power receiving antenna 31 are provided close to each other so as to be electromagnetically coupled to each other.

For example, one of the power transmitting antenna and the power receiving antenna is provided with a coil and a capacitor connected in series, and the other is provided with a coil and a capacitor connected in parallel. Therefore, it is possible to use a combination of the power transmitting antenna 22 of FIG. 2 and the power receiving antenna 31a of FIG. 5, or a combination of the power transmitting antenna 22a of FIG. 4 and the power receiving antenna 31 of FIG. 3.

From now on, power transmission processes performed by the wireless power transmission system 10A of FIG. 24 will be described.

Figure 25:
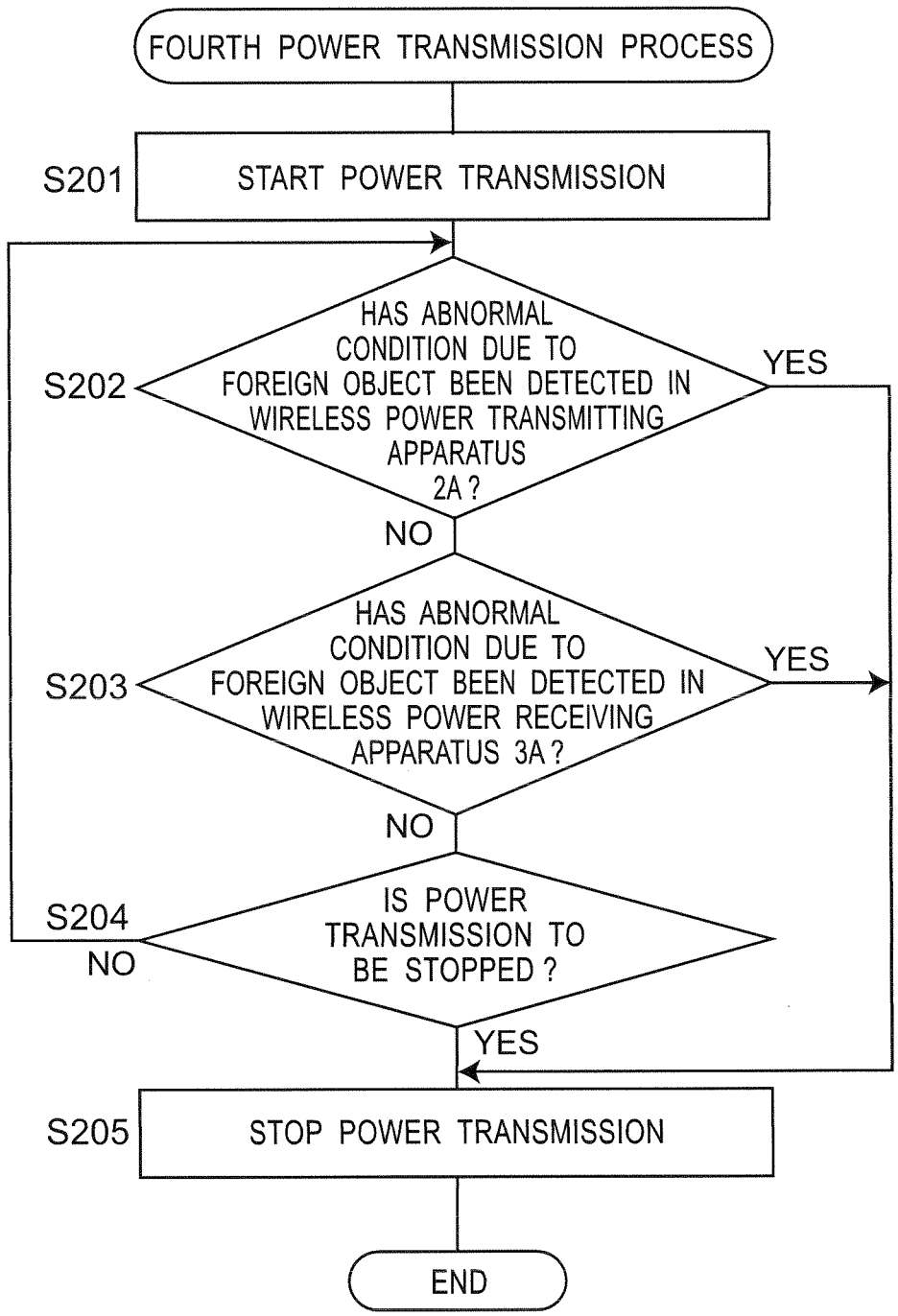
FIG. 25 is a flowchart showing a fourth power transmission process performed by a control circuit 23A of a wireless power transmitting apparatus 2A of FIG. 24.

FIG. 25 is a flowchart showing a fourth power transmission process performed by the control circuit 23A of the wireless power transmitting apparatus 2A of FIG. 24. The fourth power transmission process shows a comparison example in which power transmission is stopped when a metal foreign object is detected. At step S201 of FIG. 25, the control circuit 23A instructs the power transmitting circuit 21A to start power transmission. At step S202, the control circuit 23A determines whether or not an abnormal condition due to a foreign object has been detected in the wireless power transmitting apparatus 2A. The abnormal condition due to a foreign object is, for example, an abnormal temperature increase resulting from heating of a metal foreign object caused by an eddy current occurring on the metal foreign object, as described above. When the temperature near the power transmitting coil Lt detected by the sensor 24 is equal to, for example, a threshold Tc=90° C. or higher, the control circuit 23A determines it to be an abnormal condition. If YES at step S202, the process proceeds to step S205, and if NO at step S202, the process proceeds to step S203. At step S203, the control circuit 23A determines whether or not an abnormal condition due to a foreign object has been detected in the wireless power receiving apparatus 3A, based on a signal received from the monitoring circuit 33A of the wireless power receiving apparatus 3A. For example, when the temperature near the power receiving coil Lr detected by the sensor 34 is equal to, for example, a threshold Tc=90° C. or higher, the control circuit 23A determines it to be an abnormal condition. If YES at step S203, the process proceeds to step S205, and if NO at step S203, the process proceeds to step S204. At step S204, the control circuit 23A determines whether or not the power transmission is to be stopped. For example, the control circuit 23A stops the power transmission, when receiving a signal requesting to stop the power transmission, from the power receiving circuit 32A of the wireless power receiving apparatus 3A, or when detecting that the wireless power receiving apparatus 3A has been removed, using a further sensor (not shown). If YES at step S204, the process proceeds to step S205, and if NO at step S204, the process returns to step S202. At step S205, the control circuit 23A instructs the power transmitting circuit 21A to stop the power transmission.

Figure 26:
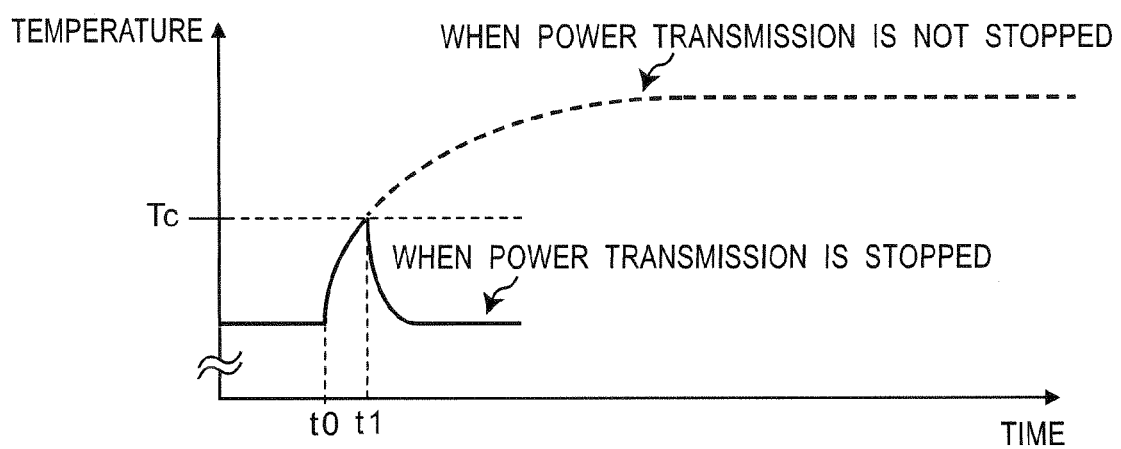
FIG. 26 is a schematic diagram for explaining temperature changes obtained when performing the fourth power transmission process of FIG. 25.

FIG. 26 is a schematic diagram for explaining temperature changes obtained when performing the fourth power transmission process of FIG. 25. It is possible to suppress overheating of the metal foreign object by stopping power transmission when the temperature near the power transmitting coil Lt or the power receiving coil Lr is equal to the threshold Tc or higher. However, according to the fourth power transmission process, power transmission cannot be resumed unless the user removes the metal foreign object.

Figure 27:
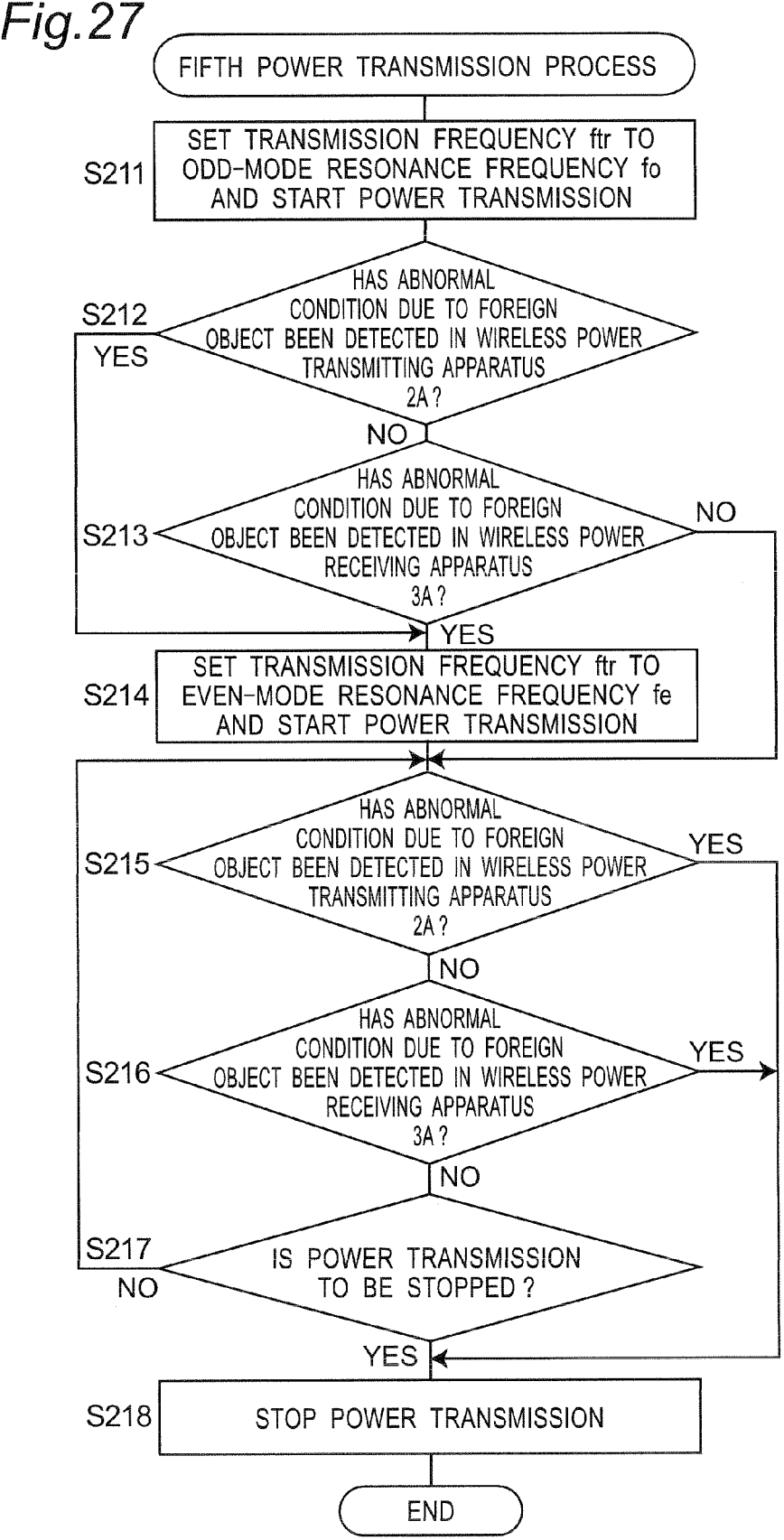
FIG. 27 is a flowchart showing a fifth power transmission process performed by the control circuit 23A of the wireless power transmitting apparatus 2A of FIG. 24.

FIG. 27 is a flowchart showing a fifth power transmission process performed by the control circuit 23A of the wireless power transmitting apparatus 2A of FIG. 24. When the power transmitting circuit 21A generates high-frequency power at one of the odd-mode resonance frequency fo and the even-mode resonance frequency fe, and the high-frequency power is transmitted from the wireless power transmitting apparatus 2A to the wireless power receiving apparatus 3A, and an abnormal condition due to a foreign object near the power transmitting coil Lt or the power receiving coil Lr occurs, the control circuit 23A changes the frequency of the high-frequency power generated by the power transmitting circuit 21A to the other of the odd-mode resonance frequency fo and the even-mode resonance frequency fe. Specifically, at step S211 of FIG. 27, the control circuit 23A instructs the power transmitting circuit 21A to set the transmission frequency ftr to the odd-mode resonance frequency fo and start power transmission. At step S212, the control circuit 23A determines whether or not an abnormal condition due to a foreign object has been detected in the wireless power transmitting apparatus 2A; if YES, the process proceeds to step S214; if NO, the process proceeds to step S213. At step S213, the control circuit 23A determines whether or not an abnormal condition due to a foreign object has been detected in the wireless power receiving apparatus 3A; if YES, the process proceeds to step S214; if NO, the process proceeds to step S215. At step S214, the control circuit 23A instructs the power transmitting circuit 21A to set the transmission frequency ftr to the even-mode resonance frequency fe and start power transmission. When the transmission frequency ftr is changed, a magnetic field distribution near the power transmitting coil Lt and the power receiving coil Lr changes, and therefore, the amount of an eddy current generated on the metal foreign object changes. When an abnormal condition due to a foreign object near the power transmitting coil Lt or the power receiving coil Lr occurs after changing the frequency of the high-frequency power generated by the power transmitting circuit 21A (transmission frequency ftr) (i.e., when the abnormal condition has not been resolved), the control circuit 23A instructs the power transmitting circuit 21A to stop the power transmission. Specifically, at step S215, the control circuit 23A determines whether or not an abnormal condition due to a foreign object has been detected in the wireless power transmitting apparatus 2A; if YES, the process proceeds to step S218; if NO, the process proceeds to step S216. At step S216, the control circuit 23A determines whether or not an abnormal condition due to a foreign object has been detected in the wireless power receiving apparatus 3A; if YES, the process proceeds to step S218; if NO, the process proceeds to step S217. At step S217, the control circuit 23A determines whether or not the power transmission is to be stopped; and if YES, the process proceeds to step S218; if NO, the process returns to step S215. At step S218, the control circuit 23A instructs the power transmitting circuit 21A to stop the power transmission.

Figure 28:
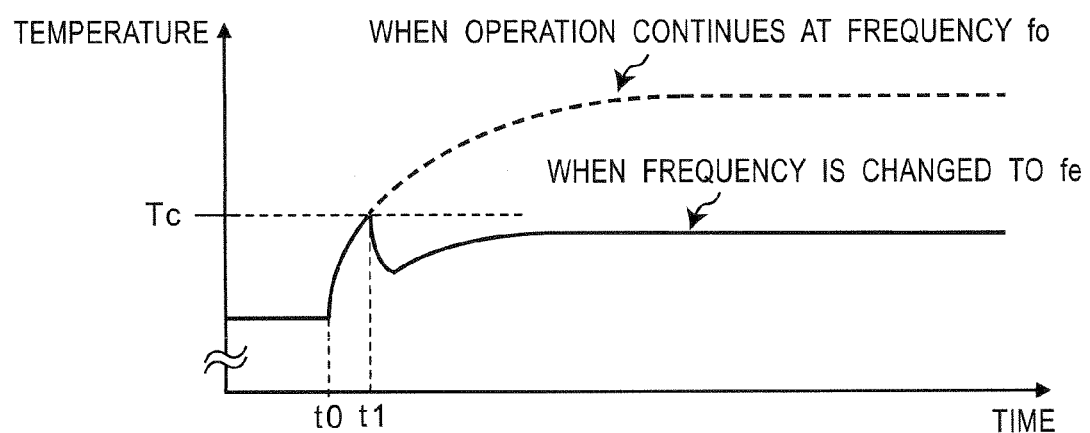
FIG. 28 is a schematic diagram for explaining temperature changes obtained when performing the fifth power transmission process of FIG. 27.

FIG. 28 is a schematic diagram for explaining temperature changes obtained when performing the fifth power transmission process of FIG. 27. According to the fifth power transmission process, even when a metal foreign object is detected near the power transmitting coil Lt or the power receiving coil Lr, it is possible to continue power transmission without immediately stopping the power transmission, while suppressing heating of the metal foreign object.

Although FIG. 28 schematically shows the case in which the power transmission is temporarily stopped when an abnormal condition due to a foreign object is detected, the transmission frequency ftr may be immediately changed from the odd-mode resonance frequency fo to the even-mode resonance frequency fe, without stopping the power transmission.

The threshold Tc used by the control circuit 23A to determine the occurrence of an abnormal condition due to a foreign object is not limited to 90° C., and may be other temperatures. In addition, different thresholds Tc may be used for the wireless power transmitting apparatus 2A and for the wireless power receiving apparatus 3A.

In addition, in order for the control circuit 23A to determine the occurrence of an abnormal condition due to a foreign object, power transmission efficiency may be used instead of the temperature near the power transmitting coil Lt or the power receiving coil Lr, or in addition to the temperature. In this case, the control circuit 23A of the wireless power transmitting apparatus 2A obtains information on transmitting power, from the power transmitting circuit 21A. The monitoring circuit 33A of the wireless power receiving apparatus 3A obtains information indicating the amount of received power, from the power receiving circuit 32A, and transmits a signal including the information to the control circuit 23A of the wireless power transmitting apparatus 2A through the power receiving antenna 31 and the power transmitting antenna 22. When the transmission efficiency of power transmission from the wireless power transmitting apparatus 2A to the wireless power receiving apparatus 3A is equal to a predetermined threshold or less (e.g., the transmission efficiency is equal to 30% or less; or the transmission efficiency is equal to 70% or less in the case in which a designed transmission efficiency, 90% is given), the control circuit 23A determines that an abnormal condition due to a foreign object near the power transmitting coil Lt or the power receiving coil Lr has occurred.

In addition, in order to simplify the power transmission process, the control circuit 23A may omit steps S213 and S216 to determine whether or not an abnormal condition due to a foreign object has been detected in the wireless power receiving apparatus 3A.

Figure 29:
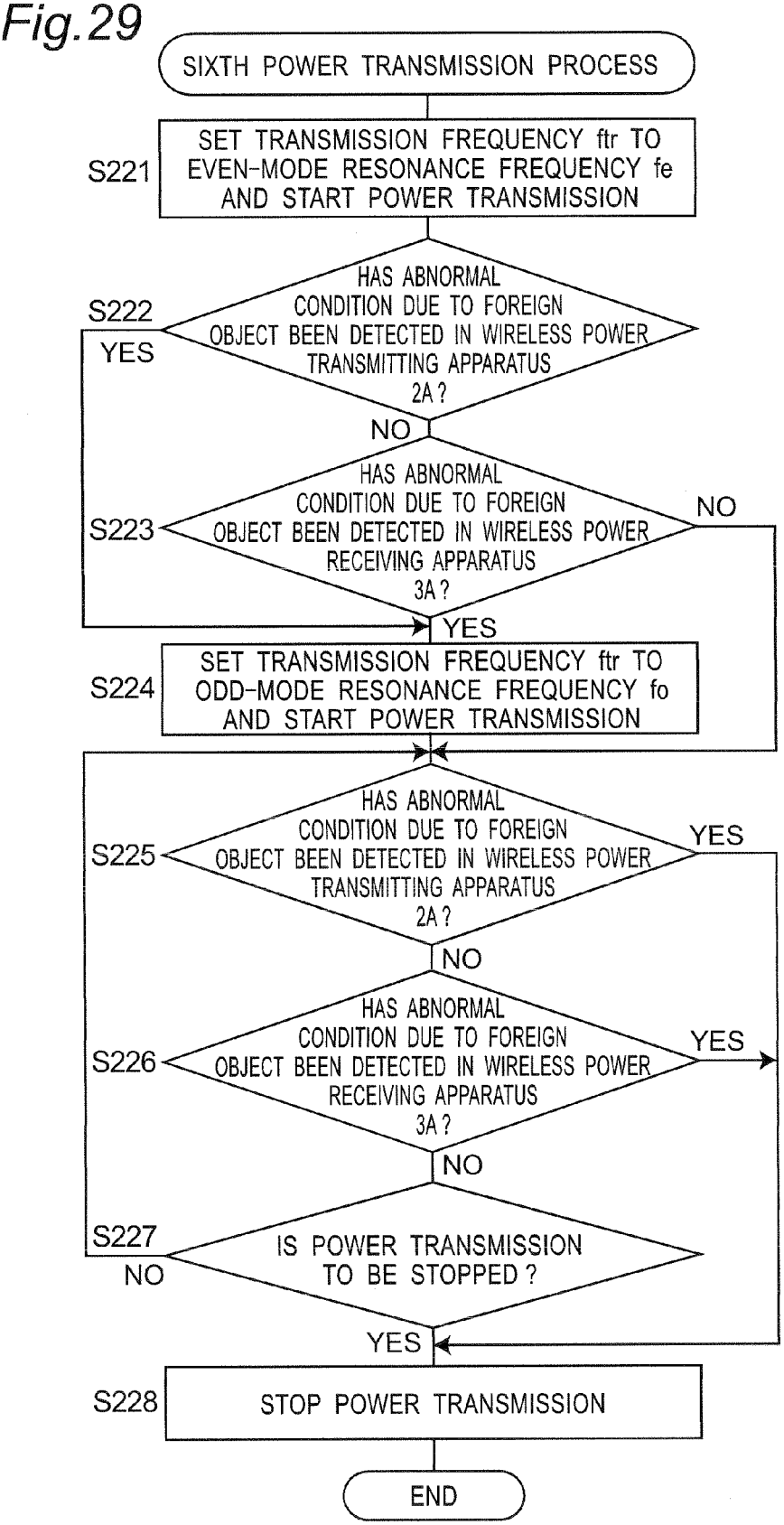
FIG. 29 is a flowchart showing a sixth power transmission process performed by the control circuit 23A of the wireless power transmitting apparatus 2A of FIG. 24.

FIG. 29 is a flowchart showing a sixth power transmission process performed by the control circuit 23A of the wireless power transmitting apparatus 2A of FIG. 24. According to the fifth power transmission process, at first, the transmission frequency ftr is set to the odd-mode resonance frequency fo to start the power transmission (step S211), and then, when an abnormal condition due to a foreign object is detected, the transmission frequency ftr is changed to the even-mode resonance frequency fe (step S214). On the other hand, according to the sixth power transmission process, at first, the transmission frequency ftr may be set to the even-mode resonance frequency fe to start the power transmission (step S221), and then, when an abnormal condition due to a foreign object is detected, the transmission frequency ftr may be changed to the odd-mode resonance frequency fo (step S224). Steps S221 to S228 of FIG. 29 are the same as steps S211 to S218 of FIG. 27, except for steps S221 and S224. According to the sixth power transmission process, even when a metal foreign object is detected near the power transmitting coil Lt or the power receiving coil Lr, it is possible to continue power transmission without immediately stopping the power transmission, while suppressing heating of the metal foreign object, in a manner similar to that of the fifth power transmission process.

Figure 30:
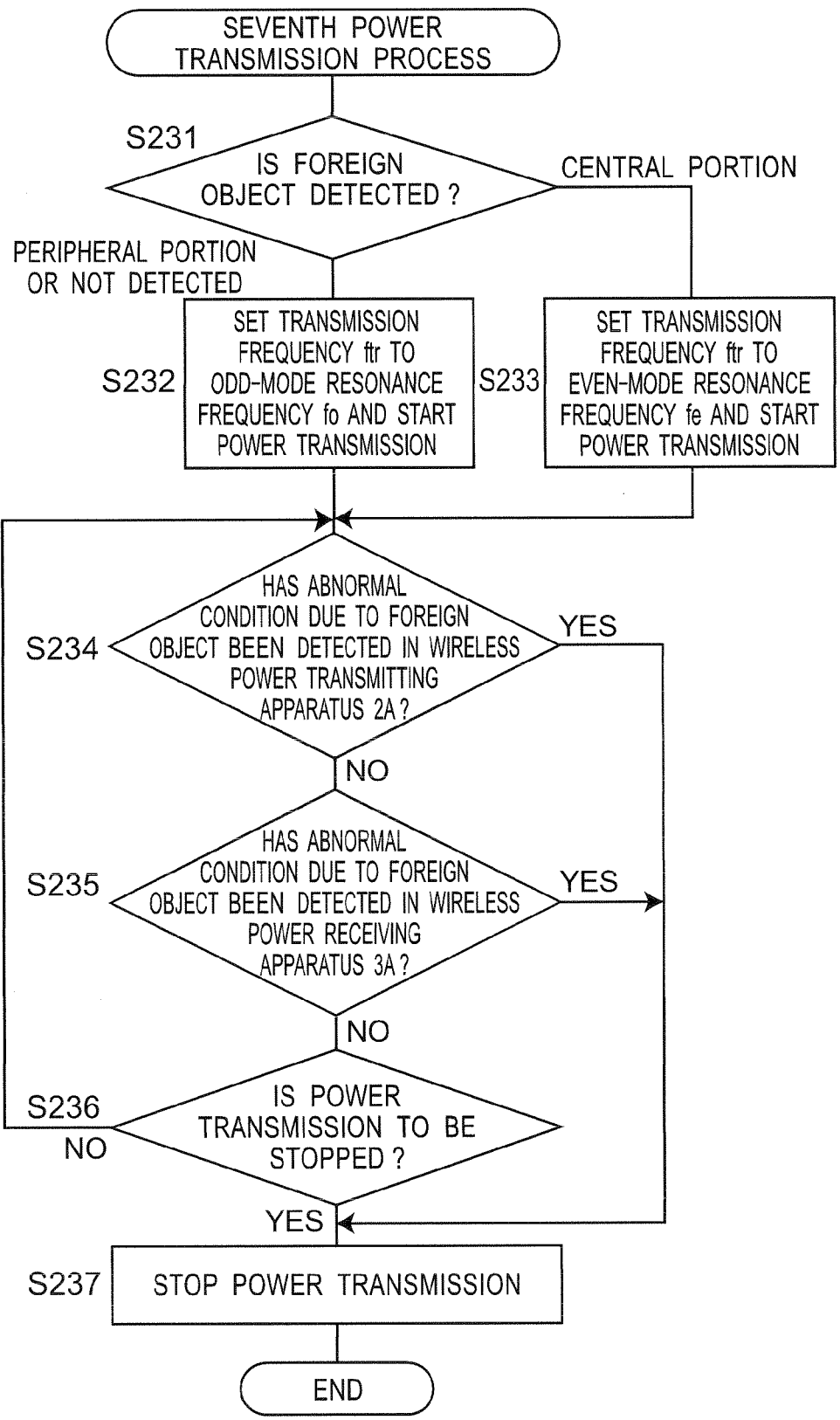
FIG. 30 is a flowchart showing a seventh power transmission process performed by the control circuit 23A of the wireless power transmitting apparatus 2A of FIG. 24.

FIG. 30 is a flowchart showing a seventh power transmission process performed by the control circuit 23A of the wireless power transmitting apparatus 2A of FIG. 24.

At least one of the sensors 24 and 34 of FIG. 24 may include a position sensor configured to detect the position of a foreign object near the power transmitting coil Lt or the power receiving coil Lr, in addition to a temperature sensor. For example, in an electric car, etc., it is expected that a variety of foreign objects, such as an iron screw and aluminum foil, enter between the power transmitting coil Lt and the power receiving coil Lr. Therefore, such foreign objects may be located in advance using a position sensor. The position sensor includes, for example, an optical sensor, a millimeter-wave radar, a magnetic sensor, etc. When a magnetic sensor is used as the position sensor, a magnetic field distribution for the case where a metal foreign object is not present is measured and stored in advance, and then, the position of a metal foreign object is detected by detecting a change with respect to the stored magnetic field distribution.

According to the seventh power transmission process, a foreign object is detected before starting power transmission, and a transmission frequency ftr is selected according to the position of the detected foreign object. As described above with reference to FIGS. 9 and 10, the magnetic flux density at the central portion of the power transmitting coil Lt and the power receiving coil Lr (point A) is lower in the even-mode resonant condition (ftr=fe) than in the odd-mode resonant condition (ftr=fo). On the other hand, the magnetic flux density at the peripheral portion of the power transmitting coil Lt and the power receiving coil Lr (point B) is lower in the odd-mode resonant condition than in the even-mode resonant condition. Therefore, in order to suppress heating of a metal foreign object, power transmission is started at the even-mode resonance frequency fe when a foreign object is present at the central portion of the power transmitting coil Lt and the power receiving coil Lr (point A), and on the other hand, power transmission is started at the odd-mode resonance frequency fo when a foreign object is present at the peripheral portion of the power transmitting coil Lt and the power receiving coil Lr (point B).

When the control circuit 23A detects a foreign object at the central portion of the power transmitting coil Lt and the power receiving coil Lr, the control circuit 23A causes the power transmitting circuit 21A to generate high-frequency power at the even-mode resonance frequency fe, and start transmission of the high-frequency power from the wireless power transmitting apparatus 2A to the wireless power receiving apparatus 3A. When the control circuit 23A detects a foreign object at the peripheral portion of the power transmitting coil Lt and the power receiving coil Lr, the control circuit 23A causes the power transmitting circuit 21A to generate high-frequency power at the odd-mode resonance frequency fo, and start transmission of the high-frequency power from the wireless power transmitting apparatus 2A to the wireless power receiving apparatus 3A. At step S231 of FIG. 30, the control circuit 23A determines whether or not a foreign object has been detected. If a foreign object is present at the peripheral portion of the power transmitting coil Lt and the power receiving coil Lr, or if a foreign object has not been detected, the process proceeds to step S232. If a foreign object is present at the central portion of the power transmitting coil Lt and the power receiving coil Lr, the process proceeds to step S233. At step S232, the control circuit 23A instructs the power transmitting circuit 21A to set the transmission frequency ftr to the odd-mode resonance frequency fo and start power transmission. At step S233, the control circuit 23A instructs the power transmitting circuit 21A to set the transmission frequency ftr to the even-mode resonance frequency fe and start power transmission. Then, at step S234, the control circuit 23A determines whether or not an abnormal condition due to a foreign object in has been detected in the wireless power transmitting apparatus 2A; if YES, the process proceeds to step S237; if NO, the process proceeds to step S235. At step S235, the control circuit 23A determines whether or not an abnormal condition due to a foreign object has been detected in the wireless power receiving apparatus 3A; if YES, the process proceeds to step S237; if NO, the process proceeds to step S236. At step S236, the control circuit 23A determines whether or not the power transmission is to be stopped; if YES, the process proceeds to step S237; if NO, the process returns to step S234. At step S237, the control circuit 23A instructs the power transmitting circuit 21A to stop the power transmission.

According to the seventh power transmission process, even when a metal foreign object is detected near the power transmitting coil Lt or the power receiving coil Lr before starting power transmission, it is possible to start the power transmission while suppressing heating of the metal foreign object.

Figure 31:
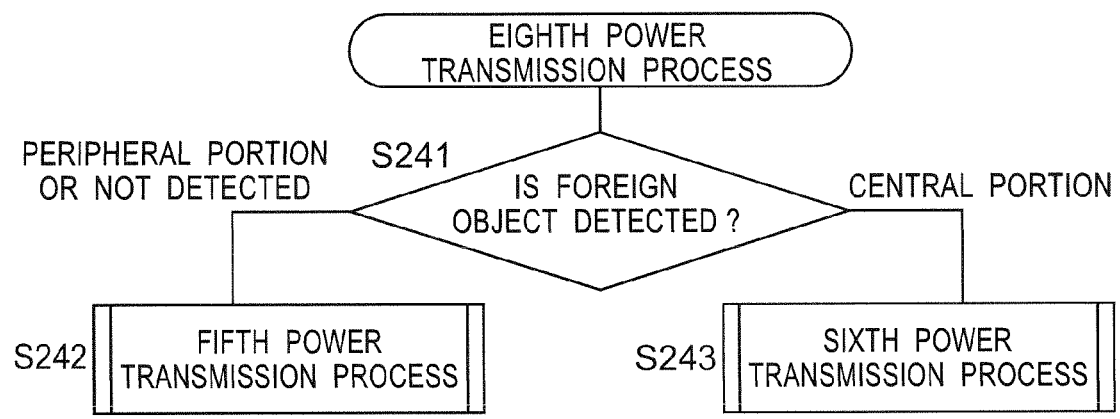
FIG. 31 is a flowchart showing an eighth power transmission process performed by the control circuit 23A of the wireless power transmitting apparatus 2A of FIG. 24.

FIG. 31 is a flowchart showing an eighth power transmission process performed by the control circuit 23A of the wireless power transmitting apparatus 2A of FIG. 24. The seventh power transmission process may be combined with the fifth and sixth power transmission processes. When the control circuit 23A detects a foreign object at the central portion of the power transmitting coil Lt and the power receiving coil Lr, the control circuit 23A causes the power transmitting circuit 21A to generate high-frequency power at the even-mode resonance frequency fe, and start transmission of the high-frequency power from the wireless power transmitting apparatus 2A to the wireless power receiving apparatus 3A. When the control circuit 23A detects a foreign object at the peripheral portion of the power transmitting coil Lt and the power receiving coil Lr, the control circuit 23A causes the power transmitting circuit 21A to generate high-frequency power at the odd-mode resonance frequency fo, and start transmission of the high-frequency power from the wireless power transmitting apparatus 2A to the wireless power receiving apparatus 3A. At step S241, the control circuit 23A determines whether or not a foreign object has been detected. If a foreign object is present at the peripheral portion of the power transmitting coil Lt and the power receiving coil Lr, or if a foreign object has not been detected, the process proceeds to step S242. If a foreign object is present at the central portion of the power transmitting coil Lt and the power receiving coil Lr, the process proceeds to step S243. At step S242, the control circuit 23A performs the fifth power transmission process of FIG. 27. At step S243, the control circuit 23A performs the sixth power transmission process of FIG. 29.

According to the eighth power transmission process, even when a metal foreign object is detected near the power transmitting coil Lt or the power receiving coil Lr before starting power transmission, it is possible to start the power transmission while suppressing heating of the metal foreign object. Further, even when an abnormal condition due to a foreign object near the power transmitting coil Lt or the power receiving coil Lr occurs, it is possible to continue the power transmission without immediately stopping the power transmission, while suppressing heating of the metal foreign object.

Figure 32:
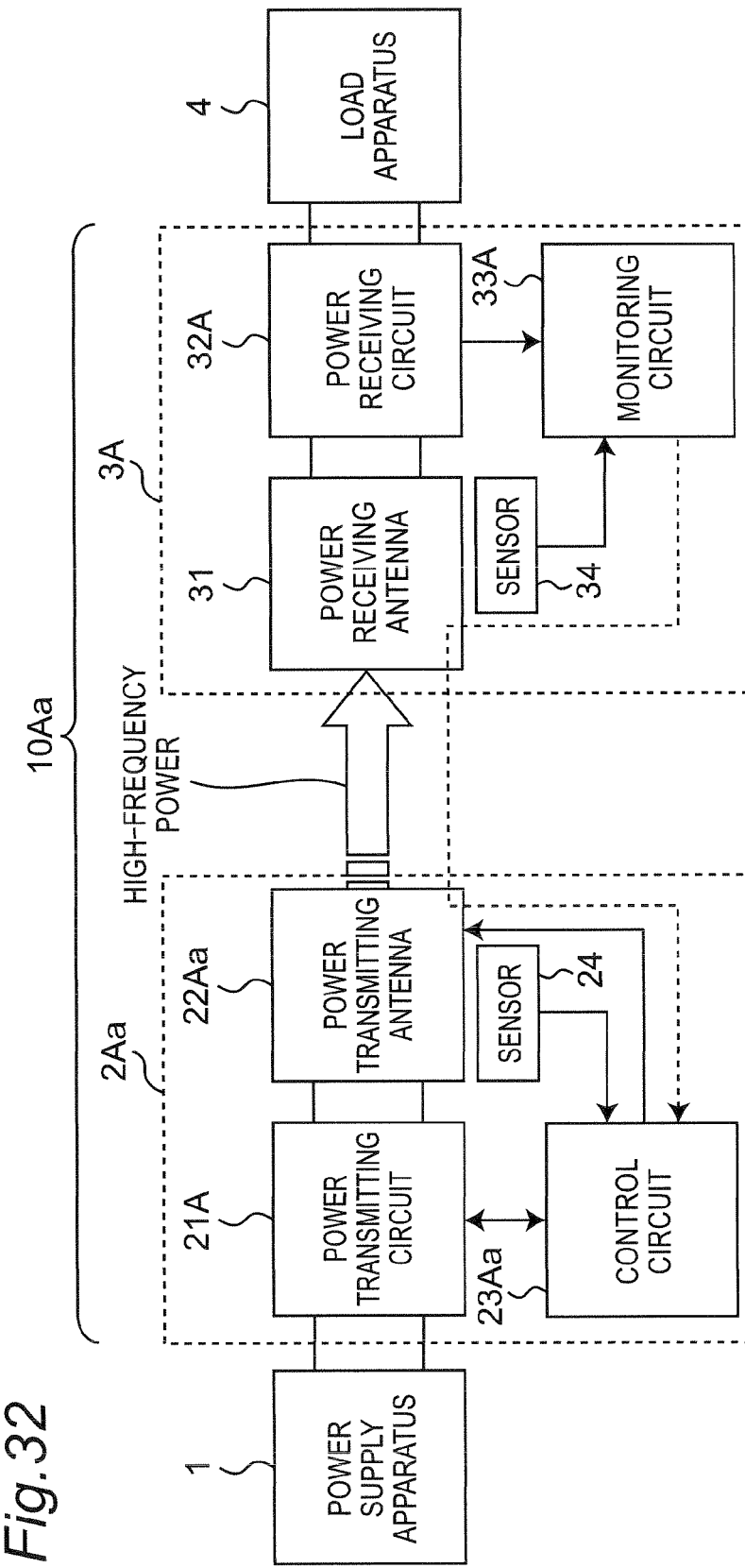
FIG. 32 is a block diagram showing a schematic configuration of a wireless power transmission system 10Aa according to a modified embodiment of the second embodiment.
Figure 33:
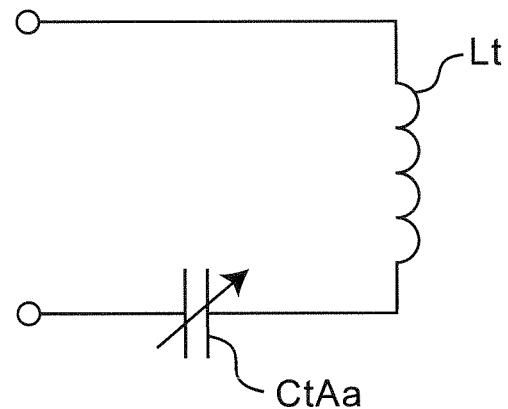
FIG. 33 is a circuit diagram showing a configuration of a power transmitting antenna 22Aa of FIG. 32.

FIG. 32 is a block diagram showing a schematic configuration of a wireless power transmission system 10Aa according to a modified embodiment of the second embodiment. The wireless power transmission system 10Aa of FIG. 32 includes: a wireless power transmitting apparatus 2Aa connected to the power supply apparatus 1; and the wireless power receiving apparatus 3A connected to the load apparatus 4. The wireless power transmitting apparatus 2Aa is provided with a power transmitting antenna 22Aa and a control circuit 23Aa, instead of the power transmitting antenna 22 and the control circuit 23A of the wireless power transmitting apparatus 2A of FIG. 24. FIG. 33 is a circuit diagram showing a configuration of the power transmitting antenna 22Aa of FIG. 32. The power transmitting antenna 22Aa is provided with a power transmitting coil Lt, and a capacitor CtAa having a variable capacitance. The control circuit 23Aa operates in a manner similar to that of the control circuit 23A of FIG. 24, and in addition, controls the capacitance of the capacitor CtAa.

Figure 34:
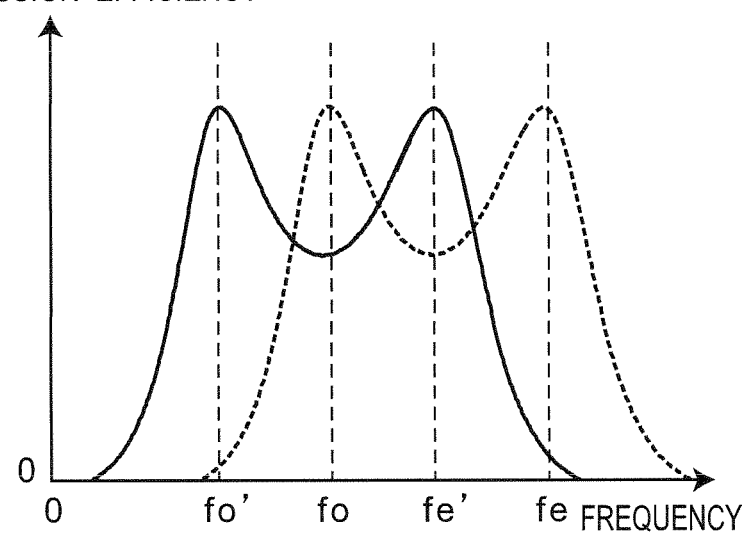
FIG. 34 is a schematic diagram showing a change in the characteristics of transmission efficiency versus frequency of the wireless power transmission system 10Aa, obtained when changing the capacitance of a capacitor CtAa of FIG. 33.

FIG. 34 is a schematic diagram showing a change in the characteristics of transmission efficiency versus frequency of the wireless power transmission system 10Aa, obtained when changing the capacitance of the capacitor CtAa of FIG. 33. The capacitor CtAa and the power transmitting coil Lt forms a plurality of LC resonators, each of the plurality of resonators corresponding to one of the plurality of capacitances of the capacitor CtAa. Each of the plurality of LC resonators has an odd-mode resonance frequency and an even-mode resonance frequency. Therefore, for example, as shown in FIG. 34, when the capacitor CtAa has a first capacitance, an LC resonator has resonance frequencies fo and fe, and when the capacitor CtAa has a second capacitance, an LC resonator has resonance frequencies fo' and fe'. For example, when the resonance frequency fe' is configured to be equal to the resonance frequency fo, it is possible to change the transmission mode between the odd mode (FIG. 9) and the even mode (FIG. 10) by changing the capacitance of the capacitor CtAa, without changing the frequency of high-frequency power generated by the power transmitting circuit 21A (transmission frequency ftr).

Figure 35:
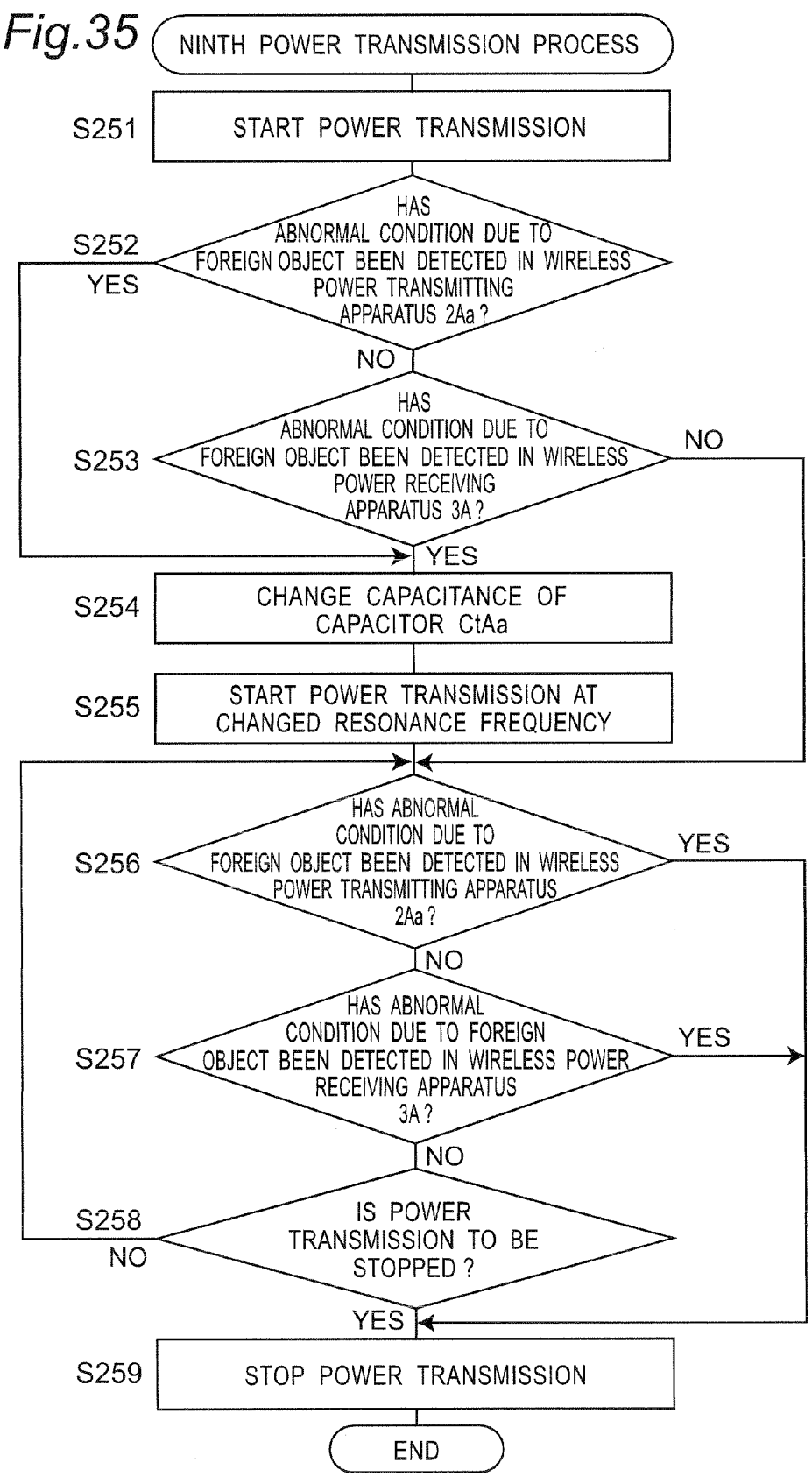
FIG. 35 is a flowchart showing a ninth power transmission process performed by a control circuit 23Aa of a wireless power transmitting apparatus 2Aa of FIG. 32.

FIG. 35 is a flowchart showing a ninth power transmission process performed by the control circuit 23Aa of the wireless power transmitting apparatus 2Aa of FIG. 32. Specifically, at step S251 of FIG. 35, the control circuit 23Aa instructs the power transmitting circuit 21A to start power transmission. This step is, for example, step S214 of FIG. 27, or step S224 of FIG. 29. At step S252, the control circuit 23Aa determines whether or not an abnormal condition due to a foreign object has been detected in the wireless power transmitting apparatus 2Aa; if YES, the process proceeds to step S254; if NO, the process proceeds to step S253. At step S253, the control circuit 23Aa determines whether or not an abnormal condition due to a foreign object has been detected in the wireless power receiving apparatus 3A; and if YES, the process proceeds to step S254; if NO, the process proceeds to step S256. At step S254, the control circuit 23Aa changes the capacitance of the capacitor CtAa. At step S255, the control circuit 23Aa instructs the power transmitting circuit 21A to start power transmission at a frequency equal to a changed resonance frequency of an LC resonator corresponding to the changed capacitance. At step S256, the control circuit 23Aa determines whether or not an abnormal condition due to a foreign object has been detected in the wireless power transmitting apparatus 2Aa; and if YES, the process proceeds to step S259; if NO, the process proceeds to step S257. At step S257, the control circuit 23Aa determines whether or not an abnormal condition due to a foreign object has been detected in the wireless power receiving apparatus 3A; if YES, the process proceeds to step S259; if NO, the process proceeds to step S258. At step S258, the control circuit 23Aa determines whether or not the power transmission is to be stopped; if YES, the process proceeds to step S259; if NO, the process returns to step S256. At step S259, the control circuit 23Aa instructs the power transmitting circuit 21A to stop the power transmission.

The capacitor CtAa may have three or more different capacitances. In this case, when the power transmitting circuit 21A generates high-frequency power at a frequency equal to one of a plurality of odd-mode resonance frequencies and a plurality of even-mode resonance frequencies, and the high-frequency power is transmitted from the wireless power transmitting apparatus 2Aa to the wireless power receiving apparatus 3A, and an abnormal condition due to a foreign object near the power transmitting coil Lt or the power receiving coil Lr occurs, the control circuit 23Aa changes the transmission frequency ftr of the power transmitting circuit 21A to another frequency of the plurality of odd-mode resonance frequencies and the plurality of even-mode resonance frequencies. When an abnormal condition due to a foreign object near the power transmitting coil Lt or the power receiving coil Lr occurs after trying to transmit high-frequency power at all of the plurality of odd-mode resonance frequencies and the plurality of even-mode resonance frequencies, the control circuit 23Aa causes the power transmitting circuit 21A to stop the transmission of high-frequency power.

According to the ninth power transmission process, even when a metal foreign object is detected near the power transmitting coil Lt or the power receiving coil Lr, it is possible to continue power transmission without immediately stopping the power transmission, while suppressing heating of the metal foreign object.

In addition, the frequency of an output voltage generated by the power transmitting circuit 21A is not limited to 100 to 200 kHz, and a frequency of 200 kHz or higher or a frequency of 100 kHz or lower may be used.

Next, with reference to FIGS. 36 and 37, simulation results for the wireless power transmission system 10A of FIG. 24 will be described.

In the simulation, the power transmitting coil Lt and the power receiving coil Lr of FIG. 20 were used. As a metal foreign object 5, a piece of aluminum of 2×5×0.2 mm was disposed between the power transmitting coil Lt and the power receiving coil Lr.

Figure 36:
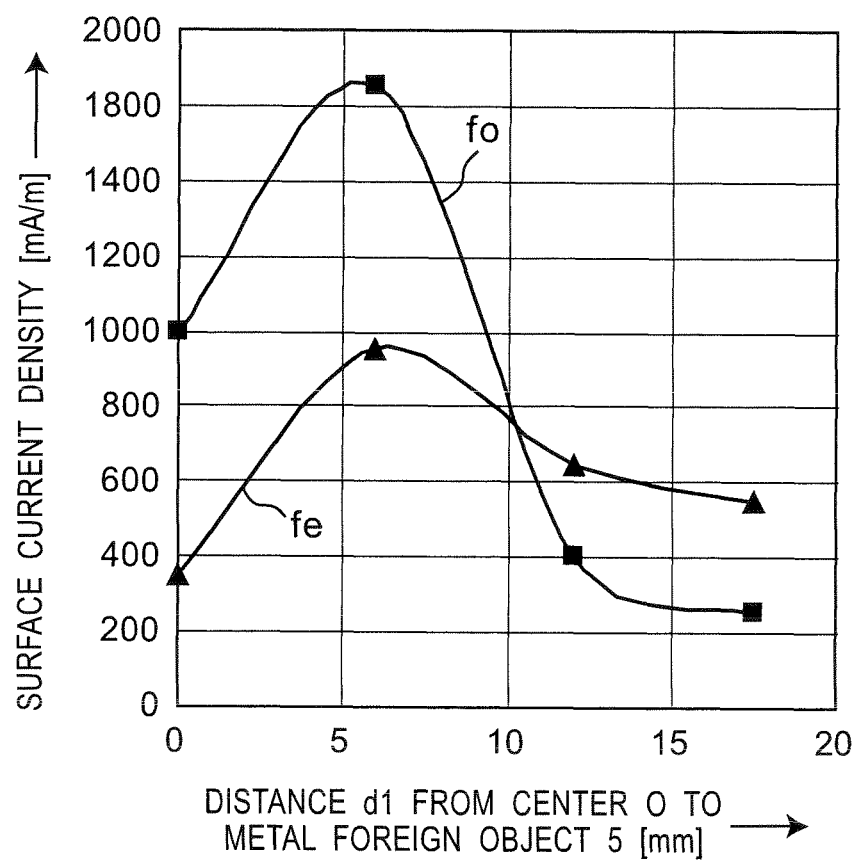
FIG. 36 is a graph showing direct-current density with respect to the position of a metal foreign object 5, for the case where the inner diameter d2 of a power transmitting coil Lt and a power receiving coil Lr is 20 mm.
Figure 37:
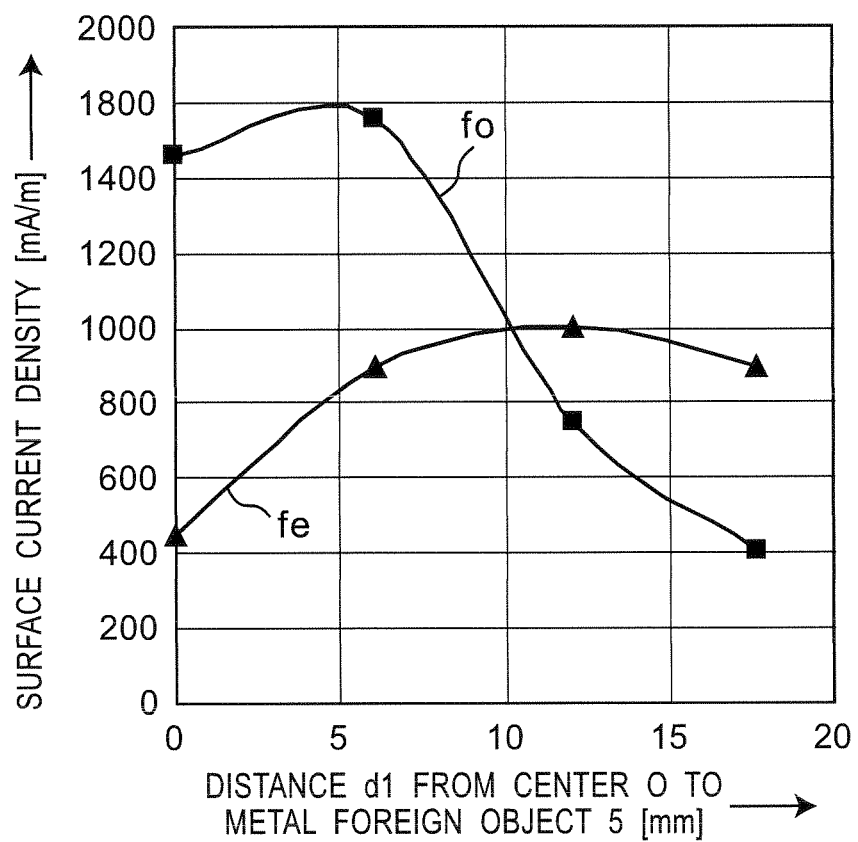
FIG. 37 is a graph showing direct-current density with respect to the position of a metal foreign object 5, for the case where the inner diameter d2 of the power transmitting coil Lt and the power receiving coil Lr is 10 mm.

FIG. 36 is a graph showing direct-current density with respect to the position of the metal foreign object 5, for the case where the inner diameter d2 of the power transmitting coil Lt and the power receiving coil Lr is 20 mm. FIG. 37 is a graph showing direct-current density with respect to the position of the metal foreign object 5, for the case where the inner diameter d2 of the power transmitting coil Lt and the power receiving coil Lr is 10 mm. The horizontal axis of each graph represents a distance d1 from the center O of the power transmitting coil Lt and the power receiving coil Lr to the metal foreign object 5. The vertical axis of each graph represents surface current density. The total amount of surface current is obtained by multiplying the surface current density by the area of the metal foreign object 5 (2×5 mm$^2$). According to FIGS. 36 and 37, it can be seen that, not depending on the structures of the power transmitting coil Lt and the power receiving coil Lr, (1) when the metal foreign object 5 is present at the central portion of the power transmitting coil Lt and the power receiving coil Lr, the amount of heating is smaller at the even-mode resonance frequency fe than at the odd-mode resonance frequency fo, and (2) when the metal foreign object 5 is present at the peripheral portion of the power transmitting coil Lt and the power receiving coil Lr, the amount of heating is smaller at the odd-mode resonance frequency fo than at the even-mode resonance frequency fe. It is noted that substantially equal impedance and substantially equal transmission efficiency are achieved at the two frequencies fo and fe, the frequency does not affect transmission characteristics. From the above results, when heating of a metal foreign object 5 is problematic, an optimal frequency is selected according to the position of the metal foreign object 5, and as a result, when healing of the metal foreign object 5 has been reduced to a non-problematic level, it is possible to continue power transmission without stopping the power transmission.

Third Embodiment

Figure 38:
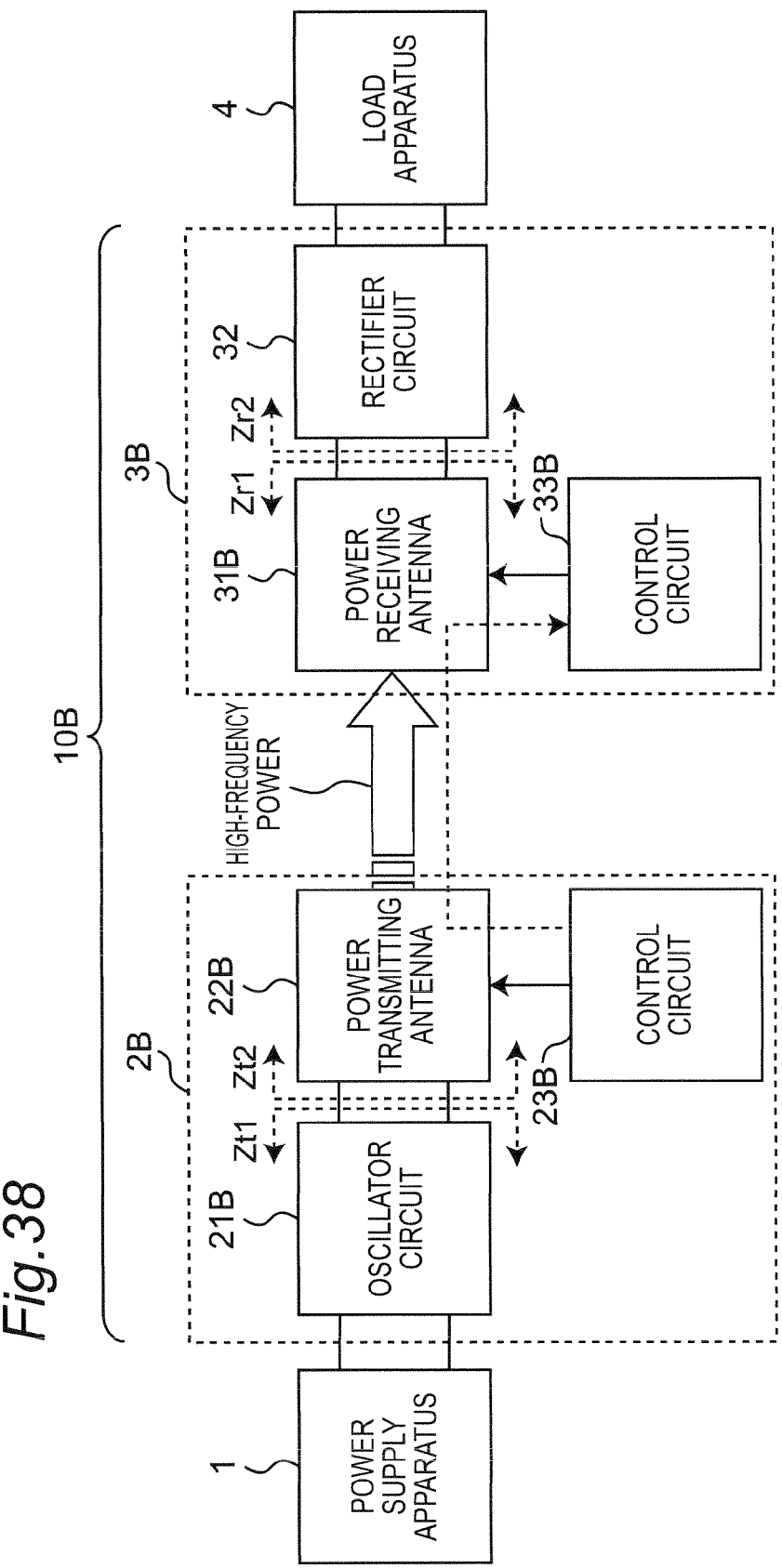
FIG. 38 is a block diagram showing a configuration of a wireless power transmission system 10B according to a third embodiment.

FIG. 38 is a block diagram showing a configuration of a wireless power transmission system 10B according to a third embodiment. The wireless power transmission system 10B includes: a wireless power transmitting apparatus 2B connected to the power supply apparatus 1; and a wireless power receiving apparatus 3B connected to the load apparatus 4. The wireless power transmission system 10B wirelessly transmits high-frequency power from the wireless power transmitting apparatus 2B to the wireless power receiving apparatus 3B.

Referring to FIG. 38, the wireless power transmitting apparatus 2B is provided with an oscillator circuit 21B, a power transmitting antenna 22B, and a control circuit 23B. The oscillator circuit 21B operates as a power transmitting circuit for generating high-frequency power from inputted direct-current power, and outputting the high-frequency power to the power transmitting antenna 22B. The oscillator circuit 21B is provided with: a pulse generator for generating a pulse sequence with a transmission frequency ftr; and a class-D amplifier including a switching element operable according to the pulse sequence. The oscillator circuit 21B generates high-frequency power with the transmission frequency ftr. The power transmitting antenna 22B includes an LC resonant circuit having at least one of a variable inductance and a variable capacitance. The control circuit 23B of the wireless power transmitting apparatus 2B changes at least one of the inductance and the capacitance of the power transmitting antenna 22B.

Referring to FIG. 38, the wireless power receiving apparatus 3B is provided with a power receiving antenna 31B, a rectifier circuit 32, and a control circuit 33B. The power receiving antenna 31B includes an LC resonant circuit having at least one of a variable inductance and a variable capacitance. The power receiving antenna 31B is electromagnetically coupled to the power transmitting antenna 22B. The control circuit 33B of the wireless power receiving apparatus 3B changes at least one of the inductance and the capacitance of the power receiving antenna 31B, under the control of the control circuit 23B of the wireless power transmitting apparatus 2B. The rectifier circuit 32 operates as a power receiving circuit for converting high-frequency power transmitted from the wireless power transmitting apparatus 2B through the power transmitting antenna 22B and the power receiving antenna 31B, into direct-current output power, and supplying the direct-current output power to the load apparatus 4.

The control circuit 23B of the wireless power transmitting apparatus 2B transmits a control signal for changing at least one of the inductance and the capacitance of the power receiving antenna 31B, to the control circuit 33B of the wireless power receiving apparatus 3B, for example, through the power transmitting antenna 22B and the power receiving antenna 31B. The control circuit 23B of the wireless power transmitting apparatus 2B may transmit the control signal to the control circuit 33B of the wireless power receiving apparatus 3B through a communication path (not shown) different from the power transmitting antenna 22B and the power receiving antenna 31B.

In the wireless power transmission system 10B of FIG. 38, when the power transmitting antenna 22B and the power receiving antenna 31B are electromagnetically coupled to each other, a system of the power transmitting antenna 22B and the power receiving antenna 31B electromagnetically coupled to each other has an operating band including two resonance frequencies corresponding to an odd-mode resonant condition and an even-mode resonant condition, respectively (see FIG. 8). In this case, an even-mode resonance frequency fe is higher than an odd-mode resonance frequency fo. The transmission efficiency of the wireless power transmission system 10B can be maximized by setting the transmission frequency ftr to the resonance frequency fo or fe. The operating band of the system of the power transmitting antenna 22B and the power receiving antenna 31B electromagnetically coupled to each other is associated with the circuit constants of the wireless power transmitting apparatus 2B (e.g., the inductance and the capacitance of the power transmitting antenna 22B) and the circuit constants of the wireless power receiving apparatus 3B (e.g., the inductance and the capacitance of the power receiving antenna 31B). The control circuit 23B of the wireless power transmitting apparatus 2B sets at least one of the circuit constant of the wireless power transmitting apparatus 2B and the circuit constant of the wireless power receiving apparatus 3B, such that the operating band of the system of the power transmitting antenna 22B and the power receiving antenna 31B electromagnetically coupled to each other is set to one of the first and second operating bands.

With reference to FIGS. 39 to 49, detailed configurations of the power transmitting antenna 22B and the power receiving antenna 31B will be described, and methods for setting the circuit constants of the wireless power transmitting apparatus 2B and the circuit constants of the wireless power receiving apparatus 3B will be described.

Figure 39:
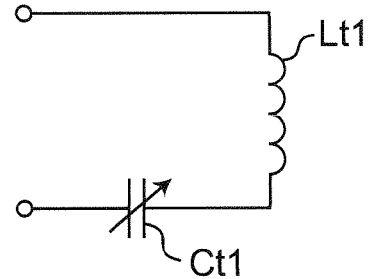
FIG. 39 is a circuit diagram showing a configuration of a power transmitting antenna 22Ba according to a first example of a power transmitting antenna 22B of FIG. 38.
Figure 40:
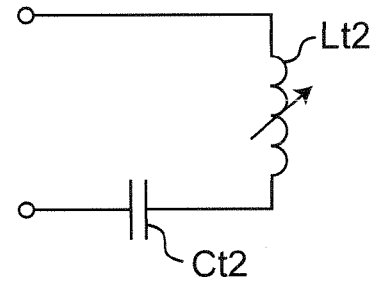
FIG. 40 is a circuit diagram showing a configuration of a power transmitting antenna 22Bb according to a second example of the power transmitting antenna 22B of FIG. 38.

FIG. 39 is a circuit diagram showing a configuration of a power transmitting antenna 22Ba according to a first example of the power transmitting antenna 22B of FIG. 38. The power transmitting antenna 22Ba of FIG. 39 is an LC series resonant circuit including a power transmitting coil Lt1 and a resonant capacitor Ct1 connected in series, and the LC series resonant circuit having a resonance frequency fT. The resonant capacitor Ct1 has a capacitance variable under the control of the control circuit 23B of the wireless power transmitting apparatus 2B. FIG. 40 is a circuit diagram showing a configuration of a power transmitting antenna 22Bb according to a second example of the power transmitting antenna 22B of FIG. 38. The power transmitting antenna 22Bb of FIG. 40 is an LC series resonant circuit including a power transmitting coil Lt2 and a resonant capacitor Ct2 connected in series, and the LC series resonant circuit has a resonance frequency fT. The power transmitting coil Lt2 has an inductance variable under the control of the control circuit 23B of the wireless power transmitting apparatus 2B.

Figure 41:
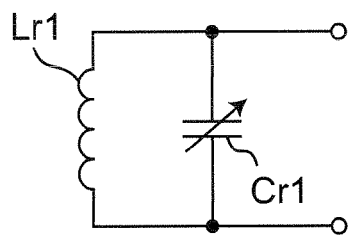
FIG. 41 is a circuit diagram showing a configuration of a power receiving antenna 31Ba according to a first example of a power receiving antenna 31B of FIG. 38.
Figure 42:
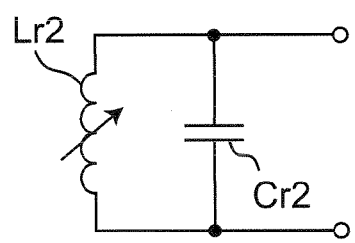
FIG. 42 is a circuit diagram showing a configuration of a power receiving antenna 31Bb according to a second example of the power receiving antenna 31B of FIG. 38.

FIG. 41 is a circuit diagram showing a configuration of a power receiving antenna 31Ba according to a first example of the power receiving antenna 31B of FIG. 38. The power receiving antenna 31Ba of FIG. 41 is an LC parallel resonant circuit including a power receiving coil Lr1 and a resonant capacitor Cr1 connected in parallel, and the LC parallel resonant circuit having a resonance frequency fR. The resonant capacitor Cr1 has a capacitance variable under the control of the control circuit 33B of the wireless power receiving apparatus 3B. FIG. 42 is a circuit diagram showing a configuration of a power receiving antenna 31Bb according to a second example of the power receiving antenna 31B of FIG. 38. The power receiving antenna 31Bb of FIG. 42 is an LC parallel resonant circuit including a power receiving coil Lr2 and a resonant capacitor Cr2 connected in parallel, and the LC parallel resonant circuit having a resonance frequency fR. The power receiving coil Lr2 has an inductance variable under the control of the control circuit 33B of the wireless power receiving apparatus 3B.

The resonance frequency fr of the power transmitting antenna 22B changes by the control circuit 23B of the wireless power transmitting apparatus 2B which changes the inductance or the capacitance of the power transmitting antenna 22B (22Ba and 22Bb). Similarly, the resonance frequency fR of the power receiving antenna 31B changes by the control circuit 33B of the wireless power receiving apparatus 3B which changes the inductance or the capacitance of the power receiving antenna 31B (31Ba and 31Bb). When the power transmitting antenna 22B and the power receiving antenna 31B are electromagnetically coupled to each other, if the resonance frequency fr of the power transmitting antenna 22B or the resonance frequency fR of the power receiving antenna 31B changes, then the operating band and the resonance frequencies (odd-mode resonance frequency and even-mode resonance frequency) of the system of the power transmitting antenna 22B and the power receiving antenna 31B electromagnetically coupled to each other also change. Therefore, the control circuit 23B of the wireless power transmitting apparatus 2B can set the operating band of the system of the power transmitting antenna 22B and the power receiving antenna 31B electromagnetically coupled to each other, to one of the first and second operating bands, by changing one of the inductance and the capacitance of the power transmitting antenna 22B and the power receiving antenna 31B.

Although in FIGS. 39 to 42 the power transmitting antenna 22B is an LC series resonant circuit and the power receiving antenna 31B is an LC parallel resonant circuit, the configurations of the power transmitting antenna 22B and the power receiving antenna 31B are not limited thereto. The LC parallel resonant circuit of FIG. 41 or 42 may be used as the power transmitting antenna 22B. In addition, the LC series resonant circuit of FIG. 39 or 40 may be used as the power receiving antenna 31B. Both the power transmitting antenna 22B and the power receiving antenna 31B may be the LC series resonant circuit of FIG. 39 or 40, or may be the LC parallel resonant circuit of FIG. 41 or 42.

The power transmitting antenna 22B may have both a variable inductance and a variable capacitance. In this case, the control circuit 23B of the wireless power transmitting apparatus 2B changes the inductance and the capacitance of the power transmitting antenna 22B. In addition, the power receiving antenna 31B may also have both a variable inductance and a variable capacitance. In this case, the control circuit 33B of the wireless power receiving apparatus 3B changes the inductance and the capacitance of the power receiving antenna 31B, under the control of the control circuit 23B of the wireless power transmitting apparatus 2B.

In addition, each of the power transmitting antenna 22B and the power receiving antenna 31B may be a self-resonant circuit using its wire's parasitic capacitance.

Figure 43:
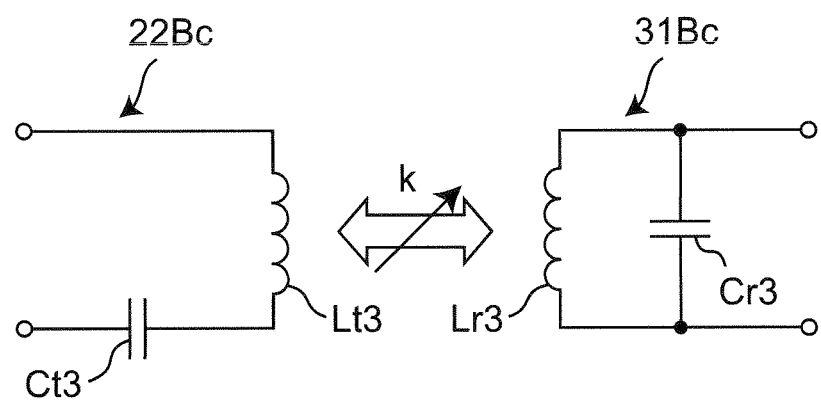
FIG. 43 is a circuit diagram showing configurations of a power transmitting antenna 22Bc and a power receiving antenna 31Bc according to a third example of the power transmitting antenna 22B and the power receiving antenna 31B of FIG. 38.

FIG. 43 is a circuit diagram showing configurations of a power transmitting antenna 22Bc and a power receiving antenna 31Bc according to a third example of the power transmitting antenna 22B and the power receiving antenna 31B of FIG. 38. The circuit constants of the wireless power transmitting apparatus 2B and the circuit constants of the wireless power receiving apparatus 3B are not limited to the inductances and the capacitances of the power transmitting antenna 22B and the power receiving antenna 31B. Referring to FIG. 43, the circuit constants of the wireless power transmitting apparatus 2B and the circuit constants of the wireless power receiving apparatus 3B include a coupling coefficient "k" between the power transmitting antenna and the power receiving antenna. The power transmitting antenna 22Bc of FIG. 43 includes a power transmitting coil Lt3 and a resonant capacitor Ct3. The power receiving antenna 31Bc of FIG. 43 includes a power receiving coil Lr3 and a resonant capacitor Cr3. The control circuit 23B of the wireless power transmitting apparatus 2B can set the operating band of the system of the power transmitting antenna 22Bc and the power receiving antenna 31Bc electromagnetically coupled to each other, to one of the first and second operating bands, by changing the coupling coefficient itself between the power transmitting antenna 22Bc and the power receiving antenna 31Bc, instead of changing the inductances and the capacitances of the power transmitting antenna 22Bc and the power receiving antenna 31Bc.

Figure 44:
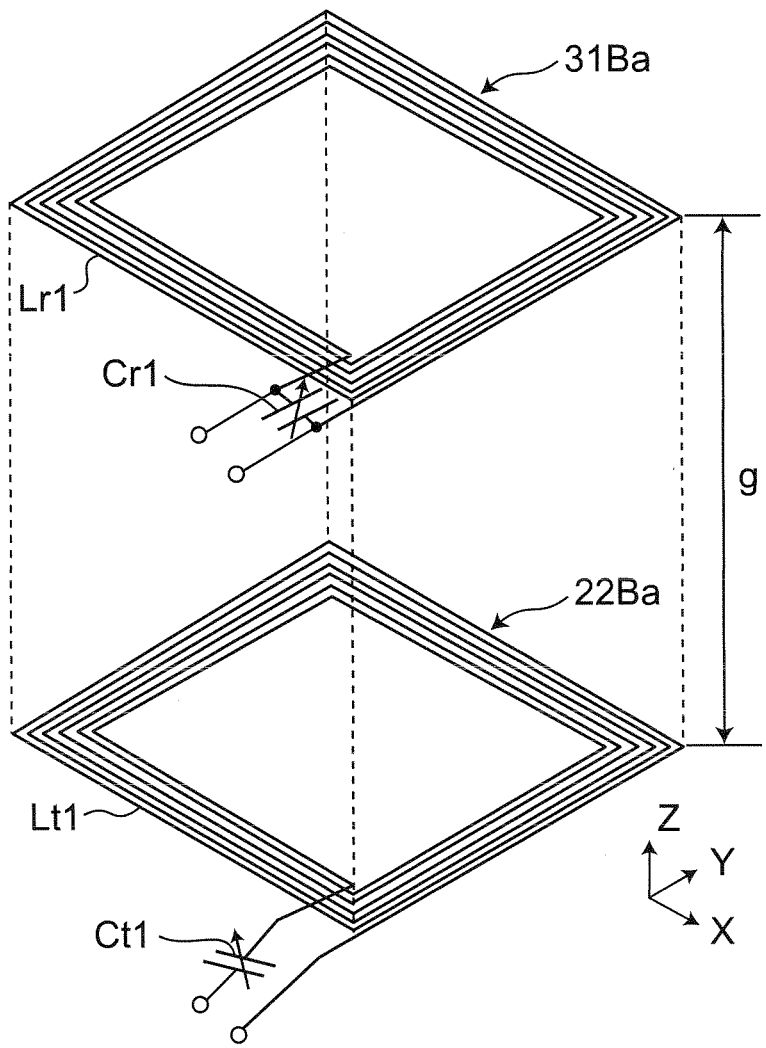
FIG. 44 is a perspective view showing an implementation example of the power transmitting antenna 22Ba of FIG. 39 and the power receiving antenna 31Ba of FIG. 41.

FIG. 44 is a perspective view showing an implementation example of the power transmitting antenna 22Ba of FIG. 39 and the power receiving antenna 31Ba of FIG. 41. The power transmitting antenna 22Ba and the power receiving antenna 31Ba of FIG. 44 are configured in a manner similar to that of the power transmitting antenna 22 and the power receiving antenna 31 of FIG. 6, except that resonant capacitors have variable capacitances.

Figure 45:
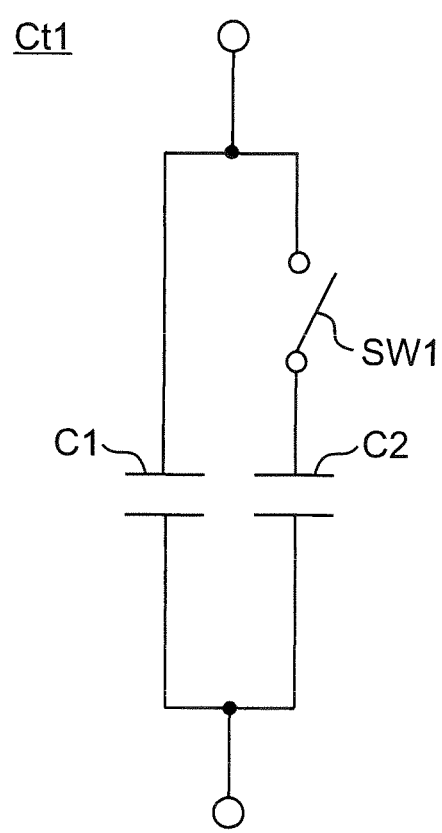
FIG. 45 is a circuit diagram showing an implementation example of a resonant capacitor Ct1 of the power transmitting antenna 22Ba of FIG. 39.

FIG. 45 is a circuit diagram showing an implementation example of the resonant capacitor Ct1 of the power transmitting antenna 22Ba of FIG. 39. The resonant capacitor Ct1 has a variable capacitance. The resonant capacitor Ct1 has a combined capacitance of the capacitances of a plurality of capacitors C1 and C2 connected in parallel. At least a part of the plurality of capacitors C1 and C2 (in FIG. 45, the capacitor C2) is connected with a high-frequency switch SW1 in series, the high-frequency switch SW1 being operable under the control of the control circuit 23B of the wireless power transmitting apparatus 2B. In the state of FIG. 45, since the high-frequency switch SW1 is turned off, the capacitance of the capacitor C2 does not contribute to the combined capacitance. When the high-frequency switch SW1 is turned on, the combined capacitance changes. The resonant capacitor Cr1 of FIG. 41 is also configured in a manner similar to that of the resonant capacitor Ct1 of FIG. 45.

The capacitances of the resonant capacitors Ct1 and Cr1 may be changed by other methods. For example, an element having a capacitance variable depending on an applied voltage may be used as the resonant capacitor Ct1, or as one of the plurality of capacitors included in the resonant capacitor Ct1.

Figure 46:
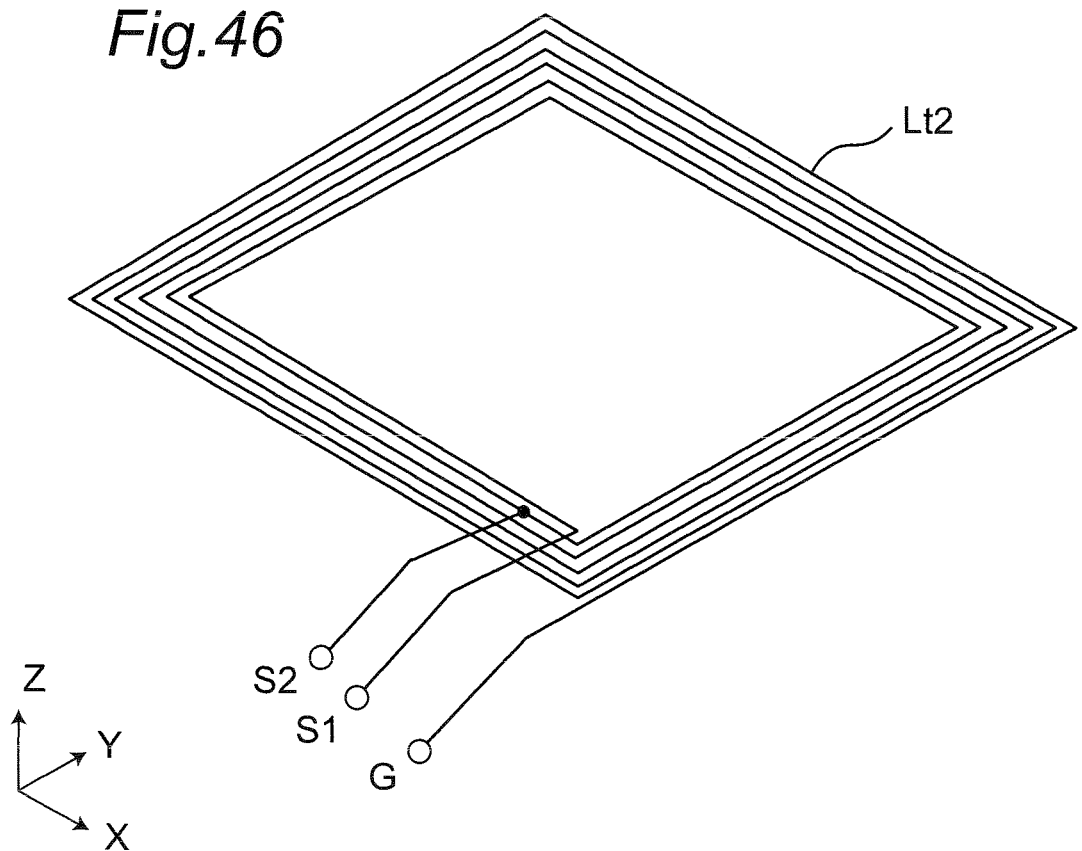
FIG. 46 is a perspective view showing a first implementation example of a power transmitting coil Lt2 of the power transmitting antenna 22Bb of FIG. 40.
Figure 47:
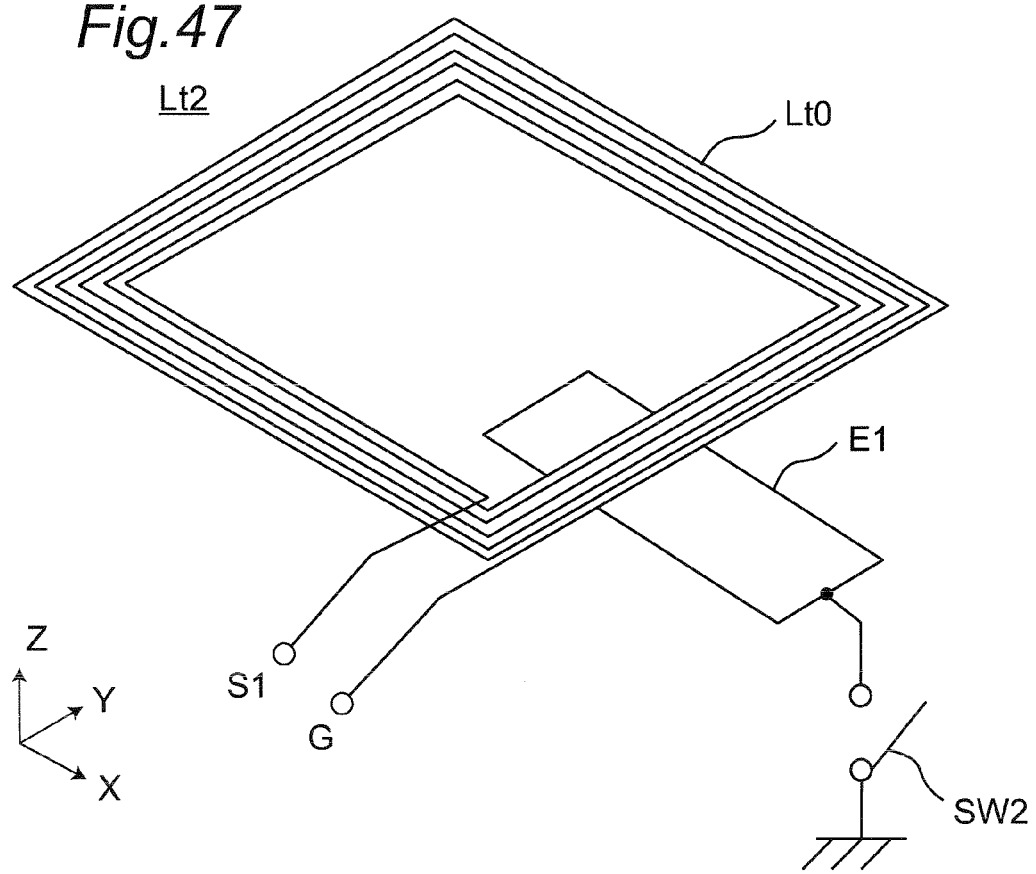
FIG. 47 is a perspective view showing a second implementation example of the power transmitting coil Lt2 of the power transmitting antenna 22Bb of FIG. 40.

FIG. 46 is a perspective view showing a first implementation example of the power transmitting coil Lt2 of the power transmitting antenna 22Bb of FIG. 40. FIG. 47 is a perspective view showing a second implementation example of the power transmitting coil Lt2 of the power transmitting antenna 22Bb of FIG. 40. The power transmitting coil Lt2 has a variable inductance. In the power transmitting coil Lt2 of FIG. 46, its number of turns Nt is 6 when terminals G and S1 are connected to the oscillator circuit 21B, and its number of turns Nt is 5 when the terminal S1 is changed to a terminal S2, and thus, the inductance of the power transmitting coil Lt2 changes. The power transmitting coil Lt2 of FIG. 47 is provided with a winding Lt0, and an electrode E1 disposed close to the winding Lt0 and having any shape. A high-frequency switch SW2 is connected between the electrode E1 and a GND terminal, the high-frequency switch SW2 being operable under the control of the control circuit 23B of the wireless power transmitting apparatus 2B. The electrode E1 may be disposed, for example, in an opposite side (−Z side) to the power receiving coil (+Z side) with respect to the power transmitting coil Lt2. The high-frequency switch SW2 controls the parasitic capacitance between the winding Lt0 and the electrode E1, thus resulting in a change in the inductance of the power transmitting coil Lt2. The power receiving coil Lr2 of FIG. 42 is also configured in a manner similar to that of the power transmitting coil Lt2 of FIG. 46 or 47.

It is noted that the inductances of the power transmitting coil Lt2 and the power receiving coil Lr2 may be changed by other methods.

Figure 48:
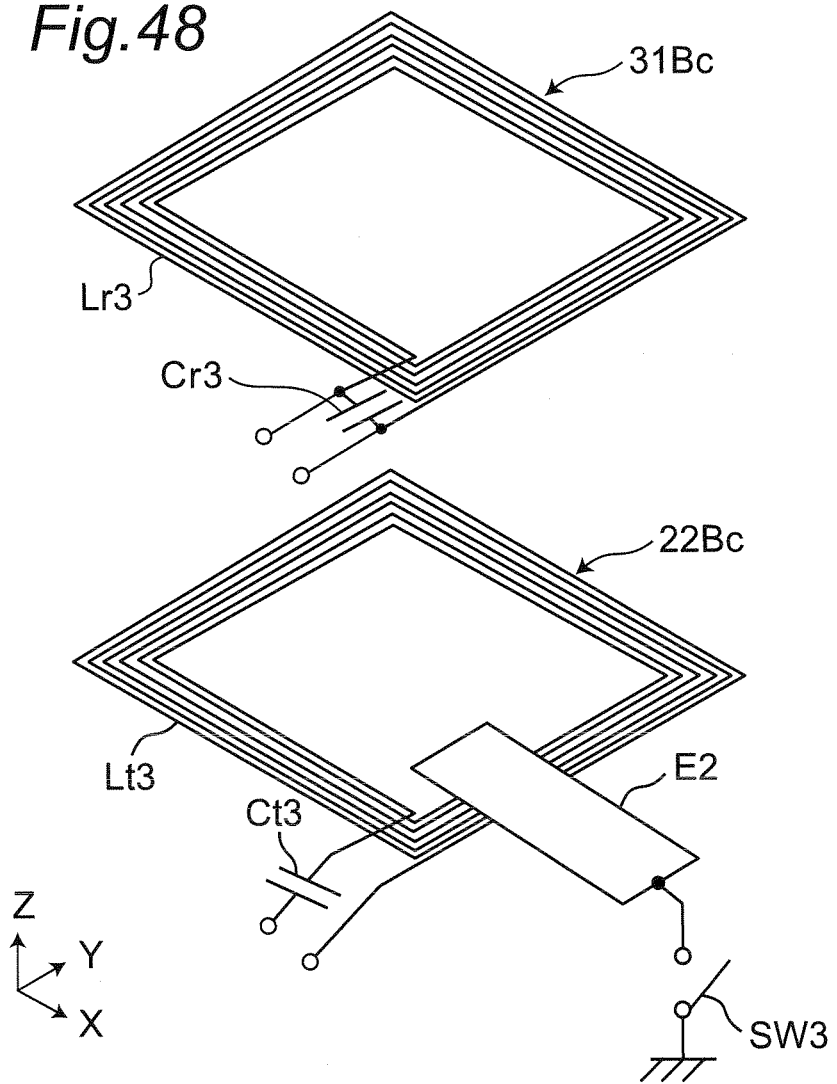
FIG. 48 is a perspective view showing a first implementation example of the power transmitting antenna 22Bc and the power receiving antenna 31Bc of FIG. 43.

FIG. 48 is a perspective view showing a first implementation example of the power transmitting antenna 22Bc and the power receiving antenna 31Bc of FIG. 43. In the implementation example of FIG. 48, an electrode E2 is inserted in space between the power transmitting antenna 22Bc and the power receiving antenna 31Bc. The electrode E2 is connected to a GND terminal through a high-frequency switch SW3 operable under the control of the control circuit 23B of the wireless power transmitting apparatus 2B. The voltage potential of the electrode E2 significantly changes by opening and closing the high-frequency switch SW3. As a result, it is possible to significantly change the coupling state between the power transmitting coil Lt3 and the power receiving coil Lr3, and accordingly, significantly change the coupling coefficient between the power transmitting antenna 22Bc and the power receiving antenna 31Bc.

Figure 49:
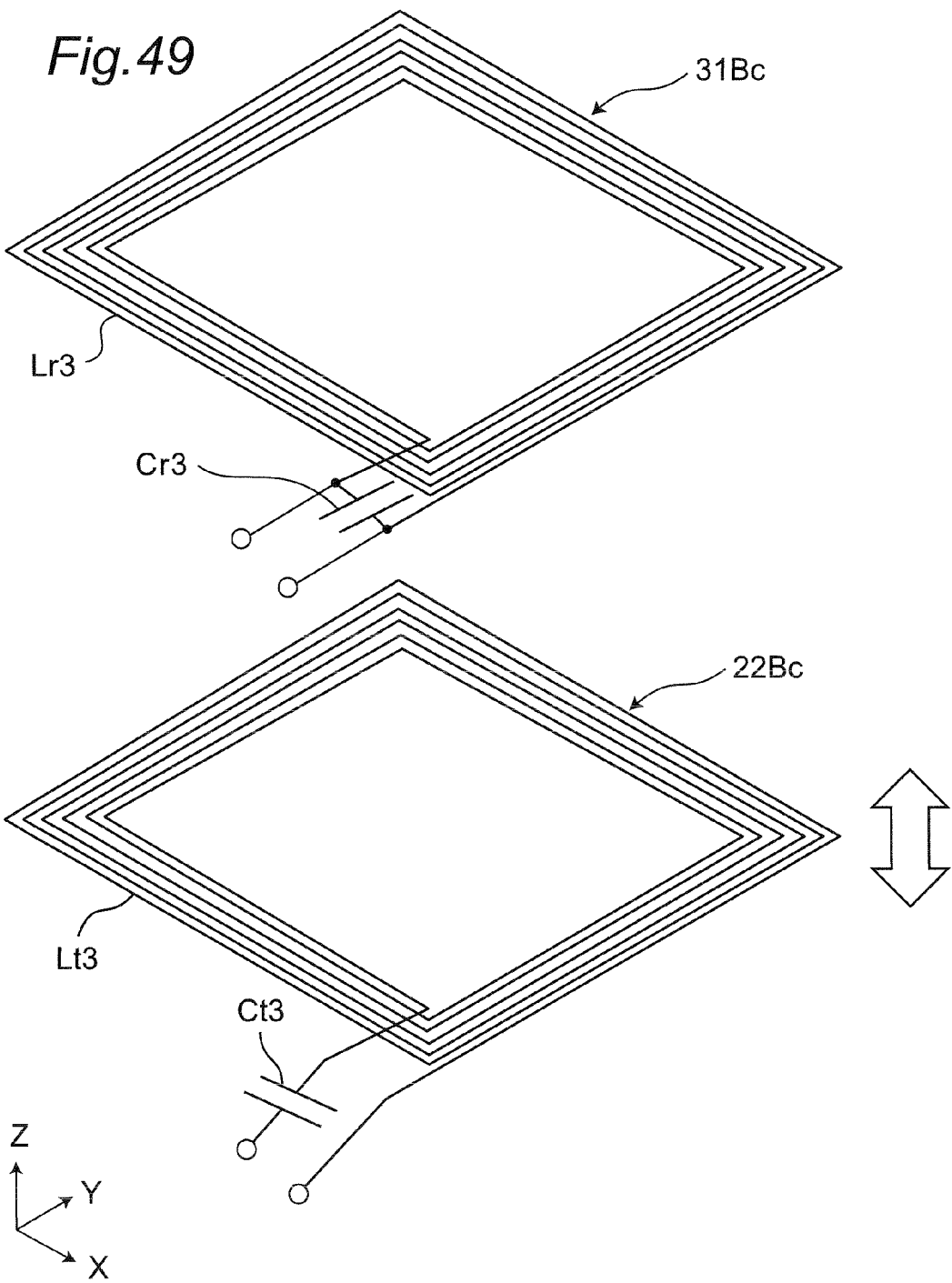
FIG. 49 is a perspective view showing a second implementation example of the power transmitting antenna 22Bc and the power receiving antenna 31Bc of FIG. 43.

FIG. 49 is a perspective view showing a second implementation example of the power transmitting antenna 22Bc and the power receiving antenna 31Bc of FIG. 43. In the implementation example of FIG. 49, the position of the power transmitting antenna 22Bc is physically moved under the control of the control circuit 23B of the wireless power transmitting apparatus 2B. Instead of moving the power transmitting antenna 22Bc in the Z-direction as shown in FIG. 49, the power transmitting antenna 22Bc may be moved in other directions, or may be tilted or may be rotated. It is possible to optimally change the coupling coefficient by changing the relative positional relationship between the power transmitting antenna 22Bc and the power receiving antenna 31Bc. In addition, instead of physically moving the position of the power transmitting antenna 22Bc, the position of the power receiving antenna 31Bc may be physically moved under the control of the control circuit 23B of the wireless power transmitting apparatus 2B.

From now on, with reference to FIGS. 50 to 52, the operation of the wireless power transmission system 10B of FIG. 38 will be described.

As described with reference to FIGS. 8 to 10, when the power transmitting antenna 22B and the power receiving antenna 31B are electromagnetically coupled to each other, the power transmitting antenna 22B and the power receiving antenna 31B have two resonance frequencies corresponding to an odd-mode resonant condition and an even-mode resonant condition, respectively. The magnetic flux density at the central portion of the power transmitting coil Lt and the power receiving coil Lr (point A) is lower in the even-mode resonant condition than in the odd-mode resonant condition. On the other hand, the magnetic flux density at the peripheral portion of the power transmitting coil Lt and the power receiving coil Lr (point B) is lower in the odd-mode resonant condition than in the even-mode resonant condition.

In order to improve the transmission efficiency of the wireless power transmission system 10B, it is necessary to increase the coupling between the power transmitting antenna 22B and the power receiving antenna 31B. However, in general, when two resonators with a resonance frequency f0 are coupled to each other with a coupling coefficient k, the even-mode resonance frequency fe and the odd-mode resonance frequency fo satisfies a relationship: k $\approx$ (fe$^2$−fo$^2$)/(fe$^2$+fo$^2$). That is, the larger the coupling coefficient k, the larger the difference between the resonance frequencies fe and fo.

Meanwhile, the frequency band that can be occupied by the wireless power transmission system 10B is limited in order to avoid interference between the wireless power transmission system 10B and existing communication systems. The wireless power transmission system 10B of FIG. 38 can achieve power transmission in a limited frequency range using both the transmission modes of the even mode and the odd mode, by changing at least one of the circuit constant of the wireless power transmitting apparatus 2B and the circuit constant of the wireless power receiving apparatus 3B. A method for power transmission using both the transmission modes of the even mode and the odd mode, and novel effects obtained by introducing the method will be described below.

Figure 50:
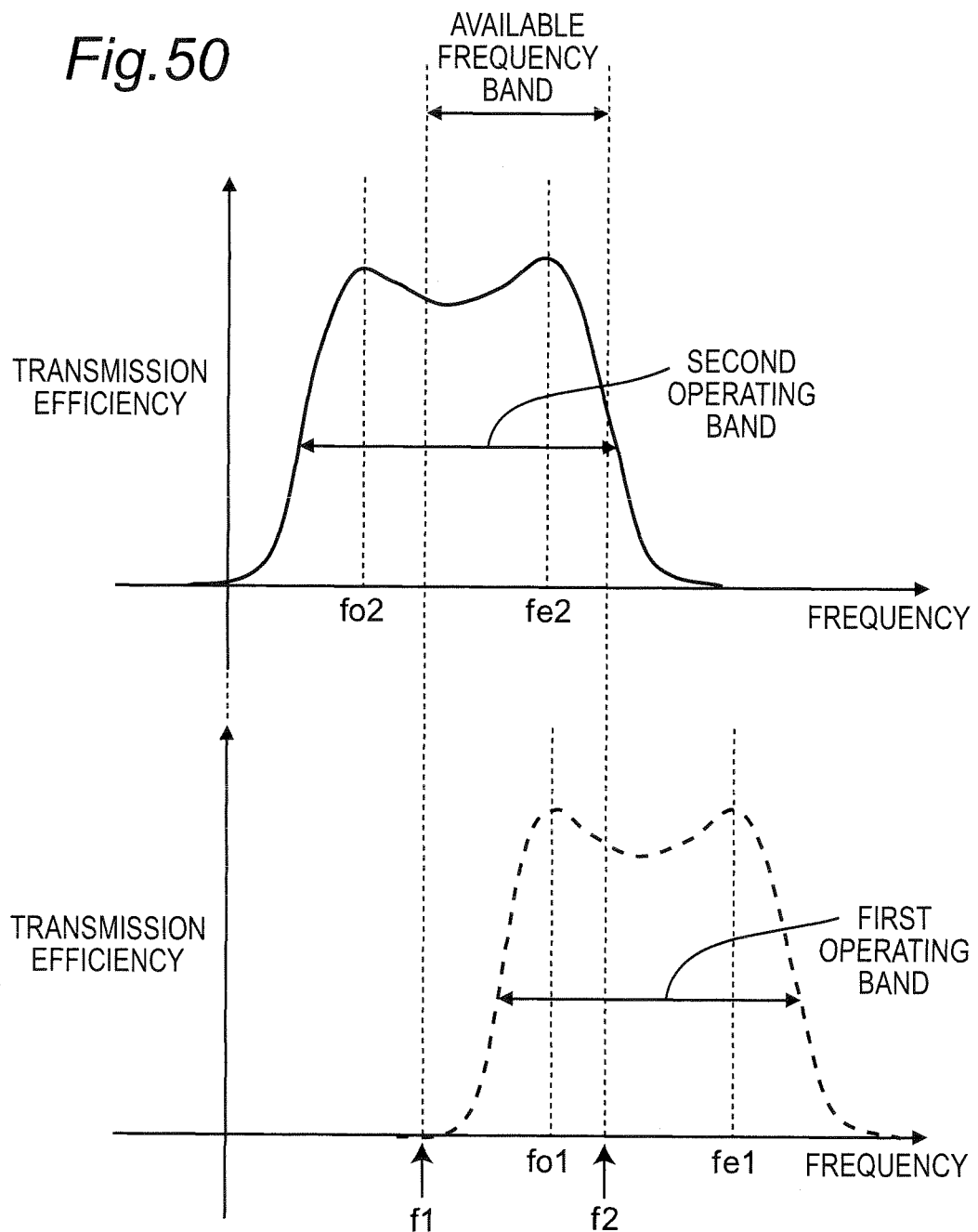
FIG. 50 is a graph showing two operating bands of the wireless power transmission system 10B of FIG. 38, and showing the characteristics of transmission efficiency versus frequency for the respective operating bands.

FIG. 50 is a graph showing two operating bands of the wireless power transmission system 10B of FIG. 38, and showing the characteristics of transmission efficiency versus frequency for the respective operating bands. The control circuit 23B of the wireless power transmitting apparatus 2B sets the operating band of the system of the power transmitting antenna 22B and the power receiving antenna 31B electromagnetically coupled to each other, to one of the first and second operating bands, by setting at least one of the circuit constant of the wireless power transmitting apparatus 2B and the circuit constant of the wireless power receiving apparatus 3B. As described above, the larger the coupling coefficient k, the higher the power transmission efficiency, but the larger the difference between the even-mode resonance frequency fe and the odd-mode resonance frequency fo. Meanwhile, the frequency band that can be occupied by the wireless power transmission system 10B is limited in order to avoid interference between the wireless power transmission system 10B and existing communication systems. For example, as shown in FIG. 50, an available frequency band has a lower limit frequency f1 and an upper limit frequency f2. Hence, by using the different first and second operating bands, the wireless power transmission system 10B can use both the transmission modes of the even mode and the odd mode, while satisfying the limitation on frequency band. An even-mode resonance frequency fe1 in the first operating band is set to be higher than an even-mode resonance frequency fe2 in the second operating band. An odd-mode resonance frequency fo1 in the first operating band is set to be higher than an odd-mode resonance frequency fo2 in the second operating band. When one of the even-mode resonance frequency fe1 in the first operating band and the odd-mode resonance frequency fo2 in the second operating band is out of a range of the available frequency band, it is not allowed to change between the even mode and the odd mode to avoid heating of a metal foreign object in the case of using only one of the first and second operating bands. However, in the wireless power transmission system 10B, the wireless power transmitting apparatus 2B transmits power to the wireless power receiving apparatus 3B at the odd-mode resonance frequency fo1 in the first operating band when using the first operating band, and transmits power to the wireless power receiving apparatus 3B at the even-mode resonance frequency fe2 in the second operating band when using the second operating band. In the example of FIG. 50, the odd-mode resonance frequency fo1 in the first operating band is the same as the even-mode resonance frequency fe2 in the second operating band. In this case, the oscillator circuit 21B of the wireless power transmitting apparatus 2B generates high-frequency power having a transmission frequency ftr equal to the resonance frequencies fo1 and fe2. Thus, the wireless power transmission system 10B can transmit power with high efficiency using both the transmission modes of the even mode and the odd mode, while satisfying the limitation on frequency band.

Figure 51:
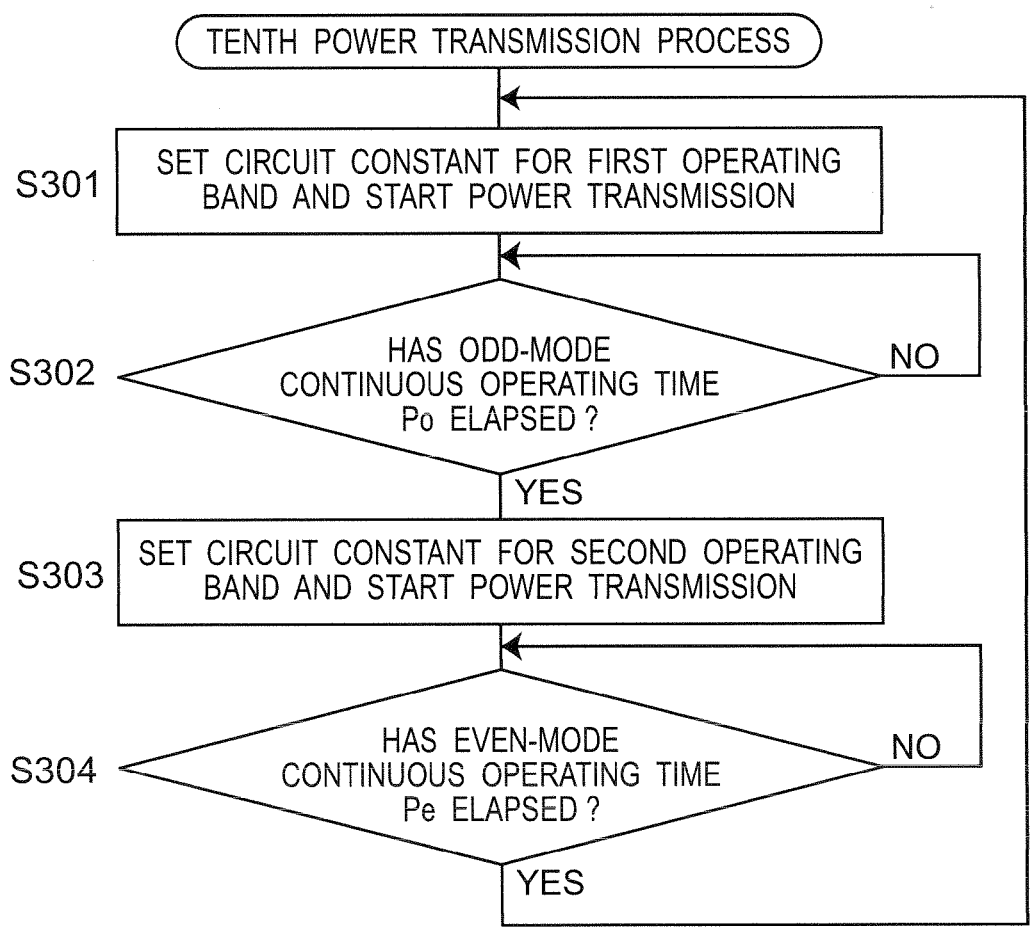
FIG. 51 is a flowchart showing a tenth power transmission process performed by a control circuit 23B of a wireless power transmitting apparatus 2B of FIG. 38.

FIG. 51 is a flowchart showing a tenth power transmission process performed by the control circuit 23B of the wireless power transmitting apparatus 2B of FIG. 38. At first, at step S301, the control circuit 23B sets at least one of the circuit constant of the wireless power transmitting apparatus 2B and the circuit constant of the wireless power receiving apparatus 3B, such that the operating band of the system of the power transmitting antenna 22B and the power receiving antenna 31B electromagnetically coupled to each other is set to the first operating band, and then, the control circuit 23B starts power transmission. At this time, since the transmission frequency ftr is equal to the odd-mode resonance frequency fo1 in the first operating band, the transmission mode is the odd mode. Then, at step S302, the control circuit 23B determines whether or not the odd-mode continuous operating time Po has elapsed; if YES, the process proceeds to step S303; if NO, the process repeats step S302. At step S303, the control circuit 23B sets at least one of the circuit constant of the wireless power transmitting apparatus 2B and the circuit constant of the wireless power receiving apparatus 3B, such that the operating band of the system of the power transmitting antenna 22B and the power receiving antenna 31B electromagnetically coupled to each other is set to the second operating band, and then, the control circuit 23B continues the power transmission. At this time, since the transmission frequency ftr is equal to the even-mode resonance frequency fe2 in the second operating band, the transmission mode is the even mode. Then, at step S304, the control circuit 23B determines whether or not the even-mode continuous operating time Pe has elapsed; if YES, the process returns to step S301; if NO, the process repeats step S304. Thus, according to the power transmission process of FIG. 51, the control circuit 23B of the wireless power transmitting apparatus 2B repeatedly alternates the first time interval and the second time interval, the first time interval having the odd-mode continuous operating time Po during which the operating band of the system of the power transmitting antenna 22B and the power receiving antenna 31B electromagnetically coupled to each other is set to the first operating band, and the second time interval having the even-mode continuous operating time Pe during which the operating band of the system of the power transmitting antenna 22B and the power receiving antenna 31B electromagnetically coupled to each other is set to the second operating band.

In the tenth power transmission process, the odd-mode continuous operating time Po and the even-mode continuous operating time Pe are the same as those described for the first power transmission process (FIG. 11).

Figure 52:
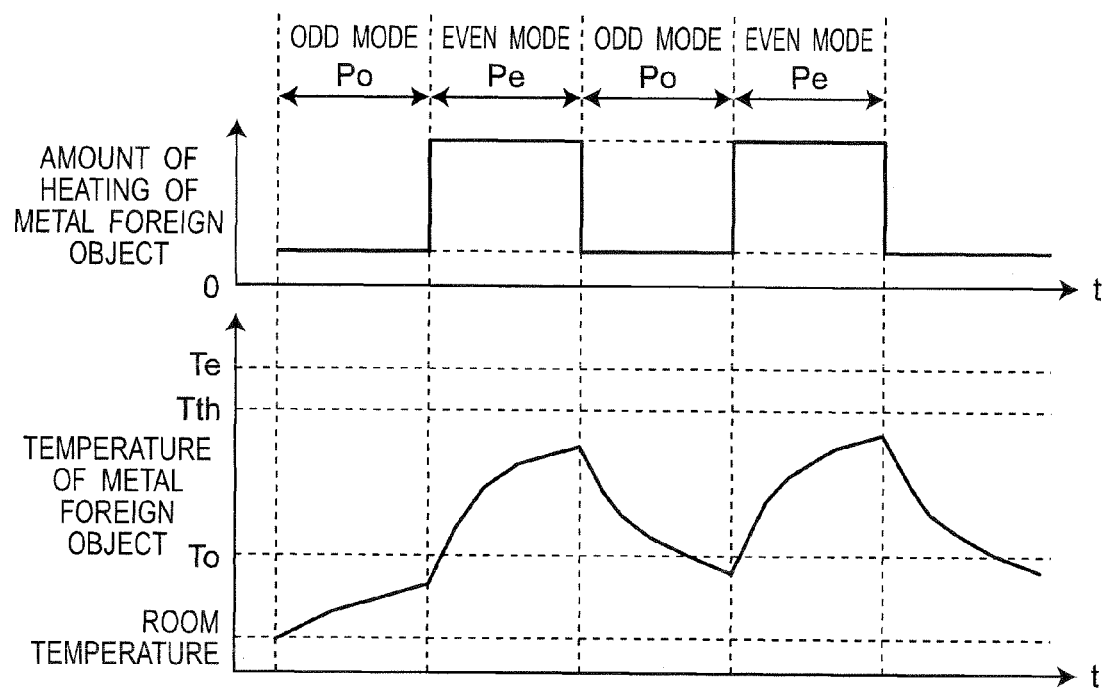
FIG. 52 is a timing chart showing the operation of the wireless power transmission system 10B for the case where a metal foreign object is present between a power transmitting coil Lt of the power transmitting antenna 22B and a power receiving coil Lr of the power receiving antenna 31B of FIG. 38, and the metal foreign object is present at the coils peripheral portion.

FIG. 52 is a timing chart showing the operation of the wireless power transmission system 10B for the case where a metal foreign object is present between the power transmitting coil Lt of the power transmitting antenna 22B and the power receiving coil Lr of the power receiving antenna 31B of FIG. 38, and the metal foreign object is present at the coils' peripheral portion. When a metal foreign object is present at the peripheral portion of the power transmitting coil Lt and the power receiving coil Lr, it is possible to suppress heating of the metal foreign object by setting the transmission mode to the odd mode, as described above (see FIG. 9). Referring to FIG. 52, the temperature Te is the saturation temperature of the metal foreign object for the case where power is transmitted continuously in the even mode, and the temperature To is the saturation temperature of the metal foreign object for the case where power is transmitted continuously in the odd mode. In addition, the threshold temperature Tth is the upper limit of the temperature of the foreign object, which is set in advance for safety reasons, etc. According to conventional wireless power transmission systems, when Te>Tth, the temperature of the metal foreign object is measured, and power transmission is stopped before the temperature reaches the threshold temperature Tth, thus ensuring safety.

Referring to FIG. 52, when the odd-mode power transmission with a smaller amount of heating of the metal foreign object is changed to the even-mode power transmission with a larger amount of heating of the metal foreign object, the temperature of the metal foreign object increases higher than room temperature, and further increases higher than the temperature To. However, since the even-mode continuous operating time Pe is set to be shorter than the time during which the temperature of the metal foreign object is saturated in the even mode, the temperature of the metal foreign object does not increase to the temperature Te. As a result, it is possible to continue the power transmission such that the temperature of the metal foreign object does not reach Te. Further, for example, by setting the even-mode continuous operating time Pe to be shorter than the time during which the temperature of the metal foreign object reaches the threshold temperature Tth, it is possible to continue the power transmission without increasing the temperature of the metal foreign object to the threshold temperature Tth.

In the power transmission process of FIG. 51, a time shorter than the continuous operating times Po and Pe may be added to stop the wireless power transmission when changing the transmission mode.

As described above, according to the wireless power transmission system 10B of FIG. 38, even when a metal foreign object is present near the power transmitting coil Lt or the power receiving coil Lr, it is possible to continue power transmission without immediately stopping the power transmission, while suppressing heating of the metal foreign object.

It is noted that in FIG. 38, when the power transmitting antenna 22B and the power receiving antenna 31B are electromagnetically coupled to each other, an output impedance Zt1 for the case where an input terminal of the power transmitting antenna 22B is seen from an output terminal of the oscillator circuit 21B is set to be substantially equal to an input impedance Zt2 for the case where the output terminal of the oscillator circuit 21B is seen from the input terminal of the power transmitting antenna 22B. Further, when the power transmitting antenna 22B and the power receiving antenna 31B are electromagnetically coupled to each other, an output impedance Zr2 for the case where the rectifier circuit 32 is seen from an output terminal of the power receiving antenna 31B is set to be substantially equal to an input impedance Zr1 for the case where the output terminal of the power receiving antenna 31B is seen from the rectifier circuit 32. At this time, the power supply apparatus 1 is connected to the wireless power transmitting apparatus 2B, and the load apparatus 4 is connected to the wireless power receiving apparatus 3B.

In addition, a matching circuit may be connected between the oscillator circuit 21B and the power transmitting antenna 22B, and a matching circuit may be connected between the power receiving antenna 31B and the rectifier circuit 32.

The wireless power receiving apparatus 3B may be provided with a frequency converter circuit, instead of the rectifier circuit 32. The frequency converter circuit converts high-frequency power transmitted from the wireless power transmitting apparatus 2B through the power transmitting antenna 22B and the power receiving antenna 31B, into alternating-current power with a frequency required by the load apparatus 4, and supplies the alternating-current power to the load apparatus 4.

The power transmitting coil of the power transmitting antenna 22B and the power receiving coil of the power receiving antenna 31B of FIG. 38 (the power transmitting coils Lt1 to Lt3 and the power receiving coils Lr1 to Lr3 shown in FIGS. 39 to 44, and 46 to 49) may have various shapes, sizes, winding methods, numbers of layers, numbers of turns, structures, materials, forming methods, etc., in a manner similar to those of the power transmitting coil of the power transmitting antenna 22 and the power receiving coil of the power receiving antenna 31 of FIG. 1.

The resonant capacitors of the power transmitting antenna 22B and the power receiving antenna 31B of FIG. 38 (the resonant capacitors Ct1 to Ct3 and Cr1 to Cr3 shown in FIGS. 39 to 45, 48, and 49) may have various shapes, structures, fabrication methods, etc., in a manner similar to those of the resonant capacitors of the power transmitting antenna 22 and the power receiving antenna 31 of FIG. 1.

The oscillator circuit 21B of FIG. 38 may be configured using circuits such as various amplifiers and filters, in a manner similar to the oscillator circuit 21 of FIG. 1.

Figure 53:
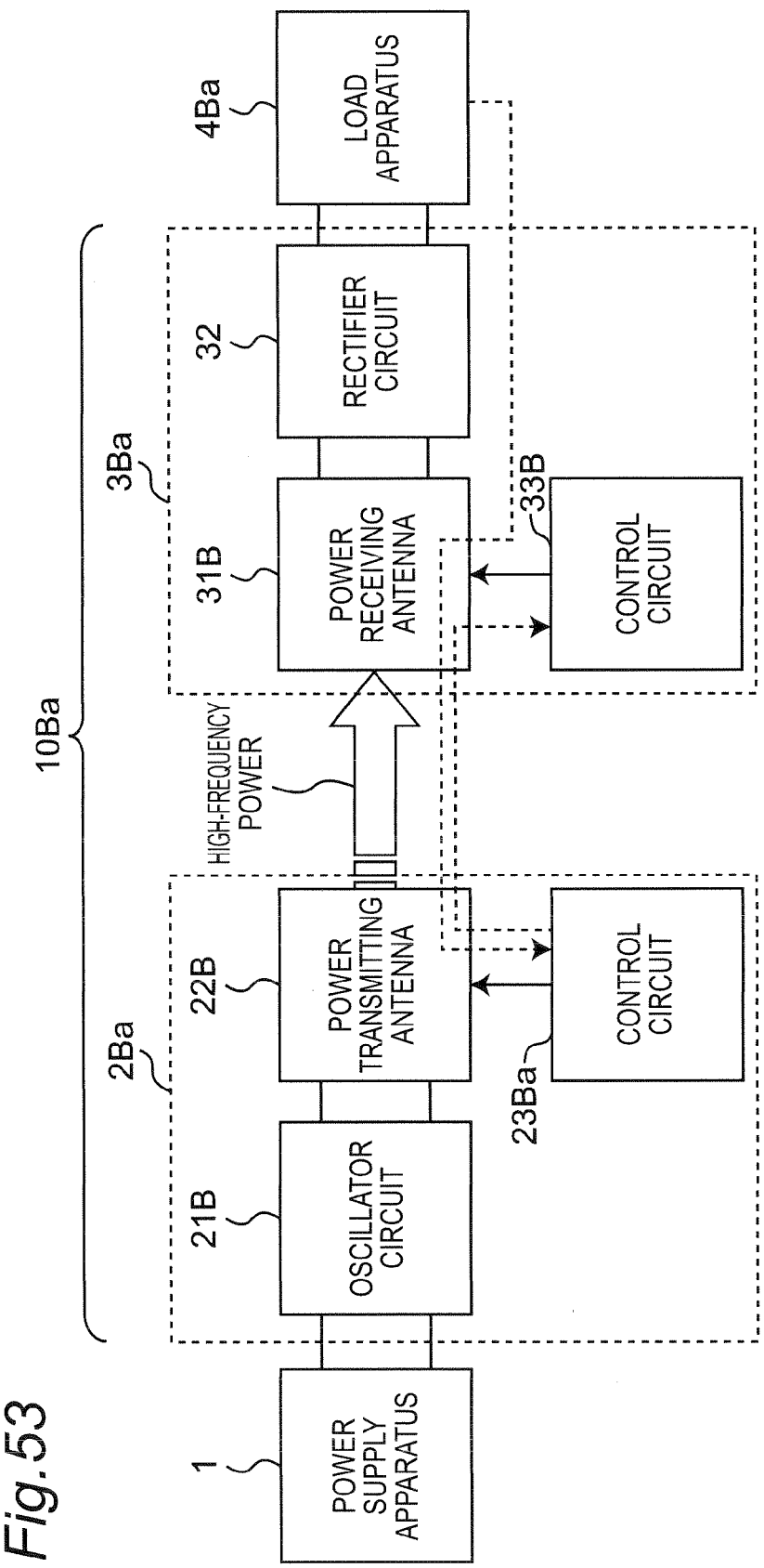
FIG. 53 is a block diagram showing a configuration of a wireless power transmission system 10Ba according to a first modified embodiment of the third embodiment.

FIG. 53 is a block diagram showing a configuration of a wireless power transmission system 10Ba according to a first modified embodiment of the third embodiment. The wireless power transmission system 10Ba includes: a wireless power transmitting apparatus 2Ba connected to the power supply apparatus 1; and a wireless power receiving apparatus 3Ba connected to a load apparatus 4Ba. The wireless power transmitting apparatus 2Ba is provided with a control circuit 23Ba, instead of the control circuit 23B of FIG. 38. The load apparatus 4Ba transmits a request signal notifying of its required voltage and current, to the control circuit 23Ba of the wireless power transmitting apparatus 2Ba through the wireless power receiving apparatus 3Ba.

The wireless power receiving apparatus 3Ba transmits the request signal to the control circuit 23Ba of the wireless power transmitting apparatus 2Ba, for example, through the power transmitting antenna 22B and the power receiving antenna 31B. The wireless power receiving apparatus 3Ba may transmit the request signal to the control circuit 23Ba of the wireless power transmitting apparatus 2Ba through a communication path (not shown) different from the power transmitting antenna 22B and the power receiving antenna 31B.

In a wireless power transmission system using resonant magnetic coupling, a metal foreign object entering near a power transmitting coil or a power receiving coil is heated by a current flowing on the metal foreign object due to a magnetic field distributed in space around the power transmitting coil or the power receiving coil. Thus, when the position of the metal foreign object is fixed, a maximum amount of heating of the metal foreign object is observed for a maximum currents flowing through the power transmitting coil and the power receiving coil according to a request from the load apparatus 4Ba, and therefore, for a maximum strength of the magnetic field. When the control circuit 23Ba of the wireless power transmitting apparatus 2Ba is requested by the load apparatus 4Ba to supply power at a maximum current, the control circuit 23Ba performs the power transmission process of FIG. 51, and repeatedly alternates the first time interval and the second time interval.

Figure 54:
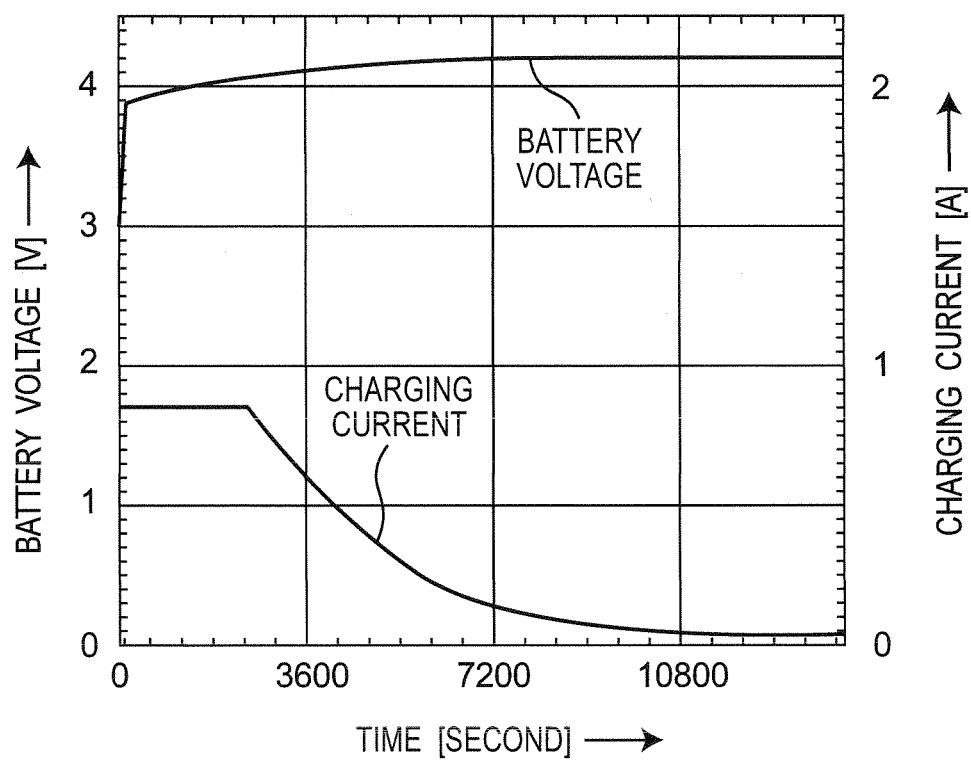
FIG. 54 is a graph showing an exemplary battery charging profile.

FIG. 54 is a graph showing an exemplary battery charging profile. For example, the load apparatus 4Ba starts battery charging at a maximum current, and then, when the charging voltage has increased from 0 V to a desired voltage, the load apparatus 4Ba gradually reduces the current while keeping the desired voltage. It is possible to avoid the most critical heating of a metal foreign object by performing the power transmission process of FIG. 51 only when supplying power at a maximum current.

In the wireless power transmission system 10Ba of FIG. 53, the transmission frequency ftr during the transmission at the maximum current is set to, for example, 50 Hz to 300 GHz, 20 kHz to 10 GHz, 20 kHz to 20 MHz, or kHz to 1

MHz. In addition, the transmission frequency ftr during the transmission at the maximum current may be set to ISM band, such as 6.78 MHz and 13.56 MHz. In addition, the transmission frequency ftr during the transmission at the maximum current may be set within a range up to 263 kHz so that its second harmonic does not interfere with AM radio broadcast waves, or a range up to 175 kHz so that its third harmonic does not interfere with AM radio broadcast waves, or a range up to 105 kHz so that its fifth harmonic does not interfere with AM radio broadcast waves.

Figure 55:
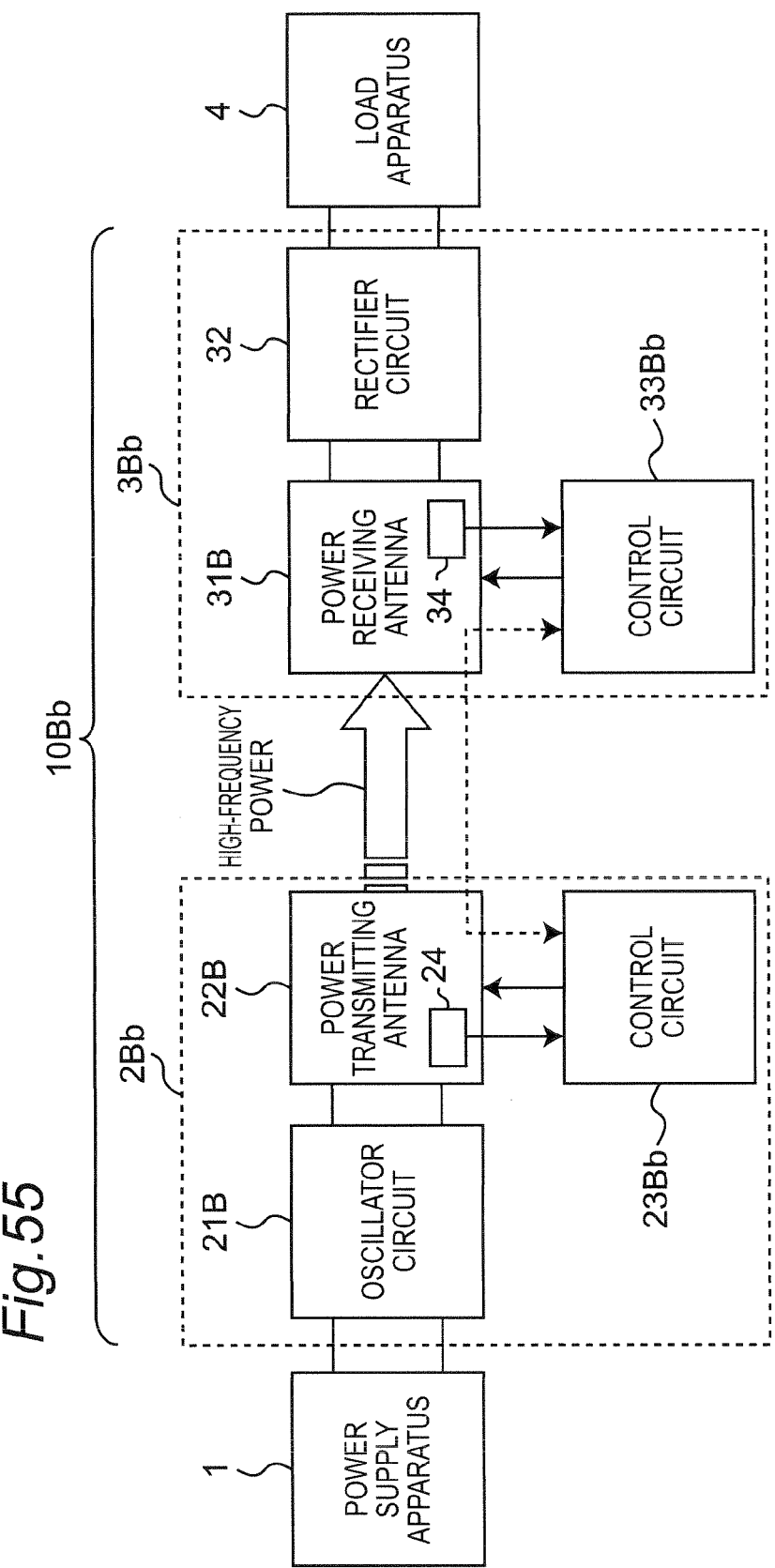
FIG. 55 is a block diagram showing a configuration of a wireless power transmission system 10Bb according to a second modified embodiment of the third embodiment.

FIG. 55 is a block diagram showing a configuration of a wireless power transmission system 10Bb according to a second modified embodiment of the third embodiment. The wireless power transmission system 10Bb includes: a wireless power transmitting apparatus 2Bb connected to the power supply apparatus 1; and a wireless power receiving apparatus 3Bb connected to the load apparatus 4. The wireless power transmitting apparatus 2Bb is provided with a control circuit 23Bb, instead of the control circuit 23B of FIG. 38. The wireless power transmitting apparatus 2Bb is further provided with the sensor 24 configured to detect an abnormal condition due to a foreign object near the power transmitting coil Lt (e.g., an abnormal temperature increase resulting from heating of a metal foreign object caused by an eddy current occurring on the metal foreign object), and notify the control circuit 23Bb of the abnormal condition. The wireless power receiving apparatus 3Bb is provided with a control circuit 33Bb, instead of the control circuit 33B of FIG. 38. The wireless power receiving apparatus 3Bb is further provided with the sensor 34 configured to detect an abnormal condition due to a foreign object near the power receiving coil Lr (e.g., an abnormal temperature increase resulting from heating of a metal foreign object caused by an eddy current occurring on the metal foreign object), and notify the control circuit 33Bb of the abnormal condition. The sensors 24 and 34 include, for example, detection means, such as a temperature sensor for measuring a temperature near the power transmitting coil Lt or the power receiving coil Lr, an infrared camera, or an imaging device.

The control circuit 33Bb of the wireless power receiving apparatus 3Bb notifies the control circuit 23Bb of the wireless power transmitting apparatus 2Bb, of an abnormal condition detected by the sensor 34, for example, through the power transmitting antenna 22B and the power receiving antenna 31B. The control circuit 33Bb of the wireless power receiving apparatus 3Bb may notify the control circuit 23Bb of the wireless power transmitting apparatus 2Bb, of an abnormal condition detected by the sensor 34, through a communication path (not shown) different from the power transmitting antenna 22B and the power receiving antenna 31B.

Figure 56:
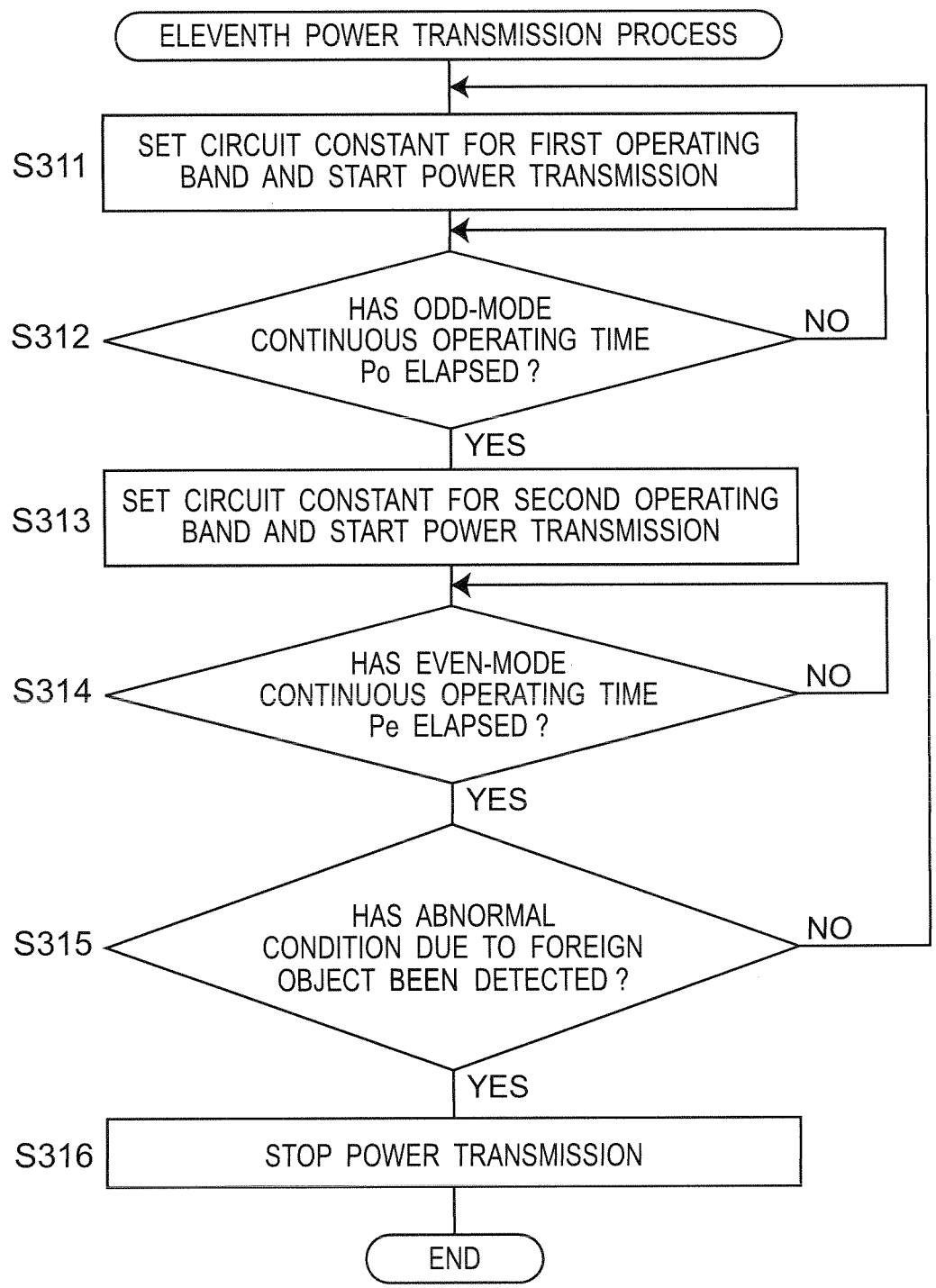
FIG. 56 is a flowchart showing an eleventh power transmission process performed by a control circuit 23Bb of a wireless power transmitting apparatus 2Bb of FIG. 55.

FIG. 56 is a flowchart showing an eleventh power transmission process performed by the control circuit 23Bb of the wireless power transmitting apparatus 2Bb of FIG. 55. Steps S311 to S314 of FIG. 56 are the same as steps S301 to S304 of FIG. 51. If YES at step S314, the process proceeds to step S315. At step S315, the control circuit 23Bb determines whether or not an abnormal condition due to a foreign object has been detected; and if YES, then at step S316, the control circuit 23Bb stops power transmission to end the power transmission process; if NO, the process returns to step S311. Specifically, for example, when the control circuit 23Bb detects that the temperature near the power transmitting coil Lt or the power receiving coil Lr is equal to a predetermined threshold temperature (e.g., threshold Tc=90° C.) or higher, or when the control circuit 23Bb detects that the temperature increase rate is equal to a predetermined threshold or higher, the control circuit 23Bb determines that an abnormal condition due to a foreign object has been detected.

According to the eleventh power transmission process, even if a metal foreign object is present near the power transmitting coil Lt or the power receiving coil Lr, it is possible to continue power transmission without immediately stopping the power transmission, while suppressing heating of the metal foreign object, until an abnormal condition due to the foreign object is detected.

It is noted that although steps S315 and S316 are performed subsequent to step S314 in FIG. 56, the order of the steps is not limited thereto. Steps S315 and S316 may be performed at any time between steps S311 and S314.

Figure 57:
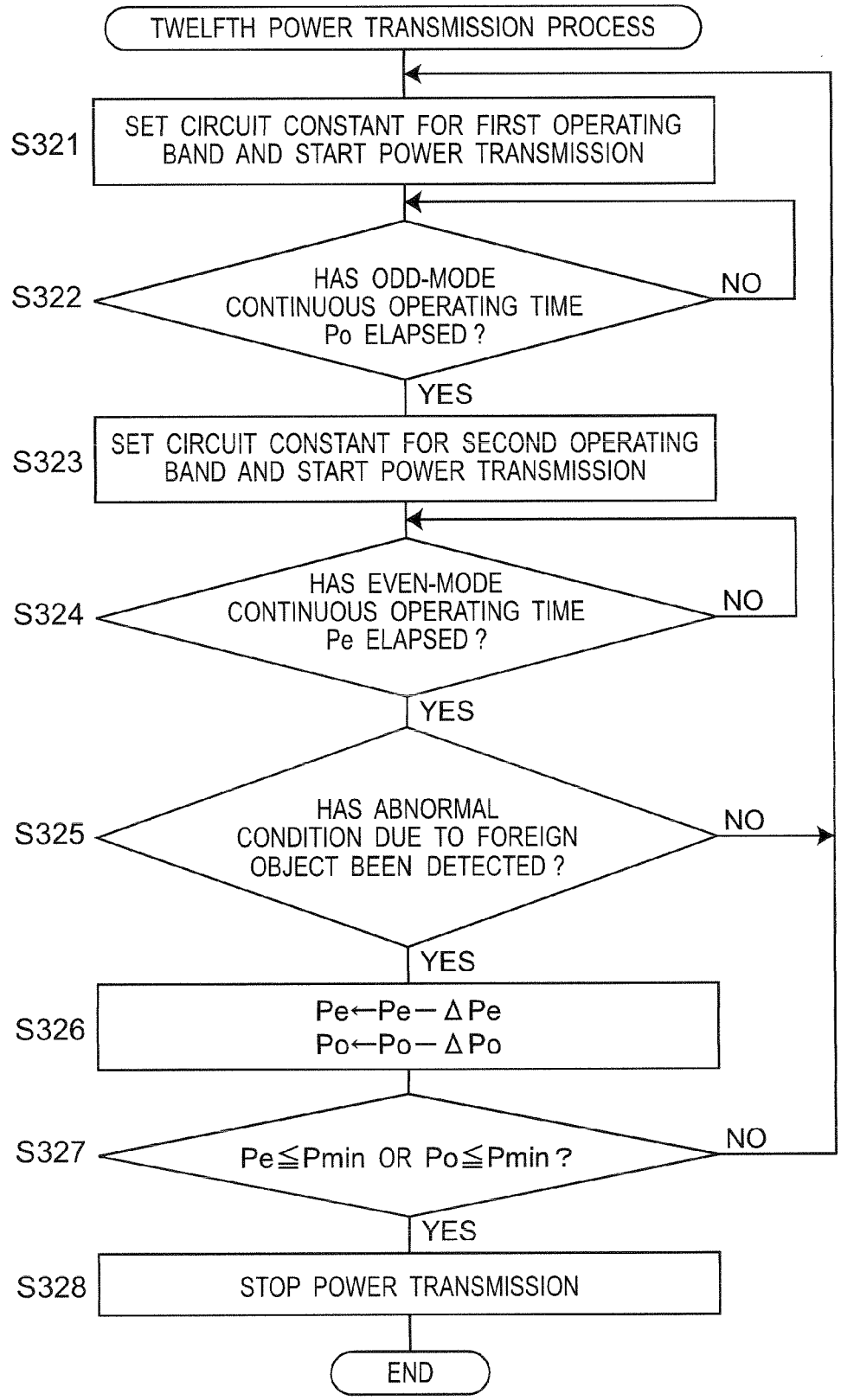
FIG. 57 is a flowchart showing a twelfth power transmission process performed by the control circuit 23Bb of the wireless power transmitting apparatus 2Bb of FIG. 55.

FIG. 57 is a flowchart showing a twelfth power transmission process performed by the control circuit 23Bb of the wireless power transmitting apparatus 2Bb of FIG. 55. Steps S321 to S325 and S328 of FIG. 57 are the same as steps S311 to S315 and S316 of FIG. 56. If YES at step S325, the process proceeds to step S326. At step S326, the control circuit 23Bb sets the odd-mode continuous operating time Po to be reduced by the odd-mode reduction time ΔPo, and sets the even-mode continuous operating time Pe to be reduced by the even-mode reduction time ΔPe. Then, at step S327, the control circuit 23Bb determines whether or not the continuous operating time Po or Pe is equal to a minimum operating time Pmin or less; and if YES, then at step S328, the control circuit 23Bb stops power transmission to end the power transmission process; if NO, the process returns to step S321. In this case, the odd-mode reduction time ΔPo is set to, for example, 5% of the continuous operating time Po, and the even-mode reduction time ΔPe is set to, for example, 5% of the continuous operating time Pe.

Heating during power transmission at one transmission mode of the even mode and the odd mode, which results in a larger amount of heating, is dominant in heating of a metal foreign object. Therefore, by reducing the continuous operating time for the transmission mode with a larger amount of heating, there is a possibility to suppress the temperature of the metal foreign object under the threshold temperature Tth. According to the twelfth power transmission process of FIG. 57, even if a metal foreign object is detected, since the continuous operating time Pe and Po are reduced, it is possible to continue power transmission longer than that of the eleventh power transmission process of FIG. 56, without immediately stopping power transmission, while suppressing heating of the metal foreign object.

It is noted that when it is known in advance which transmission mode of the even mode and the odd mode results in a larger amount of heating, it is possible to further suppress heating by reducing only the continuous operating time for the transmission mode with the larger amount of heating.

Figure 58:
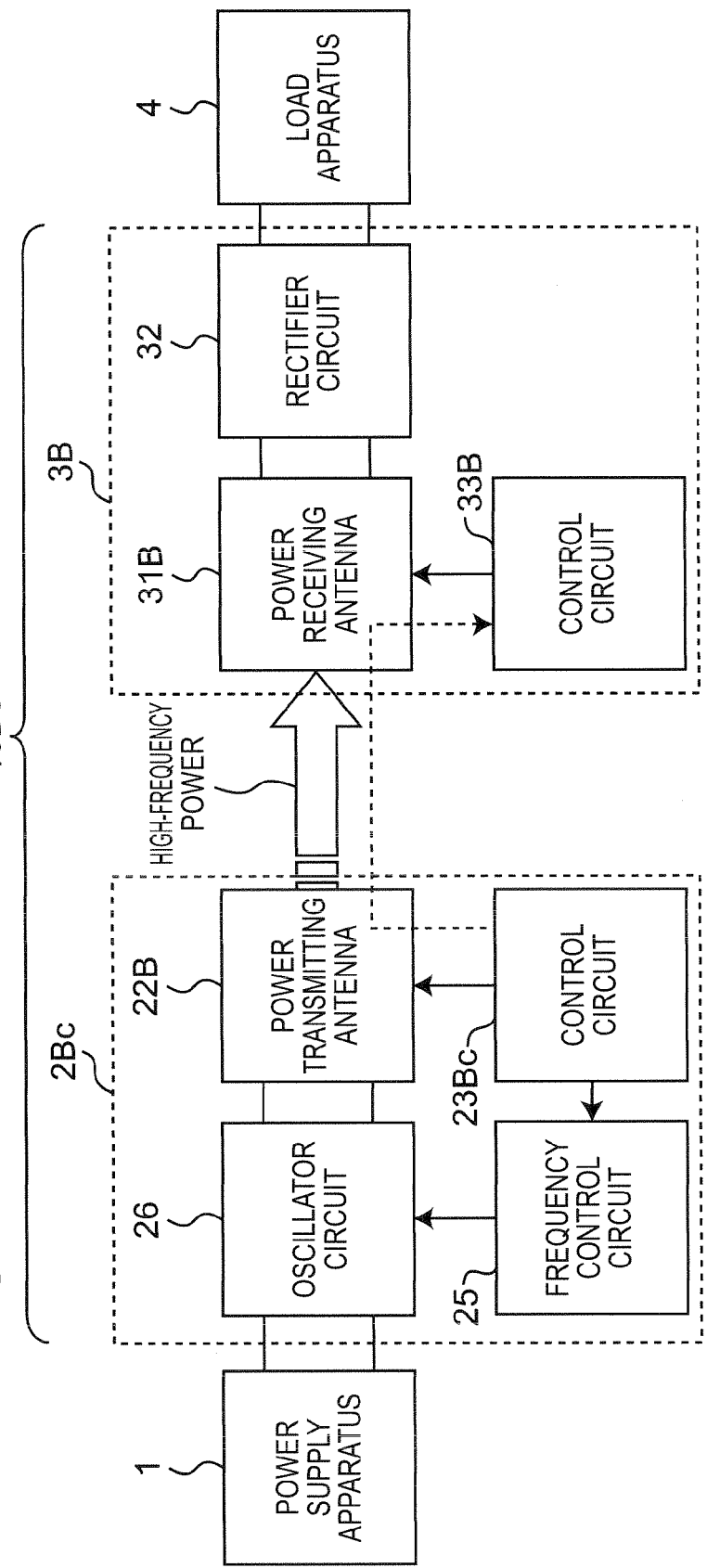
FIG. 58 is a block diagram showing a configuration of a wireless power transmission system 10Bc according to a third modified embodiment of the third embodiment.

FIG. 58 is a block diagram showing a configuration of a wireless power transmission system 10Bc according to a third modified embodiment of the third embodiment. The wireless power transmission system 10Bc includes: a wireless power transmitting apparatus 2Bc connected to the power supply apparatus 1; and the wireless power receiving apparatus 3B connected to the load apparatus 4. The wireless power transmitting apparatus 2Bc is provide with a frequency control circuit 25 and an oscillator circuit 26, instead of the oscillator circuit 21B of FIG. 38, and is provide with a control circuit 23Bc, instead of the control circuit 23B of FIG. 38. The frequency control circuit 25 and the oscillator circuit 26 generate high-frequency power at a variable frequency, under the control of the control circuit 23Bc of the wireless power transmitting apparatus. The oscillator circuit 26 is provide with; a pulse generator for generating a pulse sequence with a variable transmission frequency ftr; and a class-D amplifier including a switching element operable according to the pulse sequence. The oscillator circuit 26 generates high-frequency power with the variable transmission frequency ftr. The frequency control circuit 25 controls the pulse generator of the oscillator circuit 26 so as to generate the pulse sequence with the transmission frequency ftr. The oscillator circuit 26 drives the switching element of the class-D amplifier according to the pulse sequence with the transmission frequency ftr, and thus, converts a direct-current voltage from the power supply apparatus 1, into a high-frequency voltage, and outputs the high-frequency voltage to the power transmitting antenna 22B. The transmission frequency ftr may be fixed during one power transmission (e.g., for charging one battery), or may be changed during one power transmission (e.g., in order to optimize charging characteristics).

Figure 59:
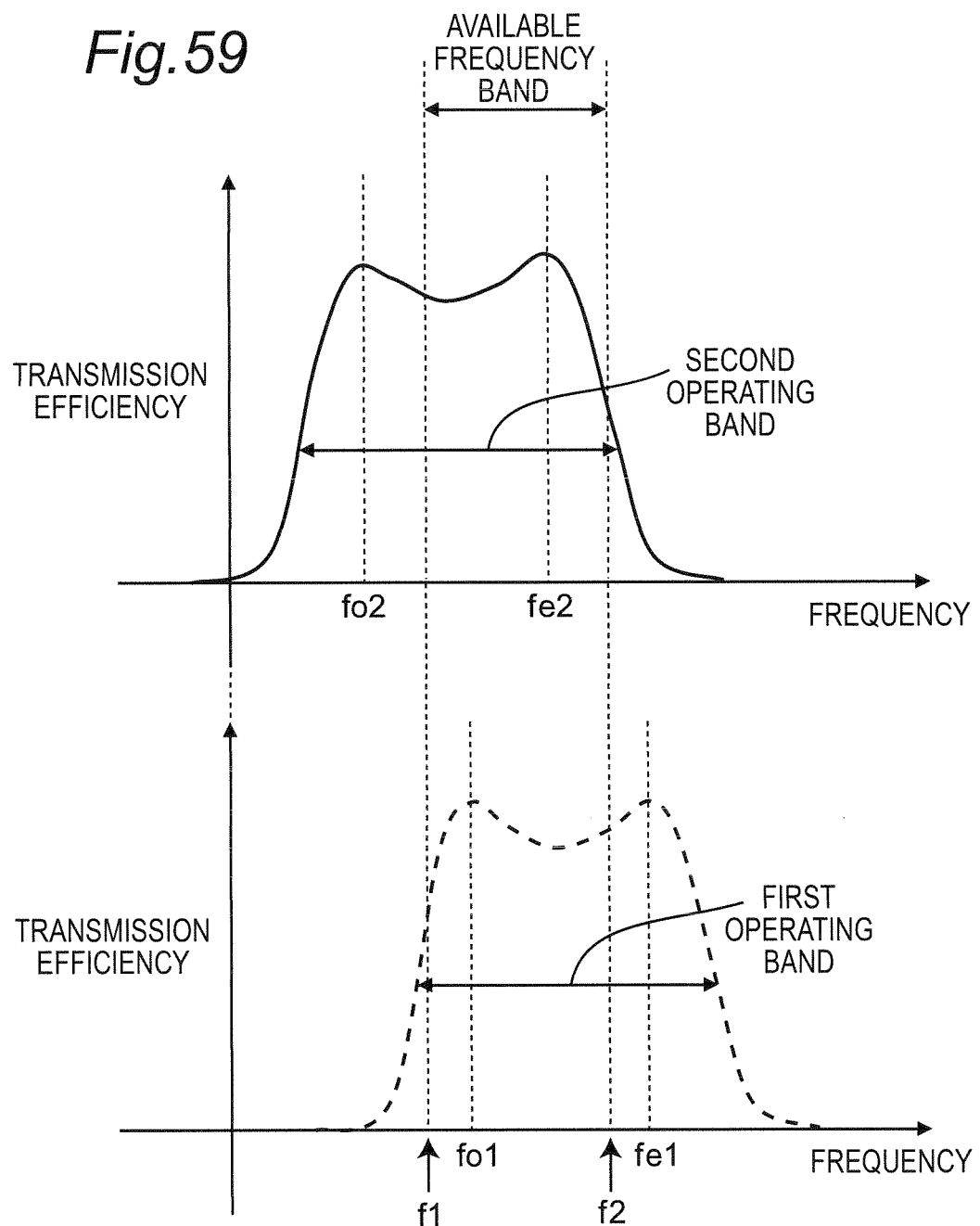
FIG. 59 is a graph showing two operating bands of the wireless power transmission system 10Bc of FIG. 58, and showing the characteristics of transmission efficiency versus frequency for the respective operating bands.

FIG. 59 is a graph showing two operating bands of the wireless power transmission system 10Bc of FIG. 58, and showing the characteristics of transmission efficiency versus frequency for the respective operating bands. In the graph of FIG. 50, the odd-mode resonance frequency fo1 in the first operating band is the same as the even-mode resonance frequency fe2 in the second operating band. However, as shown in FIG. 59, these two resonance frequencies are not necessarily the same with each other. It is noted that also in the graph of FIG. 59, the odd-mode resonance frequency fo1 in the first operating band and the even-mode resonance frequency fe2 in the second operating band are in the range of the available frequency band. Therefore, the control circuit 23Bc of the wireless power transmitting apparatus 2Bc controls the oscillator circuit 26 to generate high-frequency power at the odd-mode resonance frequency fo1 in the first operating band when using the first operating band, and to generate high-frequency power at the even-mode resonance frequency fe2 in the second operating band when using the second operating band. Thus, the wireless power transmission system 10Bc can transmit power with high efficiency using both the transmission modes of the even mode and the odd mode, while satisfying the limitation on frequency band.

Although the first and second operating bands partially overlap each other in the graph of FIG. 59, the first and second operating bands do not need to overlap each other, provided that the odd-mode resonance frequency fo1 in the first operating band and the even-mode resonance frequency fe2 in the second operating band are in the range of the available frequency band. In this case, for example, the odd-mode resonance frequency fo1 in the first operating band may be higher than the even-mode resonance frequency fe2 in the second operating band.

The control circuit 23Bc of the wireless power transmitting apparatus 2Bc may be integrated with at least one of the oscillator circuit 26 and the frequency control circuit 25, and configured as an integrated circuit.

Figure 60:
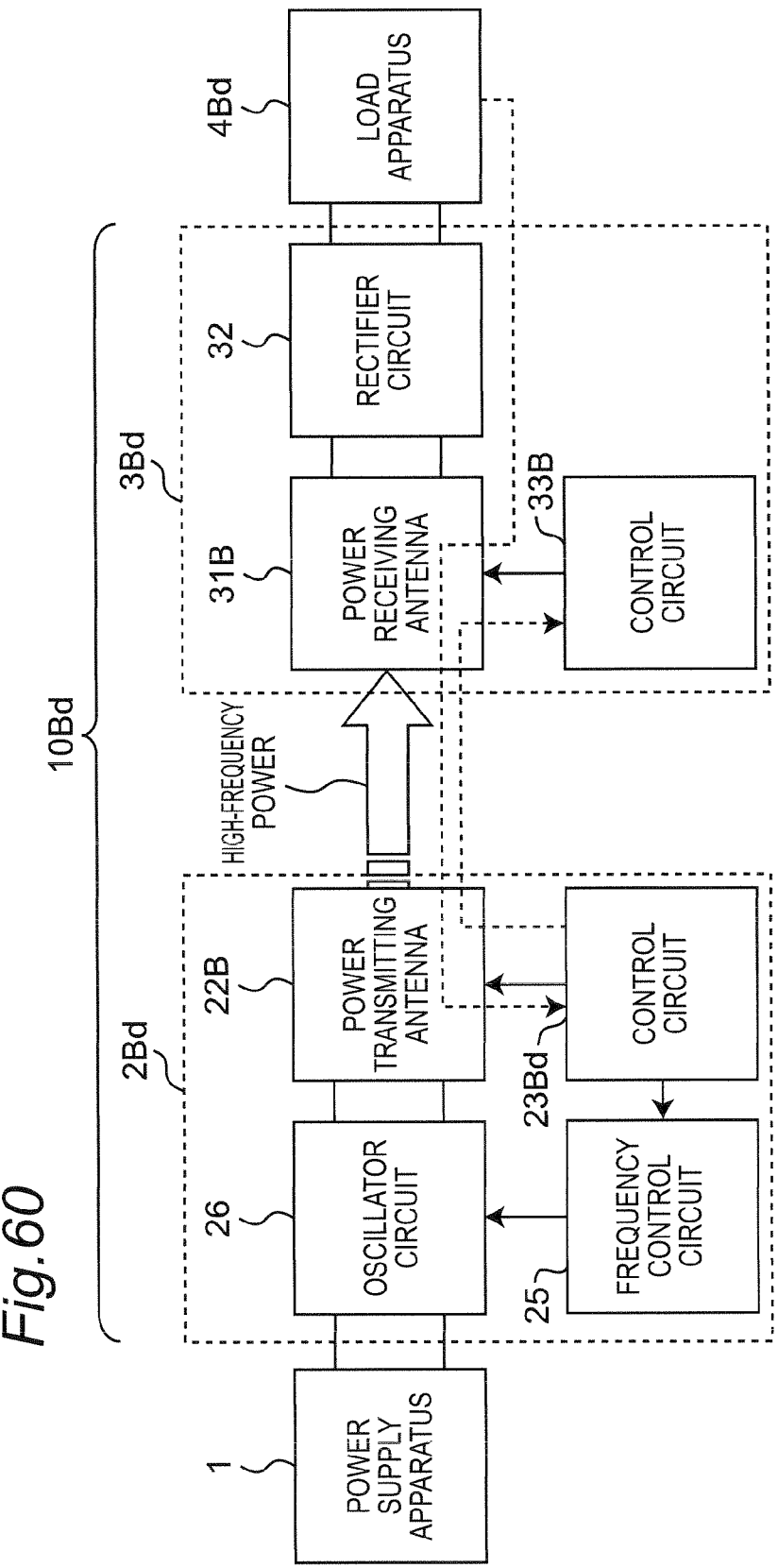
FIG. 60 is a block diagram showing a configuration of a wireless power transmission system 10Bd according to a fourth modified embodiment of the third embodiment.

FIG. 60 is a block diagram showing a configuration of a wireless power transmission system 10Bd according to a fourth modified embodiment of the third embodiment. The wireless power transmission system 10Bd includes: a wireless power transmitting apparatus 2Bd connected to the power supply apparatus 1; and a wireless power receiving apparatus 3Bd connected to a load apparatus 4Bd. The wireless power transmitting apparatus 2Bd is provided with a control circuit 23Bd, instead of the control circuit 23Bc of FIG. 58. The load apparatus 4Bd transmits a request signal notifying of its required voltage and current, to the control circuit 23Bd of the wireless power transmitting apparatus 2Bd through the wireless power receiving apparatus 3Bd.

In the wireless power transmission system 10Bd of FIG. 60, the amount of power to be transmitted from the power transmitting antenna 22B to the power receiving antenna 31B varies depending on a change in power consumed by the load apparatus 4Bd. The frequency control circuit 25 adjusts the transmission frequency ftr near the odd-mode resonance frequency fo1 in the first operating band or near the even-mode resonance frequency fe2 in the second operating band, based on the voltage and current requested by the load apparatus 4Bd, under the control of the control circuit 23Bd of the wireless power transmitting apparatus 2Bd, such that a desired voltage and a desired current are outputted to the load apparatus 4Bd. In this case, the frequency range near the resonance frequency fo1 is a frequency range from a frequency (fo1−Δfo1) to a frequency (fo1+Δfo1), and Δfo1 is set to, for example, 5% of the resonance frequency fo1. In addition, the frequency range near the resonance frequency fe2 is a frequency range from a frequency (fe2−Δfe2) to a frequency (fe2+Δfe2), and Δfe2 is set to, for example, 5% of the resonance frequency fe2.

It is noted that the control circuit 23Bd of the wireless power transmitting apparatus 2Bd may adjust the transmission frequency ftr near the resonance frequency fe2 or near the resonance frequency fo1, based on a voltage and a current to be inputted to the power transmitting antenna 22B, such that a desired voltage and a desired current are outputted to the load apparatus 4Bd.

Figure 61:
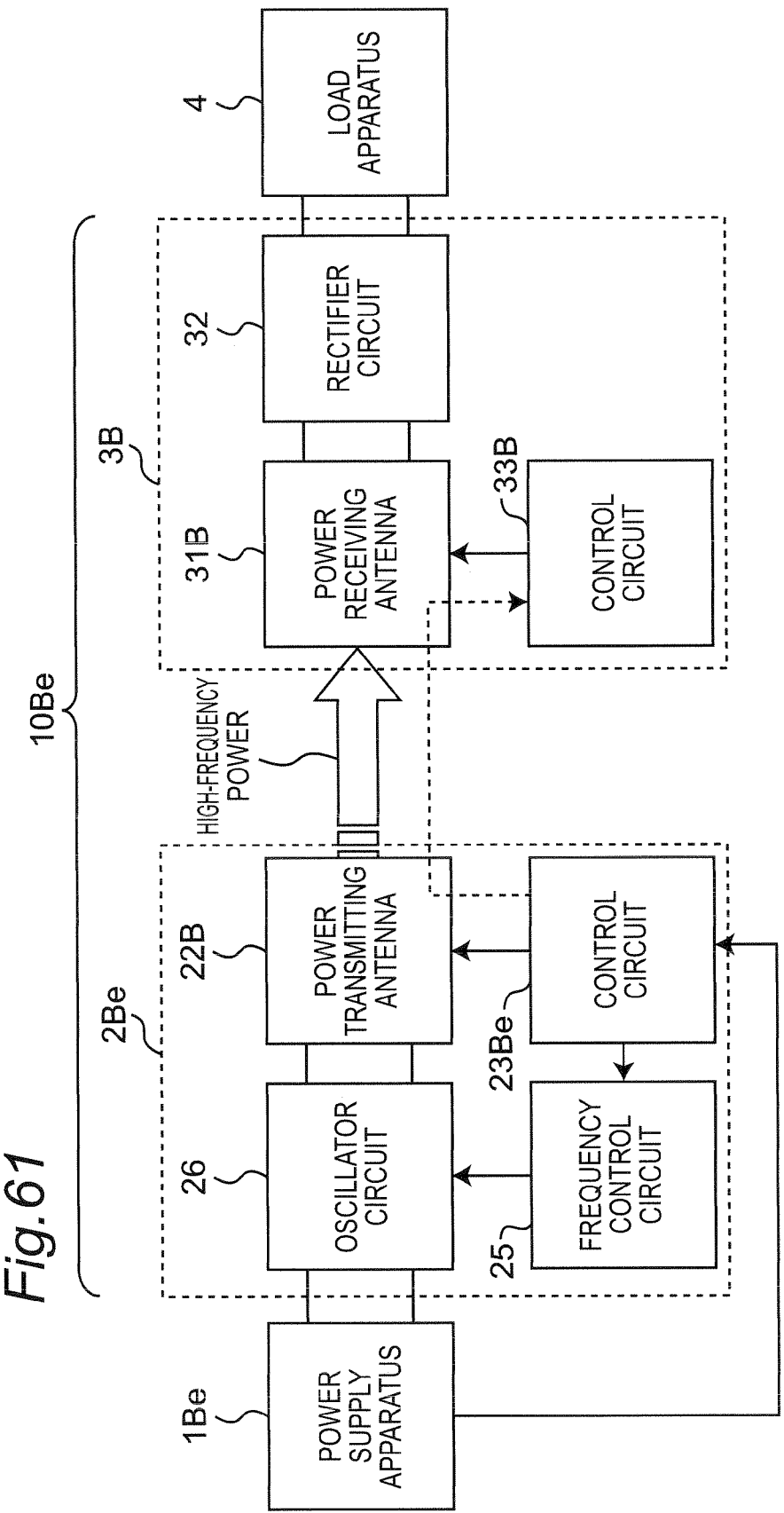
FIG. 61 is a block diagram showing a configuration of a wireless power transmission system 10Be according to a fifth modified embodiment of the third embodiment.

FIG. 61 is a block diagram showing a configuration of a wireless power transmission system 10Be according to a fifth modified embodiment of the third embodiment. The wireless power transmission system 10Be includes: a wireless power transmitting apparatus 2Be connected to a power supply apparatus 1Be; and the wireless power receiving apparatus 3B connected to the load apparatus 4. The power supply apparatus 1Be is, for example, a power generating apparatus, such as a solar cell. In this case, the power outputted from the power supply apparatus 1Be varies depending on the amount of sunlight received by the solar cell. The wireless power transmitting apparatus 2Be is provided with a control circuit 23Be, instead of the control circuit 23Bc of FIG. 58. The control circuit 23Be of the wireless power transmitting apparatus 2Be adjusts the transmission frequency ftr near the odd-mode resonance frequency fo1 in the first operating band or near the even-mode resonance frequency fe2 in the second operating band, based on a voltage and a current outputted from the power supply apparatus 1Be, so that maximum power can be obtained from the power supply apparatus 1Be.

It is noted that the control circuit 23Be of the wireless power transmitting apparatus 2Be may adjust the transmission frequency ftr near the resonance frequency fe2 or near the resonance frequency fo1, based on transmission efficiency, an output voltage, or an output current, during power transmission, so that maximum power can be obtained from the power supply apparatus 1Be.

The wireless power transmission systems 10Bd and 10Be can transmit power with high efficiency using both the transmission modes of the even mode and the odd mode, while satisfying the limitation on frequency band. Further, the wireless power transmission systems 10Bd and 10Be can control the frequency of high-frequency power such that a desired voltage and a desired current are outputted to the load apparatus, or such that maximum power can be obtained from the power supply apparatus.

Figure 62:
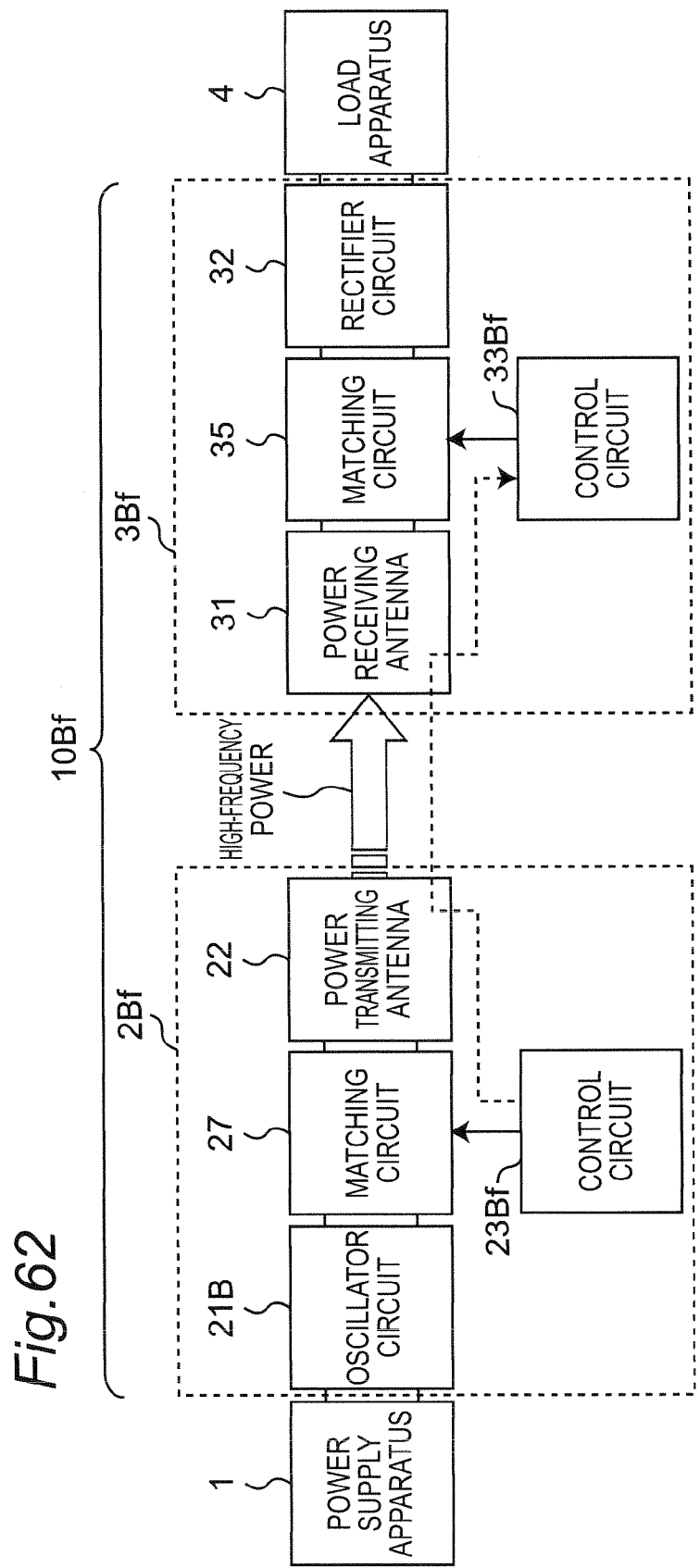
FIG. 62 is a block diagram showing a configuration of a wireless power transmission system 10Bf according to a sixth modified embodiment of the third embodiment.

FIG. 62 is a block diagram showing a configuration of a wireless power transmission system 10Bf according to a sixth modified embodiment of the third embodiment. The wireless power transmission system 10Bf includes: a wireless power transmitting apparatus 2Bf connected to the power supply apparatus 1; and a wireless power receiving apparatus 3Bf connected to the load apparatus 4. The wireless power transmitting apparatus 2Bf is provided with the power transmitting antenna 22 having a fixed inductance and capacitance, instead of the power transmitting antenna 22B of FIG. 38. The wireless power transmitting apparatus 2Bf is further provided with a matching circuit 27 for reducing power reflection, between the oscillator circuit 21B and the power transmitting antenna 22, and provided with a control circuit 23E9f, instead of the control circuit 23B of FIG. 38. The matching circuit 27 has at least one of a variable inductance and a variable capacitance. The control circuit 23Bf of the wireless power transmitting apparatus 2Bf changes at least one of the inductance and the capacitance of the matching circuit 27. The wireless power receiving apparatus 3Bf is provided with the power receiving antenna 31 having a fixed inductance and capacitance, instead of the power receiving antenna 31B of FIG. 38. The wireless power receiving apparatus 3Bf is further provided with a matching circuit 35 for reducing power reflection, between the power receiving antenna 31 and the rectifier circuit 32, and provided with a control circuit 33Bf, instead of the control circuit 33B of FIG. 38. The matching circuit 35 has at least one of a variable inductance and a variable capacitance. The control circuit 33Bf of the wireless power receiving apparatus 3Bf changes at least one of the inductance and the capacitance of the matching circuit 35, under the control of the control circuit 23Bf of the wireless power transmitting apparatus 2Bf.

The circuit constant of the wireless power transmitting apparatus and the circuit constant of the wireless power receiving apparatus are not limited to the inductances, capacitances, or a coupling coefficient of the power transmitting antenna 22B and the power receiving antenna 31B, as described with reference to FIGS. 39 to 49, and other circuit constants may be used. In the wireless power transmission system 10Bf of FIG. 62, the wireless power transmitting apparatus 2Bf is further provided with the matching circuit 27, and the wireless power receiving apparatus 3Bf is further provided with the matching circuit 35. The control circuit 23Bf of the wireless power transmitting apparatus 2Bf sets at least one of a circuit constant of the matching circuit 27 and a circuit constant of the matching circuit 35, such that the operating band of the system of the power transmitting antenna 22 and the power receiving antenna 31 electromagnetically coupled to each other is set to one of the first and second operating bands.

The control circuit 23Bf of the wireless power transmitting apparatus 2Bf may set the inductances, capacitances, or a coupling coefficient of the power transmitting antenna 22 and the power receiving antenna 31, and further set the inductances or capacitances of the matching circuit 27 and the matching circuit 35, such that the operating band of the system of the power transmitting antenna 22 and the power receiving antenna 31 electromagnetically coupled to each other is set to one of the first and second operating bands.

Figure 63:
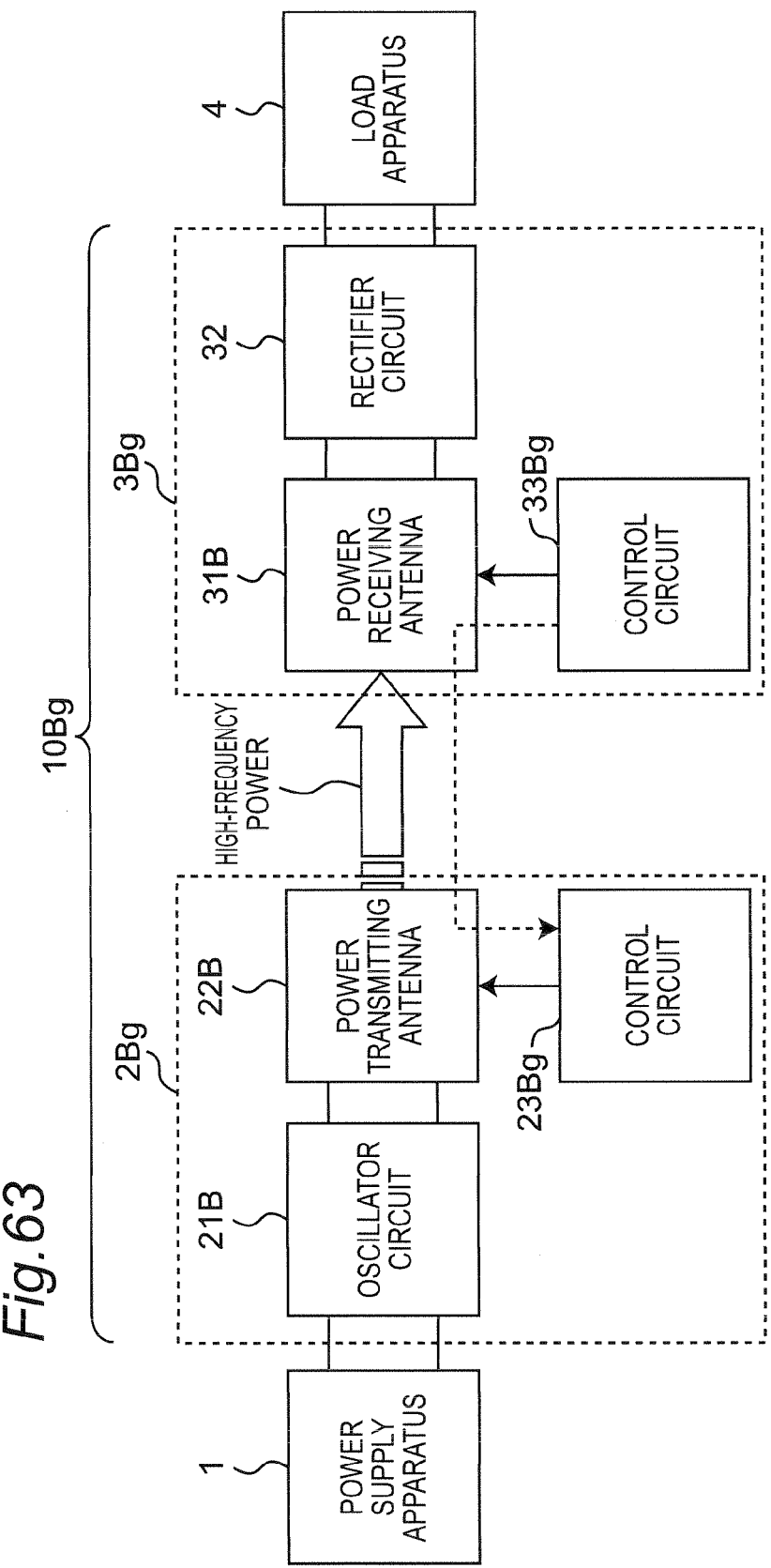
FIG. 63 is a block diagram showing a configuration of a wireless power transmission system 10Bg according to a seventh modified embodiment of the third embodiment.

FIG. 63 is a block diagram showing a configuration of a wireless power transmission system 10Bg according to a seventh modified embodiment of the third embodiment. The wireless power transmission system 10Bg includes: a wireless power transmitting apparatus 2Bg connected to the power supply apparatus 1; and a wireless power receiving apparatus 3Bg connected to the load apparatus 4. In the wireless power transmission systems of FIGS. 38 to 62, the control circuit of the wireless power receiving apparatus operates under the control of the control circuit of the wireless power transmitting apparatus. On the contrary, the control circuit of the wireless power transmitting apparatus may operate under the control of the control circuit of the wireless power receiving apparatus.

The wireless power transmitting apparatus 2Bg is provided with a control circuit 23Bg, instead of the control circuit 23B of FIG. 38. The wireless power receiving apparatus 3Bg is provided with a control circuit 33Bg, instead of the control circuit 33B of FIG. 38. The control circuit 23Bg of the wireless power transmitting apparatus 2Bg operates under the control of the control circuit 33Bg of the wireless power receiving apparatus 3Bg. The control circuit 33Bg of the wireless power receiving apparatus 3Bg performs the power transmission process of FIG. 51 to set at least one of a circuit constant of the wireless power transmitting apparatus 2Bg and a circuit constant of the wireless power receiving apparatus 3Bg, such that the operating band of the system of the power transmitting antenna 22B and the power receiving antenna 31B electromagnetically coupled to each other is set to one of the first and second operating bands.

Figure 64:
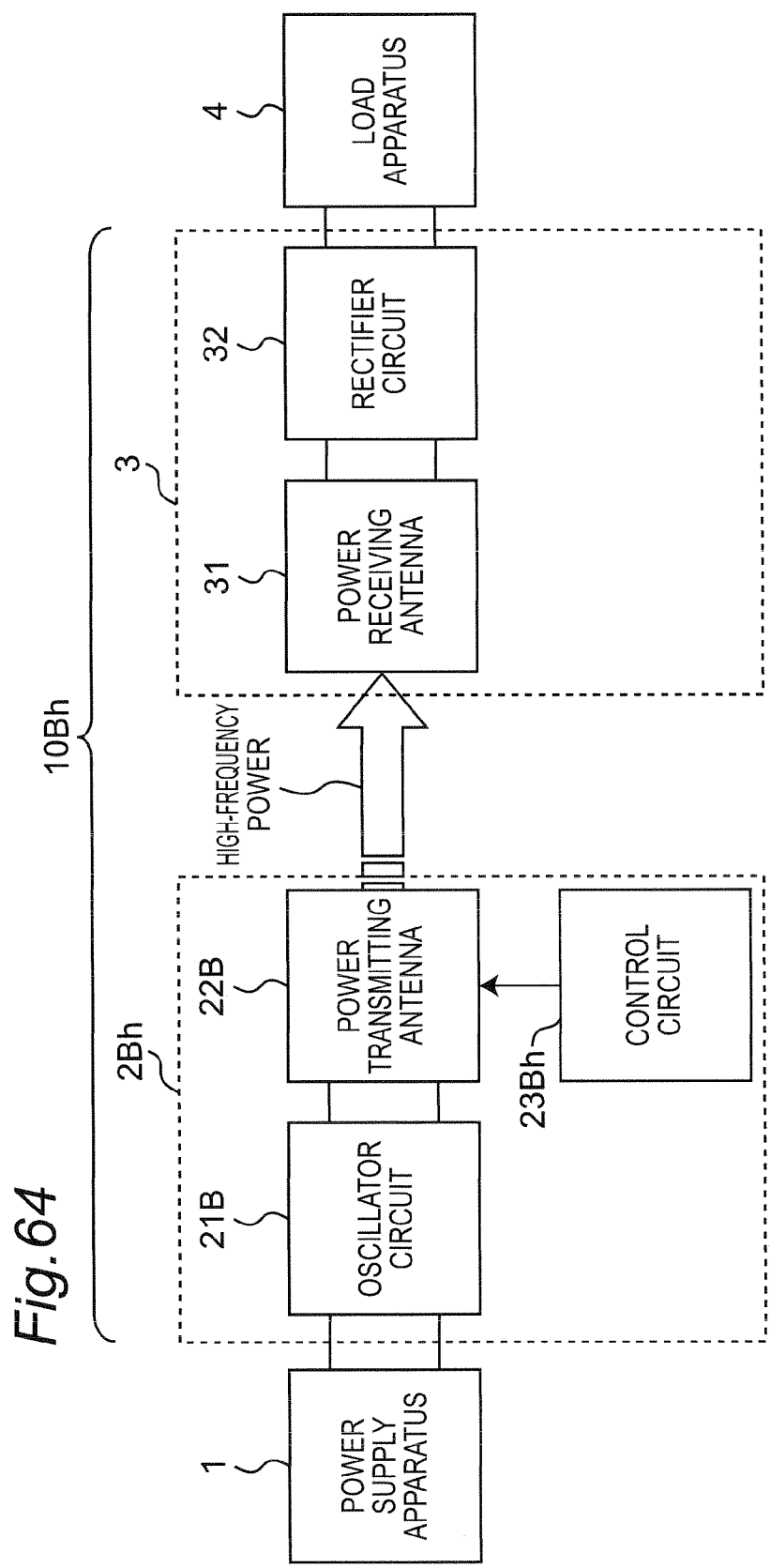
FIG. 64 is a block diagram showing a configuration of a wireless power transmission system 10Bh according to an eighth modified embodiment of the third embodiment.

FIG. 64 is a block diagram showing a configuration of a wireless power transmission system 10Bh according to an eighth modified embodiment of the third embodiment. The wireless power transmission system 10Bh includes: a wireless power transmitting apparatus 2Bh connected to the power supply apparatus 1; and the wireless power receiving apparatus 3 connected to the load apparatus 4. The wireless power receiving apparatus 3 may be a conventional wireless power receiving apparatus not capable of changing its circuit constant.

The wireless power transmitting apparatus 2Bg is provided with a control circuit 23Bg, instead of the control circuit 23B of FIG. 38. The wireless power receiving apparatus 3Bg is provided with a control circuit 33Bg, instead of the control circuit 33B of FIG. 38. The control circuit 23Bg of the wireless power transmitting apparatus 2Bg operates under the control of the control circuit 33Bg of the wireless power receiving apparatus 3Bg. The control circuit 33Bg of the wireless power receiving apparatus 3Bg performs the power transmission process of FIG. 51 to set at least one of a circuit constant of the wireless power transmitting apparatus 2Bg and a circuit constant of the wireless power receiving apparatus 3Bg, such that the operating band of the system of the power transmitting antenna 22B and the power receiving antenna 31 electromagnetically coupled to each other is set to one of the first and second operating bands.

According to the wireless power transmission systems 10Bc to 10Bh of FIGS. 58, and 60 to 64, even when a metal foreign object is present near the power transmitting coil Lt or the power receiving coil Lr, it is possible to continue power transmission without immediately stopping the power transmission, while suppressing heating of the metal foreign object, in a manner similar to that of the wireless power transmission system 10B of FIG. 38.

Next, simulation results for the wireless power transmission system 10B of FIG. 38 will be described.

A simulation was done using the finite element method on the power transmitting coil Lt and the power receiving coil Lr of FIG. 20. The capacitance of the resonant capacitor of the power transmitting antenna was changed as a circuit constant of the wireless power transmitting apparatus, and the operating band of the system of the power transmitting coil Lt and the power receiving coil Lr electromagnetically coupled to each other was set to one of the first and second operating bands. In the first operating band, the odd-mode resonance frequency fo1 was 106 kHz, and the even-mode resonance frequency fe1 was 162.6 kHz. In addition, in the second operating band, the odd-mode resonance frequency fo2 was 91 kHz, and the even-mode resonance frequency fe2 was 125 kHz. Further, as a metal foreign object 5, a piece of aluminum of 2 mm×2 mm×0.2 mm was disposed between the power transmitting coil Lt and the power receiving coil Lr.

In addition, when the load apparatus 4 was connected to the power receiving antenna 31B, the output impedance Zt1 for the case where the input terminal of the power transmitting antenna 22B is seen from the output terminal of the oscillator circuit 21B was set to be substantially equal to the input impedance Zt2 for the case where the output terminal of the oscillator circuit 21B is seen from the input terminal of the power transmitting antenna 22B. Further, when the oscillator circuit 21B was connected to the power transmitting antenna 22B, the output impedance Zr2 for the case where the load apparatus 4 is seen from the output terminal of the power receiving antenna 31B was set to be substantially equal to the input impedance Zr1 for the case where the output terminal of the power receiving antenna 31B is seen from the load apparatus 4. As a result, a good transmission efficiency of 90% or more was achieved for both the case in which the transmission frequency ftr is set to the odd-mode resonance frequency fo1, and the case in which the transmission frequency ftr is set to the even-mode resonance frequency fe2 after changing the circuit constant.

When the transmission mode condition is "ftr=fo1", the system of the power transmitting antenna and the power receiving antenna electromagnetically coupled to each other has the first operating band, and is in the odd-mode resonant condition, and power is transmitted at the odd-mode resonance frequency fo1. On the other hand, when the transmission mode condition is "ftr=fe2", the system of the power transmitting antenna and the power receiving antenna electromagnetically coupled to each other has the second operating band, and is in the even-mode resonant condition, and power is transmitted at the even-mode resonance frequency fe2.

An eddy current generated on the surface of the metal foreign object 5 is proportional to the area of the metal foreign object 5. In addition, the amount of heating of the metal foreign object 5 is theoretically proportional to the square of the eddy current generated on the surface of the metal foreign object 5. Therefore, the square of a maximum value of the surface current density was evaluated as an indicator of the amount of heating.

When the power transmitting coil Lt and the power receiving coil Lr of FIG. 20 had an inner diameter d2=10 mm, power was transmitted at the odd-mode resonance frequency fo1 in the first operating band and the even-mode resonance frequency fe2 in the second operating band. The input power to the power transmitting coil Lt was set to 1 W. When power was transmitted at the odd-mode resonance frequency fo1 in the first operating band, the same result as that of "ftr=fo" of FIG. 21 was obtained. When power was transmitted at the even-mode resonance frequency fe2 in the second operating band, the same result as that of "ftr=fe" of FIG. 21 was obtained. Referring to FIG. 21, it can be seen that when the metal foreign object 5 is present within opening (central portion) of the power transmitting coil Lt and the power receiving coil Lr, it is possible to reduce the amount of heating by transmitting power in the even-mode resonant condition. On the other hand, it can be seen that when the metal foreign object 5 is present between the winding of the power transmitting coil Lt and the winding of the power receiving coil Lr and remote from the opening of the power transmitting coil Lt and the power receiving coil Lr (present in peripheral portion), it is possible to reduce the amount of heating by transmitting power in the odd-mode resonant condition.

Similarly, when the power transmitting coil Lt and the power receiving coil Lr of FIG. 20 had an inner diameter d2=20 mm, power was transmitted at the odd-mode resonance frequency fo1 in the first operating band and the even-mode resonance frequency fe2 in the second operating band. When power was transmitted at the odd-mode resonance frequency fo1 in the first operating band, the same result as that of "ftr=fo" of FIG. 22 was obtained. When power was transmitted at the even-mode resonance frequency fe2 in the second operating band, the same result as that of "ftr=fe" of FIG. 22 was obtained. Referring to FIG. 22, it can be seen that when the metal foreign object 5 is present within the opening (central portion) of the power transmitting coil Lt and the power receiving coil Lr, it is possible to reduce the amount of heating by transmitting power in the even-mode resonant condition. On the other hand, it can be seen that when the metal foreign object 5 is present between the winding of the power transmitting coil Lt and the winding of the power receiving coil Lr and remote from the opening of the power transmitting coil Lt and the power receiving coil Lr (present in peripheral portion), it is possible to reduce the amount of heating by transmitting power in the odd-mode resonant condition.

Therefore, it can be seen that, not depending on the structures of the power transmitting coil Lt and the power receiving coil Lr, (1) when the metal foreign object 5 is present at the central portion of the power transmitting coil Lt and the power receiving coil Lr, the amount of heating is smaller in the even mode than in the odd mode, and (2) when the metal foreign object 5 is present at the peripheral portion of the power transmitting coil Lt and the power receiving coil Lr, the amount of heating is smaller in the odd mode than in the even mode. It is noted that substantially equal impedance and substantially equal transmission efficiency are achieved in the two transmission modes, the frequency does not affect transmission characteristics. From the above results, it can be seen that the wireless power transmission system 10B has two transmission modes (even mode and odd mode) capable of ensuring good transmission characteristics, and can suppress heating regardless of the position of the metal foreign object 5, by selecting one of the transmission modes.

Although the present specification describes the system of the power transmitting antenna 22B and the power receiving antenna 31B, i.e., two resonators, electromagnetically coupled to each other and having two transmission modes (even mode and odd mode), a system of three or more resonators electromagnetically coupled to one another may be used. In this case, a system of the power transmitting antenna 22B, the power receiving antenna 31B, and an additional resonator(s) electromagnetically coupled to one another has an operating band including three or more resonance frequencies corresponding to three or more transmission mode resonant conditions, respectively. In this case, it is possible to further suppress heating of the metal foreign object, by changing three or more transmission modes with different amounts of heating, depending on the position of a metal foreign object. When an available frequency band is limited, three or more operating bands may be used to change the transmission mode. In this case, a resonance frequency corresponding to a transmission mode to be used for power transmission is included in the available frequency band in any of the operating bands. For example, the control circuit 23B of the wireless power transmitting apparatus 2B (or the control circuit 33Bg of the wireless power receiving apparatus 3Bg) sets at least one of the circuit constant of the wireless power transmitting apparatus 2B and the circuit constant of the wireless power receiving apparatus 3B, so as to change the operating band and the resonance frequency of the system of the power transmitting antenna 22B, the power receiving antenna 31B, and the additional resonator(s) electromagnetically coupled to each other.

Fourth Embodiment

Figure 65:
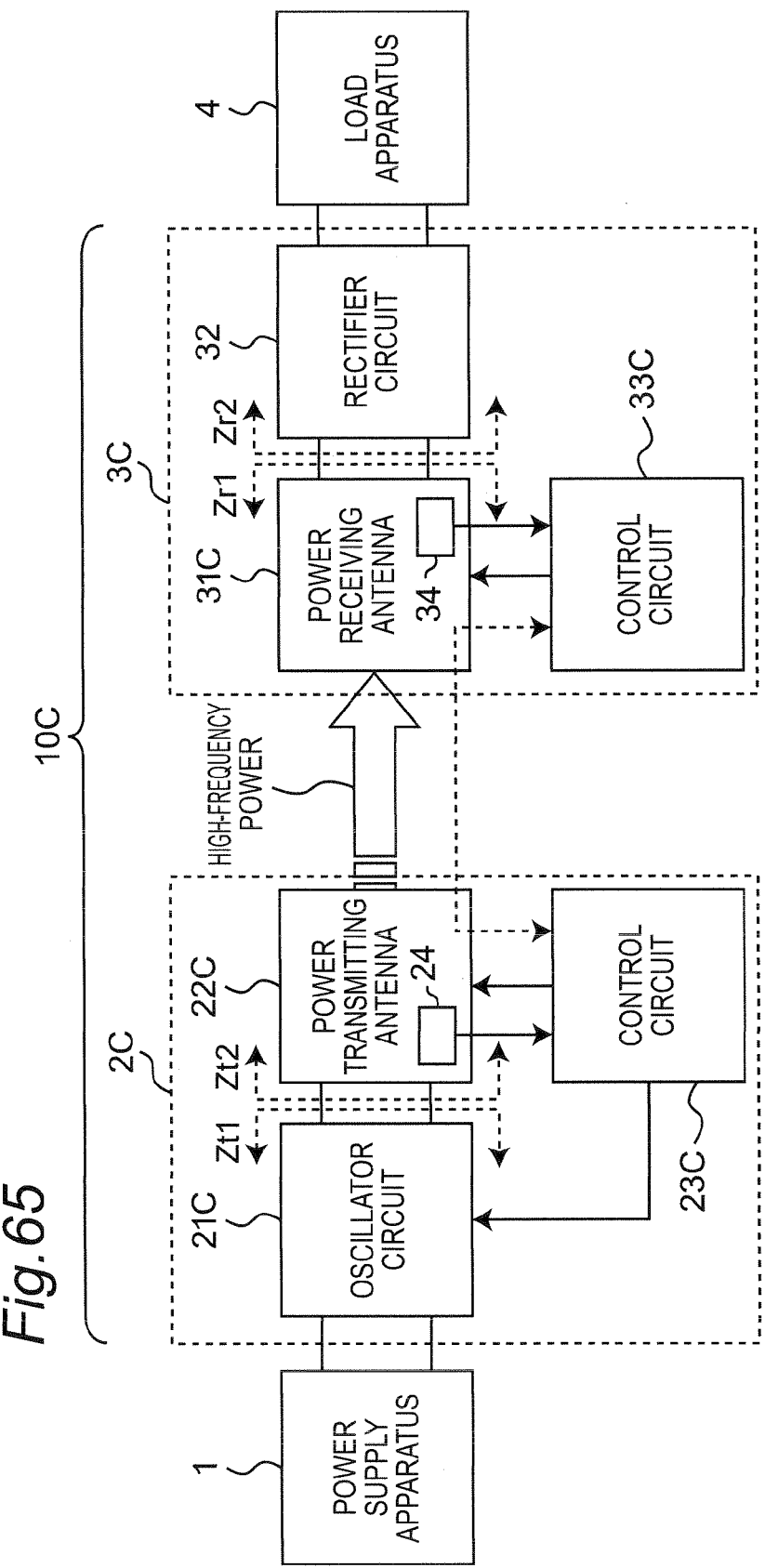
FIG. 65 is a block diagram showing a configuration of a wireless power transmission system 100 according to a fourth embodiment.

FIG. 65 is a block diagram showing a configuration of a wireless power transmission system 100 according to a fourth embodiment. The wireless power transmission system 100 includes: a wireless power transmitting apparatus 2C connected to the power supply apparatus 1; and a wireless power receiving apparatus 3C connected to the load apparatus 4. The wireless power transmission system 100 wirelessly transmits high-frequency power from the wireless power transmitting apparatus 2C to the wireless power receiving apparatus 3C. The wireless power transmission system 100 of FIG. 65 is configured as a combination of the second and third embodiments.

Referring to FIG. 65, the wireless power transmitting apparatus 2C is provided with an oscillator circuit 21C, a power transmitting antenna 22C, a control circuit 23C, and the sensor 24. The oscillator circuit 21C of FIG. 65 is configured in a manner similar to that of the oscillator circuit 21B of FIG. 38, and generates high-frequency power having a transmission frequency ftr. The power transmitting antenna 22C of FIG. 65 is configured in a manner similar to that of the power transmitting antenna 22B of FIG. 38, and includes an LC resonant circuit having at least one of a variable inductance and a variable capacitance. The control circuit 23C of the wireless power transmitting apparatus 2C changes at least one of the inductance and the capacitance of the power transmitting antenna 22C. The control circuit 23C of the wireless power transmitting apparatus 2C controls the start and stop of power transmission performed by the oscillator circuit 21C. The sensor 24 of FIG. 65 is configured in a manner similar to that of the sensor 24 of FIG. 24. The sensor 24 includes, for example, a temperature sensor.

Referring to FIG. 65, the wireless power receiving apparatus 3C is provided with a power receiving antenna 31C, the rectifier circuit 32, a control circuit 33C, and the sensor 34. The power receiving antenna 31C of FIG. 65 is configured in a manner similar to that of the power receiving antenna 31B of FIG. 38, and includes an LC resonant circuit having at least one of a variable inductance and a variable capacitance. The power receiving antenna 31C is electromagnetically coupled to the power transmitting antenna 22C. The control circuit 33C of the wireless power receiving apparatus 3C changes at least one of the inductance and the capacitance of the power receiving antenna 31C, under the control of the control circuit 23C of the wireless power transmitting apparatus 2C. The rectifier circuit 32 of FIG. 65 is configured in a manner similar to that of the rectifier circuit 32 of FIG. 38.

The control circuit 23C of the wireless power transmitting apparatus 2C sets at least one of a circuit constant of the wireless power transmitting apparatus 2C and a circuit constant of the wireless power receiving apparatus 3C, such that the operating band of a system of the power transmitting antenna 22C and the power receiving antenna 31C electromagnetically coupled to each other is set to one of the first and second operating bands. When the power transmitting antenna 22C and the power receiving antenna 31C electromagnetically coupled to each other have the first operating band, the wireless power transmitting apparatus 2C transmits power to the wireless power receiving apparatus 3C at an odd-mode resonance frequency fo1 in the first operating band. When the power transmitting antenna 22C and the power receiving antenna 31C electromagnetically coupled to each other have the second operating band, the wireless power transmitting apparatus 2C transmits power to the wireless power receiving apparatus 3C at an even-mode resonance frequency fe2 in the second operating band. When the circuit constant of the wireless power transmitting apparatus 2C is set such that the operating band of the power transmitting antenna 22C and the power receiving antenna 31C electromagnetically coupled to each other is set to one of the first and second operating bands, and an abnormal condition due to a foreign object near the power transmitting coil Lt or the power receiving coil Lr occurs, the control circuit 23C of the wireless power transmitting apparatus 2C sets the circuit constant of the wireless power transmitting apparatus such that the operating band of the power transmitting antenna 22C and the power receiving antenna 31C electromagnetically coupled to each other is set to the other of the first and second operating bands.

Figure 66:
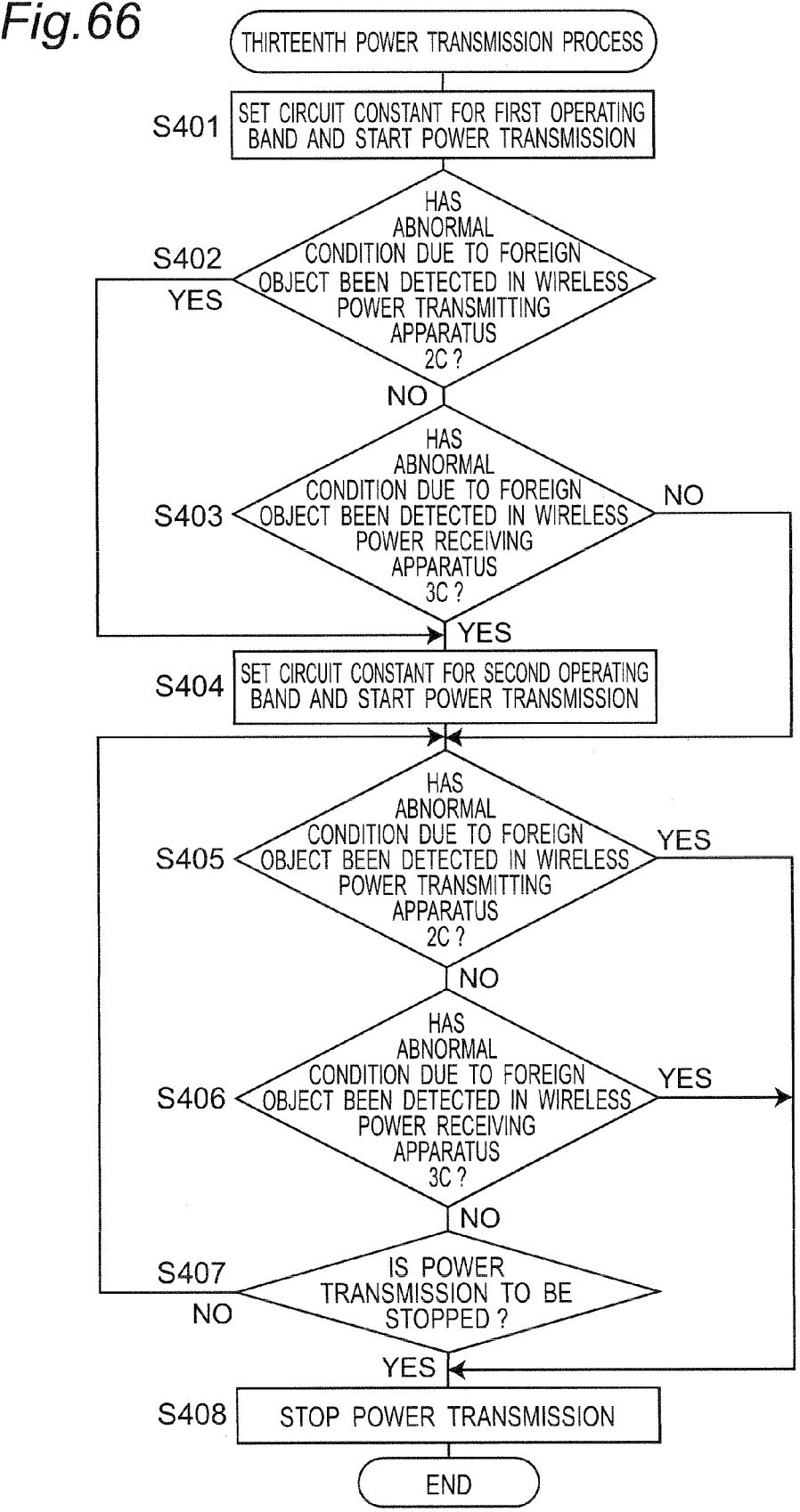
FIG. 66 is a flowchart showing a thirteenth power transmission process performed by a control circuit 23C of a wireless power transmitting apparatus 2C of FIG. 65.

FIG. 66 is a flowchart showing a thirteenth power transmission process performed by the control circuit 23C of the wireless power transmitting apparatus 2C of FIG. 65. Specifically, at step S401 of FIG. 66, the control circuit 23C sets at least one of the circuit constant of the wireless power transmitting apparatus 2C and the circuit constant of the wireless power receiving apparatus 3C, such that the operating band of the system of the power transmitting antenna 22C and the power receiving antenna 31C electromagnetically coupled to each other is set to the first operating band, and then, the control circuit 23C starts power transmission. At this time, since the transmission frequency ftr is equal to the odd-mode resonance frequency fo1 in the first operating band, the transmission mode is the odd mode. At step S402, the control circuit 23C determines whether or not an abnormal condition due to a foreign object has been detected in the wireless power transmitting apparatus 2C; and if YES, the process proceeds to step S404; if NO, the process proceeds to step S403. At step S403, the control circuit 23C determines whether or not an abnormal condition due to a foreign object has been detected in the wireless power receiving apparatus 3C; if YES, the process proceeds to step S404; if NO, the process proceeds to step S405. At step S404, the control circuit 23C sets at least one of the circuit constant of the wireless power transmitting apparatus 2C and the circuit constant of the wireless power receiving apparatus 3C, such that the operating band of the system of the power transmitting antenna 22C and the power receiving antenna 31C electromagnetically coupled to each other is set to the second operating band, and then, the control circuit 23C continues the power transmission. At this time, since the transmission frequency ftr is equal to the even-mode resonance frequency fe2 in the second operating band, the transmission mode is the even mode. When an abnormal condition due to a foreign object near the power transmitting coil Lt or the power receiving coil Lr occurs after changing the operating band of the system of the power transmitting antenna 22C and the power receiving antenna 31C electromagnetically coupled to each other (i.e., when the abnormal condition has not been resolved), the control circuit 23C causes the oscillator circuit 21C to stop the power transmission. Specifically, at step S405, the control circuit 23C determines whether or not an abnormal condition due to a foreign object has been detected in the wireless power transmitting apparatus 2C; if YES, the process proceeds to step S408; if NO, the process proceeds to step S406. At step S406, the control circuit 23C determines whether or not an abnormal condition due to a foreign object has been detected in the wireless power receiving apparatus 3C; if YES, the process proceeds to step S408; if NO, the process proceeds to step S407. At step S407, the control circuit 23C determines whether or not the power transmission is to be stopped; if YES, the process proceeds to step S408; if NO, the process returns to step S405. At step S408, the control circuit 23C instructs the oscillator circuit 21C to stop the power transmission.

According to the thirteenth power transmission process, even when a metal foreign object is present near the power transmitting coil Lt or the power receiving coil Lr, it is possible to continue power transmission without immediately stopping the power transmission, while suppressing heating of the metal foreign object.

Figure 67:
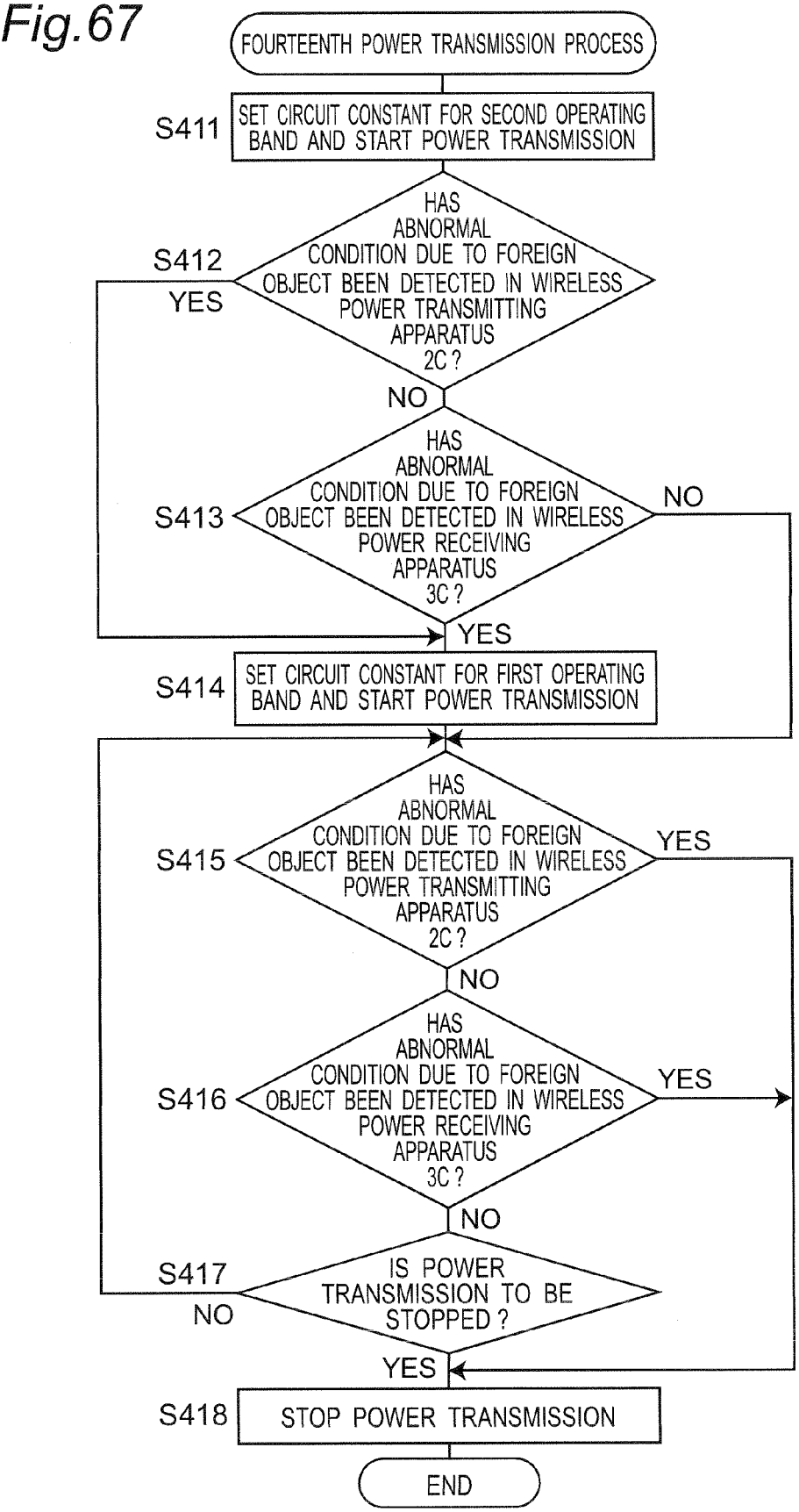
FIG. 67 is a flowchart showing a fourteenth power transmission process performed by the control circuit 23C of the wireless power transmitting apparatus 2C of FIG. 65.

FIG. 67 is a flowchart showing a fourteenth power transmission process performed by the control circuit 23C of the wireless power transmitting apparatus 2C of FIG. 65. According to the thirteenth power transmission process, at first, the operating band of the system of the power transmitting antenna 22C and the power receiving antenna 31C electromagnetically coupled to each other is set to the first operating band to start power transmission (step S401), and then, when an abnormal condition due to a foreign object is detected, the operating band is changed to the second operating band (step S404). On the other hand, according to the fourteenth power transmission process, at first, the operating band of the system of the power transmitting antenna 22C and the power receiving antenna 31C electromagnetically coupled to each other may be set to the second operating band to start power transmission (step S411), and then, when an abnormal condition due to a foreign object is detected, the operating band may be changed to the first operating band (step S414). Steps S411 to S418 of FIG. 67 are the same as steps S401 to S408 of FIG. 66, except for steps S411 and S414. According to the fourteenth power transmission process, even when a metal foreign object is present near the power transmitting coil Lt or the power receiving coil Lr, it is possible to continue power transmission without immediately stopping the power transmission, while suppressing heating of the metal foreign object, in a manner similar to that of the thirteenth power transmission process.

Figure 68:
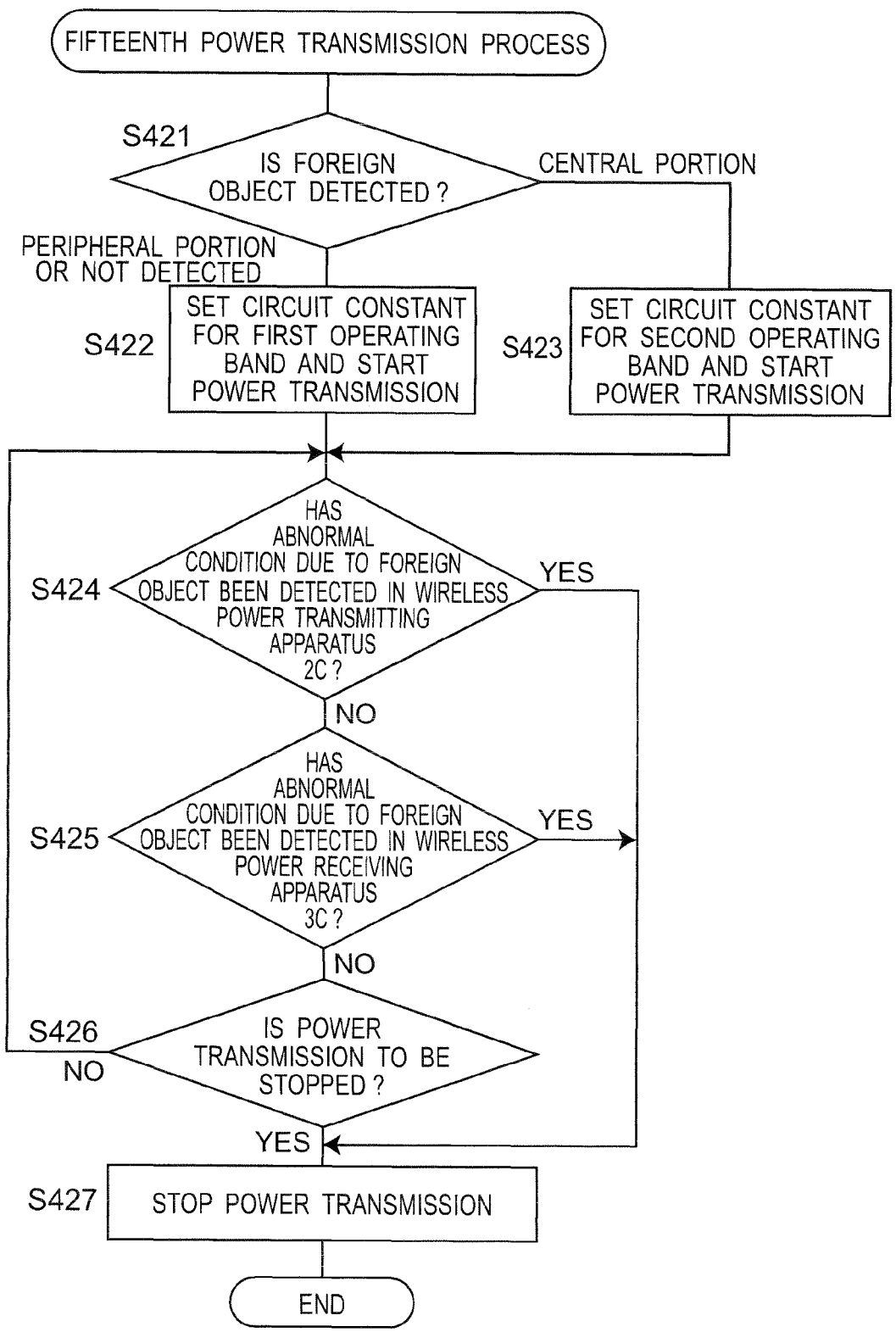
FIG. 68 is a flowchart showing a fifteenth power transmission process performed by the control circuit 23C of the wireless power transmitting apparatus 2C of FIG. 65.

FIG. 68 is a flowchart showing a fifteenth power transmission process performed by the control circuit 23C of the wireless power transmitting apparatus 2C of FIG. 65. When the control circuit 23C detects a foreign object at the central portion of the power transmitting coil Lt and the power receiving coil Lr, the control circuit 23C sets the circuit constant of the wireless power transmitting apparatus 2C such that the operating band of the power transmitting antenna 22C and the power receiving antenna 31C electromagnetically coupled to each other is set to the second operating band, and the control circuit 23C causes the oscillator circuit 21C to generate high-frequency power at the even-mode resonance frequency fe2 in the second operating band, and start transmission of the high-frequency power from the wireless power transmitting apparatus 2C to the wireless power receiving apparatus 3C. When the control circuit 23C detects a foreign object at the peripheral portion of the power transmitting coil Lt and the power receiving coil Lr, the control circuit 23C sets the circuit constant of the wireless power transmitting apparatus 2C such that the operating band of the power transmitting antenna 22C and the power receiving antenna 31C electromagnetically coupled to each other is set to the first operating band, and the control circuit 23C causes the oscillator circuit 21C to generate high-frequency power at the odd-mode resonance frequency fo1 in the first operating band, and start transmission of the high-frequency power from the wireless power transmitting apparatus 2C to the wireless power receiving apparatus 3C. At step S421 of FIG. 68, the control circuit 23C determines whether or not a foreign object has been detected. If a foreign object is present at the peripheral portion of the power transmitting coil Lt and the power receiving coil Lr, or if a foreign object has not been detected, the process proceeds to step S422. If a foreign object is present at the central portion of the power transmitting coil Lt and the power receiving coil Lr, the process proceeds to step S423. At step S422, the control circuit 23C sets at least one of the circuit constant of the wireless power transmitting apparatus 2C and the circuit constant of the wireless power receiving apparatus 3C, such that the operating band of the system of the power transmitting antenna 22C and the power receiving antenna 31C electromagnetically coupled to each other is set to the first operating band, and then, the control circuit 23C starts power transmission. At this time, since the transmission frequency ftr is equal to the odd-mode resonance frequency fo1 in the first operating band, the transmission mode is the odd mode. At step S423, the control circuit 23C sets at least one of the circuit constant of the wireless power transmitting apparatus 2C and the circuit constant of the wireless power receiving apparatus 3C, such that the operating band of the system of the power transmitting antenna 22C and the power receiving antenna 31C electromagnetically coupled to each other is set to the second operating band, and then, the control circuit 23C continues the power transmission. At this time, since the transmission frequency ftr is equal to the even-mode resonance frequency fe2 in the second operating band, the transmission mode is the even mode. Then, at step S424, the control circuit 23C determines whether or not an abnormal condition due to a foreign object has been detected in the wireless power transmitting apparatus 2C; if YES, the process proceeds to step S427; if NO, the process proceeds to step S425. At step S425, the control circuit 23C determines whether or not an abnormal condition due to a foreign object has been detected in the wireless power receiving apparatus 3C; and if YES, the process proceeds to step S427; if NO, the process proceeds to step S426. At step S426, the control circuit 23C determines whether or not the power transmission is to be stopped; if YES, the process proceeds to step S427; if NO, the process returns to step S424. At step S427, the control circuit 23C instructs the oscillator circuit 21C to stop the power transmission.

According to the fifteenth power transmission process, even when a metal foreign object is detected near the power transmitting coil Lt or the power receiving coil Lr before starting power transmission, it is possible to start the power transmission while suppressing heating of the metal foreign object.

Figure 69:
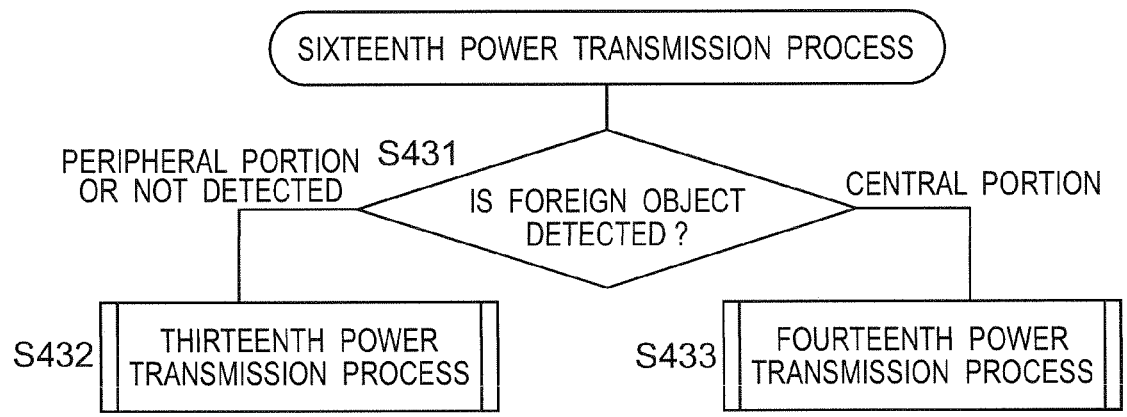
FIG. 69 is a flowchart showing a sixteenth power transmission process performed by the control circuit 23C of the wireless power transmitting apparatus 20 of FIG. 65.

FIG. 69 is a flowchart showing a sixteenth power transmission process performed by the control circuit 23C of the wireless power transmitting apparatus 2C of FIG. 65. The fifteenth power transmission process may be combined with the thirteenth and fourteenth power transmission processes. When the control circuit 23C detects a foreign object at the central portion of the power transmitting coil Lt and the power receiving coil Lr, the control circuit 23C sets the circuit constant of the wireless power transmitting apparatus 2C such that the operating band of the power transmitting antenna 22C and the power receiving antenna 31C electromagnetically coupled to each other is set to the second operating band, and the control circuit 23C causes the oscillator circuit 21C to generate high-frequency power at the even-mode resonance frequency fe2 in the second operating band, and start transmission of the high-frequency power from the wireless power transmitting apparatus 2C to the wireless power receiving apparatus 3C. When the control circuit 23C detects a foreign object at the peripheral portion of the power transmitting coil Lt and the power receiving coil Lr, the control circuit 23C sets the circuit constant mof the wireless power transmitting apparatus 2C such that the operating band of the power transmitting antenna 22C and the power receiving antenna 31C electromagnetically coupled to each other is set to the first operating band, and the control circuit 23C causes the oscillator circuit 21C to generate high-frequency power at the odd-mode resonance frequency fo1 in the first operating band, and start transmission of the high-frequency power from the wireless power transmitting apparatus 2C to the wireless power receiving apparatus 3C. At step S431, the control circuit 23C determines whether or not a foreign object has been detected. If a foreign object is present at the peripheral portion of the power transmitting coil Lt and the power receiving coil Lr, or if a foreign object has not been detected, the process proceeds to step S432. If a foreign object is present at the central portion of the power transmitting coil Lt and the power receiving coil Lr, the process proceeds to step S433. At step S432, the control circuit 23C performs the thirteenth power transmission process of FIG. 66. At step S433, the control circuit 23C performs the fourteenth power transmission process of FIG. 67.

According to the sixteenth power transmission process, even when a metal foreign object is detected near the power transmitting coil Lt or the power receiving coil Lr before starting power transmission, it is possible to start power transmission while suppressing heating of the metal foreign object. Further, even when an abnormal condition due to a foreign object near the power transmitting coil Lt or the power receiving coil Lr occurs, it is possible to continue the power transmission without immediately stopping the power transmission, while suppressing heating of the metal foreign object.

Figure 70:
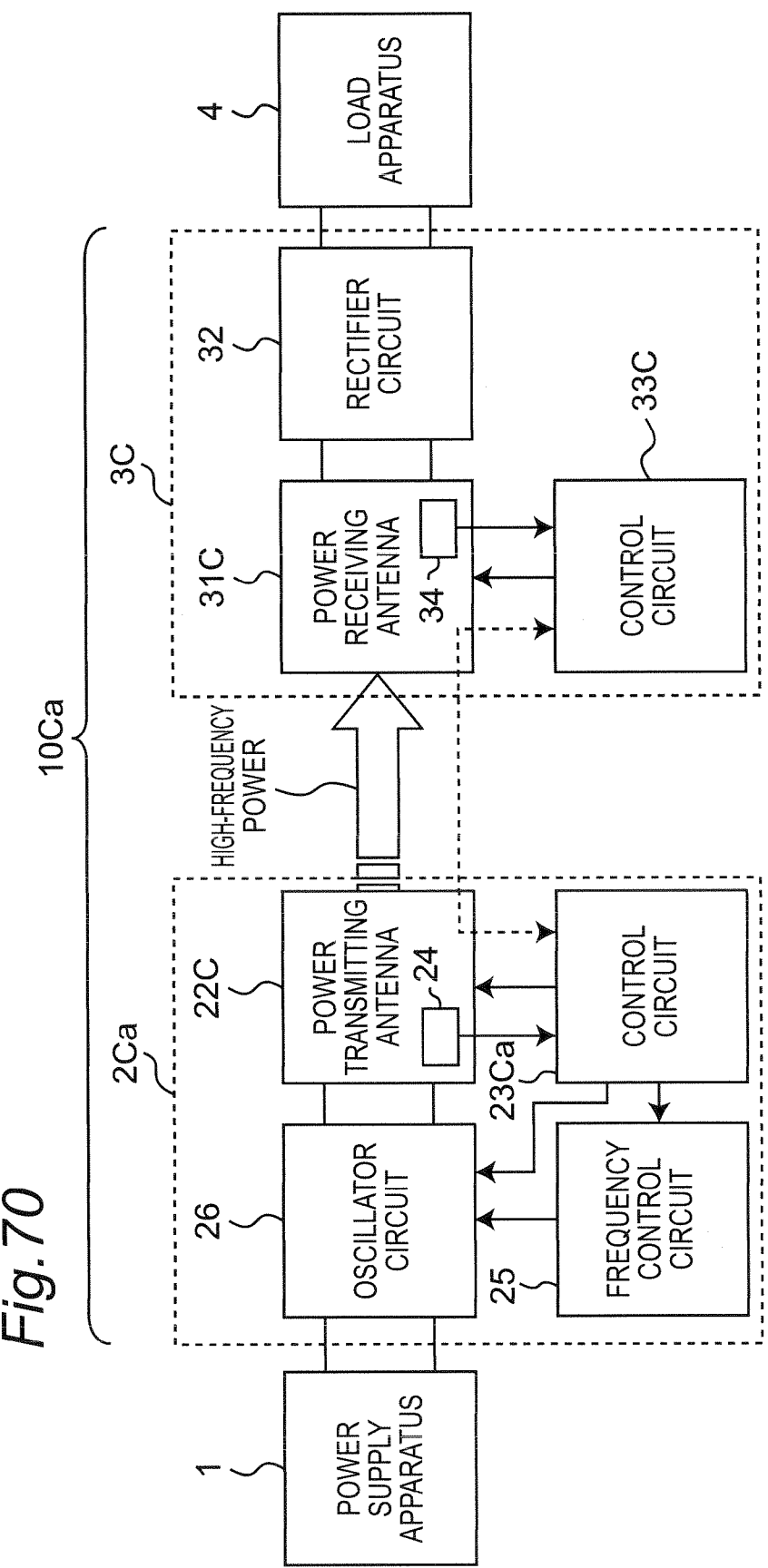
FIG. 70 is a block diagram showing a configuration of a wireless power transmission system 10Ca according to a first modified embodiment of the fourth embodiment.

FIG. 70 is a block diagram showing a configuration of a wireless power transmission system 10Ca according to a first modified embodiment of the fourth embodiment. The wireless power transmission system 10Ca includes: a wireless power transmitting apparatus 2Ca connected to the power supply apparatus 1; and the wireless power receiving apparatus 3C connected to the load apparatus 4. The wireless power transmitting apparatus 2Ca is provided with the frequency control circuit 25 and the oscillator circuit 26, instead of the oscillator circuit 21C of FIG. 65, and provided with a control circuit 23Ca, instead of the control circuit 23C of FIG. 65. The frequency control circuit 25 and the oscillator circuit 26 of FIG. 70 are configured in a manner similar to that of the frequency control circuit 25 and the oscillator circuit 26 of FIG. 58.

As mentioned with reference to FIG. 59, the odd-mode resonance frequency fo1 in the first operating band is not necessarily the same with the even-mode resonance frequency fe2 in the second operating band. The control circuit 23Ca of the wireless power transmitting apparatus 2Ca controls the oscillator circuit 26 to generate high-frequency power at the odd-mode resonance frequency fo1 in the first operating band when using the first operating band, and to generate high-frequency power at the even-mode resonance frequency fe2 in the second operating band when using the second operating band. Thus, the wireless power transmission system 10Ca can transmit power with high efficiency using both the transmission modes of the even mode and the odd mode, while satisfying the limitation on frequency band.

Figure 71:
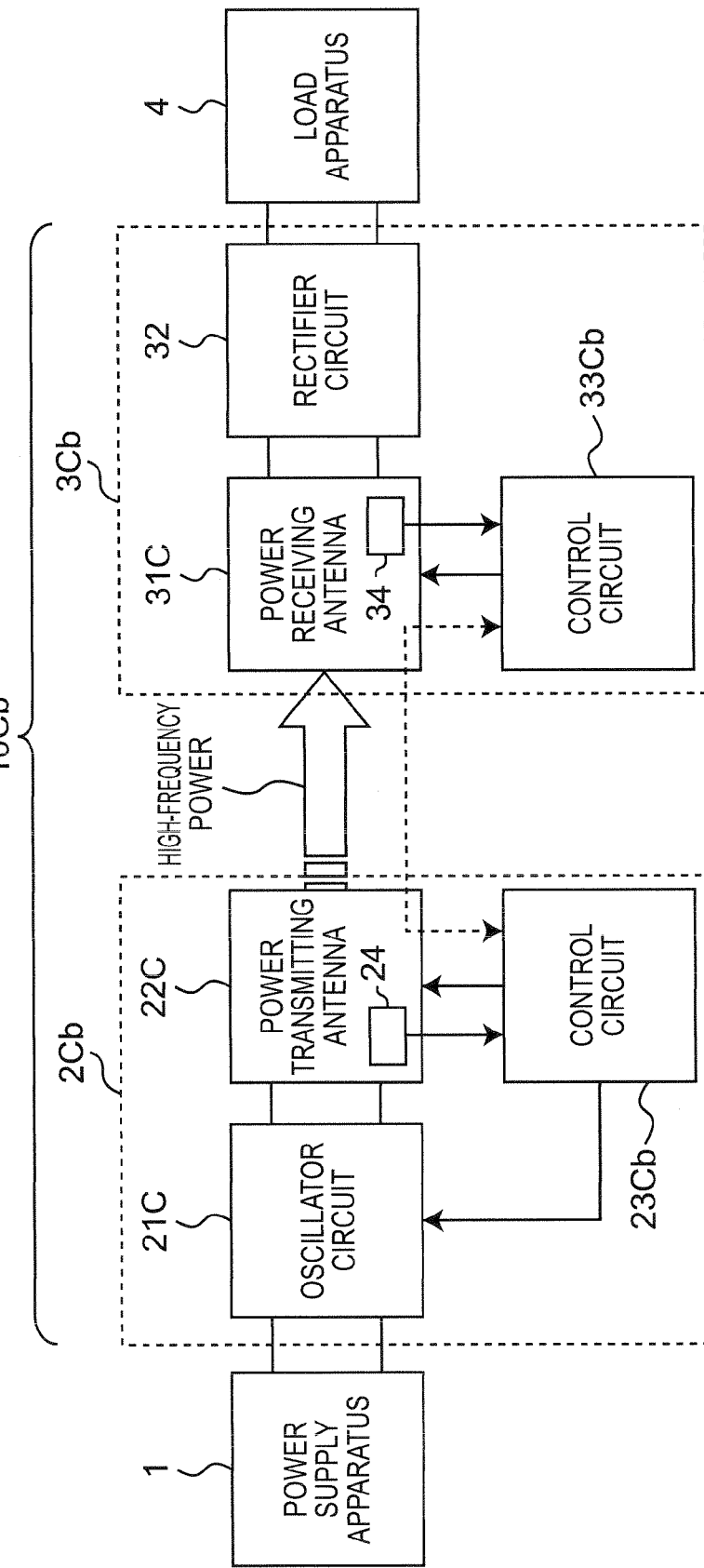
FIG. 71 is a block diagram showing a configuration of a wireless power transmission system 10Cb according to a second modified embodiment of the fourth embodiment.

FIG. 71 is a block diagram showing a configuration of a wireless power transmission system 10Cb according to a second modified embodiment of the fourth embodiment. The wireless power transmission system 10Cb includes: a wireless power transmitting apparatus 2Cb connected to the power supply apparatus 1; and a wireless power receiving apparatus 3Cb connected to the load apparatus 4. A control circuit 23Cb of the wireless power transmitting apparatus 2Cb may operate under the control of a control circuit 33Cb of the wireless power receiving apparatus 3Cb. The wireless power transmitting apparatus 2Cb is provided with the control circuit 23Cb, instead of the control circuit 23C of FIG. 65. The wireless power receiving apparatus 3Cb is provided with the control circuit 33Cb, instead of the control circuit 33C of FIG. 65. The control circuit 23Cb of the wireless power transmitting apparatus 2Cb operates under the control of the control circuit 33Cb of the wireless power receiving apparatus 3Cb. The control circuit 33Cb of the wireless power receiving apparatus 3Cb performs the power transmission process of FIG. 66 to set at least one of a circuit constant of the wireless power transmitting apparatus 2Cb and a circuit constant of the wireless power receiving apparatus 3Cb, such that the operating band of the system of the power transmitting antenna 22C and the power receiving antenna 31C electromagnetically coupled to each other is set to one of the first and second operating bands.

Figure 72:
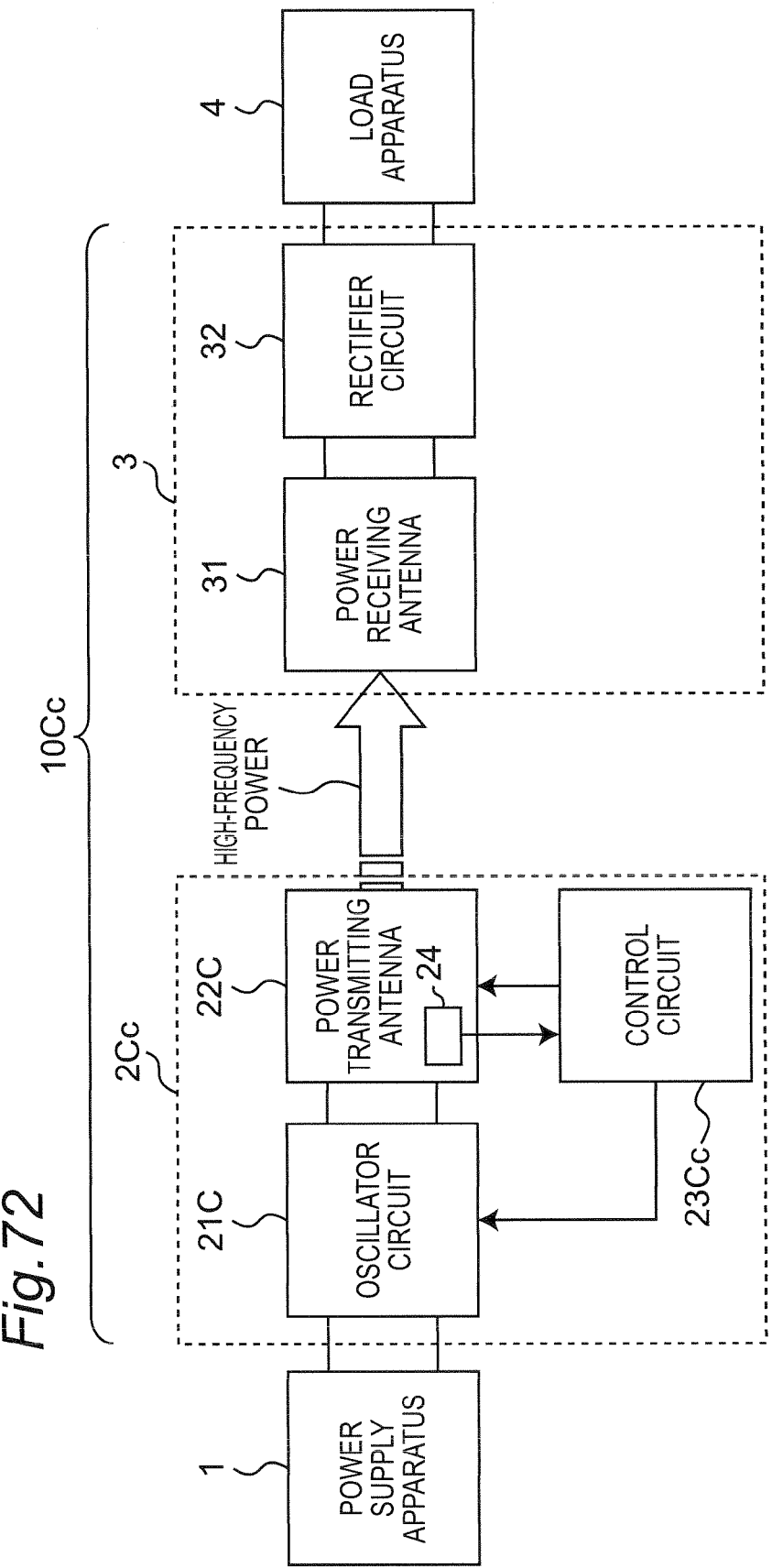
FIG. 72 is a block diagram showing a configuration of a wireless power transmission system 10Cc according to a third modified embodiment of the fourth embodiment.

FIG. 72 is a block diagram showing a configuration of a wireless power transmission system 10Cc according to a third modified embodiment of the fourth embodiment. The wireless power transmission system 10Cc includes: a wireless power transmitting apparatus 2Cc connected to the power supply apparatus 1; and the wireless power receiving apparatus 3 connected to the load apparatus 4. The wireless power receiving apparatus 3 may be a conventional wireless power receiving apparatus not capable of changing its circuit constant. The wireless power transmitting apparatus 2Cc is provided with a control circuit 23Cc, instead of the control circuit 23C of FIG. 65. The wireless power receiving apparatus 3 is provided with the power receiving antenna 31 having the fixed inductance and capacitance, instead of the power receiving antenna 31C and the control circuit 33C of FIG. 65. The control circuit 23Cc of the wireless power transmitting apparatus 2Cc performs the power transmission process of FIG. 66 to set only a circuit constant of the wireless power transmitting apparatus 2Cc, such that the operating band of the system of the power transmitting antenna 22C and the power receiving antenna 31C electromagnetically coupled to each other is set to one of the first and second operating bands.

According to the wireless power transmission systems 10Ca to 10Cc of FIGS. 70 to 72, even when a metal foreign object is present near the power transmitting coil Lt or the power receiving coil Lr, it is possible to continue power transmission without immediately stopping the power transmission, while suppressing heating of the metal foreign object, in a manner similar to that of the wireless power transmission system 10C of FIG. 65.

Fifth Embodiment

Figure 73:
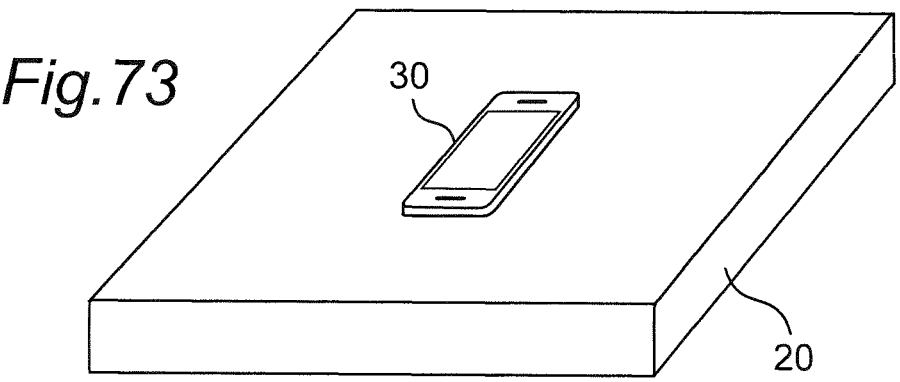
FIG. 73 is a perspective view showing a schematic configuration of a wireless power transmission system according to a fifth embodiment.
Figure 74:
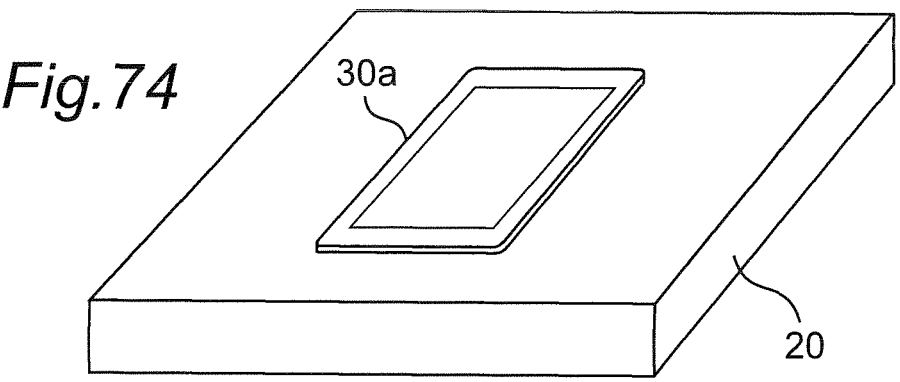
FIG. 74 is a perspective view showing a schematic configuration of a wireless power transmission system according to a modified embodiment of the fifth embodiment.

FIG. 73 is a perspective view showing a schematic configuration of a wireless power transmission system according to a fifth embodiment. The wireless power transmission system of FIG. 73 includes: a power transmitting apparatus 20 provided with a power supply apparatus and a wireless power transmitting apparatus of the first to fourth embodiments; and a power receiving apparatus 30 provided with a wireless power receiving apparatus and a load apparatus of the first to fourth embodiments. The power transmitting apparatus 20 may charge or supply power to the power receiving apparatus 30 configured as, for example, a smartphone or other mobile phones. FIG. 74 is a perspective view showing a schematic configuration of a wireless power transmission system according to a modified embodiment of the fifth embodiment. The power transmitting apparatus 20 may charge or supply power to a power receiving apparatus 30a configured as, for example, a tablet terminal apparatus or other information terminal apparatuses. When the power receiving apparatus 30 or 30a is placed on the power transmitting apparatus 20, a control circuit of the power transmitting apparatus 20 performs any of the first to twelfth power transmission processes.

The configurations described in the present specification as modified embodiments of any of the embodiments are also applicable to other embodiments.

The disclosure of the present specification can be embodied as: a control circuit of a wireless power transmitting apparatus, a control circuit of a wireless power receiving apparatus, a wireless power transmitting apparatus, a wireless power receiving apparatus, or a wireless power transmission system.

Control circuits of a wireless power transmitting apparatus and a wireless power receiving apparatus, a wireless power transmitting apparatus, a wireless power receiving apparatus, and a wireless power transmission system according to the aspects of the present disclosure have the following configurations.

According to a control circuit of a wireless power transmitting apparatus of the first aspect, a control circuit of a wireless power transmitting apparatus in a wireless power transmission system for transmitting high-frequency power from the wireless power transmitting apparatus provided with a power transmitting antenna to a power receiving antenna is provided. The power transmitting antenna includes a first resonant circuit including a power transmitting coil. The power receiving antenna includes a second resonant circuit including a power receiving coil. When the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency. The wireless power transmitting apparatus is further provided with a power transmitting circuit configured to generate, from input power, high-frequency power at a variable frequency, and supply the high-frequency power to the power transmitting antenna, under control of the control circuit of the wireless power transmitting apparatus. The control circuit of the wireless power transmitting apparatus sets the frequency of the high-frequency power generated by the power transmitting circuit to one of the odd-mode resonance frequency and the even-mode resonance frequency.

According to a control circuit of a wireless power transmitting apparatus of the second aspect, in the control circuit of the wireless power transmitting apparatus of the first aspect, the control circuit of the wireless power transmitting apparatus repeatedly alternates a first time interval and a second time interval, the first time interval has a first continuous operating time during which the frequency of the high-frequency power generated by the power transmitting circuit is set to the odd-mode resonance frequency, and the second time interval has a second continuous operating time during which the frequency of the high-frequency power generated by the power transmitting circuit is set to the even-mode resonance frequency.

According to a control circuit of a wireless power transmitting apparatus of the third aspect, in the control circuit of the wireless power transmitting apparatus of the second aspect, the first continuous operating time is set to be shorter than a shortest period of time during which a temperature of a foreign object reaches a threshold temperature, when high-frequency power is transmitted at the odd-mode resonance frequency and the foreign object is present near the power transmitting coil or the power receiving coil. The second continuous operating time is set to be shorter than a shortest period of time during which a temperature of a foreign object reaches the threshold temperature, when high-frequency power is transmitted at the even-mode resonance frequency and the foreign object is present near the power transmitting coil or the power receiving coil.

According to a control circuit of a wireless power transmitting apparatus of the fourth aspect, in the control circuit of the wireless power transmitting apparatus of the third aspect, the control circuit of the wireless power transmitting apparatus reduces the first continuous operating time and the second continuous operating time, when detecting an abnormal condition due to a foreign object near the power transmitting coil or the power receiving coil using a sensor configured to detect the abnormal condition.

According to a control circuit of a wireless power transmitting apparatus of the fifth aspect, in the control circuit of the wireless power transmitting apparatus of one of the first to third aspects, the control circuit of the wireless power transmitting apparatus stops the transmission of the high-frequency power, when detecting an abnormal condition due to a foreign object near the power transmitting coil or the power receiving coil using a sensor configured to detect the abnormal condition.

According to a wireless power transmitting apparatus of the sixth aspect, the wireless power transmitting apparatus is provided with: a control circuit of a wireless power transmitting apparatus of one of the first to fifth aspects; a power transmitting antenna including a first resonant circuit including a power transmitting coil; and a power transmitting circuit configured to generate, from input power, high-frequency power at a variable frequency, and supply the high-frequency power to the power transmitting antenna, under control of the control circuit of the wireless power transmitting apparatus.

According to a wireless power transmitting apparatus of the seventh aspect, in the wireless power transmitting apparatus of the sixth aspect, an output impedance for a case where an input terminal of the power transmitting antenna is seen from an output terminal of the power transmitting circuit is set to be substantially equal to an input impedance for a case where the output terminal of the power transmitting circuit is seen from the input terminal of the power transmitting antenna.

According to a wireless power transmitting system of the eighth aspect, the wireless power transmitting system is provided with: a wireless power transmitting apparatus of the sixth or seventh aspect; and a power receiving antenna including a second resonant circuit including a power receiving coil.

According to a wireless power transmitting system of the ninth aspect, in the wireless power transmitting system of the eighth aspect, the power receiving antenna is connected to a load apparatus. An output impedance for a case where the load apparatus is seen from an output terminal of the power receiving antenna is set to be substantially equal to an input impedance for a case where the output terminal of the power receiving antenna is seen from the load apparatus.

According to a control circuit of a wireless power transmitting apparatus of the tenth aspect, a control circuit of a wireless power transmitting apparatus in a wireless power transmission system for transmitting high-frequency power from the wireless power transmitting apparatus to a wireless power receiving apparatus is provided. The wireless power transmitting apparatus is provided with a power transmitting antenna including a first resonant circuit including a power transmitting coil. The wireless power receiving apparatus is provided with a power receiving antenna including a second resonant circuit including a power receiving coil. When the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency. The wireless power transmitting apparatus is further provided with: a power transmitting circuit configured to generate, from input power, high-frequency power at a variable frequency, and supply the high-frequency power to the power transmitting antenna, under control of the control circuit of the wireless power transmitting apparatus; and at least one sensor configured to detect an abnormal condition due to a foreign object near the power transmitting coil or the power receiving coil. When the power transmitting circuit generates high-frequency power at one of the odd-mode resonance frequency and the even-mode resonance frequency, and the high-frequency power is transmitted from the wireless power transmitting apparatus to the wireless power receiving apparatus, and an abnormal condition due to a foreign object near the power transmitting coil or the power receiving coil occurs, the control circuit of the wireless power transmitting apparatus changes the frequency of the high-frequency power generated by the power transmitting circuit to the other of the odd-mode resonance frequency and the even-mode resonance frequency.

According to a control circuit of a wireless power transmitting apparatus of the eleventh aspect, in the control circuit of the wireless power transmitting apparatus of the tenth aspect. At least a part of the power transmitting coil includes a winding wound substantially on a plane and has a central portion and a peripheral portion. At least a part of the power receiving coil includes a winding wound substantially on a plane and has a central portion and a peripheral portion. The power transmitting coil is provided close to the power receiving coil such that, when the power transmitting antenna and the power receiving antenna are electromagnetically coupled to each other, the central portion of the power transmitting coil is opposed to the central portion of the power receiving coil, and the peripheral portion of the power transmitting coil is opposed to the peripheral portion of the power receiving coil. A magnetic flux density at the central portion of the power transmitting coil and the power receiving coil is lower when the power transmitting antenna and the power receiving antenna are in the even-mode resonant condition, than when the power transmitting antenna and the power receiving antenna are in the odd-mode resonant condition. A magnetic flux density at the peripheral portion of the power transmitting coil and the power receiving coil is lower when the power transmitting antenna and the power receiving antenna are in the odd-mode resonant condition, than when the power transmitting antenna and the power receiving antenna are in the even-mode resonant condition.

According to a control circuit of a wireless power transmitting apparatus of the twelfth aspect, in the control circuit of the wireless power transmitting apparatus of the eleventh aspect, the at least one sensor includes a position sensor configured to detect a position of a foreign object near the power transmitting coil or the power receiving coil. When a foreign object is detected at the central portion of the power transmitting coil and the power receiving coil, the control circuit of the wireless power transmitting apparatus causes the power transmitting circuit to generate high-frequency power at the even-mode resonance frequency and start transmission of the high-frequency power from the wireless power transmitting apparatus to the wireless power receiving apparatus, and when a foreign object is detected at the peripheral portion of the power transmitting coil and the power receiving coil, the control circuit of the wireless power transmitting apparatus causes the power transmitting circuit to generate high-frequency power at the odd-mode resonance frequency and start transmission of the high-frequency power from the wireless power transmitting apparatus to the wireless power receiving apparatus.

According to a control circuit of a wireless power transmitting apparatus of the thirteenth aspect, in the control circuit of the wireless power transmitting apparatus of one of the tenth to twelfth aspects, when an abnormal condition due to a foreign object near the power transmitting coil or the power receiving coil occurs after changing the frequency of the high-frequency power generated by the power transmitting circuit, the control circuit of the wireless power transmitting apparatus stops the transmission of the high-frequency power.

According to a control circuit of a wireless power transmitting apparatus of the fourteenth aspect, a control circuit of a wireless power transmitting apparatus in a wireless power transmission system for transmitting high-frequency power from the wireless power transmitting apparatus to a wireless power receiving apparatus is provided. The wireless power transmitting apparatus is provide with a power transmitting antenna including a first resonant circuit including a power transmitting coil, and at least a part of the power transmitting coil includes a winding wound substantially on a plane and has a central portion and a peripheral portion. The wireless power receiving apparatus is provide with a power receiving antenna including a second resonant circuit including a power receiving coil, and at least a part of the power receiving coil includes a winding wound substantially on a plane and has a central portion and a peripheral portion. The power transmitting coil is provided close to the power receiving coil such that, when the power transmitting antenna and the power receiving antenna are electromagnetically coupled to each other, the central portion of the power transmitting coil is opposed to the central portion of the power receiving coil, and the peripheral portion of the power transmitting coil is opposed to the peripheral portion of the power receiving coil. When the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency. A magnetic flux density at the central portion of the power transmitting coil and the power receiving coil is lower when the power transmitting antenna and the power receiving antenna are in the even-mode resonant condition, than when the power transmitting antenna and the power receiving antenna are in the odd-mode resonant condition. A magnetic flux density at the peripheral portion of the power transmitting coil and the power receiving coil is lower when the power transmitting antenna and the power receiving antenna are in the odd-mode resonant condition, than when the power transmitting antenna and the power receiving antenna are in the even-mode resonant condition. The wireless power transmitting apparatus is further provide with: a power transmitting circuit configured to generate, from input power, high-frequency power at a variable frequency, and supply the high-frequency power to the power transmitting antenna, under control of the control circuit of the wireless power transmitting apparatus; and at least one sensor configured to detect an abnormal condition due to a foreign object near the power transmitting coil or the power receiving coil. The at least one sensor includes a position sensor configured to detect a position of a foreign object near the power transmitting coil or the power receiving coil. When a foreign object is detected at the central portion of the power transmitting coil and the power receiving coil, the control circuit of the wireless power transmitting apparatus causes the power transmitting circuit to generate high-frequency power at the even-mode resonance frequency and start transmission of the high-frequency power from the wireless power transmitting apparatus to the wireless power receiving apparatus, and when a foreign object is detected at the peripheral portion of the power transmitting coil and the power receiving coil, the control circuit of the wireless power transmitting apparatus causes the power transmitting circuit to generate high-frequency power at the odd-mode resonance frequency and start transmission of the high-frequency power from the wireless power transmitting apparatus to the wireless power receiving apparatus.

According to a control circuit of a wireless power transmitting apparatus of the fifteenth aspect, in the control circuit of the wireless power transmitting apparatus of the fourteenth aspect, when the high-frequency power is transmitted and an abnormal condition due to a foreign object near the power transmitting coil or the power receiving coil occurs, the control circuit of the wireless power transmitting apparatus stops the transmission of the high-frequency power.

According to a control circuit of a wireless power transmitting apparatus of the sixteenth aspect, in the control circuit of the wireless power transmitting apparatus of one of the tenth to twelfth, and fourteenth aspects, the first resonant circuit includes a capacitor having one of a plurality of capacitances selectively changed under control of the control circuit of the wireless power transmitting apparatus, and the capacitor and the power transmitting coil forms a plurality of resonators, each of the plurality of resonators corresponding to one of the plurality of capacitances. Each of the plurality of resonators has the odd-mode resonance frequency and the even-mode resonance frequency. When the power transmitting circuit generates high-frequency power at one of the plurality of odd-mode resonance frequencies and the plurality of even-mode resonance frequencies, and the high-frequency power is transmitted from the wireless power transmitting apparatus to the wireless power receiving apparatus, and an abnormal condition due to a foreign object near the power transmitting coil or the power receiving coil occurs, the control circuit of the wireless power transmitting apparatus changes the frequency of the high-frequency power generated by the power transmitting circuit to another frequency of the plurality of odd-mode resonance frequencies and the plurality of even-mode resonance frequencies.

According to a control circuit of a wireless power transmitting apparatus of the seventeenth aspect, in the control circuit of the wireless power transmitting apparatus of the sixteenth aspect, when an abnormal condition due to a foreign object near the power transmitting coil or the power receiving coil occurs after trying to transmit the high-frequency power at all of the plurality of odd-mode resonance frequencies and the plurality of even-mode resonance frequencies, the control circuit of the wireless power transmitting apparatus stops the transmission of the high-frequency power.

According to a control circuit of a wireless power transmitting apparatus of the eighteenth aspect, in the control circuit of the wireless power transmitting apparatus of one of the tenth to seventeenth aspects, the at least one sensor includes a temperature sensor configured to detect a temperature near the power transmitting coil. When the temperature near the power transmitting coil is equal to a first threshold or higher, the control circuit of the wireless power transmitting apparatus determines that an abnormal condition due to a foreign object near the power transmitting coil has occurred.

According to a control circuit of a wireless power transmitting apparatus of the nineteenth aspect, in the control circuit of the wireless power transmitting apparatus of one of the tenth to eighteenth aspects, The wireless power receiving apparatus is further provided with a temperature sensor configured to detect a temperature near the power receiving coil. When the temperature near the power receiving coil is equal to a first threshold or higher, the control circuit of the wireless power transmitting apparatus determines that an abnormal condition due to a foreign object near the power receiving coil has occurred.

According to a control circuit of a wireless power transmitting apparatus of the twentieth aspect, in the control circuit of the wireless power transmitting apparatus of one of the tenth to nineteenth aspects, when transmission efficiency of the high-frequency power from the wireless power transmitting apparatus to the wireless power receiving apparatus is equal to a second threshold or lower, the control circuit of the wireless power transmitting apparatus determines that an abnormal condition due to a foreign object near the power transmitting coil or the power receiving coil has occurred.

According to a wireless power transmitting apparatus of the twenty-first aspect, the wireless power transmitting apparatus is provided with: a control circuit of a wireless power transmitting apparatus of one of the tenth to nineteenth aspects; a power transmitting antenna including a first resonant circuit including a power transmitting coil; a power transmitting circuit configured to generate, from input power, high-frequency power at a variable frequency, and supply the high-frequency power to the power transmitting antenna, under control of the control circuit of the wireless power transmitting apparatus; and at least one sensor configured to detect an abnormal condition due to a foreign object near the power transmitting coil or the power receiving coil.

According to a wireless power transmitting system of the twenty-second aspect, the wireless power transmitting system is provided with: a wireless power transmitting apparatus of the twenty-first aspect; and a power receiving antenna including a second resonant circuit including a power receiving coil.

According to a control circuit of a wireless power transmitting apparatus of the twenty-third aspect, a control circuit of a wireless power transmitting apparatus in a wireless power transmission system for transmitting high-frequency power from the wireless power transmitting apparatus to a wireless power receiving apparatus is provided. The wireless power transmitting apparatus is provided with a power transmitting antenna including a first resonant circuit including a power transmitting coil. The wireless power receiving apparatus is provided with a power receiving antenna including a second resonant circuit including a power receiving coil. When the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency. The wireless power transmitting apparatus is further provided with: a power transmitting circuit configured to generate, from input power, high-frequency power at a variable frequency, and supply the high-frequency power to the power transmitting antenna, under control of the control circuit of the wireless power transmitting apparatus; and at least one temperature estimation means configured to estimate a temperature of a foreign object near the power transmitting coil or the power receiving coil, and When the power transmitting circuit generates high-frequency power at one of the odd-mode resonance frequency and the even-mode resonance frequency, and the high-frequency power is transmitted from the wireless power transmitting apparatus to the wireless power receiving apparatus, and an estimated temperature of a foreign object near the power transmitting coil or the power receiving coil is equal to a first threshold or higher, the control circuit of the wireless power transmitting apparatus changes the frequency of the high-frequency power generated by the power transmitting circuit to the other of the odd-mode resonance frequency and the even-mode resonance frequency.

According to a wireless power transmitting apparatus of the twenty-fourth aspect, the wireless power transmitting apparatus is provided with: a wireless power transmitting apparatus of the twenty-third aspect; a power transmitting antenna including a first resonant circuit including a power transmitting coil; a power transmitting circuit configured to generate, from input power, high-frequency power at a variable frequency, and supply the high-frequency power to the power transmitting antenna, under control of the control circuit of the wireless power transmitting apparatus; and at least one temperature estimation means configured to estimate a temperature of a foreign object near the power transmitting coil or the power receiving coil.

According to a wireless power transmitting system of the twenty-fifth aspect, the wireless power transmitting system is provided with: a wireless power transmitting apparatus of the twenty-fourth aspect; and a power receiving antenna including a second resonant circuit including a power receiving coil.

According to a control circuit of a wireless power transmitting apparatus of the twenty-sixth aspect, a control circuit of a wireless power transmitting apparatus in a wireless power transmission system for transmitting high-frequency power from the wireless power transmitting apparatus to a wireless power receiving apparatus is provided. The wireless power transmitting apparatus is provided with a power transmitting antenna including a first resonant circuit including a power transmitting coil. The wireless power receiving apparatus is provided with a power receiving antenna including a second resonant circuit including a power receiving coil. When the power transmitting antenna and the power receiving antenna are electromagnetically coupled to each other, the power transmitting antenna and the power receiving antenna have an operating band including an odd-mode resonance frequency corresponding to an odd-mode resonant condition, and an even-mode resonance frequency corresponding to an even-mode resonant condition, and the even-mode resonance frequency is higher than the odd-mode resonance frequency. The control circuit of the wireless power transmitting apparatus sets a circuit constant of the wireless power transmitting apparatus associated with an operating band of the power transmitting antenna and the power receiving antenna electromagnetically coupled to each other, such that the operating band is set to one of a first operating band and a second operating band. An even-mode resonance frequency in the first operating band is set to be higher than an even-mode resonance frequency in the second operating band, and an odd-mode resonance frequency in the first operating band is set to be higher than an odd-mode resonance frequency in the second operating band.

According to a control circuit of a wireless power transmitting apparatus of the twenty-seventh aspect, in the control circuit of the wireless power transmitting apparatus of the twenty-sixth aspect, the power transmitting antenna has at least one of a variable inductance and a variable capacitance. The circuit constant of the wireless power transmitting apparatus includes at least one of the inductance and the capacitance of the power transmitting antenna.

According to a control circuit of a wireless power transmitting apparatus of the twenty-eighth aspect, in the control circuit of the wireless power transmitting apparatus of the twenty-sixth aspect, the power transmitting antenna is further provided with a matching circuit connected to the power transmitting antenna, the matching circuit having at least one of a variable inductance and a variable capacitance. The circuit constant of the wireless power transmitting apparatus includes at least one of the inductance and the capacitance of the matching circuit.

According to a control circuit of a wireless power transmitting apparatus of the twenty-ninth aspect, in the control circuit of the wireless power transmitting apparatus of the twenty-sixth aspect, the circuit constant of the wireless power transmitting apparatus includes a coupling coefficient between the power transmitting antenna an the power receiving antenna.

According to a control circuit of a wireless power transmitting apparatus of the thirtieth aspect, in the control circuit of the wireless power transmitting apparatus of one of the twenty-sixth to twenty-ninth aspects, the wireless power receiving apparatus is further provided with a control circuit of the wireless power receiving apparatus, the control circuit of the wireless power receiving apparatus configured to set a circuit constant of the wireless power receiving apparatus associated with the operating band of the power transmitting antenna and the power receiving antenna electromagnetically coupled to each other, under control of the control circuit of the wireless power transmitting apparatus. The control circuit of the wireless power transmitting apparatus sets at least one of the circuit constant of the wireless power transmitting apparatus and the control circuit of the wireless power receiving apparatus, such that the operating band of the power transmitting antenna and the power receiving antenna electromagnetically coupled to each other is set to one of the first operating band and the second operating band.

According to a control circuit of a wireless power transmitting apparatus of the thirty-first aspect, in the control circuit of the wireless power transmitting apparatus of the thirtieth aspect, the power receiving antenna has at least one of a variable inductance and a variable capacitance. The circuit constant of the wireless power receiving apparatus includes at least one of the inductance and the capacitance of the power receiving antenna.

According to a control circuit of a wireless power transmitting apparatus of the thirty-second aspect, in the control circuit of the wireless power transmitting apparatus of the thirtieth aspect, the power receiving antenna is further provided with a matching circuit connected to the power receiving antenna, the matching circuit having at least one of a variable inductance and a variable capacitance. The circuit constant of the wireless power receiving apparatus includes at least one of the inductance and the capacitance of the matching circuit.

According to a control circuit of a wireless power transmitting apparatus of the thirty-third aspect, in the control circuit of the wireless power transmitting apparatus of the thirtieth aspect, the circuit constant of the wireless power receiving apparatus includes a coupling coefficient between the power transmitting antenna an the power receiving antenna.

According to a control circuit of a wireless power transmitting apparatus of the thirty-fourth aspect, in the control circuit of the wireless power transmitting apparatus of one of the twenty-sixth to thirty-third aspects, at least a part of the power transmitting coil includes a winding wound substantially on a plane and has a central portion and a peripheral portion. At least a part of the power receiving coil includes a winding wound substantially on a plane and has a central portion and a peripheral portion. The power transmitting coil is provided close to the power receiving coil such that, when the power transmitting antenna and the power receiving antenna are electromagnetically coupled to each other, the central portion of the power transmitting coil is opposed to the central portion of the power receiving coil, and the peripheral portion of the power transmitting coil is opposed to the peripheral portion of the power receiving coil. A magnetic flux density at the central portion of the power transmitting coil and the power receiving coil is lower when the power transmitting antenna and the power receiving antenna are in the even-mode resonant condition, than when the power transmitting antenna and the power receiving antenna are in the odd-mode resonant condition. A magnetic flux density at the peripheral portion of the power transmitting coil and the power receiving coil is lower when the power transmitting antenna and the power receiving antenna are in the odd-mode resonant condition, than when the power transmitting antenna and the power receiving antenna are in the even-mode resonant condition.

According to a control circuit of a wireless power transmitting apparatus of the thirty-fifth aspect, in the control circuit of the wireless power transmitting apparatus of one of the twenty-sixth to thirty-fourth aspects, the control circuit of the wireless power transmitting apparatus repeatedly alternates a first time interval and a second time interval, the first time interval has a first continuous operating time during which the operating band of the power transmitting antenna and the power receiving antenna electromagnetically coupled to each other is set to the first operating band, and the second time interval has a second continuous operating time during which the operating band of the power transmitting antenna and the power receiving antenna electromagnetically coupled to each other is set to the second operating band.

According to a control circuit of a wireless power transmitting apparatus of the thirty-sixth aspect, in the control circuit of the wireless power transmitting apparatus of the thirty-fifth aspect, the wireless power receiving apparatus is connected to a load apparatus to which the wireless power receiving apparatus supplies power. When requested by the load apparatus to supply power at a maximum current, the control circuit of the wireless power transmitting apparatus repeatedly alternates the first time interval and the second time interval.

According to a control circuit of a wireless power transmitting apparatus of the thirty-seventh aspect, in the control circuit of the wireless power transmitting apparatus of the thirty-fifth or thirty-sixth aspect, the first continuous operating time is set to be shorter than a shortest period of time during which a temperature of a foreign object reaches a threshold temperature, when high-frequency power is transmitted at the odd-mode resonance frequency and the foreign object is present near the power transmitting coil or the power receiving coil. The second continuous operating time is set to be shorter than a shortest period of time during which a temperature of a foreign object reaches the threshold temperature, when high-frequency power is transmitted at the even-mode resonance frequency and the foreign object is present near the power transmitting coil or the power receiving coil.

According to a control circuit of a wireless power transmitting apparatus of the thirty-eighth aspect, in the control circuit of the wireless power transmitting apparatus of the thirty-seventh aspect, the control circuit of the wireless power transmitting apparatus reduces the first continuous operating time and the second continuous operating time, when detecting an abnormal condition due to a foreign object near the power transmitting coil or the power receiving coil using a sensor configured to detect the abnormal condition.

According to a control circuit of a wireless power transmitting apparatus of the thirty-ninth aspect, in the control circuit of the wireless power transmitting apparatus of one of the twenty-sixth to thirty-seventh aspects, the control circuit of the wireless power transmitting apparatus stops the transmission of the high-frequency power, when detecting an abnormal condition due to a foreign object near the power transmitting coil or the power receiving coil using a sensor configured to detect the abnormal condition.

According to a wireless power transmitting apparatus of the fortieth aspect, the wireless power transmitting apparatus is provided with: a wireless power transmitting apparatus is provided with: a power transmitting circuit configured to generate high-frequency power from input power; a power transmitting antenna; and a control circuit of the wireless power transmitting apparatus of one of the twenty-sixth to thirty-ninth aspects. When the power transmitting antenna and the power receiving antenna electromagnetically coupled to each other have the first operating band, the wireless power transmitting apparatus transmits power to the wireless power receiving apparatus at the odd-mode resonance frequency in the first operating band, and when the power transmitting antenna and the power receiving antenna electromagnetically coupled to each other have the second operating band, the wireless power transmitting apparatus transmits power to the wireless power receiving apparatus at the even-mode resonance frequency in the second operating band.

According to a wireless power transmitting apparatus of the forty-first aspect, in the wireless power transmitting apparatus of the fortieth aspect, the odd-mode resonance frequency in the first operating band is set to be identical to the even-mode resonance frequency in the second operating band.

According to a wireless power transmitting apparatus of the forty-second aspect, in the wireless power transmitting apparatus of the fortieth or forty-first aspect, the power transmitting circuit generates high-frequency power at a variable frequency, under control of the control circuit of the wireless power transmitting apparatus. When the power transmitting antenna and the power receiving antenna electromagnetically coupled to each other have the first operating band, the control circuit of the wireless power transmitting apparatus controls the power transmitting circuit to generate high-frequency power at the odd-mode resonance frequency in the first operating band, and when the power transmitting antenna and the power receiving antenna electromagnetically coupled to each other have the second operating band, the control circuit of the wireless power transmitting apparatus controls the power transmitting circuit to generate high-frequency power at the even-mode resonance frequency in the second operating band.

According to a wireless power transmitting apparatus of the forty-third aspect, in the wireless power transmitting apparatus of the forty-second aspect, the wireless power transmitting apparatus is connected to a power supply apparatus configured to supply the input power to the power transmitting circuit. The control circuit of the wireless power transmitting apparatus controls the power transmitting circuit to adjust the frequency of the high-frequency power based on an output voltage and an output current from the power supply apparatus.

According to a wireless power transmitting apparatus of the forty-fourth aspect, in the wireless power transmitting apparatus of the forty-second or forty-third aspect, the wireless power receiving apparatus is connected to a load apparatus to which the wireless power receiving apparatus supplies power. The control circuit of the wireless power transmitting apparatus controls the power transmitting circuit to adjust the frequency of the high-frequency power based on a voltage and a current requested by the load apparatus.

According to a wireless power transmitting apparatus of the forty-fifth aspect, in the wireless power transmitting apparatus of one of the fortieth to forty-fourth aspects, an output impedance for a case where an input terminal of the power transmitting antenna is seen from an output terminal of the power transmitting circuit is set to be substantially equal to an input impedance for a case where the output terminal of the power transmitting circuit is seen from the input terminal of the power transmitting antenna.

According to a control circuit of a wireless power receiving apparatus of the forty-sixth aspect, a control circuit of a wireless power receiving apparatus in a wireless power transmission system for transmitting high-frequency power from a wireless power transmitting apparatus to the wireless power receiving apparatus. The wireless power transmitting apparatus is provided with a power transmitting antenna including a first resonant circuit including a power transmitting coil. The wireless power receiving apparatus is provided with a power receiving antenna including a second resonant circuit including a power receiving coil. When the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency. The control circuit of the wireless power receiving apparatus sets a circuit constant of the wireless power receiving apparatus associated with an operating band of the power transmitting antenna and the power receiving antenna electromagnetically coupled to each other, such that the operating band is set to one of a first operating band and a second operating band. An even-mode resonance frequency in the first operating band is set to be higher than an even-mode resonance frequency in the second operating band, and an odd-mode resonance frequency in the first operating band is set to be higher than an odd-mode resonance frequency in the second operating band.

According to a control circuit of a wireless power receiving apparatus of the forty-seventh aspect, in the control circuit of the wireless power receiving apparatus of the forty-sixth aspect, the wireless power transmitting apparatus is further provided with a control circuit of the wireless power transmitting apparatus, the control circuit of the wireless power transmitting configured to set a circuit constant of the wireless power transmitting apparatus associated with the operating band of the power transmitting antenna and the power receiving antenna electromagnetically coupled to each other, under control of the control circuit of the wireless power receiving apparatus. The control circuit of the wireless power receiving apparatus sets at least one of the circuit constant of the wireless power transmitting apparatus and the control circuit of the wireless power receiving apparatus, such that the operating band of the power transmitting antenna and the power receiving antenna electromagnetically coupled to each other is set to one of the first operating band and the second operating band.

According to a wireless power receiving apparatus of the forty-eighth aspect, the wireless power receiving apparatus is provided with: a wireless power receiving apparatus is provided with: a power receiving antenna; a power receiving circuit configured to supply output power to a load apparatus; and a control circuit of the wireless power receiving apparatus of the forty-sixth or forty-seventh aspect.

According to a wireless power receiving apparatus of the forty-ninth aspect, in the wireless power receiving apparatus of the forty-eighth aspect, an output impedance for the case where the power receiving circuit is seen from an output terminal of the power receiving antenna is set to be substantially equal to an input impedance for a case where the output terminal of the power receiving antenna is seen from the power receiving circuit.

According to a wireless power transmitting system of the fiftieth aspect, the wireless power transmitting system is provided with: a wireless power transmitting apparatus of one of the fortieth to forty-fifth aspects; and a wireless power receiving apparatus of the forty-eighth or forty-ninth aspect.

According to a wireless power transmitting apparatus of the fifty-first aspect, a wireless power transmitting apparatus in a wireless power transmission system for transmitting high-frequency power from the wireless power transmitting apparatus to a wireless power receiving apparatus. The wireless power transmitting apparatus is provided with a power transmitting antenna including a first resonant circuit including a power transmitting coil. The wireless power receiving apparatus is provided with a power receiving antenna including a second resonant circuit including a power receiving coil. When the power transmitting antenna and the power receiving antenna are electromagnetically coupled to each other, the power transmitting antenna and the power receiving antenna have an operating band including an odd-mode resonance frequency corresponding to an odd-mode resonant condition, and an even-mode resonance frequency corresponding to an even-mode resonant condition, and the even-mode resonance frequency is higher than the odd-mode resonance frequency. The wireless power transmitting apparatus is further provided with: a power transmitting circuit configured to generate high-frequency power from input power, and supply the high-frequency power to the power transmitting antenna; at least one sensor configured to detect an abnormal condition due to a foreign object near the power transmitting coil or the power receiving coil; and a control circuit of the wireless power transmitting apparatus. The control circuit of the wireless power transmitting apparatus sets a circuit constant of the wireless power transmitting apparatus associated with an operating band of the power transmitting antenna and the power receiving antenna electromagnetically coupled to each other, such that the operating band is set to one of a first operating band and a second operating band. An even-mode resonance frequency in the first operating band is set to be higher than an even-mode resonance frequency in the second operating band, and an odd-mode resonance frequency in the first operating band is set to be higher than an odd-mode resonance frequency in the second operating band. When the power transmitting antenna and the power receiving antenna electromagnetically coupled to each other have the first operating band, the wireless power transmitting apparatus transmits power to the wireless power receiving apparatus at the odd-mode resonance frequency in the first operating band, and when the power transmitting antenna and the power receiving antenna electromagnetically coupled to each other have the second operating band, the wireless power transmitting apparatus transmits power to the wireless power receiving apparatus at the even-mode resonance frequency in the second operating band. When the circuit constant of the wireless power transmitting apparatus is set such that the operating band the power transmitting antenna and the power receiving antenna electromagnetically coupled to each other is set to one of the first and second operating bands, and an abnormal condition due to a foreign object near the power transmitting coil or the power receiving coil occurs, the control circuit of the wireless power transmitting apparatus sets the circuit constant of the wireless power transmitting apparatus such that the operating band the power transmitting antenna and the power receiving antenna electromagnetically coupled to each other is set to the other of the first and second operating bands.

According to a wireless power transmitting apparatus of the fifty-second aspect, in the wireless power transmitting apparatus of the fifty-first aspect, the wireless power receiving apparatus is provided with a control circuit of the wireless power receiving apparatus, the control circuit of the wireless power receiving configured to set a circuit constant of the wireless power receiving apparatus associated with the operating band of the power transmitting antenna and the power receiving antenna electromagnetically coupled to each other, under control of the control circuit of the wireless power transmitting apparatus. The control circuit of the wireless power transmitting apparatus sets at least one of the circuit constant of the wireless power transmitting apparatus and the control circuit of the wireless power receiving apparatus, such that the operating band of the power transmitting antenna and the power receiving antenna electromagnetically coupled to each other is set to one of the first operating band and the second operating band.

According to a wireless power transmitting apparatus of the fifty-third aspect, in the wireless power transmitting apparatus of the fifty-first or fifty-second aspect, the odd-mode resonance frequency in the first operating band is set to be identical to the even-mode resonance frequency in the second operating band.

According to a wireless power transmitting apparatus of the fifty-fourth aspect, in the wireless power transmitting apparatus of one of the fifty-first to fifty-third aspects, the power transmitting circuit generates high-frequency power at a variable frequency, under control of the control circuit of the wireless power transmitting apparatus. When the power transmitting antenna and the power receiving antenna electromagnetically coupled to each other have the first operating band, the control circuit of the wireless power transmitting apparatus controls the power transmitting circuit to generate high-frequency power at the odd-mode resonance frequency in the first operating band, and when the power transmitting antenna and the power receiving antenna electromagnetically coupled to each other have the second operating band, the control circuit of the wireless power transmitting apparatus controls the power transmitting circuit to generate high-frequency power at the even-mode resonance frequency in the second operating band.

According to a wireless power transmitting apparatus of the fifty-fifth aspect, in the wireless power transmitting apparatus of one of the fifty-first to fifty-fourth aspects, at least a part of the power transmitting coil includes a winding wound substantially on a plane and has a central portion and a peripheral portion. At least a part of the power receiving coil includes a winding wound substantially on a plane and has a central portion and a peripheral portion. The power transmitting coil is provided close to the power receiving coil such that, when the power transmitting antenna and the power receiving antenna are electromagnetically coupled to each other, the central portion of the power transmitting coil is opposed to the central portion of the power receiving coil, and the peripheral portion of the power transmitting coil is opposed to the peripheral portion of the power receiving coil. A magnetic flux density at the central portion of the power transmitting coil and the power receiving coil is lower when the power transmitting antenna and the power receiving antenna are in the even-mode resonant condition, than when the power transmitting antenna and the power receiving antenna are in the odd-mode resonant condition. A magnetic flux density at the peripheral portion of the power transmitting coil and the power receiving coil is lower when the power transmitting antenna and the power receiving antenna are in the odd-mode resonant condition, than when the power transmitting antenna and the power receiving antenna are in the even-mode resonant condition. The at least one sensor includes a position sensor configured to detect a position of a foreign object near the power transmitting coil or the power receiving coil. When a foreign object is detected at the central portion of the power transmitting coil and the power receiving coil, the control circuit of the wireless power transmitting apparatus sets the circuit constant of the wireless power transmitting apparatus such that the operating band of the power transmitting antenna and the power receiving antenna electromagnetically coupled to each other is set to the second operating band, causes the power transmitting circuit to generate high-frequency power at the even-mode resonance frequency in the second operating band, and start transmission of the high-frequency power from the wireless power transmitting apparatus to the wireless power receiving apparatus. When a foreign object is detected at the peripheral portion of the power transmitting coil and the power receiving coil, the control circuit of the wireless power transmitting apparatus sets the circuit constant of the wireless power transmitting apparatus such that the operating band of the power transmitting antenna and the power receiving antenna electromagnetically coupled to each other is set to the first operating band, causes the power transmitting circuit to generate high-frequency power at the odd-mode resonance frequency in the first operating band, and start transmission of the high-frequency power from the wireless power transmitting apparatus to the wireless power receiving apparatus.

According to a wireless power transmitting apparatus of the fifty-sixth aspect, in the wireless power transmitting apparatus of one of the fifty-first to fifty-fifth aspects, when an abnormal condition due to a foreign object near the power transmitting coil or the power receiving coil occurs after changing the circuit constant of the wireless power transmitting apparatus, the control circuit of the wireless power transmitting apparatus stops the transmission of the high-frequency power.

According to a wireless power transmitting apparatus of the fifty-seventh aspect, in the wireless power transmitting apparatus of the fifty-first aspect, a wireless power transmitting apparatus in a wireless power transmission system for transmitting high-frequency power from the wireless power transmitting apparatus to a wireless power receiving apparatus. The wireless power transmitting apparatus is provided with a power transmitting antenna including a first resonant circuit including a power transmitting coil, and at least a part of the power transmitting coil includes a winding wound substantially on a plane and has a central portion and a peripheral portion. The wireless power receiving apparatus is provided with a power receiving antenna including a second resonant circuit including a power receiving coil, and at least a part of the power receiving coil includes a winding wound substantially on a plane and has a central portion and a peripheral portion. The power transmitting coil is provided close to the power receiving coil such that, when the power transmitting antenna and the power receiving antenna are electromagnetically coupled to each other, the central portion of the power transmitting coil is opposed to the central portion of the power receiving coil, and the peripheral portion of the power transmitting coil is opposed to the peripheral portion of the power receiving coil. When the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency. A magnetic flux density at the central portion of the power transmitting coil and the power receiving coil is lower when the power transmitting antenna and the power receiving antenna are in the even-mode resonant condition, than when the power transmitting antenna and the power receiving antenna are in the odd-mode resonant condition. A magnetic flux density at the peripheral portion of the power transmitting coil and the power receiving coil is lower when the power transmitting antenna and the power receiving antenna are in the odd-mode resonant condition, than when the power transmitting antenna and the power receiving antenna are in the even-mode resonant condition. The wireless power transmitting apparatus is further provided with: a power transmitting circuit configured to generate high-frequency power from input power, and supply the high-frequency power to the power transmitting antenna; at least one sensor configured to detect an abnormal condition due to a foreign object near the power transmitting coil or the power receiving coil; and a control circuit of the wireless power transmitting apparatus. The at least one sensor includes a position sensor configured to detect a position of a foreign object near the power transmitting coil or the power receiving coil. The control circuit of the wireless power transmitting apparatus sets a circuit constant of the wireless power transmitting apparatus associated with an operating band of the power transmitting antenna and the power receiving antenna electromagnetically coupled to each other, such that the operating band is set to one of a first operating band and a second operating band. An even-mode resonance frequency in the first operating band is set to be higher than an even-mode resonance frequency in the second operating band, and an odd-mode resonance frequency in the first operating band is set to be higher than an odd-mode resonance frequency in the second operating band. When the power transmitting antenna and the power receiving antenna electromagnetically coupled to each other have the first operating band, the wireless power transmitting apparatus transmits power to the wireless power receiving apparatus at the odd-mode resonance frequency in the first operating band, and when the power transmitting antenna and the power receiving antenna electromagnetically coupled to each other have the second operating band, the wireless power transmitting apparatus transmits power to the wireless power receiving apparatus at the even-mode resonance frequency in the second operating band. When a foreign object is detected at the central portion of the power transmitting coil and the power receiving coil, the control circuit of the wireless power transmitting apparatus sets the circuit constant of the wireless power transmitting apparatus such that the operating band of the power transmitting antenna and the power receiving antenna electromagnetically coupled to each other is set to the second operating band, causes the power transmitting circuit to generate high-frequency power at the even-mode resonance frequency in the second operating band, and start transmission of the high-frequency power from the wireless power transmitting apparatus to the wireless power receiving apparatus. When a foreign object is detected at the peripheral portion of the power transmitting coil and the power receiving coil, the control circuit of the wireless power transmitting apparatus sets the circuit constant of the wireless power transmitting apparatus such that the operating band of the power transmitting antenna and the power receiving antenna electromagnetically coupled to each other is set to the first operating band, causes the power transmitting circuit to generate high-frequency power at the odd-mode resonance frequency in the first operating band, and start transmission of the high-frequency power from the wireless power transmitting apparatus to the wireless power receiving apparatus.

According to a wireless power transmitting apparatus of the fifty-eighth aspect, in the wireless power transmitting apparatus of the fifty-seventh aspect, when the high-frequency power is transmitted and an abnormal condition due to a foreign object near the power transmitting coil or the power receiving coil occurs, the control circuit of the wireless power transmitting apparatus stops the transmission of the high-frequency power.

According to a wireless power transmitting system of the fifty-ninth aspect, the wireless power transmitting system is provided with: a wireless power transmitting apparatus of one of the fifty-first to fifty-eighth aspects, and a power receiving antenna including a second resonant circuit including a power receiving coil.

The control circuits of the wireless power transmitting apparatus and the wireless power receiving apparatus, the wireless power transmitting apparatus, the wireless power receiving apparatus, and the wireless power transmission system according to the aspects of the present disclosure have the following advantageous features.

Even if a foreign object such as a metal foreign object is present near the power transmitting coil or the power receiving coil, it is possible to continue power transmission without immediately stopping the power transmission, while suppressing heating of the metal foreign object.

It is possible to suppress the temperature of a foreign object under the threshold temperature.

Even if the temperature of a foreign object increases when the transmission mode is set to one of the even mode and the odd mode, it is possible to change the transmission mode to the other transmission mode, and thus, reduce the temperature of the foreign object.

Even if a metal foreign object is detected, it is possible to reduce the continuous operating time and continue power transmission for a longer time period without immediately stopping the power transmission, while suppressing heating of the metal foreign object.

When at least one sensor is provided, even if a metal foreign object is present near the power transmitting coil or the power receiving coil, it is possible to continue power transmission without immediately stopping the power transmission, while suppressing heating of the metal foreign object, until an abnormal condition due to the foreign object is detected.

It is possible to substantially maximize the transmission efficiency of the wireless power transmission system.

The wireless power transmission system can select a resonant mode of the power transmitting antenna and the power receiving antenna coupled to each other, while keeping high transmission efficiency, by changing at least one of the circuit constant of the wireless power transmitting apparatus and the circuit constant of the wireless power receiving apparatus.

As described above, the embodiments of the present disclosure have been described in detail. However, it will be apparent to those skilled in the art that the embodiments of the present disclosure are not limited thereto, and many modifications and changes can be made within the technical scope described in the following claims.

The control circuits of the wireless power transmitting apparatus and the wireless power receiving apparatus, the wireless power transmitting apparatus, the wireless power receiving apparatus, and wireless power transmission system according to the present disclosure can be applied to charging systems for electronic devices, electric motorcycles, electric bicycles with pedal-assist, or electric cars which use rechargeable batteries. In addition, the control circuits of the wireless power transmitting apparatus and the wireless power receiving apparatus, the wireless power transmitting apparatus, the wireless power receiving apparatus, and wireless power transmission system according to the present disclosure can be applied to power supply systems for various devices such as AV appliance and home electrical appliances. The AV appliances include, for example, smartphones, tablet terminal apparatuses, televisions, and laptop personal computers. The home electrical appliances include, for example, washing machines, refrigerators, and air conditioners.

The control circuits of the wireless power transmitting apparatus and the wireless power receiving apparatus, the wireless power transmitting apparatus, the wireless power receiving apparatus, and wireless power transmission system according to the present disclosure can be used, for example, to charge or supply power to smartphones or tablet terminal apparatuses, as shown in FIGS. 73 and 74.

What is claimed is:

1. A control circuit of a wireless power transmitting apparatus in a wireless power transmission system for transmitting high-frequency power from the wireless power transmitting apparatus to a wireless power receiving apparatus,
    wherein the wireless power transmitting apparatus comprises a power transmitting antenna including a first resonant circuit including a power transmitting coil,
    wherein the wireless power receiving apparatus comprises a power receiving antenna including a second resonant circuit including a power receiving coil,
    wherein, when the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency,
    wherein the wireless power transmitting apparatus further comprises:
    a power transmitting circuit configured to generate, from input power, high-frequency power at a variable frequency, and supply the high-frequency power to the power transmitting antenna, under control of the control circuit of the wireless power transmitting apparatus; and
    at least one sensor configured to detect an abnormal condition due to a foreign object near the power transmitting coil or the power receiving coil, and
    wherein, when the power transmitting circuit generates high-frequency power at one of the odd-mode resonance frequency and the even-mode resonance frequency, and the high-frequency power is transmitted from the wireless power transmitting apparatus to the wireless power receiving apparatus, and an abnormal condition due to a foreign object near the power transmitting coil or the power receiving coil occurs, the control circuit of the wireless power transmitting apparatus changes the frequency of the high-frequency power generated by the power transmitting circuit to the other of the odd-mode resonance frequency and the even-mode resonance frequency.

2. The control circuit of the wireless power transmitting apparatus as claimed in claim 1, wherein at least a part of the power transmitting coil includes a winding wound substantially on a plane and has a central portion and a peripheral portion, wherein at least a part of the power receiving coil includes a winding wound substantially on a plane and has a central portion and a peripheral portion, wherein the power transmitting coil is provided close to the power receiving coil such that, when the power transmitting antenna and the power receiving antenna are electromagnetically coupled to each other, the central portion of the power transmitting coil is opposed to the central portion of the power receiving coil, and the peripheral portion of the power transmitting coil is opposed to the peripheral portion of the power receiving coil, wherein a magnetic flux density at the central portion of the power transmitting coil and the power receiving coil is lower when the power transmitting antenna and the power receiving antenna are in the even-mode resonant condition, than when the power transmitting antenna and the power receiving antenna are in the odd-mode resonant condition, and wherein a magnetic flux density at the peripheral portion of the power transmitting coil and the power receiving coil is lower when the power transmitting antenna and the power receiving antenna are in the odd-mode resonant condition, than when the power transmitting antenna and the power receiving antenna are in the even-mode resonant condition.

3. The control circuit of the wireless power transmitting apparatus as claimed in claim 2, wherein the at least one sensor includes a position sensor configured to detect a position of a foreign object near the power transmitting coil or the power receiving coil, and wherein, when a foreign object is detected at the central portion of the power transmitting coil and the power receiving coil, the control circuit of the wireless power transmitting apparatus causes the power transmitting circuit to generate high-frequency power at the even-mode resonance frequency and start transmission of the high-frequency power from the wireless power transmitting apparatus to the wireless power receiving apparatus, and when a foreign object is detected at the peripheral portion of the power transmitting coil and the power receiving coil, the control circuit of the wireless power transmitting apparatus causes the power transmitting circuit to generate high-frequency power at the odd-mode resonance frequency and start transmission of the high-frequency power from the wireless power transmitting apparatus to the wireless power receiving apparatus.

4. The control circuit of the wireless power transmitting apparatus as claimed in claim 1, wherein, when an abnormal condition due to a foreign object near the power transmitting coil or the power receiving coil occurs after changing the frequency of the high-frequency power generated by the power transmitting circuit, the control circuit of the wireless power transmitting apparatus stops the transmission of the high-frequency power.

5. The control circuit of the wireless power transmitting apparatus as claimed in claim 1, wherein the first resonant circuit includes a capacitor having one of a plurality of capacitances selectively changed under control of the control circuit of the wireless power transmitting apparatus, and the capacitor and the power transmitting coil forms a plurality of resonators, each of the plurality of resonators corresponding to one of the plurality of capacitances, wherein each of the plurality of resonators has the odd-mode resonance frequency and the even-mode resonance frequency, and wherein, when the power transmitting circuit generates high-frequency power at one of the plurality of odd-mode resonance frequencies and the plurality of even-mode resonance frequencies, and the high-frequency power is transmitted from the wireless power transmitting apparatus to the wireless power receiving apparatus, and an abnormal condition due to a foreign object near the power transmitting coil or the power receiving coil occurs, the control circuit of the wireless power transmitting apparatus changes the frequency of the high-frequency power generated by the power transmitting circuit to another frequency of the plurality of odd-mode resonance frequencies and the plurality of even-mode resonance frequencies.

6. The control circuit of the wireless power transmitting apparatus as claimed in claim 5, wherein, when an abnormal condition due to a foreign object near the power transmitting coil or the power receiving coil occurs after trying to transmit the high-frequency power at all of the plurality of odd-mode resonance frequencies and the plurality of even-mode resonance frequencies, the control circuit of the wireless power transmitting apparatus stops the transmission of the high-frequency power.

7. The control circuit of the wireless power transmitting apparatus as claimed in claim 1, wherein the at least one sensor includes a temperature sensor configured to detect a temperature near the power transmitting coil, and wherein, when the temperature near the power transmitting coil is equal to a first threshold or higher, the control circuit of the wireless power transmitting apparatus determines that an abnormal condition due to a foreign object near the power transmitting coil has occurred.

8. The control circuit of the wireless power transmitting apparatus as claimed in claim 1, wherein the wireless power receiving apparatus further comprises a temperature sensor configured to detect a temperature near the power receiving coil, and wherein, when the temperature near the power receiving coil is equal to a first threshold or higher, the control circuit of the wireless power transmitting apparatus determines that an abnormal condition due to a foreign object near the power receiving coil has occurred.

9. The control circuit of the wireless power transmitting apparatus as claimed in claim 1, wherein, when transmission efficiency of the high-frequency power from the wireless power transmitting apparatus to the wireless power receiving apparatus is equal to a second threshold or lower, the control circuit of the wireless power transmitting apparatus determines that an abnormal condition due to a foreign object near the power transmitting coil or the power receiving coil has occurred.

10. A control circuit of a wireless power transmitting apparatus in a wireless power transmission system for transmitting high-frequency power from the wireless power transmitting apparatus to a wireless power receiving apparatus, wherein the wireless power transmitting apparatus comprises a power transmitting antenna including a first resonant circuit including a power transmitting coil, and at least a part of the power transmitting coil includes a winding wound substantially on a plane and has a central portion and a peripheral portion, wherein the wireless power receiving apparatus comprises a power receiving antenna including a second resonant circuit including a power receiving coil, and at least a part of the power receiving coil includes a winding wound substantially on a plane and has a central portion and a peripheral portion, wherein the power transmitting coil is provided close to the power receiving coil such that, when the power transmitting antenna and the power receiving antenna are electromagnetically coupled to each other, the central portion of the power transmitting coil is opposed to the central portion of the power receiving coil, and the peripheral portion of the power transmitting coil is opposed to the peripheral portion of the power receiving coil, wherein, when the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency, wherein a magnetic flux density at the central portion of the power transmitting coil and the power receiving coil is lower when the power transmitting antenna and the power receiving antenna are in the even-mode resonant condition, than when the power transmitting antenna and the power receiving antenna are in the odd-mode resonant condition, wherein a magnetic flux density at the peripheral portion of the power transmitting coil and the power receiving coil is lower when the power transmitting antenna and the power receiving antenna are in the odd-mode resonant condition, than when the power transmitting antenna and the power receiving antenna are in the even-mode resonant condition, wherein the wireless power transmitting apparatus further comprises:

a power transmitting circuit configured to generate, from input power, high-frequency power at a variable frequency, and supply the high-frequency power to the power transmitting antenna, under control of the control circuit of the wireless power transmitting apparatus; and at least one sensor configured to detect an abnormal condition due to a foreign object near the power transmitting coil or the power receiving coil, wherein the at least one sensor includes a position sensor configured to detect a position of a foreign object near the power transmitting coil or the power receiving coil, and wherein, when a foreign object is detected at the central portion of the power transmitting coil and the power receiving coil, the control circuit of the wireless power transmitting apparatus causes the power transmitting circuit to generate high-frequency power at the even-mode resonance frequency and start transmission of the high-frequency power from the wireless power transmitting apparatus to the wireless power receiving apparatus, and when a foreign object is detected at the peripheral portion of the power transmitting coil and the power receiving coil, the control circuit of the wireless power transmitting apparatus causes the power transmitting circuit to generate high-frequency power at the odd-mode resonance frequency and start transmission of the high-frequency power from the wireless power transmitting apparatus to the wireless power receiving apparatus.

11. The control circuit of the wireless power transmitting apparatus as claimed in claim 10, wherein, when the high-frequency power is transmitted and an abnormal condition due to a foreign object near the power transmitting coil or the power receiving coil occurs, the control circuit of the wireless power transmitting apparatus stops the transmission of the high-frequency power.

12. A wireless power transmitting apparatus in a wireless power transmission system for transmitting high-frequency power from the wireless power transmitting apparatus to a wireless power receiving apparatus, the wireless power transmitting apparatus comprising:

a control circuit of the wireless power transmitting apparatus;

a power transmitting antenna including a first resonant circuit including a power transmitting coil; and a power transmitting circuit configured to generate, from input power, high-frequency power at a variable frequency, and supply the high-frequency power to the power transmitting antenna, under control of the control circuit of the wireless power transmitting apparatus;

wherein the wireless power receiving apparatus comprises a power receiving antenna including a second resonant circuit including a power receiving coil, wherein the wireless power transmitting apparatus further comprises at least one sensor configured to detect an abnormal condition due to a foreign object near the power transmitting coil or the power receiving coil, wherein, when the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency, and wherein, when the power transmitting circuit generates high-frequency power at one of the odd-mode resonance frequency and the even-mode resonance frequency, and the high-frequency power is transmitted from the wireless power transmitting apparatus to the wireless power receiving apparatus, and an abnormal condition due to a foreign object near the power transmitting coil or the power receiving coil occurs, the control circuit of the wireless power transmitting apparatus changes the frequency of the high-frequency power generated by the power transmitting circuit to the other of the odd-mode resonance frequency and the even-mode resonance frequency.

13. A wireless power transmission system for transmitting high-frequency power from a wireless power transmitting apparatus to a wireless power receiving apparatus, wherein the wireless power transmitting apparatus comprises:

a control circuit of the wireless power transmitting apparatus;

a power transmitting antenna including a first resonant circuit including a power transmitting coil; and a power transmitting circuit configured to generate, from input power, high-frequency power at a variable frequency, and supply the high-frequency power to the power transmitting antenna, under control of the control circuit of the wireless power transmitting apparatus;

wherein the wireless power receiving apparatus comprises a power receiving antenna including a second resonant circuit including a power receiving coil, wherein the wireless power transmitting apparatus further comprises at least one sensor configured to detect an abnormal condition due to a foreign object near the power transmitting coil or the power receiving coil, wherein, when the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency, and wherein, when the power transmitting circuit generates high-frequency power at one of the odd-mode resonance frequency and the even-mode resonance frequency, and the high-frequency power is transmitted from the wireless power transmitting apparatus to the wireless power receiving apparatus, and an abnormal condition due to a foreign object near the power transmitting coil or the power receiving coil occurs, the control circuit of the wireless power transmitting apparatus changes the frequency of the high-frequency power generated by the power transmitting circuit to the other of the odd-mode resonance frequency and the even-mode resonance frequency.

14. A control circuit of a wireless power transmitting apparatus in a wireless power transmission system for transmitting high-frequency power from the wireless power transmitting apparatus to a wireless power receiving apparatus, wherein the wireless power transmitting apparatus comprises a power transmitting antenna including a first resonant circuit including a power transmitting coil, wherein the wireless power receiving apparatus comprises a power receiving antenna including a second resonant circuit including a power receiving coil, wherein, when the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency, wherein the wireless power transmitting apparatus further comprises:

a power transmitting circuit configured to generate, from input power, high-frequency power at a variable frequency, and supply the high-frequency power to the power transmitting antenna, under control of the control circuit of the wireless power transmitting apparatus; and at least one temperature estimation means configured to estimate a temperature of a foreign object near the power transmitting coil or the power receiving coil, and wherein, when the power transmitting circuit generates high-frequency power at one of the odd-mode resonance frequency and the even-mode resonance frequency, and the high-frequency power is transmitted from the wireless power transmitting apparatus to the wireless power receiving apparatus, and an estimated temperature of a foreign object near the power transmitting coil or the power receiving coil is equal to a first threshold or higher, the control circuit of the wireless power transmitting apparatus changes the frequency of the high-frequency power generated by the power transmitting circuit to the other of the odd-mode resonance frequency and the even-mode resonance frequency.

15. A wireless power transmitting apparatus in a wireless power transmission system for transmitting high-frequency power from the wireless power transmitting apparatus to a wireless power receiving apparatus, the wireless power transmitting apparatus comprising:

a control circuit of the wireless power transmitting apparatus;

a power transmitting antenna including a first resonant circuit including a power transmitting coil; and a power transmitting circuit configured to generate, from input power, high-frequency power at a variable frequency, and supply the high-frequency power to the power transmitting antenna, under control of the control circuit of the wireless power transmitting apparatus, wherein the wireless power receiving apparatus comprises a power receiving antenna including a second resonant circuit including a power receiving coil, wherein the wireless power transmitting apparatus further comprises at least one temperature estimation means configured to estimate a temperature of a foreign object near the power transmitting coil or the power receiving coil, wherein, when the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency, and wherein, when the power transmitting circuit generates high-frequency power at one of the odd-mode resonance frequency and the even-mode resonance frequency, and the high-frequency power is transmitted from the wireless power transmitting apparatus to the wireless power receiving apparatus, and an estimated temperature of a foreign object near the power transmitting coil or the power receiving coil is equal to a first threshold or higher, the control circuit of the wireless power transmitting apparatus changes the frequency of the high-frequency power generated by the power transmitting circuit to the other of the odd-mode resonance frequency and the even-mode resonance frequency.

16. A wireless power transmission system for transmitting high-frequency power from a wireless power transmitting apparatus to a wireless power receiving apparatus, wherein the wireless power transmitting apparatus comprises:
- a control circuit of the wireless power transmitting apparatus;
- a power transmitting antenna including a first resonant circuit including a power transmitting coil; and
- a power transmitting circuit configured to generate, from input power, high-frequency power at a variable frequency, and supply the high-frequency power to the power transmitting antenna, under control of the control circuit of the wireless power transmitting apparatus, wherein the wireless power receiving apparatus comprises a power receiving antenna including a second resonant circuit including a power receiving coil, wherein the wireless power transmitting apparatus further comprises at least one temperature estimation means configured to estimate a temperature of a foreign object near the power transmitting coil or the power receiving coil, wherein, when the power transmitting antenna and the power receiving antenna are electromagnetically coupled to each other, the power transmitting antenna and the power receiving antenna have an odd-mode resonance frequency corresponding to an odd-mode resonant condition, and an even-mode resonance frequency corresponding to an even-mode resonant condition, and the even-mode resonance frequency is higher than the odd-mode resonance frequency, and wherein, when the power transmitting circuit generates high-frequency power at one of the odd-mode resonance frequency and the even-mode resonance frequency, and the high-frequency power is transmitted from the wireless power transmitting apparatus to the wireless power receiving apparatus, and an estimated temperature of a foreign object near the power transmitting coil or the power receiving coil is equal to a first threshold or higher, the control circuit of the wireless power transmitting apparatus changes the frequency of the high-frequency power generated by the power transmitting circuit to the other of the odd-mode resonance frequency and the even-mode resonance frequency.

\* \* \* \* \*